United States Patent
Zhou et al.

(10) Patent No.: US 11,672,043 B2
(45) Date of Patent: Jun. 6, 2023

(54) FAILURE DETECTION AND RECOVERY FOR MULTIPLE ACTIVE RESOURCES

(71) Applicant: Comcast Cable Communications, LLC, Philadelphia, PA (US)

(72) Inventors: Hua Zhou, Vienna, VA (US); Esmael Hejazi Dinan, McLean, VA (US); Ali Cagatay Cirik, Chantilly, VA (US); Alireza Babaei, Fairfax, VA (US); Hyoungsuk Jeon, Centreville, VA (US); Kyungmin Park, Vienna, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/894,263

(22) Filed: Aug. 24, 2022

(65) Prior Publication Data

US 2023/0136408 A1   May 4, 2023

Related U.S. Application Data

(63) Continuation of application No. 16/995,413, filed on Aug. 17, 2020, now Pat. No. 11,464,064, which is a continuation of application No. 16/418,699, filed on May 21, 2019, now Pat. No. 10,750,564.

(60) Provisional application No. 62/675,721, filed on May 23, 2018, provisional application No. 62/674,127, filed on May 21, 2018.

(51) Int. Cl.
| | |
|---|---|
| H04W 76/19 | (2018.01) |
| H04W 24/08 | (2009.01) |
| H04W 72/23 | (2023.01) |

(52) U.S. Cl.
CPC .......... H04W 76/19 (2018.02); H04W 24/08 (2013.01); H04W 72/23 (2023.01)

(58) Field of Classification Search
CPC ...... H04W 76/19; H04W 24/08; H04W 72/23
See application file for complete search history.

(56) References Cited

U.S. PATENT DOCUMENTS

| | | |
|---|---|---|
| 8,976,698 B2 | 3/2015 | Chen et al. |
| 2013/0051214 A1 | 2/2013 | Fong et al. |
| 2017/0156152 A1 | 6/2017 | Nazar et al. |
| 2017/0238323 A1 | 8/2017 | Marinier et al. |

(Continued)

FOREIGN PATENT DOCUMENTS

| | | |
|---|---|---|
| EP | 2672649 A1 | 12/2013 |
| EP | 3282633 A1 | 2/2018 |

(Continued)

OTHER PUBLICATIONS

R1-1807747 3GPP TSG RAN WG1 Meeting #93, Busan, Korea, May 21-25, 2018, Source: Qualcomm Incorporated, Title: Summary of Remaining Details on RACH Procedure.

(Continued)

*Primary Examiner* — Kyaw Z Soe
(74) *Attorney, Agent, or Firm* — Banner & Witcoff, Ltd.

(57) ABSTRACT

Wireless communications using multiple active resources (e.g., bandwidth parts (BWPs)) are described. A wireless device may perform failure event detection, such as radio link monitoring (RLM) and/or beam failure detection (BFD), jointly or separately for multiple active resources (e.g., BWPs) based on one or more criteria.

28 Claims, 61 Drawing Sheets

(56) References Cited

U.S. PATENT DOCUMENTS

| | | | |
|---|---|---|---|
| 2017/0245165 | A1 | 8/2017 | Onggosanusi et al. |
| 2017/0353223 | A1 | 12/2017 | Kim et al. |
| 2018/0006701 | A1 | 1/2018 | Ahn et al. |
| 2018/0049047 | A1 | 2/2018 | Lin et al. |
| 2018/0049169 | A1 | 2/2018 | Lin et al. |
| 2018/0124687 | A1* | 5/2018 | Park ...................... H04W 48/12 |
| 2018/0124815 | A1 | 5/2018 | Papasakellariou |
| 2018/0131493 | A1* | 5/2018 | Luo ....................... H04L 5/0092 |
| 2018/0183551 | A1* | 6/2018 | Chou .................... H04L 5/0042 |
| 2019/0132109 | A1 | 5/2019 | Zhou et al. |
| 2019/0159136 | A1 | 5/2019 | MolavianJazi et al. |
| 2019/0254110 | A1 | 8/2019 | He et al. |

FOREIGN PATENT DOCUMENTS

| | | |
|---|---|---|
| WO | 2011038243 A2 | 3/2011 |
| WO | 2011038243 A3 | 7/2011 |
| WO | 2011085230 A2 | 7/2011 |
| WO | 2017197155 A1 | 11/2017 |
| WO | 2018021834 A1 | 2/2018 |
| WO | 2018031638 A1 | 2/2018 |
| WO | 2018031924 A1 | 2/2018 |
| WO | 2018044116 A1 | 3/2018 |
| WO | 2018080260 A1 | 5/2018 |
| WO | 2018084544 A1 | 5/2018 |
| WO | 2018084571 A1 | 5/2018 |
| WO | 2018085145 A1 | 5/2018 |
| WO | 2018089117 A1 | 5/2018 |
| WO | 2018145019 A1 | 8/2018 |

OTHER PUBLICATIONS

R2-1800688 3GPP TSG RAN WG2 NR Ad Hoc, Vancouver, Canada, Jan. 22-26, 2018, Source: Ericsson, Title: Need for PDCCH order.
Sep. 9, 2019—European Extended Search Report—EP 19174705.4.
Sep. 16, 2019—European Extended Search Report—EP 19175772.3.
R2-1712212 3GPP TSG RAN WG2 Meeting #100, Reno, USA, Nov. 27-Dec. 1, 2017, Source: ASUSTeK, Title: Details of BWP inactivity timer.
Sep. 26, 2019—European Extended Search Report—EP 19175077.7.
R1-1718581 3GPP TSG RAN WG1 Meeting #90bis, Prague, Czech Republic, Oct. 9-13, 2017, Source: Qualcomm Incorporated, Title: Open Issues on CA.
Nov. 22, 2019—European Office Action—EP 18205418.9.
Jan. 3, 2020—European Extended Search Report—EP 19189782.6.
R2-1806991 3GPP TSG RAN WG2 Meeting #102, Busan, Korea, May 21-25, 2018, Source: CATT, Title: Further Bsues with switching of bandwidth part and random access.
R2-1809515 3GPP TSG RAN WG2 AH-1807, Montreal, Canada, Jul. 2-6, 2018, Source: CATT, Title: Further issues with DL BWP switching for CFRA.
R2-1810513 3GPP TSG RAN WG2 NR AH1807, Montreal, Canada, Jul. 2-6, 2018, Source: Huawei, HiSilicon, Title: Clarification on RA procedure for BFR on BWPs without CBRA occasions.
Dec. 11, 2020—European Office Action—EP 19175762.4.
R1-1715675 3GPP TSG RAN WG1 Meeting NR Ad Hoc, Nagoya, Japan, Sep. 18-21, 2017, Source: Guangdong OPPO Mobile Telecom, Title: Uplink power control mechanism for NR.
R1-1715838 3GPP TSG RAN WG1 Meeting NR Ad Hoc, Nagoya, Japan, Sep. 18-21, 2017, Source: CATT, Title: NR Power Control Framework.
R1-1715902 3GPP TSG RAN WG1 Meeting NR Ad Hoc, Nagoya, Japan, Sep. 18-21, 2017, Source: LG Electronics, Title: Discussion on UL power control for NR.
R1-1716040 3GPP TSG RAN WG1 Meeting NR Ad Hoc, Nagoya, Japan, Sep. 18-21, 2017, Source: Samsung, Title: On UL Power Control.
R1-1716061 3GPP TSG RAN WG1 Meeting NR Ad Hoc, Nagoya, Japan, Sep. 18-21, 2017, Source: CMCC, Title: Discussion on power control framework.
R1-1716114 3GPP TSG RAN WG1 Meeting NR Ad Hoc, Nagoya, Japan, Sep. 18-21, 2017, Source: NTT DOCOMO, Inc., Title: Power control framework for PUSCH.
R1-1716127 3GPP TSG RAN WG1 Meeting NR Ad Hoc, Nagoya, Japan, Sep. 18-21, 2017, Source: Nokia, Nokia Shanghai Bell, Title: Discussion on NR power control framework.
R1-1716451 3GPP TSG RAN WG1 Meeting NR Ad Hoc, Nagoya, Japan, Sep. 18-21, 2017, Source: Qualcomm ncorporated, Title: Power control and PHR for NR.
R1-1716515 3GPP TSG RAN WG1 Meeting NR Ad Hoc, Nagoya, Japan, Sep. 18-21, 2017, Source: InterDigital Inc., Title: Further Details on Uplink Power Control.
R1-1716535 3GPP TSG RAN WG1 Meeting NR Ad Hoc, Nagoya, Japan, Sep. 18-21, 2017, Source: Panasonic, Title: Discussion on NR power control framework.
R1-1716604 3GPP TSG RAN WG1 Meeting NR Ad Hoc, Nagoya, Japan, Sep. 18-21, 2017, Source: Ericsson, Title: NR UL power control framework.
R1-1716606 3GPP TSG RAN WG1 Meeting NR Ad Hoc, Nagoya, Japan, Sep. 18-21, 2017, Source: Ericsson, Title: Closed loop PC in NR.
R1-1717311 3GPP TSG RAN WG1 Meeting NR Ad Hoc, Nagoya, Japan, Sep. 18-21, 2017, Source: Huawei, HiSilicon, Title: General considerations on UL power control design.
R1-1717408 3GPP TSG RAN WG1 Meeting #90bis, Prague, Czech Republic, Oct. 9-13, 2017, Source: Intel Corporation, Title: Remaining Details on UL Power Control Framework.
R1-1717438 3GPP TSG RAN WG1 Meeting #90bis, Prague, Czech Republic, Oct. 9-13, 2017, Source: ZTE, Sanechips, Title: On NR Power Control.
R1-1717508 3GPP TSG RAN WG1 Meeting #90bis, Prague, Czech Republic, Oct. 9-13, 2017, Source: vivo, Title: Remaining issues on NR UL power control.
R1-1717692 3GPP TSG RAN WG1 Meeting #90bis, Prague, Czech Republic, Oct. 9-13, 2017, Source: Samsung, Title: On UL Power Control.
R1-1717846 3GPP TSG RAN WG1 Meeting NR Ad Hoc, Nagoya, Japan, Sep. 18-21, 2017, Source: CATT, Title: NR Power Control Aspects.
R1-1717892 3GPP TSG RAN WG1 Meeting #90bis, Prague, Czech Republic, Oct. 9-13, 2017, Source: CMCC, Title: Discussion on power control framework.
R1-1717919 3GPP TSG RAN WG1 Meeting #90bis, Prague, Czech Republic, Oct. 9-13, 2017, Source: Panasonic, Title: Discussion on NR power control framework.
R1-1717983 3GPP TSG RAN WG1 Meeting #90bis, Prague, Czech Republic, Oct. 9-13, 2017, Source: LG Electronics, Title: Discussion on UL power control for NR.
R1-1718031 3GPP TSG RAN WG1 Meeting #90bis, Prague, Czech Republic, Oct. 9-13, 2017, Source: OPPO, Title: On uplink power control for NR.
R1-1718228 3GPP TSG RAN WG1 Meeting #90bis, Prague, Czech Republic, Oct. 9-13, 2017, Source: NTT DOCOMO, Inc., Title: Power control framework for PUSCH.
R1-1718502 3GPP TSG RAN WG1 Meeting #90bis, Prague, Czech Republic, Oct. 9-13, 2017, Source: InterDigital, Inc., Title: On NR Power Control Framework.
R1-1718592 3GPP TSG RAN WG1 Meeting #90bis, Prague, Czech Republic, Oct. 9-13, 2017, Source: Qualcomm Incorporated, Title: Power control and PHR for NR.
R1-1718625 3GPP TSG RAN WG1 Meeting #90bis, Prague, Czech Republic, Oct. 9-13, 2017, Source: ITL, Title: JL power control and PHR.
R1-1718652 3GPP TSG RAN WG1 Meeting #90Bis, Prague, Czech Republic, Oct. 9-13, 2017, Source: Ericsson, Title: NR power control framework.
R1-1718655 3GPP TSG RAN WG1 Meeting #90bis, Prague, Czech Republic, Oct. 9-13, 2017, Source: Ericsson, Title: Further details on closed loop power control.

(56) References Cited

OTHER PUBLICATIONS

R1-1718692 3GPP TSG RAN WG1 Meeting #90bis, Prague, Czech Republic, Oct. 9-13, 2017, Source: Nokia, Nokia Shanghai Bell, Title: Discussion on NR power control framework.
R1-1718704 3GPP TSG RAN WG1 Meeting #90bis, Prague, Czech Republic, Oct. 9-13, 2017, Source: Motorola Mobility, Lenovo, Title: On NR power control.
3GPP TS 36.413 V13.3.0 (Jun. 2016), Technical Specification, 3rd Generation Partnership Project; Technical Specification Group Radio Access Network; Evolved Universal Terrestrial Radio Access Network (E-UTRAN); S1 Application ;Protocol (S1AP) (Release 13).
3GPP TS 36.211 V14.3.0 (Jun. 2017); Technical Specification; 3rd Generation Partnership Project; Technical Specification Group Radio Access Network; Evolved Universal Terrestrial Radio Access (E-UTRA); Physical channels and modulation (Release 14).
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding (Release 14).
3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures (Release 14).
3GPP TS 36.321 V10.3.0 (Sep. 2011), Technical Specification, 3rd Generation Partnership Project; Technical Specification Group Radio Access Network; Evolved Universal Terrestrial Radio Access (E-UTRA); Medium Access Control (MAC) Protocol Specification (Release 10).
3GPP TS 36.321 V14.3.0 (Jun. 2017), Technical Specification, 3rd Generation Partnership Project; Technical Specification Group Radio Access Network; Evolved Universal Terrestrial Radio Access (E-UTRA); Medium Access Control (MAC) Protocol Specification (Release 14).
3GPP TS 36.331 V14.3.0 (Jun. 2017), Technical Specification, 3rd Generation Partnership Project; Technical Specification Group Radio Access Network; Evolved Universal Terrestrial Radio Access (E-UTRA); Radio Resource Control (RCC); Protocol Specification (Release 14).
3GPP TR 38.802 V14.1.0 (Jun. 2017), Technical Report, 3rd Generation Partnership Project; Technical Specification Croup Radio Access Network; Study on New Radio Access Technology Physical Layer Aspects (Release 14).
3GPP TR 38.912 V14.0.0 (Mar. 2017), Technical Report, 3rd Generation Partnership Project; Technical Specification Group Radio Access Network; Study on New Radio (NR) Access Technology (Release 14).
3GPP TSG RAN WG1 Meeting #90bis, Prague, Czech Republic, Oct. 9-13, 2017, Title: RAN1 Chairman's Notes.
3GPP TSG RAN WG1 Meeting #93, Busan, Korea, May 21-25, 2018, Title: RAN1 Chairman's Notes.
3GPP TSG RAN WG2 NR Ad Hoc, Vancouver, Canada, Jan. 22-26, 2018, Source: Session Chair (InterDigital), Title: Report from LTE and NR User Plane Break-Out Session.
R2-1711835 3GPP TSG RAN WG2 Meeting #99bis, Prague, Czech Republic, Oct. 9-13, 2017, Source: Session Chair (InterDigital), Title: Report from LTE and NR User Plane Break-Out Session.
R1-1716353 3GPP TSG RAN WG1 Meeting NR Ad Hoc, Nagoya, Japan, Sep. 18-21, 2017, Source: Ericsson, Title: On dynamic triggering for CSI reports and CSI-RS.
R1-1716354 3GPP TSG RAN WG1 Meeting NR Ad Hoc, Nagoya, Japan, Sep. 18-21, 2017, Source: Ericsson, Title: A comparison of CSI-RS activation schemes based on MAC CE and DCI.
R1-1716357 3GPP TSG RAN WG1 Meeting NR Ad Hoc, Nagoya, Japan, Sep. 18-21, 2017, Source: Ericsson, Title: On semi-persistent CSI reporting on PUSCH.
R1-1717939 3GPP TSG RAN WG1 Meeting #90bis, Prague, Czech Republic, Oct. 9-13, 2017, Source: LG Electronics, Title: Discussion on CSI measurement.

R1-1801073 3GPP TSG RAN WG1 NR Ad Hoc, Vancouver, Canada, Jan. 22-26, 2018, Source: RAN2, Title: LS an PDCCH order for initiation of random access.
R1-1805701 3GPP TSG RAN WG1 Meeting #92bis, Sanya, China, Apr. 16-20, 2018, Source: Qualcomm Incorporated, Title: Summary of Remaining Details on RACH Procedure.
R1-1805876 3GPP TSG RAN WG1 Meeting #93, Busan, Korea, May 21-25, 2018, Source: Huawei, HiSilicon, Title: Remaining details of RACH Procedures.
Jan. 16, 2019—European Search Report—EP 18202948.8.
OPPO "SPS operations for BWP switching" Oct. 8, 2017.
Ericsson "URLLC aspects for grant-free UL transmission in NR" Feb. 12, 2017.
Mar. 29, 2019—Extended European Search Report—EP 18205418.9.
Jun. 28, 2019—European Extended Search Report—19166254.3.
Huawei, HiSilicon: "Bandwidth part activation and adaptation", Sep. 18, 2017.
InterDigital, Inc.: "Remaining details of BWP", Sep. 18, 2017.
LG Electronics: "Discussion on carrier aggregation and bandwidth parts", Sep. 18, 2017.
R1-1718901 3GPP TSG RAN WG1 Meeting 90bis, Prague, Czech Republic, Oct. 9-13, 2017, Source: MediaTek Inc., Title: Summary of Bandwidth Part Operation.
Jul. 10, 2019—European Extended Search Report—EP 19175762.4.
3GPP TSG-RAN WG2 Meeting #102: "Email Discussion on SSB and Cell relationship", May 21, 2018.
3GPP TSG RAN WG1 Meeting #93: "Remaining Issues on Beam Management", May 21, 2018.
R1-1715425 3GPP TSG RAN WG1 Meeting NR Ad Hoc, Nagoya, Japan, Sep. 18-21, 2017, Source: Huawei, HiSilicon, Title: Overview of bandwidth part, CA, and DC operation including SRS switching.
R1-1715492 3GPP TSG RAN WG1 Meeting NR Ad Hoc, Nagoya, Japan, Sep. 18-21, 2017, Source: Fujitsu, Title: Considerations on UCI feedback for carrier aggregation.
R1-1715517 3GPP TSG RAN WG1 Meeting NR Ad Hoc, Nagoya, Japan, Sep. 18-21, 2017, Source: Spreadtrum Communications, Title: Consideration on monitoring preemption indication in bandwidth parts.
R1-1715535 3GPP TSG RAN WG1 Meeting NR Ad Hoc, Nagoya, Japan, Sep. 18-21, 2017, Source: Lenovo, Motorola Mobility, Title: HARQ-ACK codebook size determination for CA with different numerologies.
R1-1715648 3GPP TSG RAN WG1 Meeting NR Ad Hoc, Nagoya, Japan, Sep. 18-21, 2017, Source: vivo, Title: Remaining details for bandwidth part operation.
R1-1715692 3GPP TSG RAN WG1 Meeting NR Ad Hoc, Nagoya, Japan, Sep. 18-21, 2017, Source: Guangdong OPPO Mobile Telecom, Title: Remaining issues on bandwidth part configuration and activation.
R1-1715755 3GPP TSG RAN WG1 Meeting NR Ad Hoc, Nagoya, Japan, Sep. 18-21, 2017, Source: Nokia, Nokia Shanghai Bell, Title: On remaining aspects of NR CA/DC and BWPs.
R1-1715770 3GPP TSG RAN WG1 Meeting NR Ad Hoc, Nagoya, Japan, Sep. 18-21, 2017, Source: ETRI, Title: Remaining details of bandwidth part for initial access.
R1-1715774 3GPP TSG RAN WG1 Meeting NR Ad Hoc, Nagoya, Japan, Sep. 18-21, 2017, Source: Panasonic, Title: Combining DRX with BWP adaptation.
R1-1715830 3GPP TSG RAN WG1 Meeting NR Ad Hoc, Nagoya, Japan, Sep. 18-21, 2017, Source: CATT, Title: Remaining aspects of CA and wider bandwidth operation.
R1-1715892 3GPP TSG RAN WG1 Meeting NR Ad Hoc, Nagoya, Japan, Sep. 18-21, 2017, Source: LG Electronics, Title: Discussion on carrier aggregation and bandwidth parts.
R1-1716019 3GPP TSG RAN WG1 Meeting NR Ad Hoc, Nagoya, Japan, Sep. 18-21, 2017, Source: Samsung, Title: On Bandwidth Part Operation.
R1-1716109 3GPP TSG RAN WG1 Meeting NR Ad Hoc, Nagoya, Japan, Sep. 18-21, 2017, Source: NTT DOCOMO,Inc., Title: Remaing issues on bandwidth parts for NR.

(56) References Cited

OTHER PUBLICATIONS

R1-1716192 3GPP TSG RAN WG1 Meeting NR Ad Hoc, Nagoya, Japan, Sep. 18-21, 2017, Source: AT&T, Title: Remaining Details of Carrier Aggregation and Bandwidth Parts.

R1-1716202 3GPP TSG RAN WG1 Meeting NR Ad Hoc, Nagoya, Japan, Sep. 18-21, 2017, Source: MediaTek Inc., Title: Remaining Details on Bandwidth Part Operation in NR.

R1-1716258 3GPP TSG RAN WG1 Meeting NR Ad Hoc, Nagoya, Japan, Sep. 18-21, 2017, Source: InterDigital, Inc., Title: Remaining details of BWP.

R1-1716327 3GPP TSG RAN WG1 Meeting NR Ad Hoc, Nagoya, Japan, Sep. 18-21, 2017, Source: Intel Corporation, Title: Remaining aspects for carrier aggregation and bandwidth parts.

R1-1716440 3GPP TSG RAN WG1 Meeting NR Ad Hoc, Nagoya, Japan, Sep. 18-21, 2017, Source: Qualcomm Incorporated, Title: CA and BWP.

R1-1716601 3GPP TSG RAN WG1 Meeting NR Ad Hoc, Nagoya, Japan, Sep. 18-21, 2017, Source: Ericsson, Title: On CA related aspects and BWP related aspects.

R1-1716647 3GPP TSG RAN WG1 Meeting NR Ad Hoc, Nagoya, Japan, Sep. 18-21, 2017, Source: Convida Wireless, Title: Discussion on BWP Design.

R1-1717077 3GPP TSG RAN WG1 Meeting #90bis, Prague, Czech Republic, Oct. 9-13, 2017, Source: Huawei, HiSilicon, Title: Remaining issues on bandwidth part.

R1-1717400 3GPP TSG RAN WG1 Meeting #90bis, Prague, Czech Republic, Oct. 9-13, 2017, Source: Intel Corporation, Title: Remaining details for bandwidth parts.

R1-1717504 3GPP TSG RAN WG1 Meeting #90bis, Prague, Czech Republic, Oct. 9-13, 2017, Source: vivo, Title: Remaining details for bandwidth part operation.

R1-1717675 3GPP TSG RAN WG1 Meeting #90bis, Prague, Czech Republic, Oct. 9-13, 2017, Source: Samsung, Title: On Bandwidth Part Operation.

R1-1717839 3GPP TSG RAN WG1 Meeting #90bis, Prague, Czech Republic, Oct. 9-13, 2017, Source: CATT, Title: Remaining aspects of BWP operation.

R1-1717972 3GPP TSG RAN WG1 Meeting #90bis, Prague, Czech Republic, Oct. 9-13, 2017, Source: LG Electronics, Title: Remaining issues on bandwidth parts.

R1-1718050 3GPP TSG RAN WG1 Meeting #90bis, Prague, Czech Republic, Oct. 9-13, 2017, Source: OPPO, Title: Remaining issues on bandwidth part configuration and activation.

R1-1718223 3GPP TSG RAN WG1 Meeting #90bis, Prague, Czech Republic, Oct. 9-13, 2017, Source: NTT DOCOMO, Inc., Title: Remaing issues on bandwidth parts for NR.

R1-1718327 3GPP TSG RAN WG1 Meeting #90bis, Prague, Czech Republic, Oct. 9-13, 2017, Source: MediaTek Inc., Title: Remaining Details on Bandwidth Part Operation in NR.

R1-1718365 3GPP TSG RAN WG1 Meeting #90bis, Prague, Czech Republic, Oct. 9-13, 2017, Source: InterDigital, Inc., Title: Remaining details of BWP.

R1-1718404 3GPP TSG RAN WG1 Meeting #90bis, Prague, Czech Republic, Oct. 9-13, 2017, Source: AT&T, Title: Remaining details for bandwidth parts.

R1-1718523 3GPP TSG RAN WG1 Meeting #90bis, Prague, Czech Republic, Oct. 9-13, 2017, Source: Ericsson, Title: On bandwidth parties.

R1-1718580 3GPP TSG RAN WG1 Meeting #90bis, Prague, Czech Republic, Oct. 9-13, 2017, Source: Qualcomm Incorporated, Title: Open Issues on BWP.

R1-1718607 3GPP TSG RAN WG1 Meeting #90bis, Prague, Czech Republic, Oct. 9-13, 2017, Source: Nokia, Nokia Shanghai Bell, Title: On remaining aspects of BWPs.

R1-1715454 3GPP TSG RAN WG1 Meeting NR Ad Hoc, Nagoya, Japan, Sep. 18-21, 2017, Source: ZTE, Sanechips, Title: On NR Power Control.

R1-1715478 3GPP TSG RAN WG1 Meeting NR Ad Hoc, Nagoya, Japan, Sep. 18-21, 2017, Source: Huawei, HiSilicon, Title: General considerations on UL power control design.

R1-1715505 3GPP TSG RAN WG1 Meeting NR Ad Hoc, Nagoya, Japan, Sep. 18-21, 2017, Source: Mitsubishi Electric, Title: UL transmission power control.

R1-1715651 3GPP TSG RAN WG1 Meeting NR Ad Hoc, Nagoya, Japan, Sep. 18-21, 2017, Source: vivo, Title: NR UL power control framework.

\* cited by examiner

User Plane Protocol Stack

Control Plane Protocol Stack

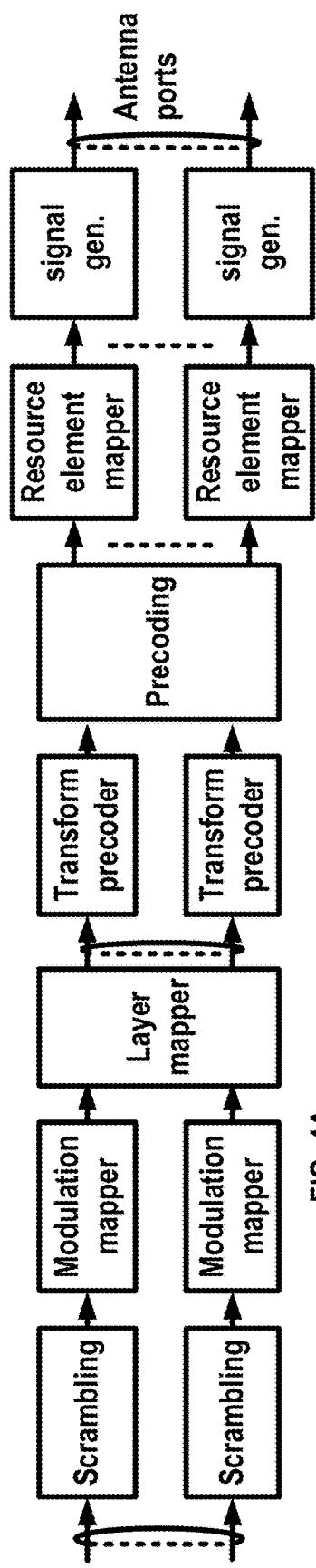
FIG. 4A
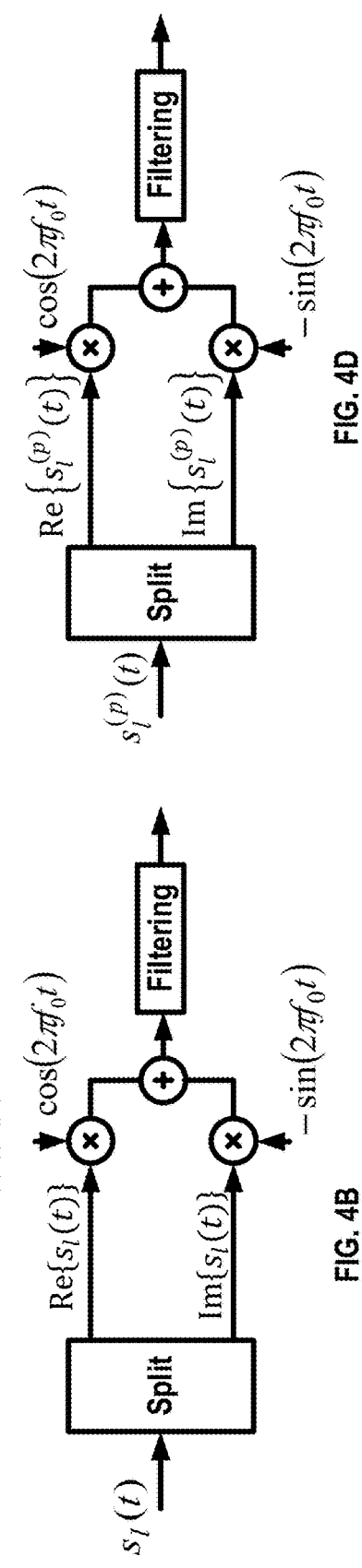
FIG. 4B
FIG. 4D
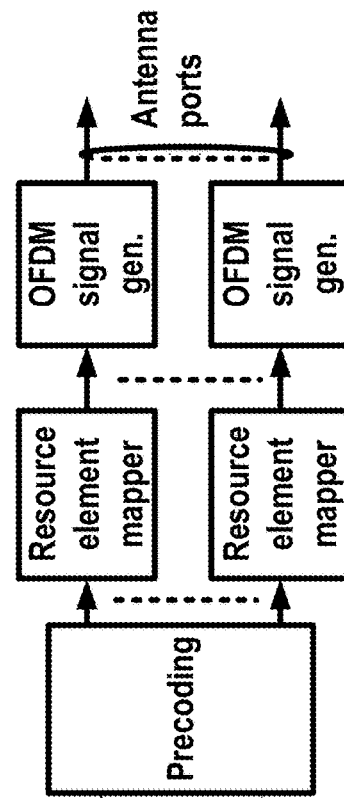
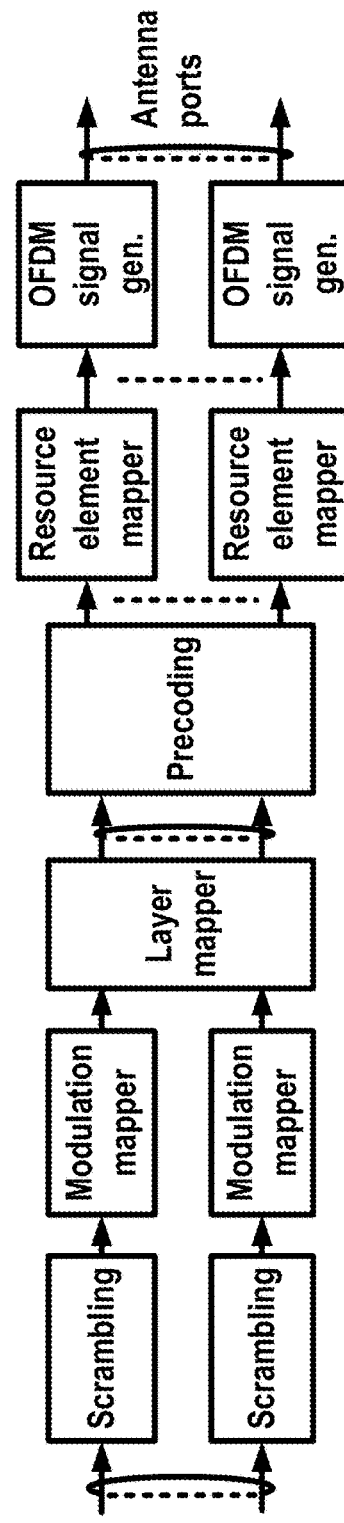
FIG. 4C

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 18

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 19

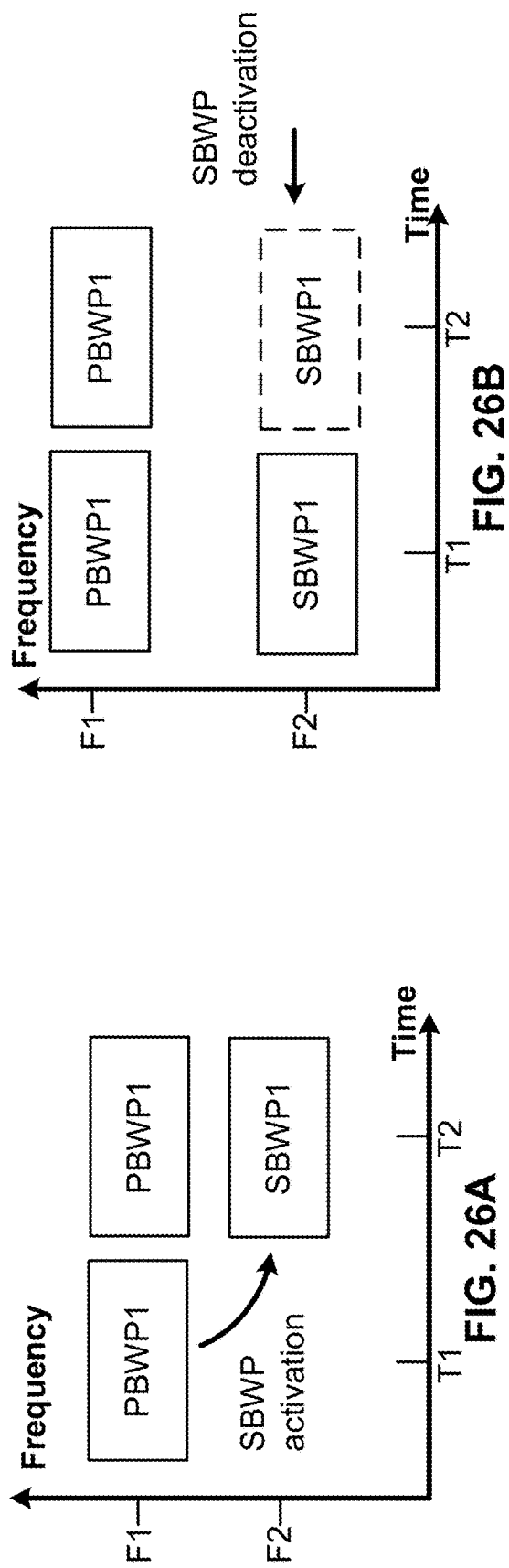
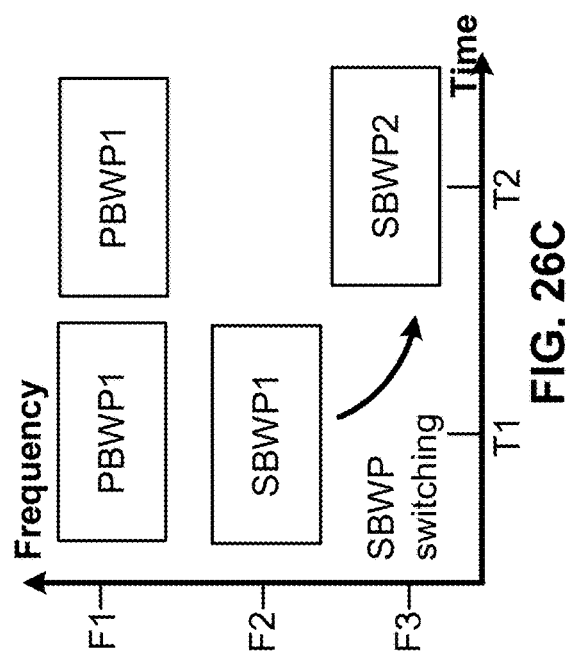
FIG. 26A
FIG. 26B
FIG. 26C

FIG. 27A

| Oct 1 | Oct 2 |
|---|---|
| R / Serving Cell ID | $U_1$ / $U_2$ / $U_3$ / $U_4$ / $D_1$ / $D_2$ / $D_3$ / $D_4$ |

FIG. 27B

| Oct 1 | Oct 2 |
|---|---|
| R / R / Serving Cell ID | $D_1$ / $D_2$ / $D_3$ / $D_4$ / $U_1$ / $U_2$ / $U_3$ / $U_4$ |

FIG. 27C

| Oct 1 | Oct 2 |
|---|---|
| R / Serving Cell ID | $D_1$ / $U_1$ / $D_2$ / $U_2$ / $D_3$ / $U_3$ / $D_4$ / $U_4$ |

FIG. 27D

| Oct 1 | Oct 2 |
|---|---|
| R / F / LCID | L |

| BWP ID | a second field | Meaning for the second field |
|---|---|---|
| X | 00 | Indicating a PBWP change to BWP X if X is different from current PBWP; Indicating a DL/UL scheduling on BWP X if X is same as current PBWP; |
| Y | 01 | Indicating BWP Y activated as a SBWP |
| Z | 10 | Indicating BWP Z deactivated |
| Q | 11 | Indicating a SBWP change to BWP Q if Q is different from current SBWP; Indicating a DL/UL scheduling on BWP Q if Q is same as current SBWP; |

FIG. 28A

| BWP ID field | a second field | Meaning for the second field |
|---|---|---|
| Y | 1 | Indicating BWP Y activated as a SBWP |
| Z | 0 | Indicating BWP Z deactivated |

FIG. 28B

| BWP ID field | Action indication field | Meaning for action indication field |
|---|---|---|
| X | 00 | Indicating a DL/UL scheduling on BWP X if X is same as current PBWP; Indicating a DL/UL scheduling on BWP Q if Q is same as current SBWP; |
| Y | 01 | Indicating BWP Y activated as a SBWP |
| Z | 10 | Indicating BWP Z deactivated |
| Q | 11 | Indicating a SBWP change to BWP Q if Q is different from current SBWP; |

FIG. 29A

| BWP ID field | Action indication field | Meaning for action indication field |
|---|---|---|
| Y | 1 | Indicating BWP Y activated as a SBWP |
| Z | 0 | Indicating BWP Z deactivated |

FIG. 29B

| BWP ID field | Action indication field | Meaning for action indication field |
|---|---|---|
| X | 00 | Indicating a DL/UL scheduling on BWP X if X is same as an active BWP; |
| Y | 01 | Indicating BWP Y activated as an active BWP |
| Z | 10 | Indicating BWP Z deactivated |
| Q | 11 | Indicating a BWP change to BWP Q if Q is different from an active BWP on which the DCI is transmitted; |

FIG. 30A

| BWP ID field | Action indication field | Meaning for action indication field |
|---|---|---|
| Y | 1 | Indicating BWP Y activated as an active BWP |
| Z | 0 | Indicating BWP Z deactivated |

FAILURE DETECTION AND RECOVERY FOR MULTIPLE ACTIVE RESOURCES

CROSS-REFERENCE TO RELATED APPLICATIONS

This application is a continuation of and claims priority to U.S. application Ser. No. 16/995,413, filed Aug. 17, 2020, which is a continuation of U.S. application Ser. No. 16/418,699, filed May 21, 2019 (now U.S. Pat. No. 10,750,564), which claims the benefit of U.S. Provisional Application No. 62/674,127, filed May 21, 2018 and U.S. Provisional Application No. 62/675,721, filed May 23, 2018, each of which is hereby incorporated by reference in its entirety.

BACKGROUND

Wireless communications may use bandwidth parts (BWPs) and/or other wireless resources. A wireless device may perform failure event detection and/or failure recovery, such as radio link monitoring (RLM), radio link failure (RLF), and/or beam failure detection (BFD), to determine a failure event on an active resource (e.g., an active BWP). Performing failure event detection and/or recovery for multiple active resources (e.g., multiple active BWPs) may cause various problems such as excessive power consumption of the wireless device and/or increased interference. Performing failure event detection and/or recovery for only one (or fewer than all) of multiple active resources may reduce accuracy of failure event detection and/or recovery.

SUMMARY

The following summary presents a simplified summary of certain features. The summary is not an extensive overview and is not intended to identify key or critical elements.

Wireless communications for failure event detection and/or recovery using multiple active resources (e.g., multiple active BWPs) are described. A wireless device may perform failure event detection and/or recovery, such as RLM and/or BFD, for multiple active resources (e.g., multiple active BWPs). The wireless device may perform failure event detection and/or recovery for multiple active resources separately and/or jointly, based on one or more criteria and/or set(s) of resources associated with the multiple active resources, to provide improved failure event detection and/or recovery with reduced power consumption and/or increased accuracy.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 4A, FIG. 4B, FIG. 4C, and FIG. 4D show examples of uplink and downlink signal transmission.

FIG. 18 shows an example of LCIDs for DL-SCH.

FIG. 19 shows an example of LCIDs for UL-SCH.

FIG. 26A, FIG. 26B, and FIG. 26C show examples of multiple active BWPs operation.

FIG. 27A, FIG. 27B, FIG. 27C, and FIG. 27D show examples of a MAC CE and a corresponding MAC subheader for BWP activation/deactivation.

FIG. 28A and FIG. 28B show examples of one or more fields of DCI for multiple active BWP operation indication.

FIG. 29A and FIG. 29B show examples of one or more fields of DCI for multiple active BWP operation indication.

FIG. 30A and FIG. 30B show examples of one or more fields of DCI for multiple active BWP operation indication.

DETAILED DESCRIPTION

Figure 1:
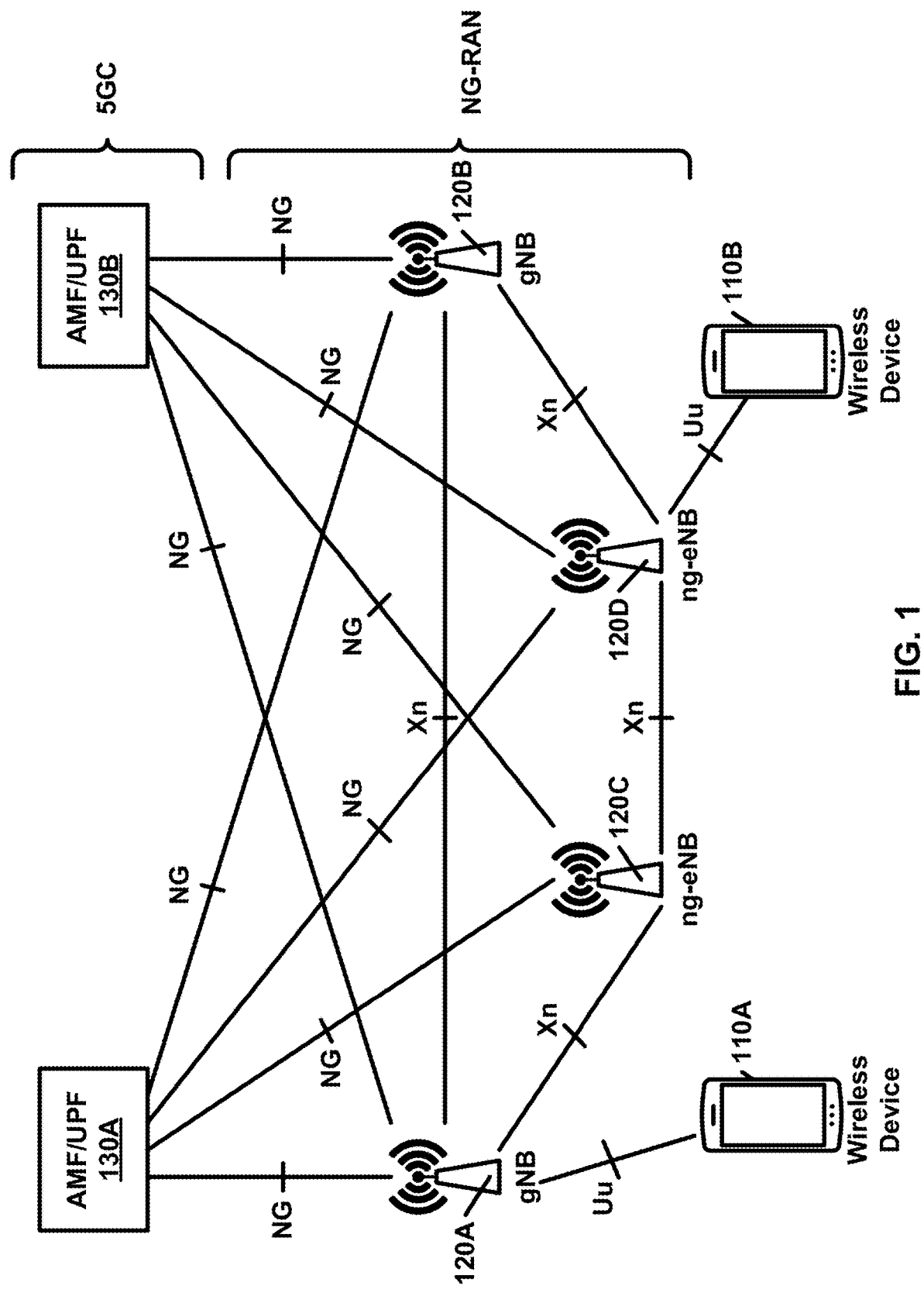
FIG. 1 shows an example radio access network (RAN) architecture.

The accompanying drawings and descriptions provide examples. It is to be understood that the examples shown in the drawings and/or described are non-exclusive and that there are other examples of how features shown and described may be practiced.

Examples are provided for operation of wireless communication systems which may be used in the technical field of multicarrier communication systems. More particularly, the technology described herein may relate to multiple active bandwidth parts in multicarrier communication systems.

The following acronyms are used throughout the drawings and/or descriptions, and are provided below for convenience although other acronyms may be introduced in the detailed description:
3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CSS Common Search Space
CU Central Unit
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM Orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator
QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RLM Radio Link Monitoring
RRC Radio Resource Control
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TC-RNTI Temporary Cell-Radio Network Temporary Identifier
TDD Time Division Duplex
TDMA Time Division Multiple Access
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Examples described herein may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and/or OFDM/CDMA may be used. Various modulation schemes may be used for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM and/or the like. Physical radio transmission may be enhanced by dynamically or semi-dynamically changing the modulation and coding scheme, for example, depending on transmission requirements and/or radio conditions.

FIG. 1 shows an example Radio Access Network (RAN) architecture. A RAN node may comprise a next generation Node B (gNB) (e.g., 120A, 120B) providing New Radio (NR) user plane and control plane protocol terminations towards a first wireless device (e.g., 110A). A RAN node may comprise a base station such as a next generation evolved Node B (ng-eNB) (e.g., 120C, 120D), providing Evolved UMTS Terrestrial Radio Access (E-UTRA) user plane and control plane protocol terminations towards a second wireless device (e.g., 110B). A first wireless device 110A may communicate with a base station, such as a gNB 120A, over a Uu interface. A second wireless device 110B may communicate with a base station, such as an ng-eNB 120D, over a Uu interface. The wireless devices 110A and/or 110B may be structurally similar to wireless devices shown in and/or described in connection with other drawing figures. The Node B 120A, the Node B 120B, the Node B 120C, and/or the Node B 120D may be structurally similar to Nodes B and/or base stations shown in and/or described in connection with other drawing figures.

A base station, such as a gNB (e.g., 120A, 120B, etc.) and/or an ng-eNB (e.g., 120C, 120D, etc.) may host functions such as radio resource management and scheduling, IP header compression, encryption and integrity protection of data, selection of Access and Mobility Management Function (AMF) at wireless device (e.g., User Equipment (UE)) attachment, routing of user plane and control plane data, connection setup and release, scheduling and transmission of paging messages (e.g., originated from the AMF), scheduling and transmission of system broadcast information (e.g., originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in an inactive state (e.g., RRC_INACTIVE state), distribution function for Non-Access Stratum (NAS) messages, RAN sharing, dual connectivity, and/or tight interworking between NR and E-UTRA.

One or more first base stations (e.g., gNBs 120A and 120B) and/or one or more second base stations (e.g., ng-eNBs 120C and 120D) may be interconnected with each other via Xn interface. A first base station (e.g., gNB 120A, 120B, etc.) or a second base station (e.g., ng-eNB 120C, 120D, etc.) may be connected via NG interfaces to a network, such as a 5G Core Network (5GC). A 5GC may comprise one or more AMF/User Plan Function (UPF) functions (e.g., 130A and/or 130B). A base station (e.g., a gNB and/or an ng-eNB) may be connected to a UPF via an NG-User plane (NG-U) interface. The NG-U interface may provide delivery (e.g., non-guaranteed delivery) of user plane Protocol Data Units (PDUs) between a RAN node and the UPF. A base station (e.g., a gNB and/or an ng-eNB) may be connected to an AMF via an NG-Control plane (NG-C) interface. The NG-C interface may provide functions such as NG interface management, wireless device (e.g., UE) context management, wireless device (e.g., UE) mobility management, transport of NAS messages, paging, PDU session management, configuration transfer, and/or warning message transmission.

A UPF may host functions such as anchor point for intra-/inter-Radio Access Technology (RAT) mobility (e.g., if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, quality of service (QoS) handling for user plane, packet filtering, gating, Uplink (UL)/Downlink (DL) rate enforcement, uplink traffic verification (e.g., Service Data Flow (SDF) to QoS flow mapping), downlink packet buffering, and/or downlink data notification triggering.

An AMF may host functions such as NAS signaling termination, NAS signaling security, Access Stratum (AS) security control, inter Core Network (CN) node signaling (e.g., for mobility between 3rd Generation Partnership Project (3GPP) access networks), idle mode wireless device reachability (e.g., control and execution of paging retransmission), registration area management, support of intra-system and inter-system mobility, access authentication, access authorization including check of roaming rights, mobility management control (e.g., subscription and/or policies), support of network slicing, and/or Session Management Function (SMF) selection.

Figure 2A:
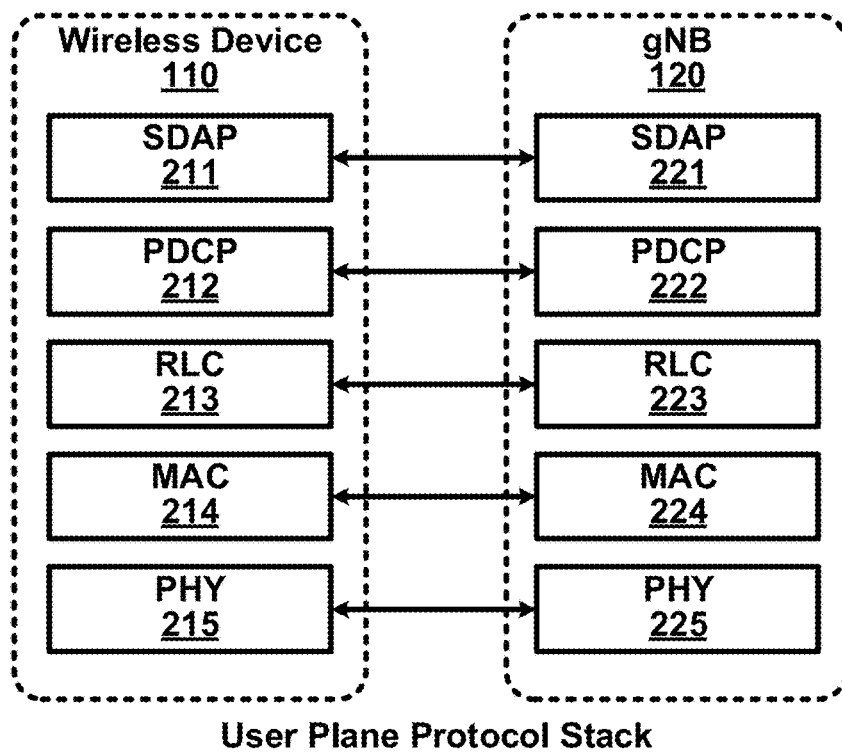
FIG. 2A shows an example user plane protocol stack.

FIG. 2A shows an example user plane protocol stack. A Service Data Adaptation Protocol (SDAP) (e.g., 211 and 221), Packet Data Convergence Protocol (PDCP) (e.g., 212 and 222), Radio Link Control (RLC) (e.g., 213 and 223), and Media Access Control (MAC) (e.g., 214 and 224) sublayers, and a Physical (PHY) (e.g., 215 and 225) layer, may be terminated in a wireless device (e.g., 110) and in a base station (e.g., 120) on a network side. A PHY layer may provide transport services to higher layers (e.g., MAC, RRC, etc.). Services and/or functions of a MAC sublayer may comprise mapping between logical channels and transport channels, multiplexing and/or demultiplexing of MAC Service Data Units (SDUs) belonging to the same or different logical channels into and/or from Transport Blocks (TBs) delivered to and/or from the PHY layer, scheduling information reporting, error correction through Hybrid Automatic Repeat request (HARQ) (e.g., one HARQ entity per carrier for Carrier Aggregation (CA)), priority handling between wireless devices such as by using dynamic scheduling, priority handling between logical channels of a wireless device such as by using logical channel prioritization, and/or padding. A MAC entity may support one or multiple numerologies and/or transmission timings. Mapping restrictions in a logical channel prioritization may control which numerology and/or transmission timing a logical channel may use. An RLC sublayer may support transparent mode (TM), unacknowledged mode (UM), and/or acknowledged mode (AM) transmission modes. The RLC configuration may be per logical channel with no dependency on numerologies and/or Transmission Time Interval (TTI) durations. Automatic Repeat Request (ARQ) may operate on any of the numerologies and/or TTI durations with which the logical channel is configured. Services and functions of the PDCP layer for the user plane may comprise, for example, sequence numbering, header compression and decompression, transfer of user data, reordering and duplicate detection, PDCP PDU routing (e.g., such as for split bearers), retransmission of PDCP SDUs, ciphering, deciphering and integrity protection, PDCP SDU discard, PDCP re-establishment and data recovery for RLC AM, and/or duplication of PDCP PDUs. Services and/or functions of SDAP may comprise, for example, mapping between a QoS flow and a data radio bearer. Services and/or functions of SDAP may comprise mapping a Quality of Service Indicator (QFI) in DL and UL packets. A protocol entity of SDAP may be configured for an individual PDU session.

Figure 2B:
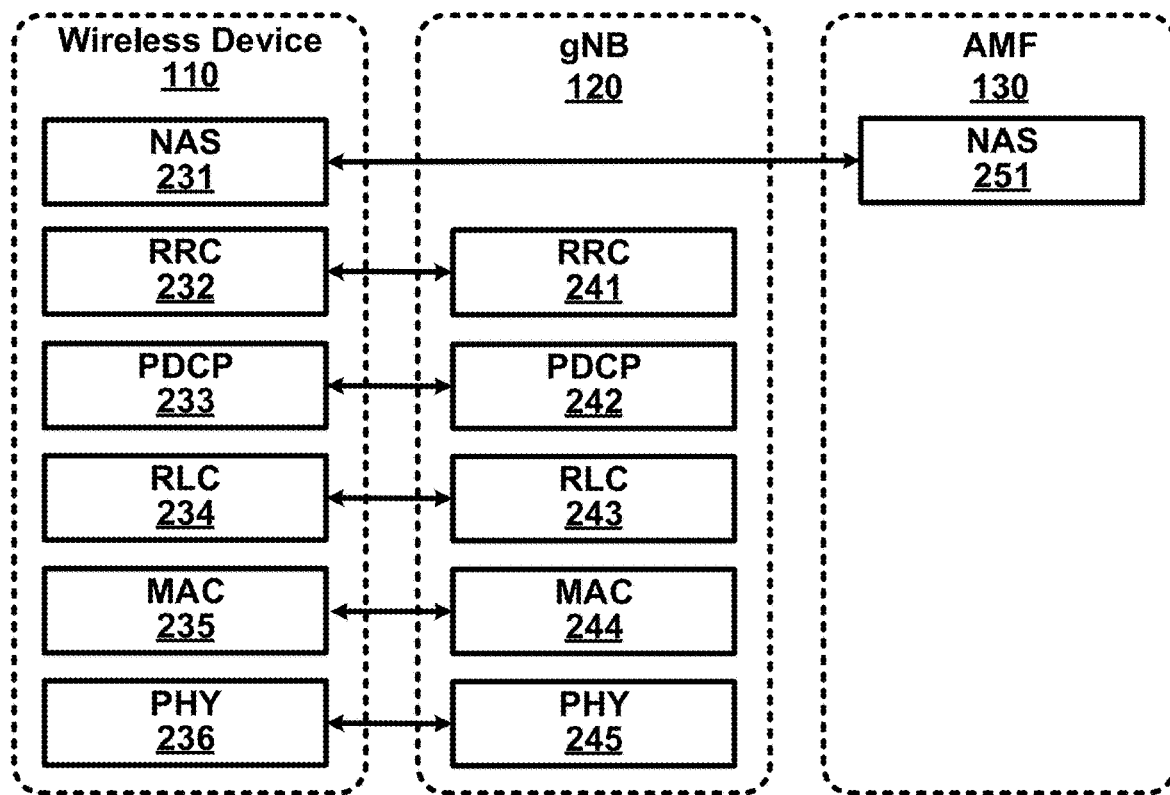
FIG. 2B shows an example control plane protocol stack.

FIG. 2B shows an example control plane protocol stack. A PDCP (e.g., 233 and 242), RLC (e.g., 234 and 243), and MAC (e.g., 235 and 244) sublayers, and a PHY (e.g., 236 and 245) layer, may be terminated in a wireless device (e.g., 110), and in a base station (e.g., 120) on a network side, and perform service and/or functions described above. RRC (e.g., 232 and 241) may be terminated in a wireless device and a base station on a network side. Services and/or functions of RRC may comprise broadcast of system information related to AS and/or NAS; paging (e.g., initiated by a 5GC or a RAN); establishment, maintenance, and/or release of an RRC connection between the wireless device and RAN; security functions such as key management, establishment, configuration, maintenance, and/or release of Signaling Radio Bearers (SRBs) and Data Radio Bearers (DRBs); mobility functions; QoS management functions; wireless device measurement reporting and control of the reporting; detection of and recovery from radio link failure; and/or NAS message transfer to/from NAS from/to a wireless device. NAS control protocol (e.g., 231 and 251) may be terminated in the wireless device and AMF (e.g., 130) on a network side. NAS control protocol may perform functions such as authentication, mobility management between a wireless device and an AMF (e.g., for 3GPP access and non-3GPP access), and/or session management between a wireless device and an SMF (e.g., for 3GPP access and non-3GPP access).

A base station may configure a plurality of logical channels for a wireless device. A logical channel of the plurality of logical channels may correspond to a radio bearer. The radio bearer may be associated with a QoS requirement. A base station may configure a logical channel to be mapped to one or more TTIs and/or numerologies in a plurality of TTIs and/or numerologies. The wireless device may receive Downlink Control Information (DCI) via a Physical Downlink Control CHannel (PDCCH) indicating an uplink grant. The uplink grant may be for a first TTI and/or a first numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise, for example, priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or to one or more MAC Control Elements (CEs). The one or more first logical channels may be mapped to the first TTI and/or the first numerology. The MAC layer at the wireless device may multiplex one or more MAC CEs and/or one or more MAC SDUs (e.g., logical channel) in a MAC PDU (e.g., transport block). The MAC PDU may comprise a MAC header comprising a plurality of MAC sub-headers. A MAC sub-header in the plurality of MAC sub-headers may correspond to a MAC CE or a MAC SUD (e.g., logical channel) in the one or more MAC CEs and/or in the one or more MAC SDUs. A MAC CE and/or a logical channel may be configured with a Logical Channel IDentifier (LCID). An LCID for a logical channel and/or a MAC CE may be fixed and/or pre-configured. An LCID for a logical channel and/or MAC CE may be configured for the wireless device by the base station. The MAC sub-header corresponding to a MAC CE and/or a MAC SDU may comprise an LCID associated with the MAC CE and/or the MAC SDU.

A base station may activate, deactivate, and/or impact one or more processes (e.g., set values of one or more parameters of the one or more processes or start and/or stop one or more timers of the one or more processes) at the wireless device, for example, by using one or more MAC commands. The one or more MAC commands may comprise one or more MAC control elements. The one or more processes may comprise activation and/or deactivation of PDCP packet duplication for one or more radio bearers. The base station may send (e.g., transmit) a MAC CE comprising one or more fields. The values of the fields may indicate activation and/or deactivation of PDCP duplication for the one or more radio bearers. The one or more processes may comprise Channel State Information (CSI) transmission of on one or more cells. The base station may send (e.g., transmit) one or more MAC CEs indicating activation and/or deactivation of the CSI transmission on the one or more cells. The one or more processes may comprise activation and/or deactivation of one or more secondary cells. The base station may send (e.g., transmit) a MAC CE indicating activation and/or deactivation of one or more secondary cells. The base station may send (e.g., transmit) one or more MAC CEs indicating starting and/or stopping of one or more Discontinuous Reception (DRX) timers at the wireless device. The base station may send (e.g., transmit) one or more MAC CEs indicating one or more timing advance values for one or more Timing Advance Groups (TAGs).

Figure 3:
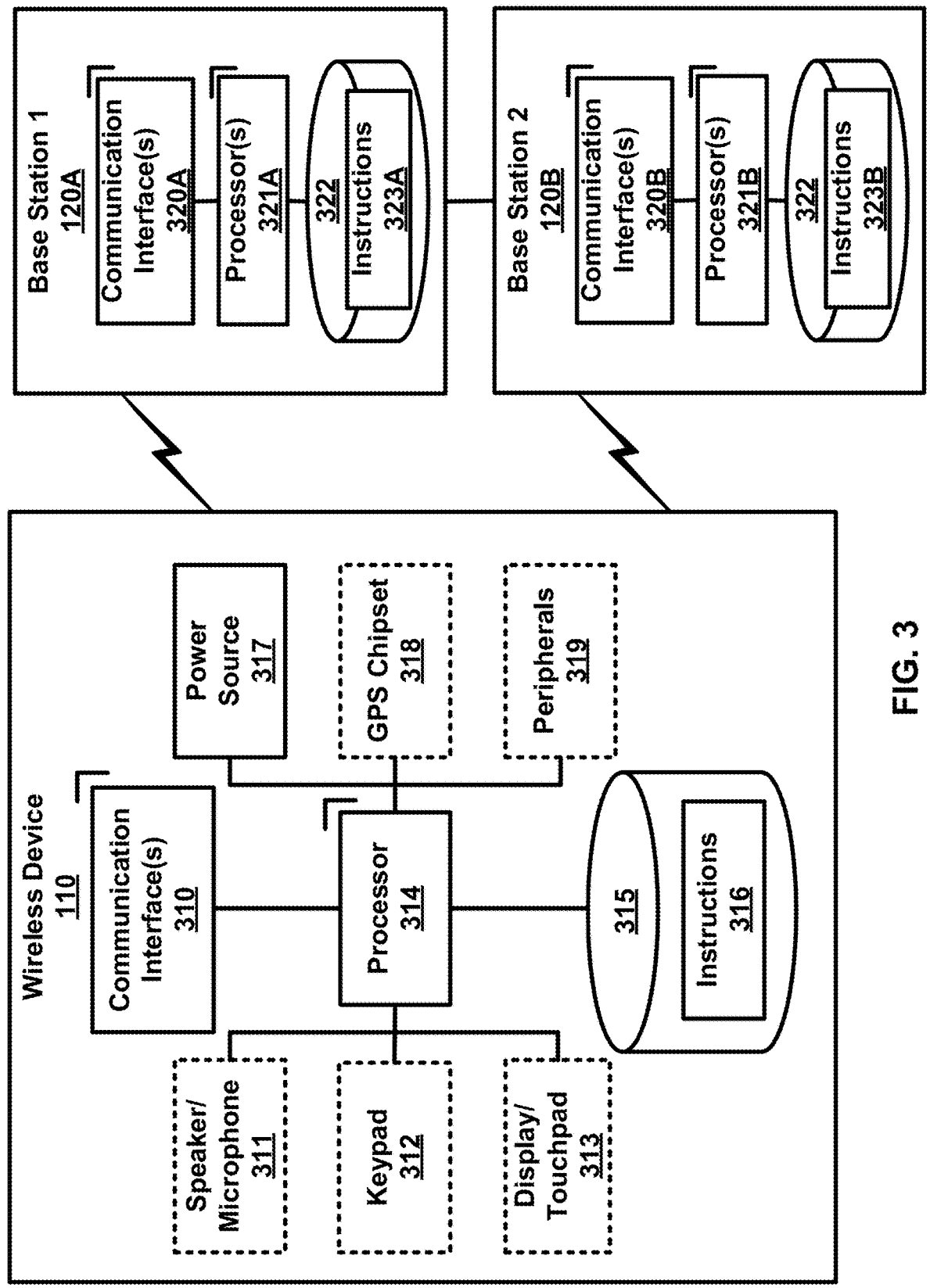
FIG. 3 shows an example wireless device and two base stations.

FIG. 3 shows an example of base stations (base station 1, 120A, and base station 2, 120B) and a wireless device 110. The wireless device 110 may comprise a UE or any other wireless device. The base station (e.g., 120A, 120B) may comprise a Node B, eNB, gNB, ng-eNB, or any other base station. A wireless device and/or a base station may perform one or more functions of a relay node. The base station 1, 120A, may comprise at least one communication interface 320A (e.g., a wireless modem, an antenna, a wired modem, and/or the like), at least one processor 321A, and at least one set of program code instructions 323A that may be stored in non-transitory memory 322A and executable by the at least one processor 321A. The base station 2, 120B, may comprise at least one communication interface 320B, at least one processor 321B, and at least one set of program code instructions 323B that may be stored in non-transitory memory 322B and executable by the at least one processor 321B.

A base station may comprise any number of sectors, for example: 1, 2, 3, 4, or 6 sectors. A base station may comprise any number of cells, for example, ranging from 1 to 50 cells or more. A cell may be categorized, for example, as a primary cell or secondary cell. At Radio Resource Control (RRC) connection establishment, re-establishment, handover, etc., a serving cell may provide NAS (non-access stratum) mobility information (e.g., Tracking Area Identifier (TAI)). At RRC connection re-establishment and/or handover, a serving cell may provide security input. This serving cell may be referred to as the Primary Cell (PCell). In the downlink, a carrier corresponding to the PCell may be a DL Primary Component Carrier (PCC). In the uplink, a carrier may be an UL PCC. Secondary Cells (SCells) may be configured to form together with a PCell a set of serving cells, for example, depending on wireless device capabilities. In a downlink, a carrier corresponding to an SCell may be a downlink secondary component carrier (DL SCC). In an uplink, a carrier may be an uplink secondary component carrier (UL SCC). An SCell may or may not have an uplink carrier.

A cell, comprising a downlink carrier and optionally an uplink carrier, may be assigned a physical cell ID and/or a cell index. A carrier (downlink and/or uplink) may belong to one cell. The cell ID and/or cell index may identify the downlink carrier and/or uplink carrier of the cell (e.g., depending on the context it is used). A cell ID may be equally referred to as a carrier ID, and a cell index may be referred to as a carrier index. A physical cell ID and/or a cell index may be assigned to a cell. A cell ID may be determined using a synchronization signal transmitted via a downlink carrier. A cell index may be determined using RRC messages. A first physical cell ID for a first downlink carrier may indicate that the first physical cell ID is for a cell comprising the first downlink carrier. The same concept may be used, for example, with carrier activation and/or deactivation (e.g., secondary cell activation and/or deactivation). A first carrier that is activated may indicate that a cell comprising the first carrier is activated.

A base station may send (e.g., transmit) to a wireless device one or more messages (e.g., RRC messages) comprising a plurality of configuration parameters for one or more cells. One or more cells may comprise at least one primary cell and at least one secondary cell. An RRC message may be broadcasted and/or unicasted to the wireless device. Configuration parameters may comprise common parameters and dedicated parameters.

Services and/or functions of an RRC sublayer may comprise at least one of: broadcast of system information related to AS and/or NAS; paging initiated by a 5GC and/or an NG-RAN; establishment, maintenance, and/or release of an RRC connection between a wireless device and an NG-RAN, which may comprise at least one of addition, modification, and/or release of carrier aggregation; and/or addition, modification, and/or release of dual connectivity in NR or between E-UTRA and NR. Services and/or functions of an RRC sublayer may comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g., intra NR mobility or inter-RAT mobility) and/or a context transfer; and/or a wireless device cell selection and/or reselection and/or control of cell selection and reselection. Services and/or functions of an RRC sublayer may comprise at least one of QoS management functions; a wireless device measurement configuration/reporting; detection of and/or recovery from radio link failure; and/or NAS message transfer to and/or from a core network entity (e.g., AMF, Mobility Management Entity (MME)) from and/or to the wireless device.

An RRC sublayer may support an RRC_Idle state, an RRC_Inactive state, and/or an RRC_Connected state for a wireless device. In an RRC_Idle state, a wireless device may perform at least one of: Public Land Mobile Network (PLMN) selection; receiving broadcasted system information; cell selection and/or re-selection; monitoring and/or receiving a paging for mobile terminated data initiated by 5GC; paging for mobile terminated data area managed by 5GC; and/or DRX for CN paging configured via NAS. In an RRC_Inactive state, a wireless device may perform at least one of: receiving broadcasted system information; cell selection and/or re-selection; monitoring and/or receiving a RAN and/or CN paging initiated by an NG-RAN and/or a 5GC; RAN-based notification area (RNA) managed by an NG-RAN; and/or DRX for a RAN and/or CN paging configured by NG-RAN/NAS. In an RRC_Idle state of a wireless device, a base station (e.g., NG-RAN) may keep a 5GC-NG-RAN connection (e.g., both C/U-planes) for the wireless device; and/or store a wireless device AS context for the wireless device. In an RRC_Connected state of a wireless device, a base station (e.g., NG-RAN) may perform at least one of: establishment of 5GC-NG-RAN connection (both C/U-planes) for the wireless device; storing a UE AS context for the wireless device; send (e.g., transmit) and/or receive of unicast data to and/or from the wireless device; and/or network-controlled mobility based on measurement results received from the wireless device. In an RRC_Connected state of a wireless device, an NG-RAN may know a cell to which the wireless device belongs.

System information (SI) may be divided into minimum SI and other SI. The minimum SI may be periodically broadcast. The minimum SI may comprise basic information required for initial access and/or information for acquiring any other SI broadcast periodically and/or provisioned on-demand (e.g., scheduling information). The other SI may either be broadcast, and/or be provisioned in a dedicated manner, such as either triggered by a network and/or upon request from a wireless device. A minimum SI may be transmitted via two different downlink channels using different messages (e.g., MasterInformationBlock and SystemInformationBlockType1). Another SI may be transmitted via SystemInformationBlockType2. For a wireless device in an RRC_Connected state, dedicated RRC signalling may be used for the request and delivery of the other SI. For the wireless device in the RRC_Idle state and/or in the RRC_Inactive state, the request may trigger a random access procedure.

A wireless device may report its radio access capability information, which may be static. A base station may request one or more indications of capabilities for a wireless device to report based on band information. A temporary capability restriction request may be sent by the wireless device (e.g., if allowed by a network) to signal the limited availability of some capabilities (e.g., due to hardware sharing, interference, and/or overheating) to the base station. The base station may confirm or reject the request. The temporary capability restriction may be transparent to 5GC (e.g., static capabilities may be stored in 5GC).

A wireless device may have an RRC connection with a network, for example, if CA is configured. At RRC connection establishment, re-establishment, and/or handover procedures, a serving cell may provide NAS mobility information. At RRC connection re-establishment and/or handover, a serving cell may provide a security input. This serving cell may be referred to as the PCell. SCells may be configured to form together with the PCell a set of serving cells, for example, depending on the capabilities of the wireless device. The configured set of serving cells for the wireless device may comprise a PCell and one or more SCells.

The reconfiguration, addition, and/or removal of SCells may be performed by RRC messaging. At intra-NR handover, RRC may add, remove, and/or reconfigure SCells for usage with the target PCell. Dedicated RRC signaling may be used (e.g., if adding a new SCell) to send all required system information of the SCell (e.g., if in connected mode, wireless devices may not acquire broadcasted system information directly from the SCells).

The purpose of an RRC connection reconfiguration procedure may be to modify an RRC connection, (e.g., to establish, modify, and/or release RBs; to perform handover; to setup, modify, and/or release measurements, for example, to add, modify, and/or release SCells and cell groups). NAS dedicated information may be transferred from the network to the wireless device, for example, as part of the RRC connection reconfiguration procedure. The RRCConnectionReconfiguration message may be a command to modify an RRC connection.

One or more RRC messages may convey information for measurement configuration, mobility control, and/or radio resource configuration (e.g., RBs, MAC main configuration, and/or physical channel configuration), which may comprise any associated dedicated NAS information and/or security configuration. The wireless device may perform an SCell release, for example, if the received RRC Connection Reconfiguration message includes the sCellToReleaseList. The wireless device may perform SCell additions or modification, for example, if the received RRC Connection Reconfiguration message includes the sCellToAddModList.

An RRC connection establishment, reestablishment, and/or resume procedure may be to establish, reestablish, and/or resume an RRC connection, respectively. An RRC connection establishment procedure may comprise SRB1 establishment. The RRC connection establishment procedure may be used to transfer the initial NAS dedicated information and/or message from a wireless device to an E-UTRAN. The RRCConnectionReestablishment message may be used to re-establish SRB1.

A measurement report procedure may be used to transfer measurement results from a wireless device to an NG-RAN. The wireless device may initiate a measurement report procedure, for example, after successful security activation.

A measurement report message may be used to send (e.g., transmit) measurement results.

The wireless device 110 may comprise at least one communication interface 310 (e.g., a wireless modem, an antenna, and/or the like), at least one processor 314, and at least one set of program code instructions 316 that may be stored in non-transitory memory 315 and executable by the at least one processor 314. The wireless device 110 may further comprise at least one of at least one speaker and/or microphone 311, at least one keypad 312, at least one display and/or touchpad 313, at least one power source 317, at least one global positioning system (GPS) chipset 318, and/or other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and/or the like. The processor 314 of the wireless device 110, the processor 321A in base station 1 120A, and/or the processor 321B in base station 2 120B may perform at least one of signal coding and/or processing, data processing, power control, input/output processing, and/or any other functionality that may enable the wireless device 110, the base station 1 120A and/or the base station 2 120B to operate in a wireless environment.

The processor 314 of the wireless device 110 may be connected to and/or in communication with the speaker and/or microphone 311, the keypad 312, and/or the display and/or touchpad 313. The processor 314 may receive user input data from and/or provide user output data to the speaker and/or microphone 311, the keypad 312, and/or the display and/or touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and/or the like. The processor 314 may be connected to the GPS chipset 318. The GPS chipset 318 may be configured to provide geographic location information of the wireless device 110.

The processor 314 of the wireless device 110 may further be connected to and/or in communication with other peripherals 319, which may comprise one or more software and/or hardware modules that may provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and/or the like.

The communication interface 320A of the base station 1, 120A, and/or the communication interface 320B of the base station 2, 120B, may be configured to communicate with the communication interface 310 of the wireless device 110, for example, via a wireless link 330A and/or via a wireless link 330B, respectively. The communication interface 320A of the base station 1, 120A, may communicate with the communication interface 320B of the base station 2 and/or other RAN and/or core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110, and/or the base station 2 120B and the wireless device 110, may be configured to send and receive transport blocks, for example, via the wireless link 330A and/or via the wireless link 330B, respectively. The wireless link 330A and/or the wireless link 330B may use at least one frequency carrier. Transceiver(s) may be used. A transceiver may be a device that comprises both a transmitter and a receiver. Transceivers may be used in devices such as wireless devices, base stations, relay nodes, computing devices, and/or the like. Radio technology may be implemented in the communication interface 310, 320A, and/or 320B, and the wireless link 330A and/or 330B. The radio technology may comprise one or more elements shown in FIG. 4A, FIG. 4B, FIG. 4C, FIG. 4D, FIG. 6, FIG. 7A, FIG. 7B, FIG. 8, and associated text, described below.

Other nodes in a wireless network (e.g. AMF, UPF, SMF, etc.) may comprise one or more communication interfaces, one or more processors, and memory storing instructions. A node (e.g., wireless device, base station, AMF, SMF, UPF, servers, switches, antennas, and/or the like) may comprise one or more processors, and memory storing instructions that when executed by the one or more processors causes the node to perform certain processes and/or functions. Single-carrier and/or multi-carrier communication operation may be performed. A non-transitory tangible computer readable media may comprise instructions executable by one or more processors to cause operation of single-carrier and/or multi-carrier communications. An article of manufacture may comprise a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, and/or electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and/or code stored in (and/or in communication with) a memory device to implement connections, electronic device operations, protocol(s), protocol layers, communication drivers, device drivers, hardware operations, combinations thereof, and/or the like.

A communication network may comprise the wireless device 110, the base station 1, 120A, the base station 2, 120B, and/or any other device. The communication network may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a WiFi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

FIG. 4A, FIG. 4B, FIG. 4C and FIG. 4D show examples of uplink and downlink signal transmission. FIG. 4A shows an example uplink transmitter for at least one physical channel A baseband signal representing a physical uplink shared channel may perform one or more functions. The one or more functions may comprise at least one of: scrambling (e.g., by Scrambling); modulation of scrambled bits to generate complex-valued symbols (e.g., by a Modulation mapper); mapping of the complex-valued modulation symbols onto one or several transmission layers (e.g., by a Layer mapper); transform precoding to generate complex-valued symbols (e.g., by a Transform precoder); precoding of the complex-valued symbols (e.g., by a Precoder); mapping of precoded complex-valued symbols to resource elements (e.g., by a Resource element mapper); generation of complex-valued time-domain Single Carrier-Frequency Division Multiple Access (SC-FDMA) or CP-OFDM signal for an antenna port (e.g., by a signal gen.); and/or the like. A SC-FDMA signal for uplink transmission may be generated, for example, if transform precoding is enabled. A CP-OFDM signal for uplink transmission may be generated by FIG. 4A, for example, if transform precoding is not enabled. These functions are shown as examples and other mechanisms may be implemented.

FIG. 4B shows an example of modulation and up-conversion to the carrier frequency of a complex-valued SC-FDMA or CP-OFDM baseband signal for an antenna port and/or for the complex-valued Physical Random Access CHannel (PRACH) baseband signal. Filtering may be performed prior to transmission.

FIG. 4C shows an example of downlink transmissions. The baseband signal representing a downlink physical channel may perform one or more functions. The one or more functions may comprise: scrambling of coded bits in a codeword to be transmitted on a physical channel (e.g., by Scrambling); modulation of scrambled bits to generate complex-valued modulation symbols (e.g., by a Modulation mapper); mapping of the complex-valued modulation symbols onto one or several transmission layers (e.g., by a Layer mapper); precoding of the complex-valued modulation symbols on a layer for transmission on the antenna ports (e.g., by Precoding); mapping of complex-valued modulation symbols for an antenna port to resource elements (e.g., by a Resource element mapper); generation of complex-valued time-domain OFDM signal for an antenna port (e.g., by an OFDM signal gen.); and/or the like. These functions are shown as examples and other mechanisms may be implemented.

A base station may send (e.g., transmit) a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. A first antenna port and a second antenna port may be quasi co-located, for example, if one or more large-scale properties of the channel over which a first symbol on the first antenna port is conveyed may be inferred from the channel over which a second symbol on a second antenna port is conveyed. The one or more large-scale properties may comprise at least one of: delay spread; Doppler spread; Doppler shift; average gain; average delay; and/or spatial receiving (Rx) parameters.

FIG. 4D shows an example modulation and up-conversion to the carrier frequency of the complex-valued OFDM baseband signal for an antenna port. Filtering may be performed prior to transmission.

Figure 5A:
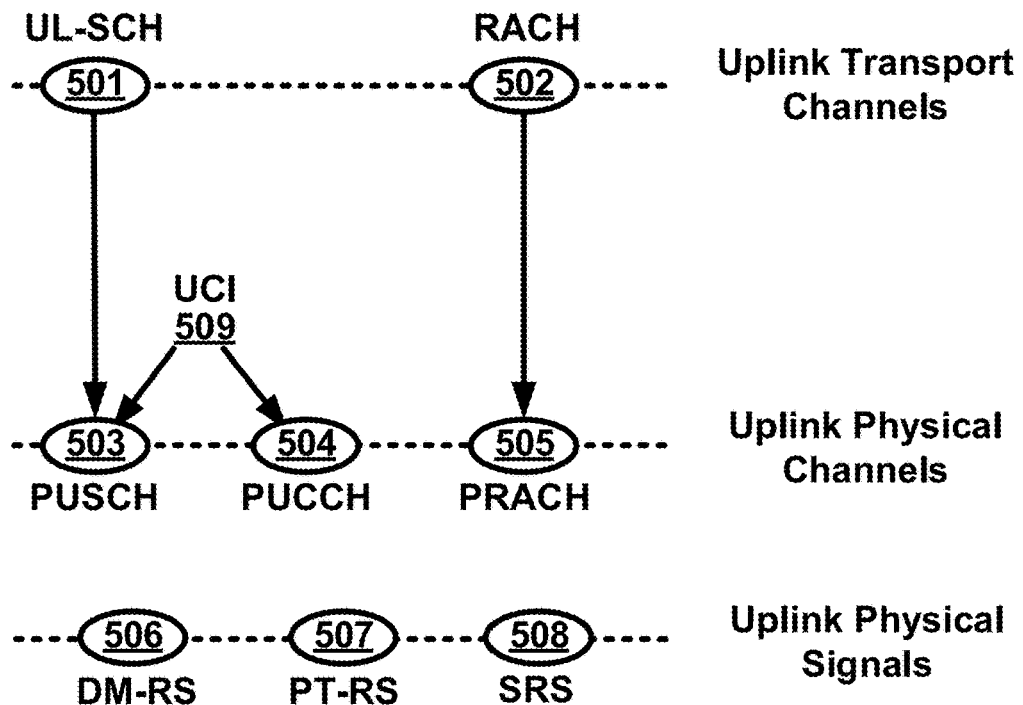
FIG. 5A shows an example uplink channel mapping and example uplink physical signals.

FIG. 5A shows example uplink channel mapping and example uplink physical signals. A physical layer may provide one or more information transfer services to a MAC and/or one or more higher layers. The physical layer may provide the one or more information transfer services to the MAC via one or more transport channels. An information transfer service may indicate how and/or with what characteristics data is transferred over the radio interface.

Uplink transport channels may comprise an Uplink-Shared CHannel (UL-SCH) 501 and/or a Random Access CHannel (RACH) 502. A wireless device may send (e.g., transmit) one or more uplink DM-RSs 506 to a base station for channel estimation, for example, for coherent demodulation of one or more uplink physical channels (e.g., PUSCH 503 and/or PUCCH 504). The wireless device may send (e.g., transmit) to a base station at least one uplink DM-RS 506 with PUSCH 503 and/or PUCCH 504, wherein the at least one uplink DM-RS 506 may be spanning a same frequency range as a corresponding physical channel. The base station may configure the wireless device with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to send (e.g., transmit) at one or more symbols of a PUSCH and/or PUCCH. The base station may semi-statically configure the wireless device with a maximum number of front-loaded DM-RS symbols for PUSCH and/or PUCCH. The wireless device may schedule a single-symbol DM-RS and/or double symbol DM-RS based on a maximum number of front-loaded DM-RS symbols, wherein the base station may configure the wireless device with one or more additional uplink DM-RS for PUSCH and/or PUCCH. A new radio network may support, for example, at least for CP-OFDM, a common DM-RS structure for DL and UL, wherein a DM-RS location, DM-RS pattern, and/or scrambling sequence may be same or different.

Whether or not an uplink PT-RS 507 is present may depend on an RRC configuration. A presence of the uplink PT-RS may be wireless device-specifically configured. A presence and/or a pattern of the uplink PT-RS 507 in a scheduled resource may be wireless device-specifically configured by a combination of RRC signaling and/or association with one or more parameters used for other purposes (e.g., Modulation and Coding Scheme (MCS)) which may be indicated by DCI. If configured, a dynamic presence of uplink PT-RS 507 may be associated with one or more DCI parameters comprising at least a MCS. A radio network may support a plurality of uplink PT-RS densities defined in time/frequency domain. If present, a frequency domain density may be associated with at least one configuration of a scheduled bandwidth. A wireless device may assume a same precoding for a DMRS port and a PT-RS port. A number of PT-RS ports may be less than a number of DM-RS ports in a scheduled resource. The uplink PT-RS 507 may be confined in the scheduled time/frequency duration for a wireless device.

A wireless device may send (e.g., transmit) an SRS 508 to a base station for channel state estimation, for example, to support uplink channel dependent scheduling and/or link adaptation. The SRS 508 sent (e.g., transmitted) by the wireless device may allow for the base station to estimate an uplink channel state at one or more different frequencies. A base station scheduler may use an uplink channel state to assign one or more resource blocks of a certain quality (e.g., above a quality threshold) for an uplink PUSCH transmission from the wireless device. The base station may semi-statically configure the wireless device with one or more SRS resource sets. For an SRS resource set, the base station may configure the wireless device with one or more SRS resources. An SRS resource set applicability may be configured by a higher layer (e.g., RRC) parameter. An SRS resource in each of one or more SRS resource sets may be sent (e.g., transmitted) at a time instant, for example, if a higher layer parameter indicates beam management. The wireless device may send (e.g., transmit) one or more SRS resources in different SRS resource sets simultaneously. A new radio network may support aperiodic, periodic, and/or semi-persistent SRS transmissions. The wireless device may send (e.g., transmit) SRS resources, for example, based on one or more trigger types. The one or more trigger types may comprise higher layer signaling (e.g., RRC) and/or one or more DCI formats (e.g., at least one DCI format may be used for a wireless device to select at least one of one or more configured SRS resource sets). An SRS trigger type 0 may refer to an SRS triggered based on a higher layer signaling. An SRS trigger type 1 may refer to an SRS triggered based on one or more DCI formats. The wireless device may be configured to send (e.g., transmit) the SRS 508 after a transmission of PUSCH 503 and corresponding uplink DM-RS 506, for example, if PUSCH 503 and the SRS 508 are transmitted in a same slot.

A base station may semi-statically configure a wireless device with one or more SRS configuration parameters indicating at least one of following: an SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, an SRS bandwidth, a frequency hopping bandwidth, a cyclic shift, and/or an SRS sequence ID.

Figure 5B:
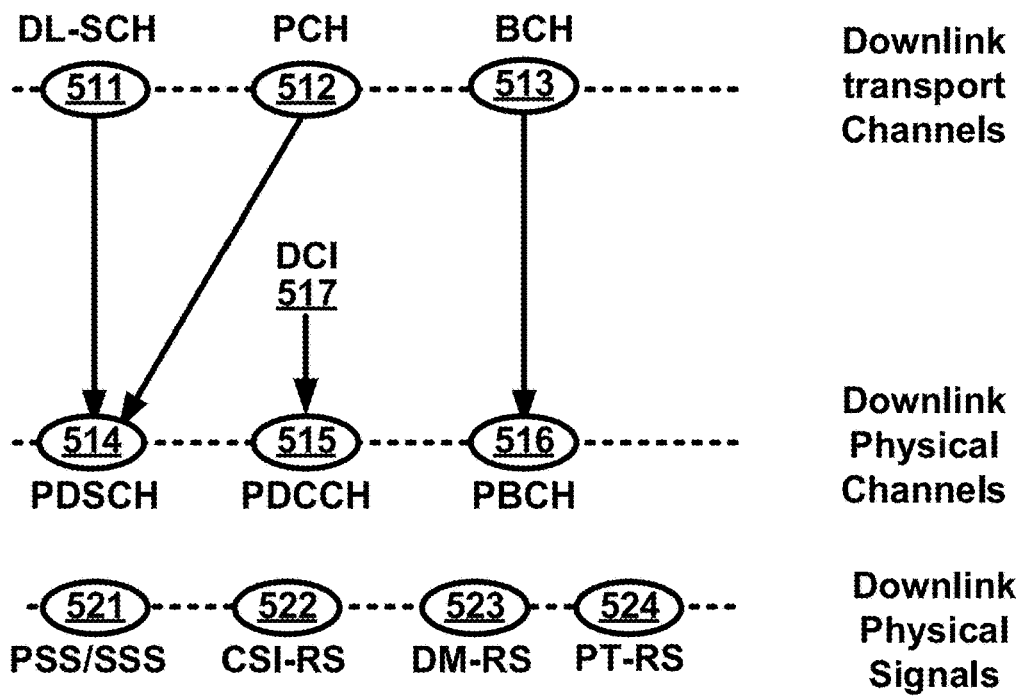
FIG. 5B shows an example downlink channel mapping and example downlink physical signals.

FIG. 5B shows an example downlink channel mapping and downlink physical signals. Downlink transport channels may comprise a Downlink-Shared CHannel (DL-SCH) 511, a Paging CHannel (PCH) 512, and/or a Broadcast CHannel (BCH) 513. A transport channel may be mapped to one or more corresponding physical channels. An UL-SCH 501 may be mapped to a Physical Uplink Shared CHannel (PUSCH) 503. A RACH 502 may be mapped to a PRACH 505. A DL-SCH 511 and a PCH 512 may be mapped to a Physical Downlink Shared CHannel (PDSCH) 514. A BCH 513 may be mapped to a Physical Broadcast CHannel (PBCH) 516.

A radio network may comprise one or more downlink and/or uplink transport channels. The radio network may comprise one or more physical channels without a corresponding transport channel. The one or more physical channels may be used for an Uplink Control Information (UCI) 509 and/or a Downlink Control Information (DCI) 517. A Physical Uplink Control CHannel (PUCCH) 504 may carry UCI 509 from a wireless device to a base station. A Physical Downlink Control CHannel (PDCCH) 515 may carry the DCI 517 from a base station to a wireless device. The radio network (e.g., NR) may support the UCI 509 multiplexing in the PUSCH 503, for example, if the UCI 509 and the PUSCH 503 transmissions may coincide in a slot (e.g., at least in part). The UCI 509 may comprise at least one of a CSI, an Acknowledgement (ACK)/Negative Acknowledgement (NACK), and/or a scheduling request. The DCI 517 via the PDCCH 515 may indicate at least one of following: one or more downlink assignments and/or one or more uplink scheduling grants.

In uplink, a wireless device may send (e.g., transmit) one or more Reference Signals (RSs) to a base station. The one or more RSs may comprise at least one of a Demodulation-RS (DM-RS) 506, a Phase Tracking-RS (PT-RS) 507, and/or a Sounding RS (SRS) 508. In downlink, a base station may send (e.g., transmit, unicast, multicast, and/or broadcast) one or more RSs to a wireless device. The one or more RSs may comprise at least one of a Primary Synchronization Signal (PSS)/Secondary Synchronization Signal (SSS) 521, a CSI-RS 522, a DM-RS 523, and/or a PT-RS 524.

In a time domain, an SS/PBCH block may comprise one or more OFDM symbols (e.g., 4 OFDM symbols numbered in increasing order from 0 to 3) within the SS/PBCH block. An SS/PBCH block may comprise the PSS/SSS 521 and/or the PBCH 516. In the frequency domain, an SS/PBCH block may comprise one or more contiguous subcarriers (e.g., 240 contiguous subcarriers with the subcarriers numbered in increasing order from 0 to 239) within the SS/PBCH block. The PSS/SSS 521 may occupy, for example, 1 OFDM symbol and 127 subcarriers. The PBCH 516 may span across, for example, 3 OFDM symbols and 240 subcarriers. A wireless device may assume that one or more SS/PBCH blocks transmitted with a same block index may be quasi co-located, for example, with respect to Doppler spread, Doppler shift, average gain, average delay, and/or spatial Rx parameters. A wireless device may not assume quasi co-location for other SS/PBCH block transmissions. A periodicity of an SS/PBCH block may be configured by a radio network (e.g., by an RRC signaling). One or more time locations in which the SS/PBCH block may be sent may be determined by sub-carrier spacing. A wireless device may assume a band-specific sub-carrier spacing for an SS/PBCH block, for example, unless a radio network has configured the wireless device to assume a different sub-carrier spacing.

The downlink CSI-RS 522 may be used for a wireless device to acquire channel state information. A radio network may support periodic, aperiodic, and/or semi-persistent transmission of the downlink CSI-RS 522. A base station may semi-statically configure and/or reconfigure a wireless device with periodic transmission of the downlink CSI-RS 522. A configured CSI-RS resources may be activated and/or deactivated. For semi-persistent transmission, an activation and/or deactivation of a CSI-RS resource may be triggered dynamically. A CSI-RS configuration may comprise one or more parameters indicating at least a number of antenna ports. A base station may configure a wireless device with 32 ports, or any other number of ports. A base station may semi-statically configure a wireless device with one or more CSI-RS resource sets. One or more CSI-RS resources may be allocated from one or more CSI-RS resource sets to one or more wireless devices. A base station may semi-statically configure one or more parameters indicating CSI RS resource mapping, for example, time-domain location of one or more CSI-RS resources, a bandwidth of a CSI-RS resource, and/or a periodicity. A wireless device may be configured to use the same OFDM symbols for the downlink CSI-RS 522 and the Control Resource Set (CORESET), for example, if the downlink CSI-RS 522 and the CORESET are spatially quasi co-located and resource elements associated with the downlink CSI-RS 522 are the outside of PRBs configured for the CORESET. A wireless device may be configured to use the same OFDM symbols for downlink CSI-RS 522 and SS/PBCH blocks, for example, if the downlink CSI-RS 522 and SS/PBCH blocks are spatially quasi co-located and resource elements associated with the downlink CSI-RS 522 are outside of the PRBs configured for the SS/PBCH blocks.

A wireless device may send (e.g., transmit) one or more downlink DM-RSs 523 to a base station for channel estimation, for example, for coherent demodulation of one or more downlink physical channels (e.g., PDSCH 514). A radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a wireless device with a maximum number of front-loaded DM-RS symbols for PDSCH 514. A DM-RS configuration may support one or more DM-RS ports. A DM-RS configuration may support at least 8 orthogonal downlink DM-RS ports, for example, for single user-MIMO. ADM-RS configuration may support 12 orthogonal downlink DM-RS ports, for example, for multiuser-MIMO. A radio network may support, for example, at least for CP-OFDM, a common DM-RS structure for DL and UL, wherein a DM-RS location, DM-RS pattern, and/or scrambling sequence may be the same or different.

Whether or not the downlink PT-RS 524 is present may depend on an RRC configuration. A presence of the downlink PT-RS 524 may be wireless device-specifically configured. A presence and/or a pattern of the downlink PT-RS 524 in a scheduled resource may be wireless device-specifically configured, for example, by a combination of RRC signaling and/or an association with one or more parameters used for other purposes (e.g., MCS) which may be indicated by the DCI. If configured, a dynamic presence of the downlink PT-RS 524 may be associated with one or more DCI parameters comprising at least MCS. A radio network may support a plurality of PT-RS densities in a time/frequency domain. If present, a frequency domain density may be associated with at least one configuration of a scheduled bandwidth. A wireless device may assume the same precoding for a DMRS port and a PT-RS port. A number of PT-RS ports may be less than a number of DM-RS ports in a scheduled resource. The downlink PT-RS 524 may be confined in the scheduled time/frequency duration for a wireless device.

Figure 6:
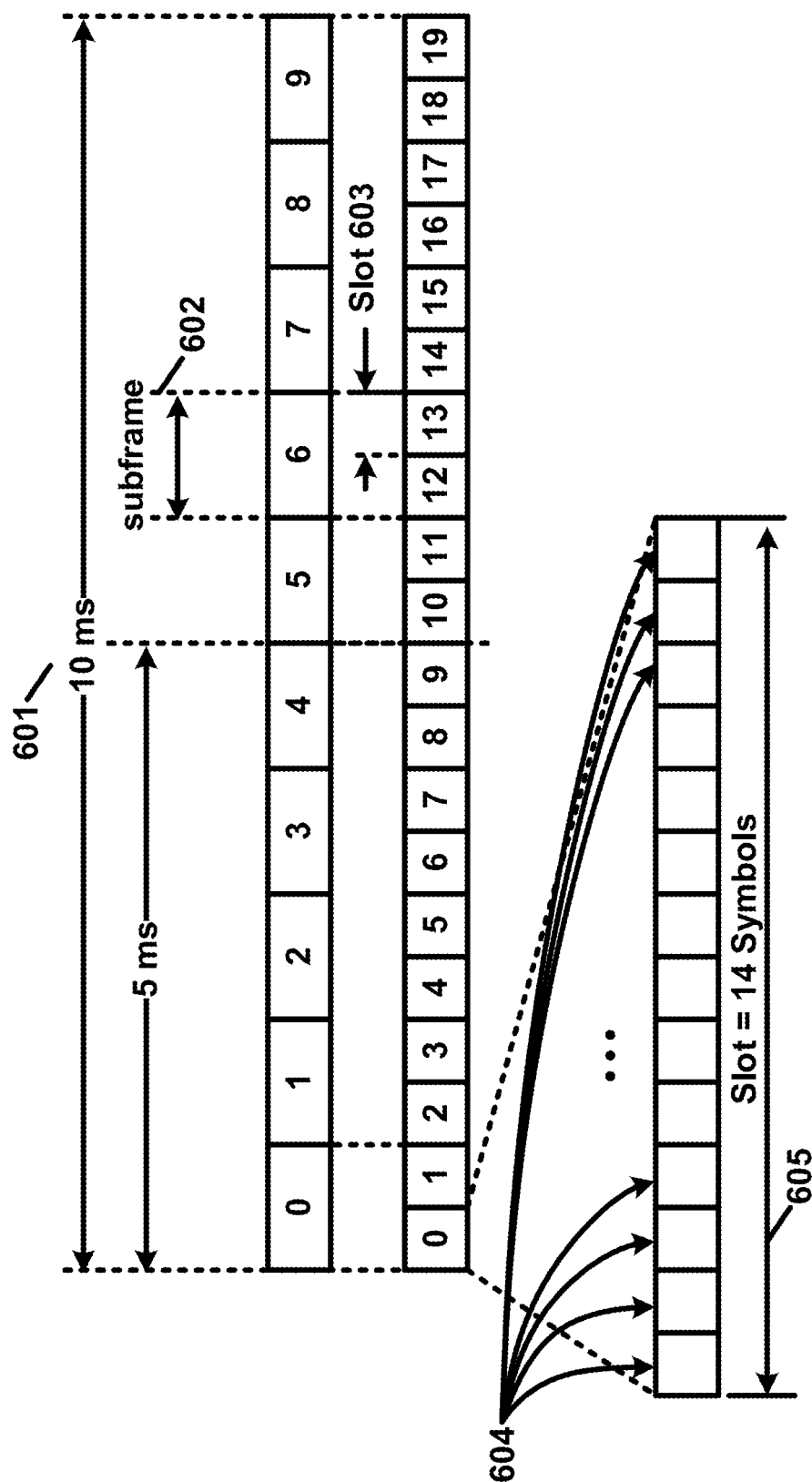
FIG. 6 shows an example transmission time and/or reception time for a carrier.

FIG. 6 shows an example transmission time and reception time for a carrier. A multicarrier OFDM communication system may include one or more carriers, for example, ranging from 1 to 32 carriers (such as for carrier aggregation) or ranging from 1 to 64 carriers (such as for dual connectivity). Different radio frame structures may be supported (e.g., for FDD and/or for TDD duplex mechanisms).

FIG. 6 shows an example frame timing. Downlink and uplink transmissions may be organized into radio frames 601. Radio frame duration may be 10 milliseconds (ms). A 10 ms radio frame 601 may be divided into ten equally sized subframes 602, each with a 1 ms duration. Subframe(s) may comprise one or more slots (e.g., slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Other subframe durations such as, for example, 0.5 ms, 1 ms, 2 ms, and 5 ms may be supported. Uplink and downlink transmissions may be separated in the frequency domain. Slot(s) may include a plurality of OFDM symbols 604. The number of OFDM symbols 604 in a slot 605 may depend on the cyclic prefix length. A slot may be 14 OFDM symbols for the same subcarrier spacing of up to 480 kHz with normal CP. A slot may be 12 OFDM symbols for the same subcarrier spacing of 60 kHz with extended CP. A slot may comprise downlink, uplink, and/or a downlink part and an uplink part, and/or alike.

Figure 7A:
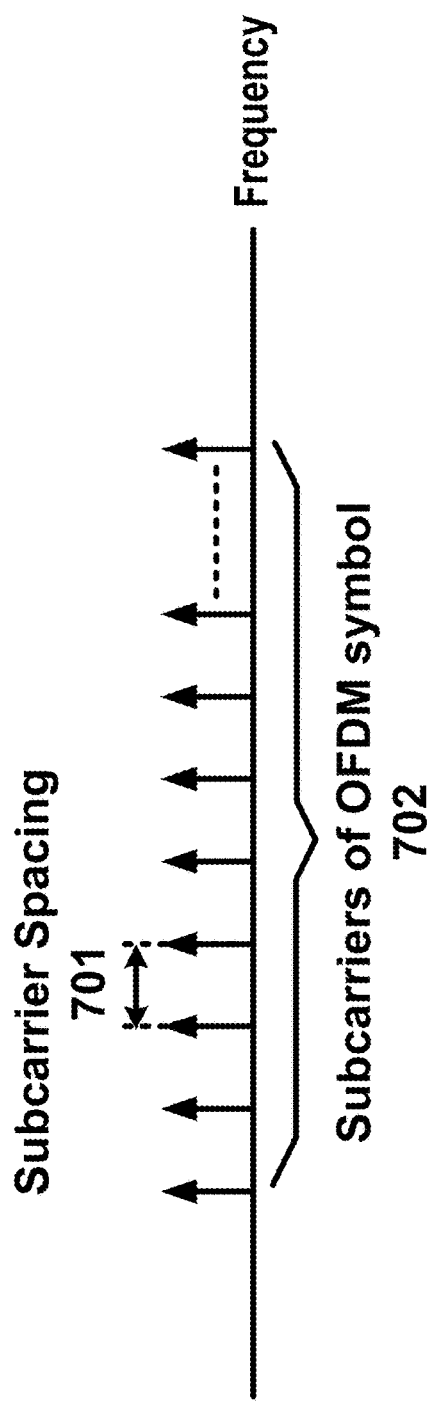
FIG. 7A and FIG. 7B show example sets of orthogonal frequency division multiplexing (OFDM) subcarriers.

FIG. 7A shows example sets of OFDM subcarriers. A base station may communicate with a wireless device using a carrier having an example channel bandwidth 700. Arrow(s) in the example may depict a subcarrier in a multicarrier OFDM system. The OFDM system may use technology such as OFDM technology, SC-FDMA technology, and/or the like. An arrow 701 shows a subcarrier transmitting information symbols. A subcarrier spacing 702, between two contiguous subcarriers in a carrier, may be any one of 15 kHz, 30 kHz, 60 kHz, 120 kHz, 240 kHz, or any other frequency. Different subcarrier spacing may correspond to different transmission numerologies. A transmission numerology may comprise at least: a numerology index; a value of subcarrier spacing; and/or a type of cyclic prefix (CP). A base station may send (e.g., transmit) to and/or receive from a wireless device via a number of subcarriers 703 in a carrier. A bandwidth occupied by a number of subcarriers 703 (e.g., transmission bandwidth) may be smaller than the channel bandwidth 700 of a carrier, for example, due to guard bands 704 and 705. Guard bands 704 and 705 may be used to reduce interference to and from one or more neighbor carriers. A number of subcarriers (e.g., transmission bandwidth) in a carrier may depend on the channel bandwidth of the carrier and/or the subcarrier spacing. A transmission bandwidth, for a carrier with a 20 MHz channel bandwidth and a 15 kHz subcarrier spacing, may be in number of 1024 subcarriers.

A base station and a wireless device may communicate with multiple component carriers (CCs), for example, if configured with CA. Different component carriers may have different bandwidth and/or different subcarrier spacing, for example, if CA is supported. A base station may send (e.g., transmit) a first type of service to a wireless device via a first component carrier. The base station may send (e.g., transmit) a second type of service to the wireless device via a second component carrier. Different types of services may have different service requirements (e.g., data rate, latency, reliability), which may be suitable for transmission via different component carriers having different subcarrier spacing and/or different bandwidth.

Figure 7B:
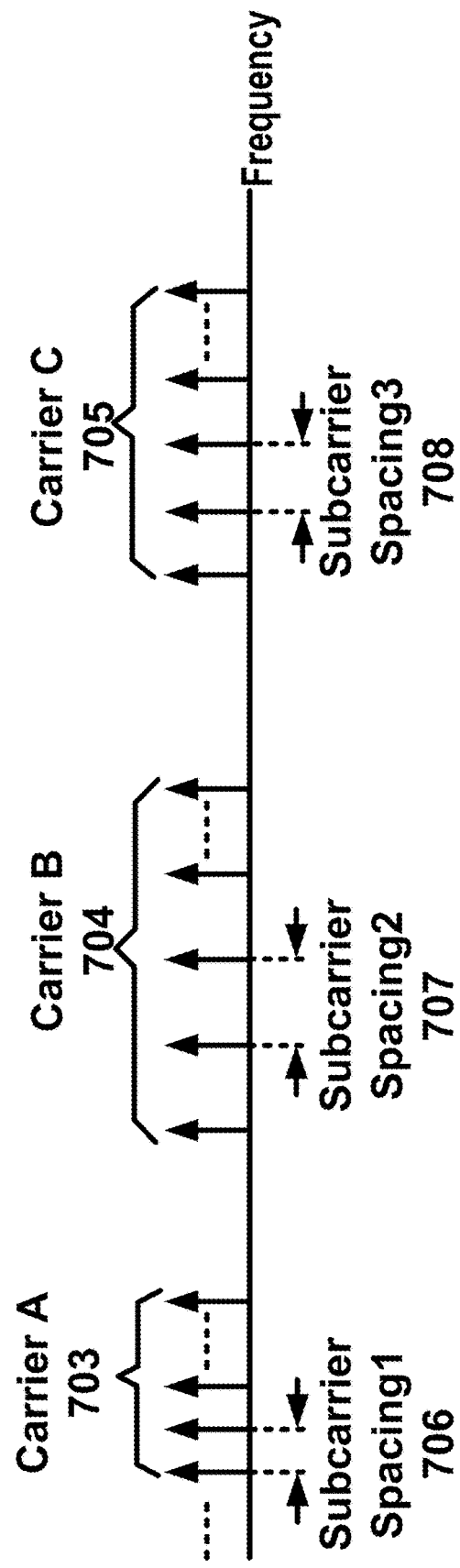

FIG. 7B shows examples of component carriers. A first component carrier may comprise a first number of subcarriers 706 having a first subcarrier spacing 709. A second component carrier may comprise a second number of subcarriers 707 having a second subcarrier spacing 710. A third component carrier may comprise a third number of subcarriers 708 having a third subcarrier spacing 711. Carriers in a multicarrier OFDM communication system may be contiguous carriers, non-contiguous carriers, or a combination of both contiguous and non-contiguous carriers.

Figure 8:
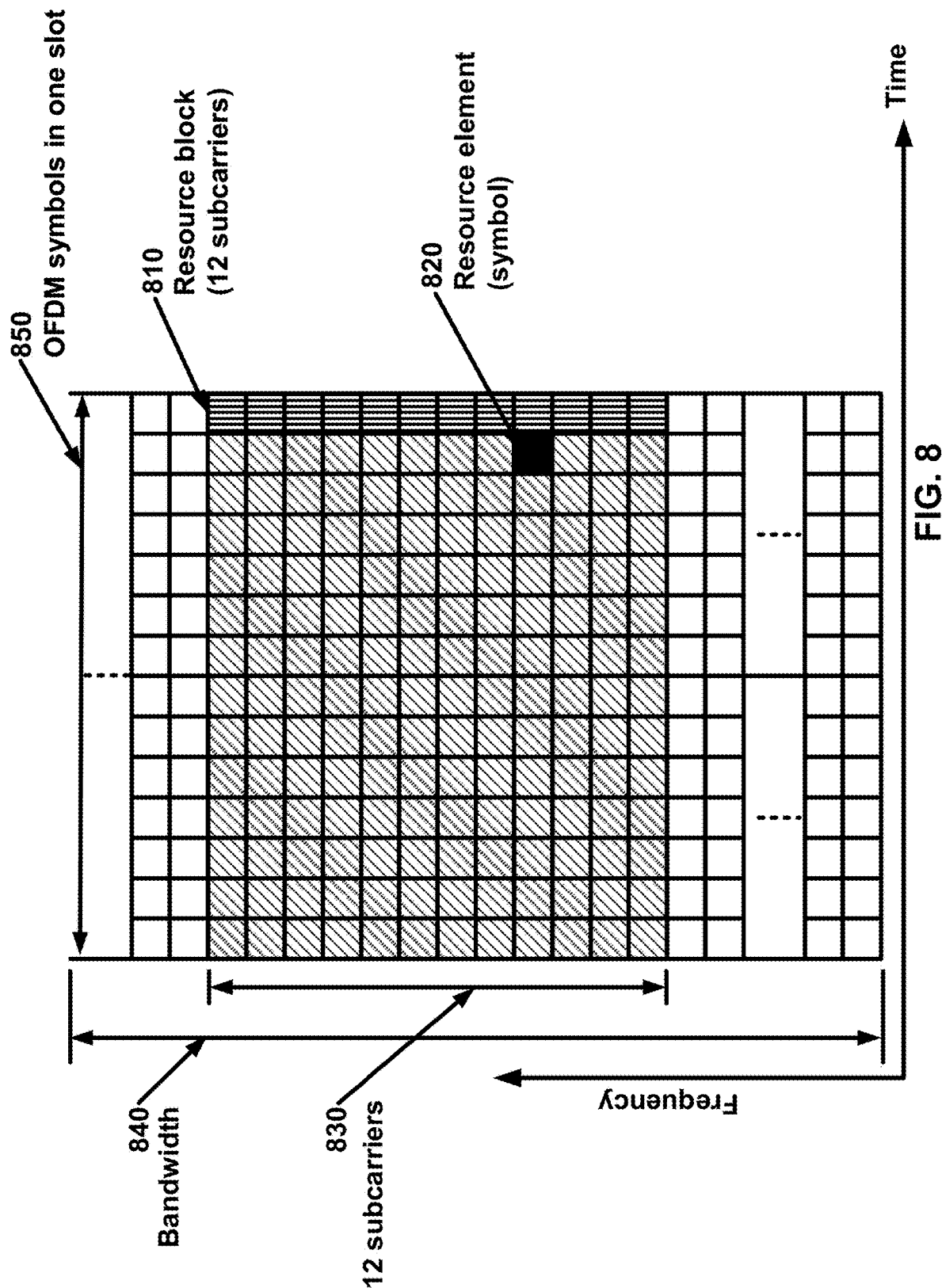
FIG. 8 shows example OFDM radio resources.

FIG. 8 shows an example of OFDM radio resources. A carrier may have a transmission bandwidth 801. A resource grid may be in a structure of frequency domain 802 and time domain 803. A resource grid may comprise a first number of OFDM symbols in a subframe and a second number of resource blocks, starting from a common resource block indicated by higher-layer signaling (e.g., RRC signaling), for a transmission numerology and a carrier. In a resource grid, a resource element 805 may comprise a resource unit that may be identified by a subcarrier index and a symbol index. A subframe may comprise a first number of OFDM symbols 807 that may depend on a numerology associated with a carrier. A subframe may have 14 OFDM symbols for a carrier, for example, if a subcarrier spacing of a numerology of a carrier is 15 kHz. A subframe may have 28 OFDM symbols, for example, if a subcarrier spacing of a numerology is 30 kHz. A subframe may have 56 OFDM symbols, for example, if a subcarrier spacing of a numerology is 60 kHz. A subcarrier spacing of a numerology may comprise any other frequency. A second number of resource blocks comprised in a resource grid of a carrier may depend on a bandwidth and a numerology of the carrier.

A resource block 806 may comprise 12 subcarriers. Multiple resource blocks may be grouped into a Resource Block Group (RBG) 804. A size of a RBG may depend on at least one of: a RRC message indicating a RBG size configuration; a size of a carrier bandwidth; and/or a size of a bandwidth part of a carrier. A carrier may comprise multiple bandwidth parts. A first bandwidth part of a carrier may have a different frequency location and/or a different bandwidth from a second bandwidth part of the carrier.

A base station may send (e.g., transmit), to a wireless device, a downlink control information comprising a downlink or uplink resource block assignment. A base station may send (e.g., transmit) to and/or receive from, a wireless device, data packets (e.g., transport blocks). The data packets may be scheduled on and transmitted via one or more resource blocks and one or more slots indicated by parameters in downlink control information and/or RRC message(s). A starting symbol relative to a first slot of the one or more slots may be indicated to the wireless device. A base station may send (e.g., transmit) to and/or receive from, a wireless device, data packets. The data packets may be scheduled for transmission on one or more RBGs and in one or more slots.

A base station may send (e.g., transmit), to a wireless device, downlink control information comprising a downlink assignment. The base station may send (e.g., transmit) the DCI via one or more PDCCHs. The downlink assignment may comprise parameters indicating at least one of a modulation and coding format; resource allocation; and/or HARQ information related to the DL-SCH. The resource allocation may comprise parameters of resource block allocation; and/or slot allocation. A base station may allocate (e.g., dynamically) resources to a wireless device, for example, via a Cell-Radio Network Temporary Identifier (C-RNTI) on one or more PDCCHs. The wireless device may monitor the one or more PDCCHs, for example, in order to find possible allocation if its downlink reception is enabled. The wireless device may receive one or more downlink data packets on one or more PDSCH scheduled by the one or more PDCCHs, for example, if the wireless device successfully detects the one or more PDCCHs.

A base station may allocate Configured Scheduling (CS) resources for down link transmission to a wireless device. The base station may send (e.g., transmit) one or more RRC messages indicating a periodicity of the CS grant. The base station may send (e.g., transmit) DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages. The CS grant may be implicitly reused, for example, until deactivated.

A base station may send (e.g., transmit), to a wireless device via one or more PDCCHs, downlink control information comprising an uplink grant. The uplink grant may comprise parameters indicating at least one of a modulation and coding format; a resource allocation; and/or HARQ information related to the UL-SCH. The resource allocation may comprise parameters of resource block allocation; and/or slot allocation. The base station may dynamically allocate resources to the wireless device via a C-RNTI on one or more PDCCHs. The wireless device may monitor the one or more PDCCHs, for example, in order to find possible resource allocation. The wireless device may send (e.g., transmit) one or more uplink data packets via one or more PUSCH scheduled by the one or more PDCCHs, for example, if the wireless device successfully detects the one or more PDCCHs.

The base station may allocate CS resources for uplink data transmission to a wireless device. The base station may transmit one or more RRC messages indicating a periodicity of the CS grant. The base station may send (e.g., transmit) DCI via a PDCCH addressed to a CS-RNTI to activate the CS resources. The DCI may comprise parameters indicating that the uplink grant is a CS grant. The CS grant may be implicitly reused according to the periodicity defined by the one or more RRC message, The CS grant may be implicitly reused, for example, until deactivated.

A base station may send (e.g., transmit) DCI and/or control signaling via a PDCCH. The DCI may comprise a format of a plurality of formats. The DCI may comprise downlink and/or uplink scheduling information (e.g., resource allocation information, HARQ related parameters, MCS), request(s) for CSI (e.g., aperiodic CQI reports), request(s) for an SRS, uplink power control commands for one or more cells, one or more timing information (e.g., TB transmission/reception timing, HARQ feedback timing, etc.), and/or the like. The DCI may indicate an uplink grant comprising transmission parameters for one or more transport blocks. The DCI may indicate a downlink assignment indicating parameters for receiving one or more transport blocks. The DCI may be used by the base station to initiate a contention-free random access at the wireless device. The base station may send (e.g., transmit) DCI comprising a slot format indicator (SFI) indicating a slot format. The base station may send (e.g., transmit) DCI comprising a preemption indication indicating the PRB(s) and/or OFDM symbol(s) in which a wireless device may assume no transmission is intended for the wireless device. The base station may send (e.g., transmit) DCI for group power control of the PUCCH, the PUSCH, and/or an SRS. DCI may correspond to an RNTI. The wireless device may obtain an RNTI after or in response to completing the initial access (e.g., C-RNTI). The base station may configure an RNTI for the wireless (e.g., CS-RNTI, TPC-CS-RNTI, TPC-PUCCH-RNTI, TPC-PUSCH-RNTI, TPC-SRS-RNTI, etc.). The wireless device may determine (e.g., compute) an RNTI (e.g., the wireless device may determine the RA-RNTI based on resources used for transmission of a preamble). An RNTI may have a pre-configured value (e.g., P-RNTI or SI-RNTI). The wireless device may monitor a group common search space which may be used by the base station for sending (e.g., transmitting) DCIs that are intended for a group of wireless devices. A group common DCI may correspond to an RNTI which is commonly configured for a group of wireless devices. The wireless device may monitor a wireless device-specific search space. A wireless device specific DCI may correspond to an RNTI configured for the wireless device.

A communications system (e.g., an NR system) may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources (e.g., which may be associated with a CSI-RS resource index (CRI)), and/or one or more DM-RSs of a PBCH, may be used as an RS for measuring a quality of a beam pair link. The quality of a beam pair link may be based on a reference signal received power (RSRP) value, a reference signal received quality (RSRQ) value, and/or a CSI value measured on RS resources. The base station may indicate whether an RS resource, used for measuring a beam pair link quality, is quasi-co-located (QCLed) with DM-RSs of a control channel. An RS resource and DM-RSs of a control channel may be called QCLed, for example, if channel characteristics from a transmission on an RS to a wireless device, and that from a transmission on a control channel to a wireless device, are similar or the same under a configured criterion. In a multi-beam operation, a wireless device may perform an uplink beam sweeping to access a cell.

A wireless device may be configured to monitor a PDCCH on one or more beam pair links simultaneously, for example, depending on a capability of the wireless device. This monitoring may increase robustness against beam pair link blocking. A base station may send (e.g., transmit) one or more messages to configure the wireless device to monitor the PDCCH on one or more beam pair links in different PDCCH OFDM symbols. A base station may send (e.g., transmit) higher layer signaling (e.g., RRC signaling) and/or a MAC CE comprising parameters related to the Rx beam setting of the wireless device for monitoring the PDCCH on one or more beam pair links. The base station may send (e.g., transmit) an indication of a spatial QCL assumption between an DL RS antenna port(s) (e.g., a cell-specific CSI-RS, a wireless device-specific CSI-RS, an SS block, and/or a PBCH with or without DM-RSs of the PBCH) and/or DL RS antenna port(s) for demodulation of a DL control channel. Signaling for beam indication for a PDCCH may comprise MAC CE signaling, RRC signaling, DCI signaling, and/or specification-transparent and/or implicit method, and/or any combination of signaling methods.

A base station may indicate spatial QCL parameters between DL RS antenna port(s) and DM-RS antenna port(s) of a DL data channel, for example, for reception of a unicast DL data channel. The base station may send (e.g., transmit) DCI (e.g., downlink grants) comprising information indicating the RS antenna port(s). The information may indicate RS antenna port(s) that may be QCL-ed with the DM-RS antenna port(s). A different set of DM-RS antenna port(s) for a DL data channel may be indicated as QCL with a different set of the RS antenna port(s).

Figure 9A:
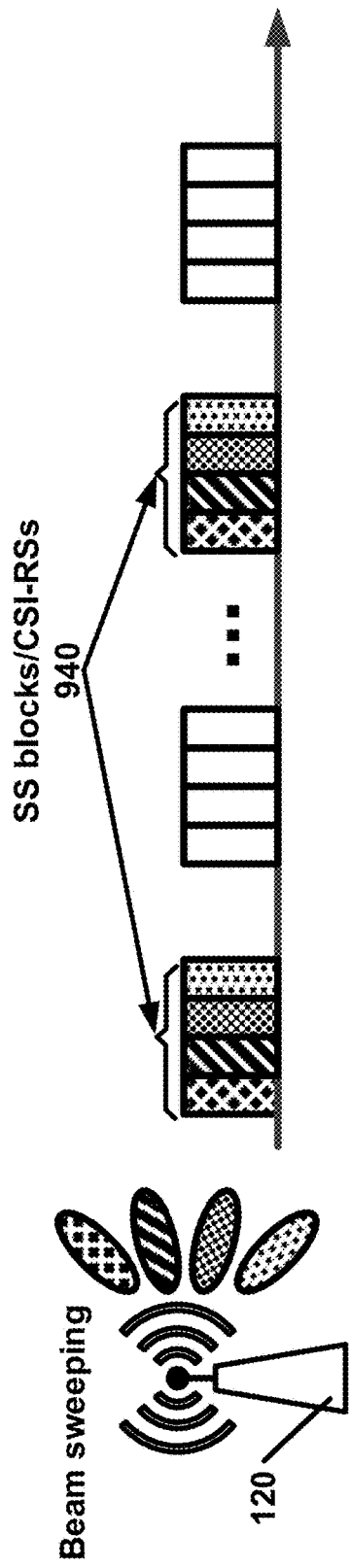
FIG. 9A shows an example channel state information reference signal (CSI-RS) and/or synchronization signal (SS) block transmission in a multi-beam system.

FIG. 9A shows an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. A base station 120 may send (e.g., transmit) SS blocks in multiple beams, together forming a SS burst 940, for example, in a multi-beam operation. One or more SS blocks may be sent (e.g., transmitted) on one beam. If multiple SS bursts 940 are transmitted with multiple beams, SS bursts together may form SS burst set 950.

A wireless device may use CSI-RS for estimating a beam quality of a link between a wireless device and a base station, for example, in the multi beam operation. A beam may be associated with a CSI-RS. A wireless device may (e.g., based on a RSRP measurement on CSI-RS) report a beam index, which may be indicated in a CRI for downlink beam selection and/or associated with an RSRP value of a beam. A CSI-RS may be sent (e.g., transmitted) on a CSI-RS resource, which may comprise at least one of: one or more antenna ports and/or one or more time and/or frequency radio resources. A CSI-RS resource may be configured in a cell-specific way such as by common RRC signaling, or in a wireless device-specific way such as by dedicated RRC signaling and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be sent (e.g., transmitted) periodically, using aperiodic transmission, or using a multi-shot or semi-persistent transmission. In a periodic transmission in FIG. 9A, a base station 120 may send (e.g., transmit) configured CSI-RS resources 940 periodically using a configured periodicity in a time domain. In an aperiodic transmission, a configured CSI-RS resource may be sent (e.g., transmitted) in a dedicated time slot. In a multi-shot and/or semi-persistent transmission, a configured CSI-RS resource may be sent (e.g., transmitted) within a configured period. Beams used for CSI-RS transmission may have a different beam width than beams used for SS-blocks transmission.

Figure 9B:
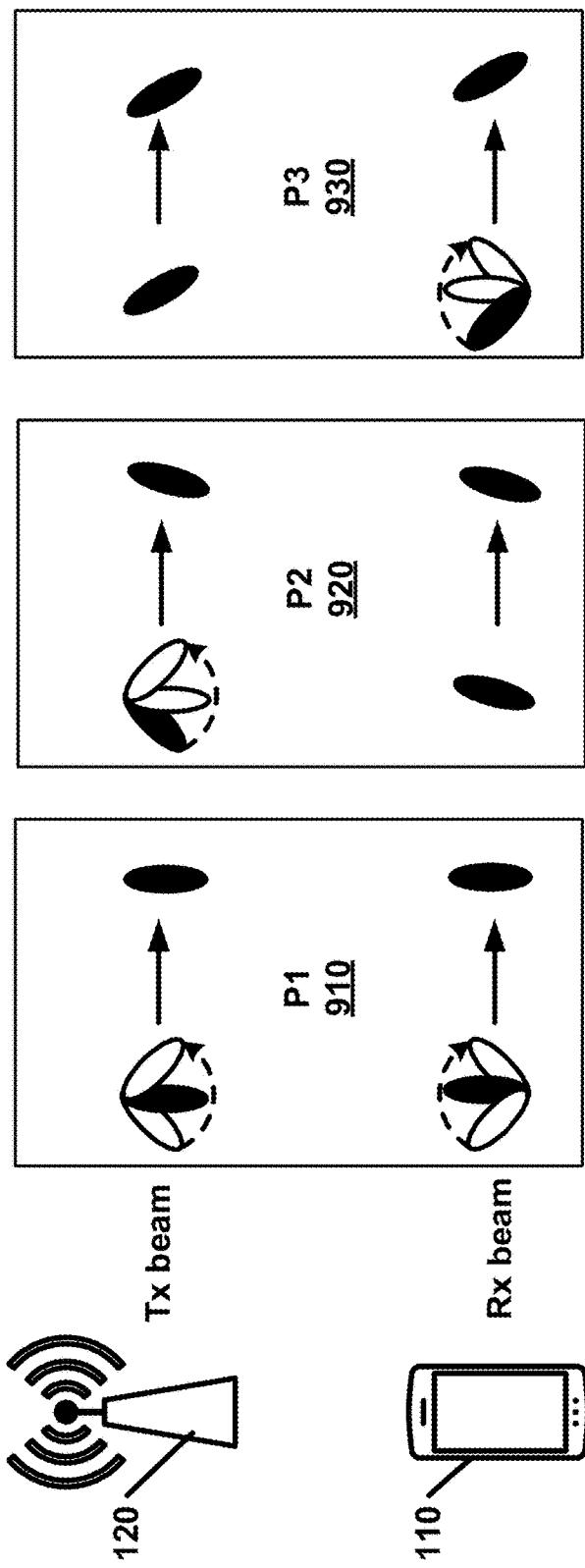
FIG. 9B shows an example downlink beam management procedure.

FIG. 9B shows an example of a beam management procedure, such as in an example new radio network. The base station 120 and/or the wireless device 110 may perform a downlink L1/L2 beam management procedure. One or more of the following downlink L1/L2 beam management procedures may be performed within one or more wireless devices 110 and one or more base stations 120. A P1 procedure 910 may be used to enable the wireless device 110 to measure one or more Transmission (Tx) beams associated with the base station 120, for example, to support a selection of a first set of Tx beams associated with the base station 120 and a first set of Rx beam(s) associated with the wireless device 110. A base station 120 may sweep a set of different Tx beams, for example, for beamforming at a base station 120 (such as shown in the top row, in a counter-clockwise direction). A wireless device 110 may sweep a set of different Rx beams, for example, for beamforming at a wireless device 110 (such as shown in the bottom row, in a clockwise direction). A P2 procedure 920 may be used to enable a wireless device 110 to measure one or more Tx beams associated with a base station 120, for example, to possibly change a first set of Tx beams associated with a base station 120. A P2 procedure 920 may be performed on a possibly smaller set of beams (e.g., for beam refinement) than in the P1 procedure 910. A P2 procedure 920 may be a special example of a P1 procedure 910. A P3 procedure 930 may be used to enable a wireless device 110 to measure at least one Tx beam associated with a base station 120, for example, to change a first set of Rx beams associated with a wireless device 110.

A wireless device 110 may send (e.g., transmit) one or more beam management reports to a base station 120. In one or more beam management reports, a wireless device 110 may indicate one or more beam pair quality parameters comprising one or more of: a beam identification; an RSRP; a Precoding Matrix Indicator (PMI), Channel Quality Indicator (CQI), and/or Rank Indicator (RI) of a subset of configured beams. Based on one or more beam management reports, the base station 120 may send (e.g., transmit) to a wireless device 110 a signal indicating that one or more beam pair links are one or more serving beams. The base station 120 may send (e.g., transmit) the PDCCH and the PDSCH for a wireless device 110 using one or more serving beams.

A communications network (e.g., a new radio network) may support a Bandwidth Adaptation (BA). Receive and/or transmit bandwidths that may be configured for a wireless device using a BA may not be large. Receive and/or transmit bandwidth may not be as large as a bandwidth of a cell. Receive and/or transmit bandwidths may be adjustable. A wireless device may change receive and/or transmit bandwidths, for example, to reduce (e.g., shrink) the bandwidth (s) at (e.g., during) a period of low activity such as to save power. A wireless device may change a location of receive and/or transmit bandwidths in a frequency domain, for example, to increase scheduling flexibility. A wireless device may change a subcarrier spacing, for example, to allow different services.

A Bandwidth Part (BWP) may comprise a subset of a total cell bandwidth of a cell. A base station may configure a wireless device with one or more BWPs, for example, to achieve a BA. A base station may indicate, to a wireless device, which of the one or more (configured) BWPs is an active BWP.

Figure 10:
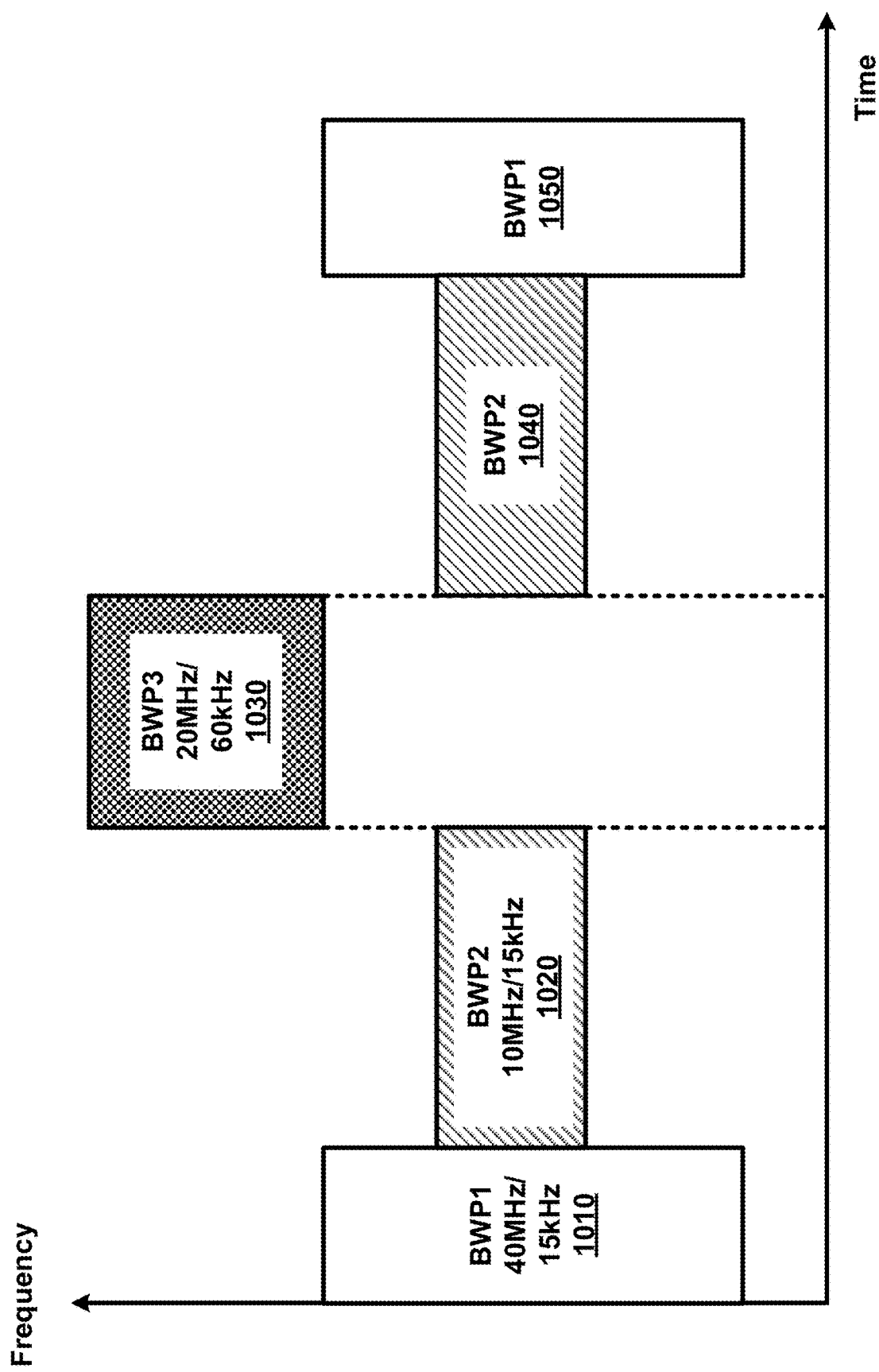
FIG. 10 shows an example of configured bandwidth parts (BWPs).

FIG. 10 shows an example of BWP configurations. BWPs may be configured as follows: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz. Any number of BWP configurations may comprise any other width and subcarrier spacing combination.

A wireless device, configured for operation in one or more BWPs of a cell, may be configured by one or more higher layers (e.g., RRC layer). The wireless device may be configured for a cell with: a set of one or more BWPs (e.g., at most four BWPs) for reception (e.g., a DL BWP set) in a DL bandwidth by at least one parameter DL-BWP; and a set of one or more BWPs (e.g., at most four BWPs) for transmissions (e.g., UL BWP set) in an UL bandwidth by at least one parameter UL-BWP.

A base station may configure a wireless device with one or more UL and DL BWP pairs, for example, to enable BA on the PCell. To enable BA on SCells (e.g., for CA), a base station may configure a wireless device at least with one or more DL BWPs (e.g., there may be none in an UL).

An initial active DL BWP may comprise at least one of a location and number of contiguous PRBs, a subcarrier spacing, or a cyclic prefix, for example, for a control resource set for at least one common search space. For operation on the PCell, one or more higher layer parameters may indicate at least one initial UL BWP for a random access procedure. If a wireless device is configured with a secondary carrier on a primary cell, the wireless device may be configured with an initial BWP for random access procedure on a secondary carrier.

A wireless device may expect that a center frequency for a DL BWP may be same as a center frequency for an UL BWP, for example, for unpaired spectrum operation. A base station may semi-statically configure a wireless device for a cell with one or more parameters, for example, for a DL BWP or an UL BWP in a set of one or more DL BWPs or one or more UL BWPs, respectively. The one or more parameters may indicate one or more of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; and/or an offset of a first PRB of a DL bandwidth or an UL bandwidth, respectively, relative to a first PRB of a bandwidth.

For a DL BWP in a set of one or more DL BWPs on a PCell, a base station may configure a wireless device with one or more control resource sets for at least one type of common search space and/or one wireless device-specific search space. A base station may not configure a wireless device without a common search space on a PCell, or on a PSCell, in an active DL BWP. For an UL BWP in a set of one or more UL BWPs, a base station may configure a wireless device with one or more resource sets for one or more PUCCH transmissions.

DCI may comprise a BWP indicator field. The BWP indicator field value may indicate an active DL BWP, from a configured DL BWP set, for one or more DL receptions. The BWP indicator field value may indicate an active UL BWP, from a configured UL BWP set, for one or more UL transmissions.

For a PCell, a base station may semi-statically configure a wireless device with a default DL BWP among configured DL BWPs. If a wireless device is not provided a default DL BWP, a default BWP may be an initial active DL BWP.

A base station may configure a wireless device with a timer value for a PCell. A wireless device may start a timer (e.g., a BWP inactivity timer), for example, if a wireless device detects DCI indicating an active DL BWP, other than a default DL BWP, for a paired spectrum operation, and/or if a wireless device detects DCI indicating an active DL BWP or UL BWP, other than a default DL BWP or UL BWP, for an unpaired spectrum operation. The wireless device may increment the timer by an interval of a first value (e.g., the first value may be 1 millisecond, 0.5 milliseconds, or any other time duration), for example, if the wireless device does not detect DCI at (e.g., during) the interval for a paired spectrum operation or for an unpaired spectrum operation. The timer may expire at a time that the timer is equal to the timer value. A wireless device may switch to the default DL BWP from an active DL BWP, for example, if the timer expires.

A base station may semi-statically configure a wireless device with one or more BWPs. A wireless device may switch an active BWP from a first BWP to a second BWP, for example, after or in response to receiving DCI indicating the second BWP as an active BWP, and/or after or in response to an expiry of BWP inactivity timer (e.g., the second BWP may be a default BWP). FIG. 10 shows an example of three BWPs configured, BWP1 (1010 and 1050), BWP2 (1020 and 1040), and BWP3 (1030). BWP2 (1020 and 1040) may be a default BWP. BWP1 (1010) may be an initial active BWP. A wireless device may switch an active BWP from BWP1 1010 to BWP2 1020, for example, after or in response to an expiry of the BWP inactivity timer. A wireless device may switch an active BWP from BWP2 1020 to BWP3 1030, for example, after or in response to receiving DCI indicating BWP3 1030 as an active BWP. Switching an active BWP from BWP3 1030 to BWP2 1040 and/or from BWP2 1040 to BWP1 1050 may be after or in response to receiving DCI indicating an active BWP, and/or after or in response to an expiry of BWP inactivity timer.

Wireless device procedures on a secondary cell may be same as on a primary cell using the timer value for the secondary cell and the default DL BWP for the secondary cell, for example, if a wireless device is configured for a secondary cell with a default DL BWP among configured DL BWPs and a timer value. A wireless device may use an indicated DL BWP and an indicated UL BWP on a secondary cell as a respective first active DL BWP and first active UL BWP on a secondary cell or carrier, for example, if a base station configures a wireless device with a first active DL BWP and a first active UL BWP on a secondary cell or carrier.

Figure 11A:
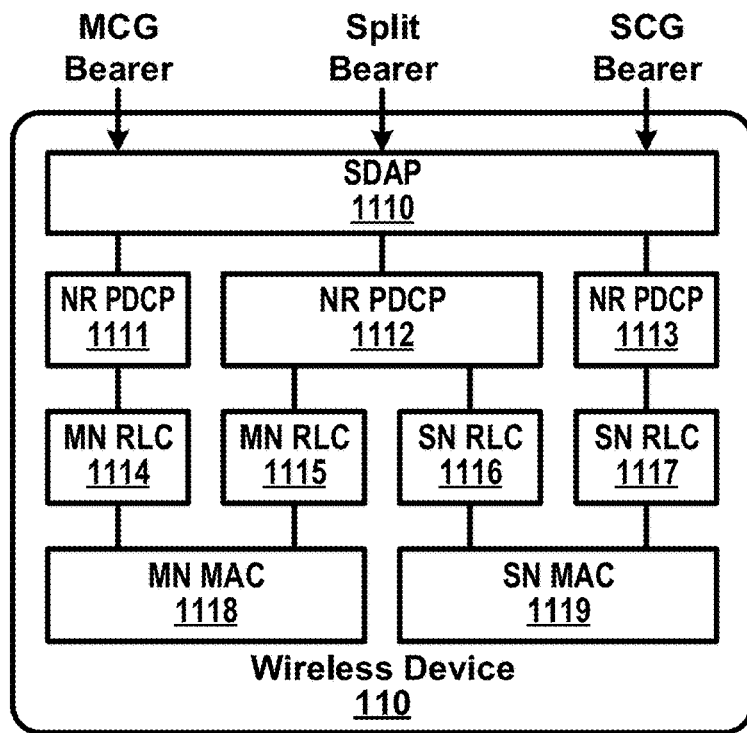
FIG. 11A and FIG. 11B show examples of multi connectivity.
Figure 11B:
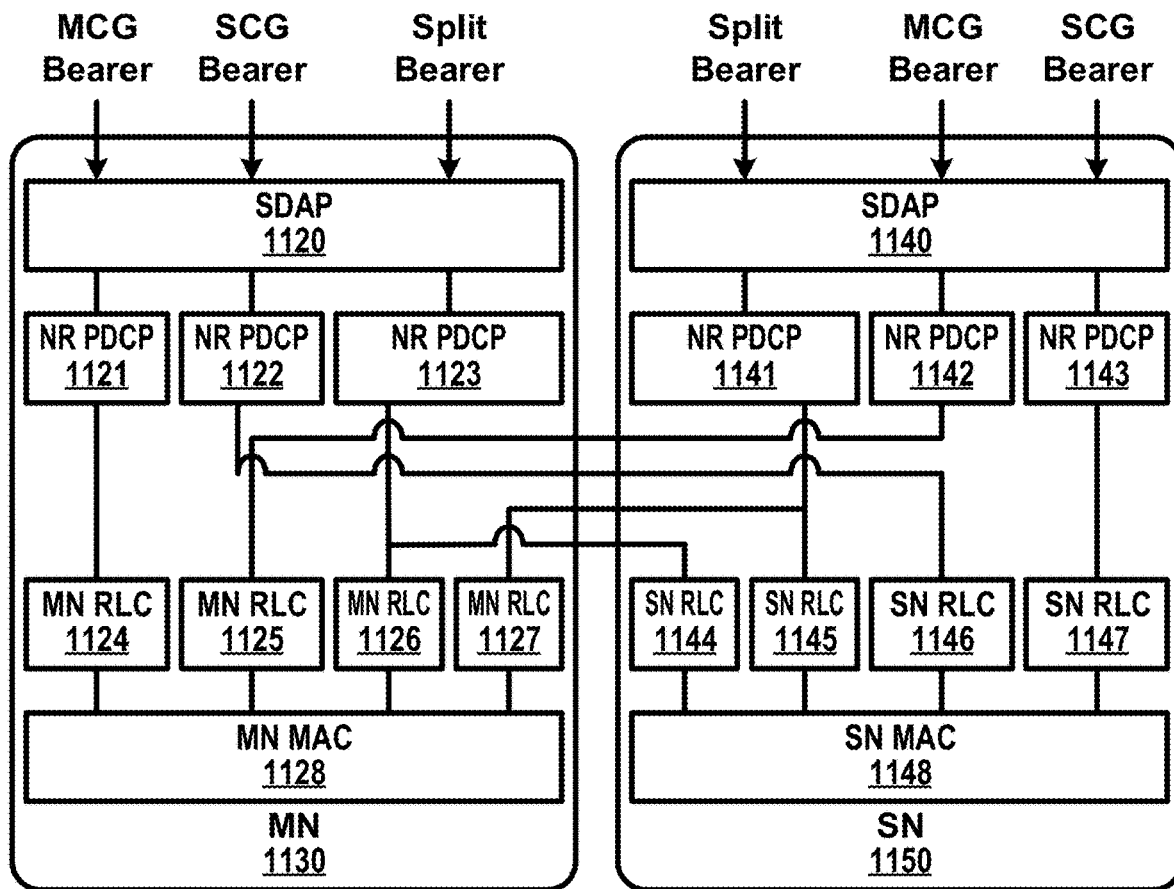

FIG. 11A and FIG. 11B show packet flows using a multi connectivity (e.g., dual connectivity, multi connectivity, tight interworking, and/or the like). FIG. 11A shows an example of a protocol structure of a wireless device 110 (e.g., UE) with CA and/or multi connectivity. FIG. 11B shows an example of a protocol structure of multiple base stations with CA and/or multi connectivity. The multiple base stations may comprise a master node, MN 1130 (e.g., a master node, a master base station, a master gNB, a master eNB, and/or the like) and a secondary node, SN 1150 (e.g., a secondary node, a secondary base station, a secondary gNB, a secondary eNB, and/or the like). A master node 1130 and a secondary node 1150 may co-work to communicate with a wireless device 110.

If multi connectivity is configured for a wireless device 110, the wireless device 110, which may support multiple reception and/or transmission functions in an RRC connected state, may be configured to utilize radio resources provided by multiple schedulers of a multiple base stations. Multiple base stations may be inter-connected via a non-ideal or ideal backhaul (e.g., Xn interface, X2 interface, and/or the like). A base station involved in multi connectivity for a certain wireless device may perform at least one of two different roles: a base station may act as a master base station or act as a secondary base station. In multi connectivity, a wireless device may be connected to one master base station and one or more secondary base stations. A master base station (e.g., the MN 1130) may provide a master cell group (MCG) comprising a primary cell and/or one or more secondary cells for a wireless device (e.g., the wireless device 110). A secondary base station (e.g., the SN 1150) may provide a secondary cell group (SCG) comprising a primary secondary cell (PSCell) and/or one or more secondary cells for a wireless device (e.g., the wireless device 110).

In multi connectivity, a radio protocol architecture that a bearer uses may depend on how a bearer is setup. Three different types of bearer setup options may be supported: an MCG bearer, an SCG bearer, and/or a split bearer. A wireless device may receive and/or send (e.g., transmit) packets of an MCG bearer via one or more cells of the MCG. A wireless device may receive and/or send (e.g., transmit) packets of an SCG bearer via one or more cells of an SCG. Multi-connectivity may indicate having at least one bearer configured to use radio resources provided by the secondary base station. Multi-connectivity may or may not be configured and/or implemented.

A wireless device (e.g., wireless device 110) may send (e.g., transmit) and/or receive: packets of an MCG bearer via an SDAP layer (e.g., SDAP 1110), a PDCP layer (e.g., NR PDCP 1111), an RLC layer (e.g., MN RLC 1114), and a MAC layer (e.g., MN MAC 1118); packets of a split bearer via an SDAP layer (e.g., SDAP 1110), a PDCP layer (e.g., NR PDCP 1112), one of a master or secondary RLC layer (e.g., MN RLC 1115, SN RLC 1116), and one of a master or secondary MAC layer (e.g., MN MAC 1118, SN MAC 1119); and/or packets of an SCG bearer via an SDAP layer (e.g., SDAP 1110), a PDCP layer (e.g., NR PDCP 1113), an RLC layer (e.g., SN RLC 1117), and a MAC layer (e.g., MN MAC 1118).

A master base station (e.g., MN 1130) and/or a secondary base station (e.g., SN 1150) may send (e.g., transmit) and/or receive: packets of an MCG bearer via a master or secondary node SDAP layer (e.g., SDAP 1120, SDAP 1140), a master or secondary node PDCP layer (e.g., NR PDCP 1121, NR PDCP 1142), a master node RLC layer (e.g., MN RLC 1124, MN RLC 1125), and a master node MAC layer (e.g., MN MAC 1128); packets of an SCG bearer via a master or secondary node SDAP layer (e.g., SDAP 1120, SDAP 1140), a master or secondary node PDCP layer (e.g., NR PDCP 1122, NR PDCP 1143), a secondary node RLC layer (e.g., SN RLC 1146, SN RLC 1147), and a secondary node MAC layer (e.g., SN MAC 1148); packets of a split bearer via a master or secondary node SDAP layer (e.g., SDAP 1120, SDAP 1140), a master or secondary node PDCP layer (e.g., NR PDCP 1123, NR PDCP 1141), a master or secondary node RLC layer (e.g., MN RLC 1126, SN RLC 1144, SN RLC 1145, MN RLC 1127), and a master or secondary node MAC layer (e.g., MN MAC 1128, SN MAC 1148).

In multi connectivity, a wireless device may configure multiple MAC entities, such as one MAC entity (e.g., MN MAC 1118) for a master base station, and other MAC entities (e.g., SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be used. At least one cell of an SCG may have a configured UL CC and at least one cell of a SCG, named as primary secondary cell (e.g., PSCell, PCell of SCG, PCell), and may be configured with PUCCH resources. If an SCG is configured, there may be at least one SCG bearer or one split bearer. After or upon detection of a physical layer problem or a random access problem on a PSCell, or a number of NR RLC retransmissions has been reached associated with the SCG, or after or upon detection of an access problem on a PSCell associated with (e.g., during) a SCG addition or an SCG change: an RRC connection re-establishment procedure may not be triggered, UL transmissions towards cells of an SCG may be stopped, a master base station may be informed by a wireless device of a SCG failure type, a DL data transfer over a master base station may be maintained (e.g., for a split bearer). An NR RLC acknowledged mode (AM) bearer may be configured for a split bearer. A PCell and/or a PSCell may not be de-activated. A PSCell may be changed with a SCG change procedure (e.g., with security key change and a RACH procedure). A bearer type change between a split bearer and a SCG bearer, and/or simultaneous configuration of a SCG and a split bearer, may or may not be supported.

With respect to interactions between a master base station and a secondary base stations for multi-connectivity, one or more of the following may be used. A master base station and/or a secondary base station may maintain RRM measurement configurations of a wireless device. A master base station may determine (e.g., based on received measurement reports, traffic conditions, and/or bearer types) to request a secondary base station to provide additional resources (e.g., serving cells) for a wireless device. After or upon receiving a request from a master base station, a secondary base station may create and/or modify a container that may result in a configuration of additional serving cells for a wireless device (or decide that the secondary base station has no resource available to do so). For a wireless device capability coordination, a master base station may provide (e.g., all or a part of) an AS configuration and wireless device capabilities to a secondary base station. A master base station and a secondary base station may exchange information about a wireless device configuration such as by using RRC containers (e.g., inter-node messages) carried via Xn messages. A secondary base station may initiate a reconfiguration of the secondary base station existing serving cells (e.g., PUCCH towards the secondary base station). A secondary base station may decide which cell is a PSCell within a SCG. A master base station may or may not change content of RRC configurations provided by a secondary base station. A master base station may provide recent (and/or the latest) measurement results for SCG cell(s), for example, if an SCG addition and/or an SCG SCell addition occurs. A master base station and secondary base stations may receive information of SFN and/or subframe offset of each other from an OAM and/or via an Xn interface (e.g., for a purpose of DRX alignment and/or identification of a measurement gap). Dedicated RRC signaling may be used for sending required system information of a cell as for CA, for example, if adding a new SCG SCell, except for an SFN acquired from an MIB of a PSCell of a SCG.

Figure 12:
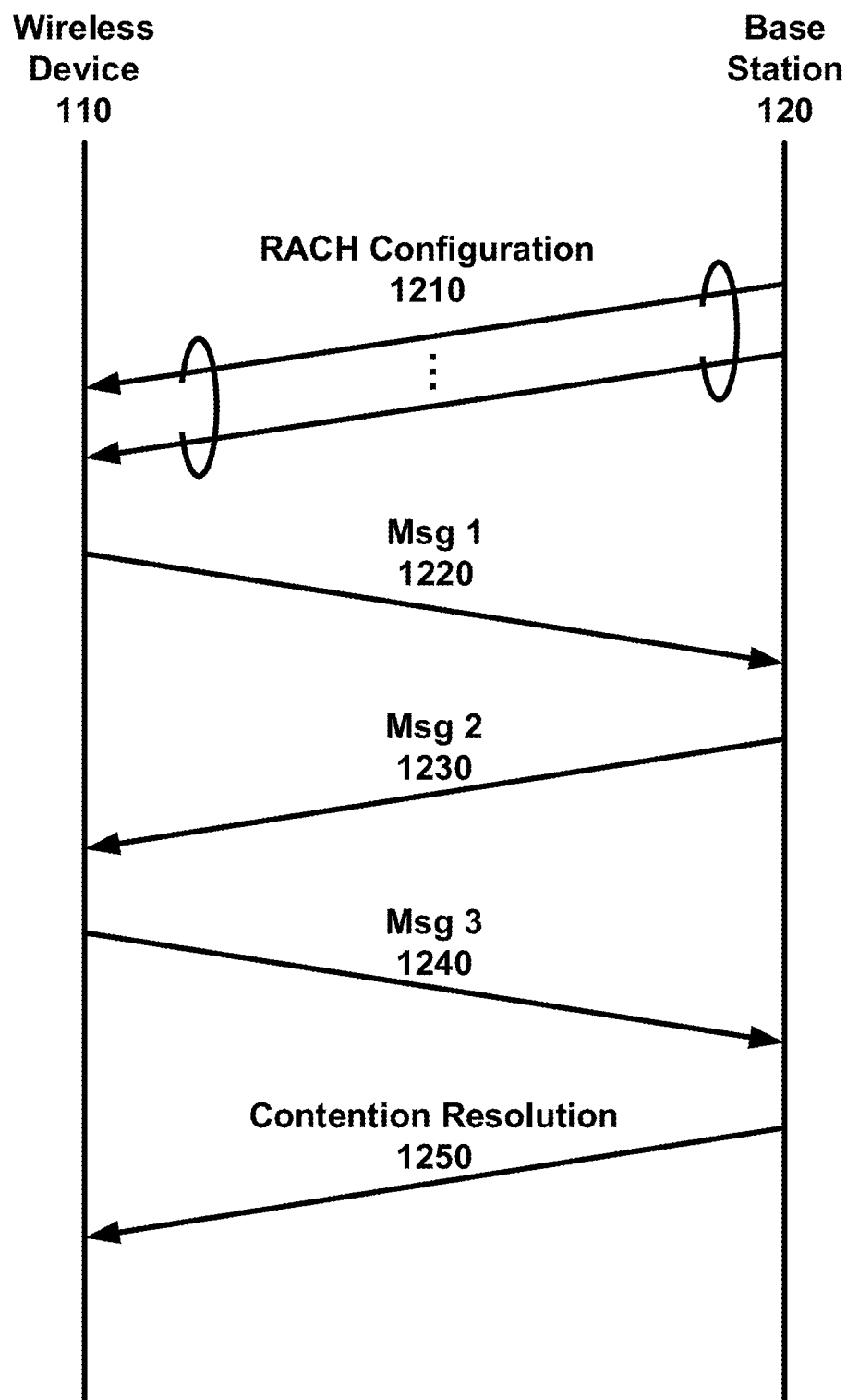
FIG. 12 shows an example of a random access procedure.

FIG. 12 shows an example of a random access procedure. One or more events may trigger a random access procedure. For example, one or more events may be at least one of following: initial access from RRC_IDLE, RRC connection re-establishment procedure, handover, DL or UL data arrival in (e.g., during) a state of RRC_CONNECTED (e.g., if UL synchronization status is non-synchronized), transition from RRC_Inactive, and/or request for other system information. A PDCCH order, a MAC entity, and/or a beam failure indication may initiate a random access procedure.

A random access procedure may comprise or be one of at least a contention based random access procedure and/or a contention free random access procedure. A contention based random access procedure may comprise one or more Msg 1 1220 transmissions, one or more Msg 2 1230 transmissions, one or more Msg 3 1240 transmissions, and contention resolution 1250. A contention free random access procedure may comprise one or more Msg 1 1220 transmissions and one or more Msg 2 1230 transmissions. One or more of Msg 1 1220, Msg 2 1230, Msg 3 1240, and/or contention resolution 1250 may be transmitted in the same step. A two-step random access procedure, for example, may comprise a first transmission (e.g., Msg A) and a second transmission (e.g., Msg B). The first transmission (e.g., Msg A) may comprise transmitting, by a wireless device (e.g., wireless device 110) to a base station (e.g., base station 120), one or more messages indicating an equivalent and/or similar contents of Msg 1 1220 and Msg 3 1240 of a four-step random access procedure. The second transmission (e.g., Msg B) may comprise transmitting, by the base station (e.g., base station 120) to a wireless device (e.g., wireless device 110) after or in response to the first message, one or more messages indicating an equivalent and/or similar content of Msg 2 1230 and contention resolution 1250 of a four-step random access procedure.

A base station may send (e.g., transmit, unicast, multicast, broadcast, etc.), to a wireless device, a RACH configuration 1210 via one or more beams. The RACH configuration 1210 may comprise one or more parameters indicating at least one of following: an available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), a random access preamble index, a maximum number of preamble transmissions, preamble group A and group B, a threshold (e.g., message size) to determine the groups of random access preambles, a set of one or more random access preambles for a system information request and corresponding PRACH resource(s) (e.g., if any), a set of one or more random access preambles for a beam failure recovery procedure and corresponding PRACH resource(s) (e.g., if any), a time window to monitor RA response(s), a time window to monitor response(s) on a beam failure recovery procedure, and/or a contention resolution timer.

The Msg 1 1220 may comprise one or more transmissions of a random access preamble. For a contention based random access procedure, a wireless device may select an SS block with an RSRP above the RSRP threshold. If random access preambles group B exists, a wireless device may select one or more random access preambles from a group A or a group B, for example, depending on a potential Msg 3 1240 size. If a random access preambles group B does not exist, a wireless device may select the one or more random access preambles from a group A. A wireless device may select a random access preamble index randomly (e.g., with equal probability or a normal distribution) from one or more random access preambles associated with a selected group. If a base station semi-statically configures a wireless device with an association between random access preambles and SS blocks, the wireless device may select a random access preamble index randomly with equal probability from one or more random access preambles associated with a selected SS block and a selected group.

A wireless device may initiate a contention free random access procedure, for example, based on a beam failure indication from a lower layer. A base station may semi-statically configure a wireless device with one or more contention free PRACH resources for a beam failure recovery procedure associated with at least one of SS blocks and/or CSI-RSs. A wireless device may select a random access preamble index corresponding to a selected SS block or a CSI-RS from a set of one or more random access preambles for a beam failure recovery procedure, for example, if at least one of the SS blocks with an RSRP above a first RSRP threshold amongst associated SS blocks is available, and/or if at least one of CSI-RSs with a RSRP above a second RSRP threshold amongst associated CSI-RSs is available.

A wireless device may receive, from a base station, a random access preamble index via PDCCH or RRC for a contention free random access procedure. The wireless device may select a random access preamble index, for example, if a base station does not configure a wireless device with at least one contention free PRACH resource associated with SS blocks or CSI-RS. The wireless device may select the at least one SS block and/or select a random access preamble corresponding to the at least one SS block, for example, if a base station configures the wireless device with one or more contention free PRACH resources associated with SS blocks and/or if at least one SS block with a RSRP above a first RSRP threshold amongst associated SS blocks is available. The wireless device may select the at least one CSI-RS and/or select a random access preamble corresponding to the at least one CSI-RS, for example, if a base station configures a wireless device with one or more contention free PRACH resources associated with CSI-RSs and/or if at least one CSI-RS with a RSRP above a second RSPR threshold amongst the associated CSI-RSs is available.

A wireless device may perform one or more Msg 1 1220 transmissions, for example, by sending (e.g., transmitting) the selected random access preamble. The wireless device may determine a PRACH occasion from one or more PRACH occasions corresponding to a selected SS block, for example, if the wireless device selects an SS block and is configured with an association between one or more PRACH occasions and/or one or more SS blocks. The wireless device may determine a PRACH occasion from one or more PRACH occasions corresponding to a selected CSI-RS, for example, if the wireless device selects a CSI-RS and is configured with an association between one or more PRACH occasions and one or more CSI-RSs. The wireless device may send (e.g., transmit), to a base station, a selected random access preamble via a selected PRACH occasions. The wireless device may determine a transmit power for a transmission of a selected random access preamble at least based on an initial preamble power and a power-ramping factor. The wireless device may determine an RA-RNTI associated with a selected PRACH occasion in which a selected random access preamble is sent (e.g., transmitted). The wireless device may not determine an RA-RNTI for a beam failure recovery procedure. The wireless device may determine an RA-RNTI at least based on an index of a first OFDM symbol, an index of a first slot of a selected PRACH occasions, and/or an uplink carrier index for a transmission of Msg 1 1220.

A wireless device may receive, from a base station, a random access response, Msg 2 1230. The wireless device may start a time window (e.g., ra-ResponseWindow) to monitor a random access response. For a beam failure recovery procedure, the base station may configure the wireless device with a different time window (e.g., bfr-ResponseWindow) to monitor response to on a beam failure recovery request. The wireless device may start a time window (e.g., ra-ResponseWindow or bfr-ResponseWindow) at a start of a first PDCCH occasion, for example, after a fixed duration of one or more symbols from an end of a preamble transmission. If the wireless device sends (e.g., transmits) multiple preambles, the wireless device may start a time window at a start of a first PDCCH occasion after a fixed duration of one or more symbols from an end of a first preamble transmission. The wireless device may monitor a PDCCH of a cell for at least one random access response identified by a RA-RNTI, or for at least one response to a beam failure recovery request identified by a C-RNTI, at a time that a timer for a time window is running.

A wireless device may determine that a reception of random access response is successful, for example, if at least one random access response comprises a random access preamble identifier corresponding to a random access preamble sent (e.g., transmitted) by the wireless device. The wireless device may determine that the contention free random access procedure is successfully completed, for example, if a reception of a random access response is successful. The wireless device may determine that a contention free random access procedure is successfully complete, for example, if a contention free random access procedure is triggered for a beam failure recovery request and if a PDCCH transmission is addressed to a C-RNTI. The wireless device may determine that the random access procedure is successfully completed, and may indicate a reception of an acknowledgement for a system information request to upper layers, for example, if at least one random access response comprises a random access preamble identifier. The wireless device may stop sending (e.g., transmitting) remaining preambles (if any) after or in response to a successful reception of a corresponding random access response, for example, if the wireless device has signaled multiple preamble transmissions.

The wireless device may perform one or more Msg 3 1240 transmissions, for example, after or in response to a successful reception of random access response (e.g., for a contention based random access procedure). The wireless device may adjust an uplink transmission timing, for example, based on a timing advanced command indicated by a random access response. The wireless device may send (e.g., transmit) one or more transport blocks, for example, based on an uplink grant indicated by a random access response. Subcarrier spacing for PUSCH transmission for Msg 3 1240 may be provided by at least one higher layer (e.g., RRC) parameter. The wireless device may send (e.g., transmit) a random access preamble via a PRACH, and Msg 3 1240 via PUSCH, on the same cell. A base station may indicate an UL BWP for a PUSCH transmission of Msg 3 1240 via system information block. The wireless device may use HARQ for a retransmission of Msg 3 1240.

Multiple wireless devices may perform Msg 1 1220, for example, by sending (e.g., transmitting) the same preamble to a base station. The multiple wireless devices may receive, from the base station, the same random access response comprising an identity (e.g., TC-RNTI). Contention resolution (e.g., comprising the wireless device 110 receiving contention resolution 1250) may be used to increase the likelihood that a wireless device does not incorrectly use an identity of another wireless device. The contention resolution 1250 may be based on, for example, a C-RNTI on a PDCCH, and/or a wireless device contention resolution identity on a DL-SCH. If a base station assigns a C-RNTI to a wireless device, the wireless device may perform contention resolution (e.g., comprising receiving contention resolution 1250), for example, based on a reception of a PDCCH transmission that is addressed to the C-RNTI. The wireless device may determine that contention resolution is successful, and/or that a random access procedure is successfully completed, for example, after or in response to detecting a C-RNTI on a PDCCH. If a wireless device has no valid C-RNTI, a contention resolution may be addressed by using a TC-RNTI. If a MAC PDU is successfully decoded and a MAC PDU comprises a wireless device contention resolution identity MAC CE that matches or otherwise corresponds with the CCCH SDU sent (e.g., transmitted) in Msg 3 1240, the wireless device may determine that the contention resolution (e.g., comprising contention resolution 1250) is successful and/or the wireless device may determine that the random access procedure is successfully completed.

Figure 13:
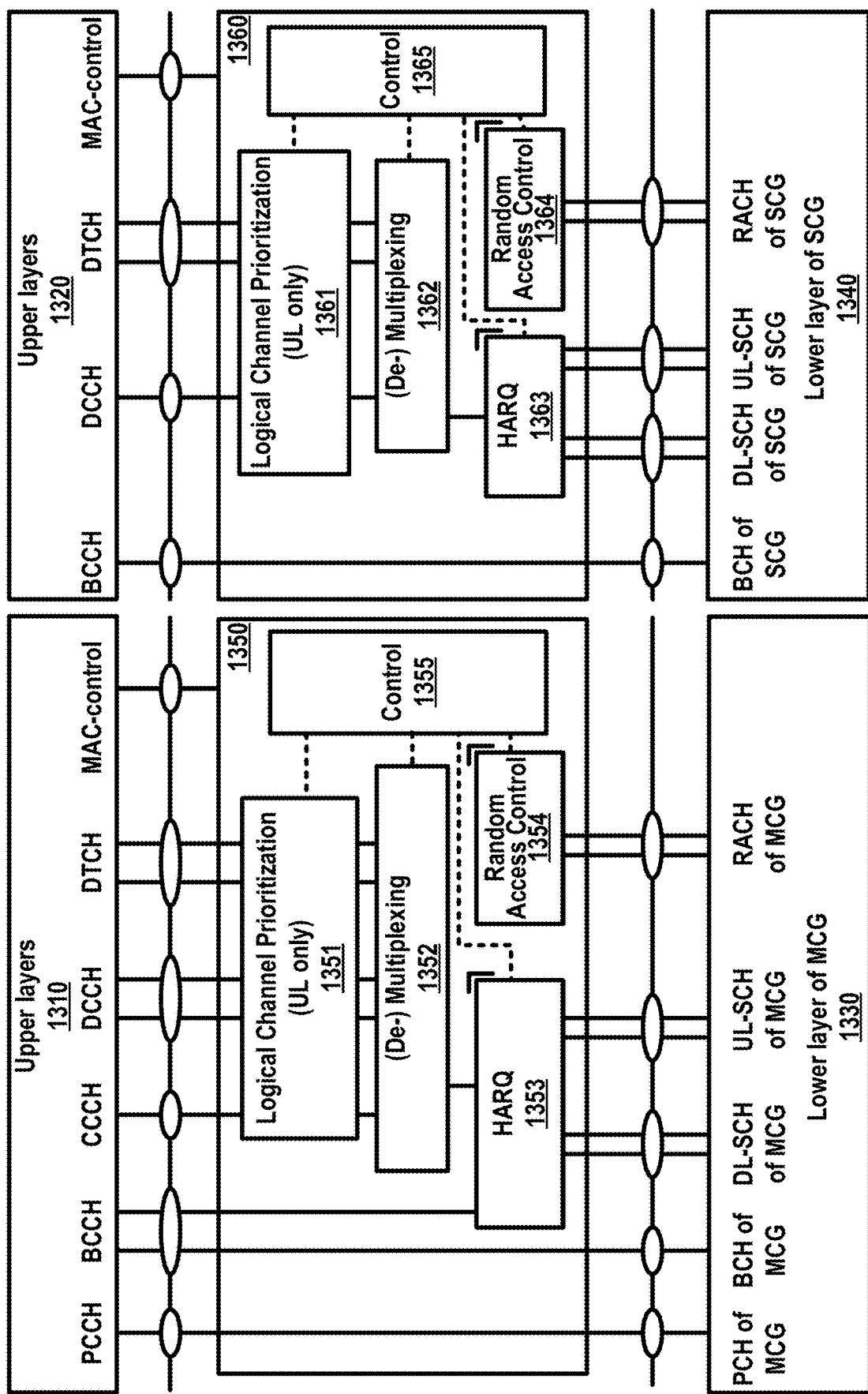
FIG. 13 shows example medium access control (MAC) entities.

FIG. 13 shows an example structure for MAC entities. A wireless device may be configured to operate in a multi-connectivity mode. A wireless device in RRC_CONNECTED with multiple Rx/Tx may be configured to utilize radio resources provided by multiple schedulers that may be located in a plurality of base stations. The plurality of base stations may be connected via a non-ideal or ideal backhaul over the Xn interface. A base station in a plurality of base stations may act as a master base station or as a secondary base station. A wireless device may be connected to and/or in communication with, for example, one master base station and one or more secondary base stations. A wireless device may be configured with multiple MAC entities, for example, one MAC entity for a master base station, and one or more other MAC entities for secondary base station(s). A configured set of serving cells for a wireless device may comprise two subsets: an MCG comprising serving cells of a master base station, and one or more SCGs comprising serving cells of a secondary base station(s). FIG. 13 shows an example structure for MAC entities in which a MCG and a SCG are configured for a wireless device.

At least one cell in a SCG may have a configured UL CC. A cell of the at least one cell may comprise a PSCell or a PCell of a SCG, or a PCell. A PSCell may be configured with PUCCH resources. There may be at least one SCG bearer, or one split bearer, for a SCG that is configured. After or upon detection of a physical layer problem or a random access problem on a PSCell, after or upon reaching a number of RLC retransmissions associated with the SCG, and/or after or upon detection of an access problem on a PSCell associated with (e.g., during) a SCG addition or a SCG change: an RRC connection re-establishment procedure may not be triggered, UL transmissions towards cells of a SCG may be stopped, and/or a master base station may be informed by a wireless device of a SCG failure type and DL data transfer over a master base station may be maintained.

A MAC sublayer may provide services such as data transfer and radio resource allocation to upper layers (e.g., 1310 or 1320). A MAC sublayer may comprise a plurality of MAC entities (e.g., 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. BCCH, PCCH, CCCH and/or DCCH may be control channels, and DTCH may be a traffic channel. A first MAC entity (e.g., 1310) may provide services on PCCH, BCCH, CCCH, DCCH, DTCH, and/or MAC control elements. A second MAC entity (e.g., 1320) may provide services on BCCH, DCCH, DTCH, and/or MAC control elements.

A MAC sublayer may expect from a physical layer (e.g., 1330 or 1340) services such as data transfer services, signaling of HARQ feedback, and/or signaling of scheduling request or measurements (e.g., CQI). In dual connectivity, two MAC entities may be configured for a wireless device: one for a MCG and one for a SCG. A MAC entity of a wireless device may handle a plurality of transport channels. A first MAC entity may handle first transport channels comprising a PCCH of a MCG, a first BCH of the MCG, one or more first DL-SCHs of the MCG, one or more first UL-SCHs of the MCG, and/or one or more first RACHs of the MCG. A second MAC entity may handle second transport channels comprising a second BCH of a SCG, one or more second DL-SCHs of the SCG, one or more second UL-SCHs of the SCG, and/or one or more second RACHs of the SCG.

If a MAC entity is configured with one or more SCells, there may be multiple DL-SCHs, multiple UL-SCHs, and/or multiple RACHs per MAC entity. There may be one DL-SCH and/or one UL-SCH on an SpCell. There may be one DL-SCH, zero or one UL-SCH, and/or zero or one RACH for an SCell. A DL-SCH may support receptions using different numerologies and/or TTI duration within a MAC entity. An UL-SCH may support transmissions using different numerologies and/or TTI duration within the MAC entity.

A MAC sublayer may support different functions. The MAC sublayer may control these functions with a control (e.g., Control 1355 and/or Control 1365) element. Functions performed by a MAC entity may comprise one or more of: mapping between logical channels and transport channels (e.g., in uplink or downlink), multiplexing (e.g., (De-) Multiplexing 1352 and/or (De-) Multiplexing 1362) of MAC SDUs from one or different logical channels onto transport blocks (TBs) to be delivered to the physical layer on transport channels (e.g., in uplink), demultiplexing (e.g., (De-) Multiplexing 1352 and/or (De-) Multiplexing 1362) of MAC SDUs to one or different logical channels from transport blocks (TBs) delivered from the physical layer on transport channels (e.g., in downlink), scheduling information reporting (e.g., in uplink), error correction through HARQ in uplink and/or downlink (e.g., 1363), and logical channel prioritization in uplink (e.g., Logical Channel Prioritization 1351 and/or Logical Channel Prioritization 1361). A MAC entity may handle a random access process (e.g., Random Access Control 1354 and/or Random Access Control 1364).

Figure 14:
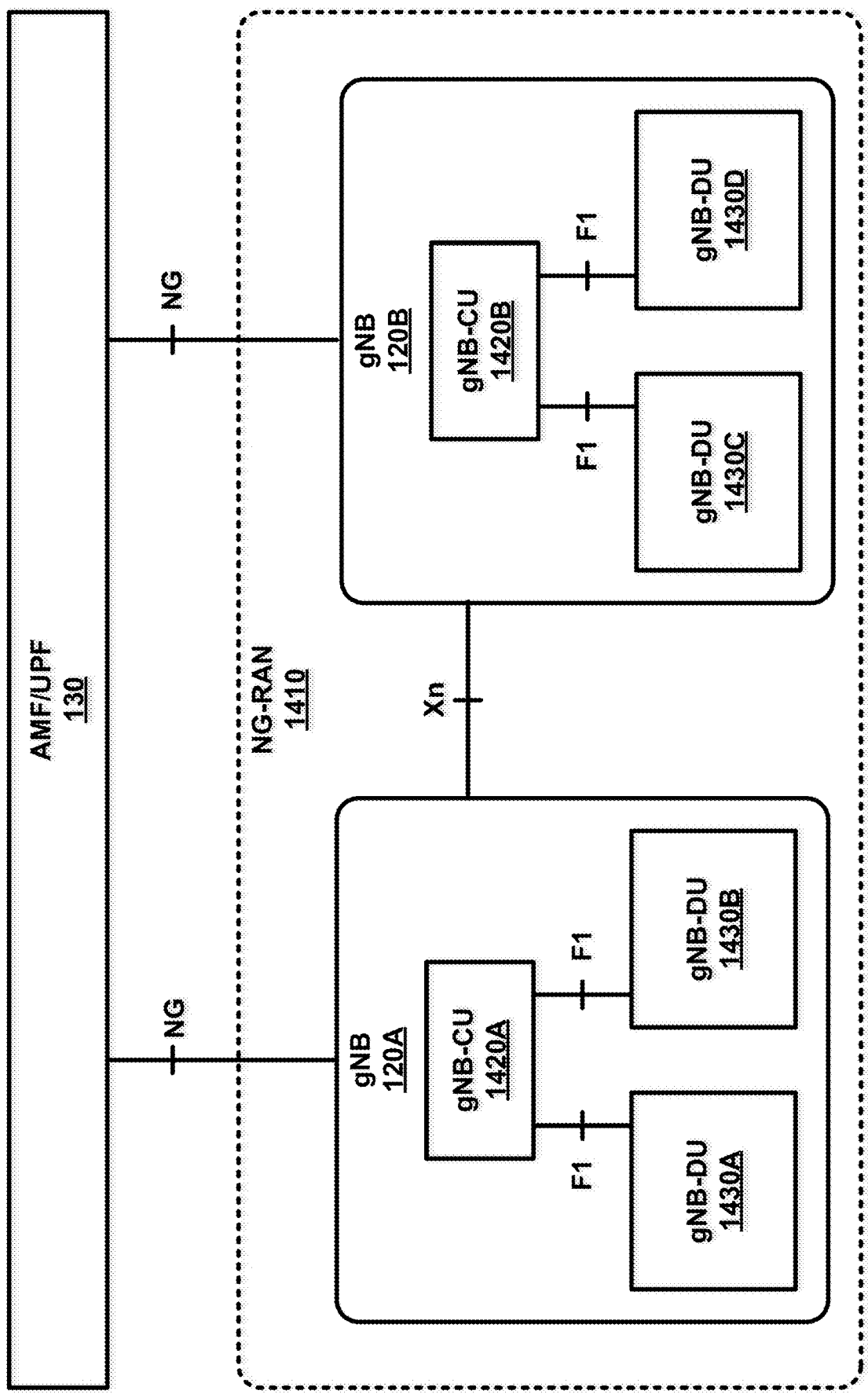
FIG. 14 shows an example RAN architecture.

FIG. 14 shows an example of a RAN architecture comprising one or more base stations. A protocol stack (e.g., RRC, SDAP, PDCP, RLC, MAC, and/or PHY) may be supported at a node. A base station (e.g., gNB 120A and/or 120B) may comprise a base station central unit (CU) (e.g., gNB-CU 1420A or 1420B) and at least one base station distributed unit (DU) (e.g., gNB-DU 1430A, 1430B, 1430C, and/or 1430D), for example, if a functional split is configured. Upper protocol layers of a base station may be located in a base station CU, and lower layers of the base station may be located in the base station DUs. An F1 interface (e.g., CU-DU interface) connecting a base station CU and base station DUs may be an ideal or non-ideal backhaul. F1-C may provide a control plane connection over an F1 interface, and F1-U may provide a user plane connection over the F1 interface. An Xn interface may be configured between base station CUs.

A base station CU may comprise an RRC function, an SDAP layer, and/or a PDCP layer. Base station DUs may comprise an RLC layer, a MAC layer, and/or a PHY layer. Various functional split options between a base station CU and base station DUs may be possible, for example, by locating different combinations of upper protocol layers (e.g., RAN functions) in a base station CU and different combinations of lower protocol layers (e.g., RAN functions) in base station DUs. A functional split may support flexibility to move protocol layers between a base station CU and base station DUs, for example, depending on service requirements and/or network environments.

Functional split options may be configured per base station, per base station CU, per base station DU, per wireless device, per bearer, per slice, and/or with other granularities. In a per base station CU split, a base station CU may have a fixed split option, and base station DUs may be configured to match a split option of a base station CU. In a per base station DU split, a base station DU may be configured with a different split option, and a base station CU may provide different split options for different base station DUs. In a per wireless device split, a base station (e.g., a base station CU and at least one base station DUs) may provide different split options for different wireless devices. In a per bearer split, different split options may be utilized for different bearers. In a per slice splice, different split options may be used for different slices.

Figure 15:
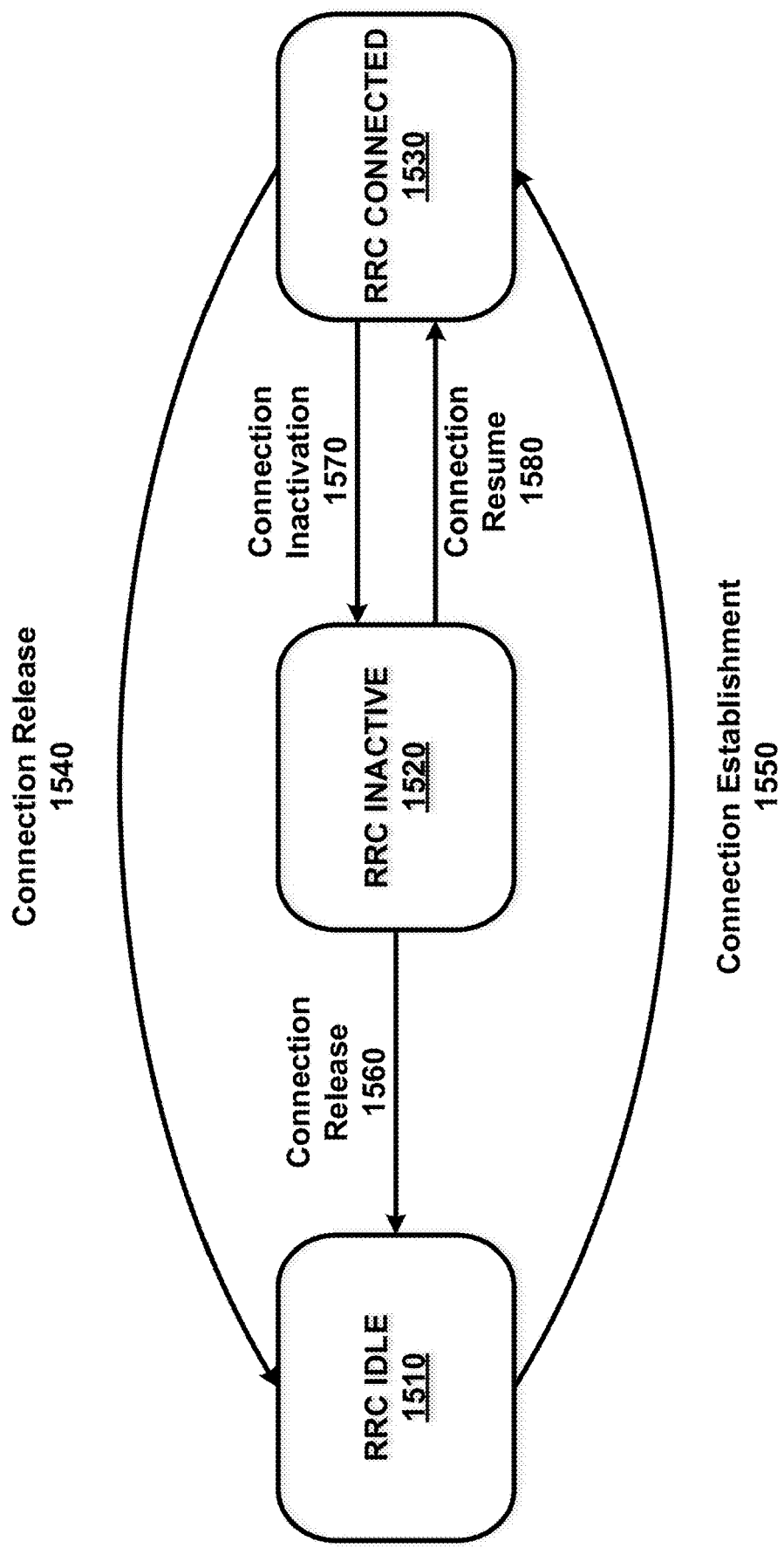
FIG. 15 shows example radio resource control (RRC) states.

FIG. 15 shows example RRC state transitions of a wireless device. A wireless device may be in at least one RRC state among an RRC connected state (e.g., RRC Connected 1530, RRC_Connected, etc.), an RRC idle state (e.g., RRC Idle 1510, RRC_Idle, etc.), and/or an RRC inactive state (e.g., RRC Inactive 1520, RRC_Inactive, etc.). In an RRC connected state, a wireless device may have at least one RRC connection with at least one base station (e.g., gNB and/or eNB), which may have a context of the wireless device (e.g., UE context). A wireless device context (e.g., UE context) may comprise at least one of an access stratum context, one or more radio link configuration parameters, bearer (e.g., data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an RRC idle state, a wireless device may not have an RRC connection with a base station, and a context of the wireless device may not be stored in a base station. In an RRC inactive state, a wireless device may not have an RRC connection with a base station. A context of a wireless device may be stored in a base station, which may comprise an anchor base station (e.g., a last serving base station).

A wireless device may transition an RRC state (e.g., UE RRC state) between an RRC idle state and an RRC connected state in both ways (e.g., connection release 1540 or connection establishment 1550; and/or connection reestablishment) and/or between an RRC inactive state and an RRC connected state in both ways (e.g., connection inactivation 1570 or connection resume 1580). A wireless device may transition its RRC state from an RRC inactive state to an RRC idle state (e.g., connection release 1560).

An anchor base station may be a base station that may keep a context of a wireless device (e.g., UE context) at least at (e.g., during) a time period that the wireless device stays in a RAN notification area (RNA) of an anchor base station, and/or at (e.g., during) a time period that the wireless device stays in an RRC inactive state. An anchor base station may comprise a base station that a wireless device in an RRC inactive state was most recently connected to in a latest RRC connected state, and/or a base station in which a wireless device most recently performed an RNA update procedure. An RNA may comprise one or more cells operated by one or more base stations. A base station may belong to one or more RNAs. A cell may belong to one or more RNAs.

A wireless device may transition, in a base station, an RRC state (e.g., UE RRC state) from an RRC connected state to an RRC inactive state. The wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

An anchor base station may broadcast a message (e.g., RAN paging message) to base stations of an RNA to reach to a wireless device in an RRC inactive state. The base stations receiving the message from the anchor base station may broadcast and/or multicast another message (e.g., paging message) to wireless devices in their coverage area, cell coverage area, and/or beam coverage area associated with the RNA via an air interface.

A wireless device may perform an RNA update (RNAU) procedure, for example, if the wireless device is in an RRC inactive state and moves into a new RNA. The RNAU procedure may comprise a random access procedure by the wireless device and/or a context retrieve procedure (e.g., UE context retrieve). A context retrieve procedure may comprise: receiving, by a base station from a wireless device, a random access preamble; and requesting and/or receiving (e.g., fetching), by a base station, a context of the wireless device (e.g., UE context) from an old anchor base station. The requesting and/or receiving (e.g., fetching) may comprise: sending a retrieve context request message (e.g., UE context request message) comprising a resume identifier to the old anchor base station and receiving a retrieve context response message comprising the context of the wireless device from the old anchor base station.

A wireless device in an RRC inactive state may select a cell to camp on based on at least a measurement result for one or more cells, a cell in which a wireless device may monitor an RNA paging message, and/or a core network paging message from a base station. A wireless device in an RRC inactive state may select a cell to perform a random access procedure to resume an RRC connection and/or to send (e.g., transmit) one or more packets to a base station (e.g., to a network). The wireless device may initiate a random access procedure to perform an RNA update procedure, for example, if a cell selected belongs to a different RNA from an RNA for the wireless device in an RRC inactive state. The wireless device may initiate a random access procedure to send (e.g., transmit) one or more packets to a base station of a cell that the wireless device selects, for example, if the wireless device is in an RRC inactive state and has one or more packets (e.g., in a buffer) to send (e.g., transmit) to a network. A random access procedure may be performed with two messages (e.g., 2-stage or 2-step random access) and/or four messages (e.g., 4-stage or 4-step random access) between the wireless device and the base station.

A base station receiving one or more uplink packets from a wireless device in an RRC inactive state may request and/or receive (e.g., fetch) a context of a wireless device (e.g., UE context), for example, by sending (e.g., transmitting) a retrieve context request message for the wireless device to an anchor base station of the wireless device based on at least one of an AS context identifier, an RNA identifier, a base station identifier, a resume identifier, and/or a cell identifier received from the wireless device. A base station may send (e.g., transmit) a path switch request for a wireless device to a core network entity (e.g., AMF, MME, and/or the like), for example, after or in response to requesting and/or receiving (e.g., fetching) a context. A core network entity may update a downlink tunnel endpoint identifier for one or more bearers established for the wireless device between a user plane core network entity (e.g., UPF, S-GW, and/or the like) and a RAN node (e.g., the base station), such as by changing a downlink tunnel endpoint identifier from an address of the anchor base station to an address of the base station).

A base station may communicate with a wireless device via a wireless network using one or more technologies, such as new radio technologies (e.g., NR, 5G, etc.). The one or more radio technologies may comprise at least one of: multiple technologies related to physical layer; multiple technologies related to medium access control layer; and/or multiple technologies related to radio resource control layer Enhancing the one or more radio technologies may improve performance of a wireless network. System throughput, and/or data rate of transmission, may be increased. Battery consumption of a wireless device may be reduced. Latency of data transmission between a base station and a wireless device may be improved. Network coverage of a wireless network may be improved. Transmission efficiency of a wireless network may be improved.

A base station may send (e.g., transmit) DCI via a PDCCH for at least one of: a scheduling assignment and/or grant; a slot format notification; a preemption indication; and/or a power-control command. The DCI may comprise at least one of: an identifier of a DCI format; a downlink scheduling assignment(s); an uplink scheduling grant(s); a slot format indicator; a preemption indication; a power-control for PUCCH/PUSCH; and/or a power-control for SRS.

A downlink scheduling assignment DCI may comprise parameters indicating at least one of: an identifier of a DCI format; a PDSCH resource indication; a transport format; HARQ information; control information related to multiple antenna schemes; and/or a command for power control of the PUCCH. An uplink scheduling grant DCI may comprise parameters indicating at least one of: an identifier of a DCI format; a PUSCH resource indication; a transport format; HARQ related information; and/or a power control command of the PUSCH.

Different types of control information may correspond to different DCI message sizes. Supporting multiple beams, spatial multiplexing in the spatial domain, and/or noncontiguous allocation of RBs in the frequency domain, may require a larger scheduling message, in comparison with an uplink grant allowing for frequency-contiguous allocation. DCI may be categorized into different DCI formats. A DCI format may correspond to a certain message size and/or usage.

A wireless device may monitor (e.g., in common search space or wireless device-specific search space) one or more PDCCH for detecting one or more DCI with one or more DCI format. A wireless device may monitor a PDCCH with a limited set of DCI formats, for example, which may reduce power consumption. The more DCI formats that are to be detected, the more power may be consumed by the wireless device.

The information in the DCI formats for downlink scheduling may comprise at least one of: an identifier of a DCI format; a carrier indicator; an RB allocation; a time resource allocation; a bandwidth part indicator; a HARQ process number; one or more MCS; one or more NDI; one or more RV; MIMO related information; a downlink assignment index (DAI); a TPC for PUCCH; an SRS request; and/or padding (e.g., if necessary). The MIMO related information may comprise at least one of: a PMI; precoding information; a transport block swap flag; a power offset between PDSCH and a reference signal; a reference-signal scrambling sequence; a number of layers; antenna ports for the transmission; and/or a transmission configuration indication (TCI).

The information in the DCI formats used for uplink scheduling may comprise at least one of: an identifier of a DCI format; a carrier indicator; a bandwidth part indication; a resource allocation type; an RB allocation; a time resource allocation; an MCS; an NDI; a phase rotation of the uplink DMRS; precoding information; a CSI request; an SRS request; an uplink index/DAI; a TPC for PUSCH; and/or padding (e.g., if necessary).

A base station may perform CRC scrambling for DCI, for example, before transmitting the DCI via a PDCCH. The base station may perform CRC scrambling by binarily adding multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, and/or TPC-SRS-RNTI) on the CRC bits of the DCI. The wireless device may check the CRC bits of the DCI, for example, if detecting the DCI. The wireless device may receive the DCI, for example, if the CRC is scrambled by a sequence of bits that is the same as the at least one wireless device identifier.

A base station may send (e.g., transmit) one or more PDCCH in different CORESETs, for example, to support a wide bandwidth operation. A base station may transmit one or more RRC messages comprising configuration parameters of one or more CORESETs. A CORESET may comprise at least one of: a first OFDM symbol; a number of consecutive OFDM symbols; a set of resource blocks; and/or a CCE-to-REG mapping. A base station may send (e.g., transmit) a PDCCH in a dedicated CORESET for particular purpose, for example, for beam failure recovery confirmation. A wireless device may monitor a PDCCH for detecting DCI in one or more configured CORESETs, for example, to reduce the power consumption.

A base station may send (e.g., transmit) one or more MAC PDUs to a wireless device. A MAC PDU may comprise a bit string that may be byte aligned (e.g., multiple of eight bits) in length. Bit strings may be represented by tables in which the most significant bit is the leftmost bit of the first line of the table, and the least significant bit is the rightmost bit on the last line of the table. The bit string may be read from the left to right, and then, in the reading order of the lines. The bit order of a parameter field within a MAC PDU may be represented with the first and most significant bit in the leftmost bit, and with the last and least significant bit in the rightmost bit.

A MAC SDU may comprise a bit string that is byte aligned (e.g., multiple of eight bits) in length. A MAC SDU may be included in a MAC PDU, for example, from the first bit onward. In an example, a MAC CE may be a bit string that is byte aligned (e.g., multiple of eight bits) in length. A MAC subheader may be a bit string that is byte aligned (e.g., multiple of eight bits) in length. A MAC subheader may be placed immediately in front of the corresponding MAC SDU, MAC CE, and/or padding. A MAC entity may ignore a value of reserved bits in a DL MAC PDU.

A MAC PDU may comprise one or more MAC subPDUs. A MAC subPDU of the one or more MAC subPDUs may comprise at least one of: a MAC subheader only (e.g., including padding); a MAC subheader and a MAC SDU; a MAC subheader and a MAC CE; and/or a MAC subheader and padding. The MAC SDU may be of variable size. A MAC subheader may correspond to a MAC SDU, a MAC CE, and/or padding.

A MAC subheader may comprise: an R field comprising one bit; an F field with one bit in length; an LCID field with multiple bits in length; an L field with multiple bits in length, for example, if the MAC subheader corresponds to a MAC SDU, a variable-sized MAC CE, and/or padding.

Figure 16A:
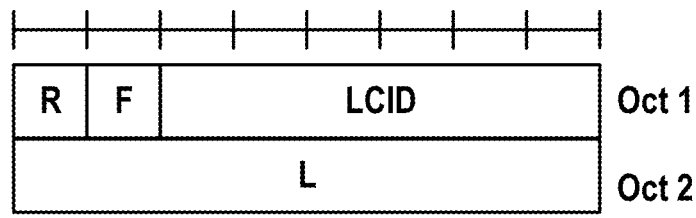
FIG. 16A, FIG. 16B and FIG. 16C show examples of MAC subheaders.

FIG. 16A shows an example of a MAC subheader comprising an eight-bit L field. The LCID field may have six bits in length. The L field may have eight bits in length.

Figure 16B:
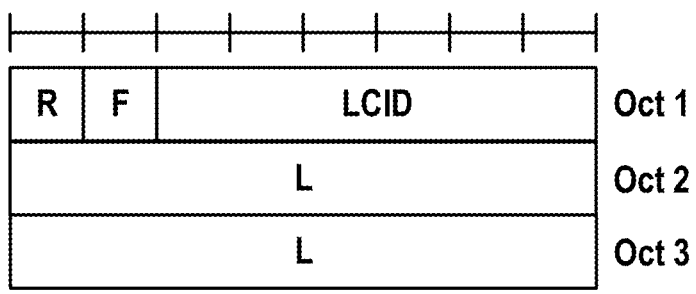

FIG. 16B shows an example of a MAC subheader with a sixteen-bit L field. The LCID field may have six bits in length. The L field may have sixteen bits in length. A MAC subheader may comprise: a R field comprising two bits in length; and an LCID field comprising multiple bits in length (e.g., if the MAC subheader corresponds to a fixed sized MAC CE), and/or padding.

Figure 16C:
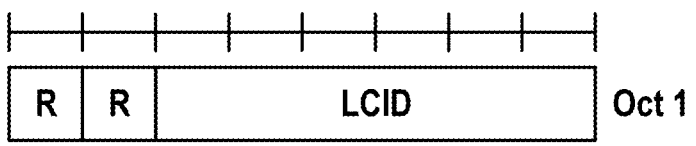

FIG. 16C shows an example of the MAC subheader. The LCID field may comprise six bits in length, and the R field may comprise two bits in length.

Figure 17A:
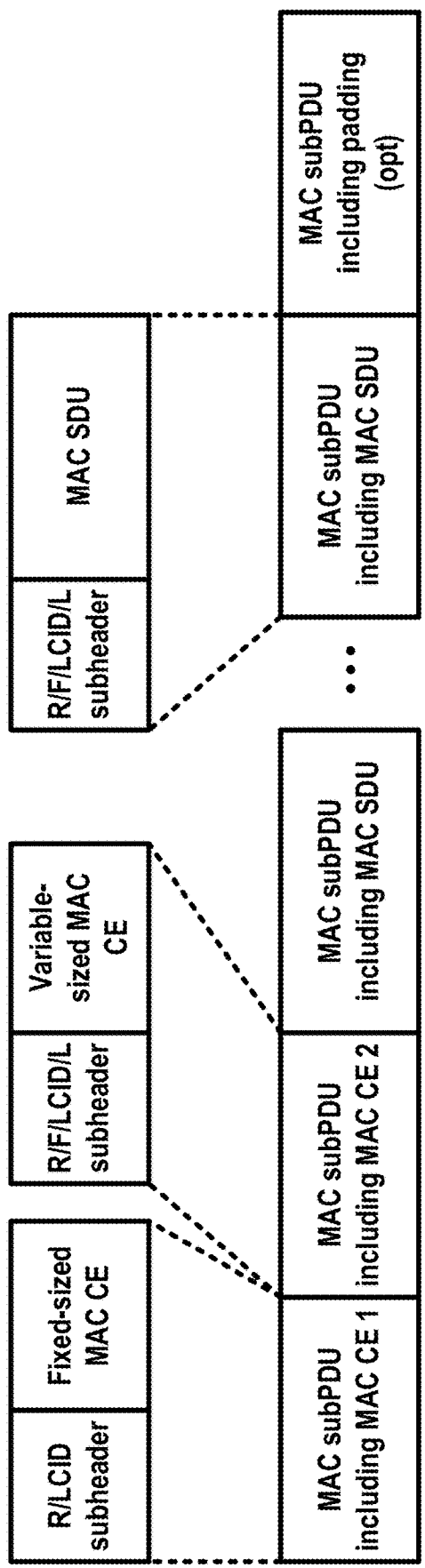
FIG. 17A and FIG. 17B show examples of MAC PDUs.

FIG. 17A shows an example of a DL MAC PDU. Multiple MAC CEs may be placed together. A MAC subPDU comprising MAC CE may be placed before any MAC subPDU comprising a MAC SDU, and/or before a MAC subPDU comprising padding.

Figure 17B:
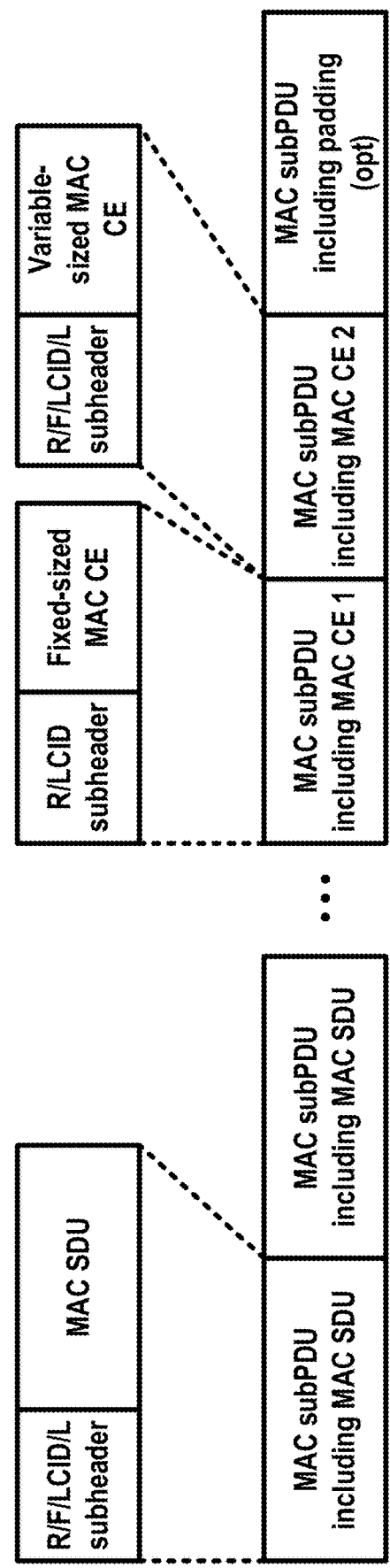

FIG. 17B shows an example of an UL MAC PDU. Multiple MAC CEs may be placed together. A MAC subPDU comprising a MAC CE may be placed after all MAC subPDU comprising a MAC SDU. The MAC subPDU may be placed before a MAC subPDU comprising padding.

FIG. 18 shows first examples of LCIDs. FIG. 19 shows second examples of LCIDs. In each of FIG. 18 and FIG. 19, the left columns comprise indices, and the right columns comprises corresponding LCID values for each index.

FIG. 18 shows an example of an LCID that may be associated with the one or more MAC CEs. A MAC entity of a base station may send (e.g., transmit) to a MAC entity of a wireless device one or more MAC CEs. The one or more MAC CEs may comprise at least one of: an SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a wireless device (e.g., UE) contention resolution identity MAC CE; a timing advance command MAC CE; a DRX command MAC CE; a long DRX command MAC CE; an SCell activation and/or deactivation MAC CE (e.g., 1 Octet); an SCell activation and/or deactivation MAC CE (e.g., 4 Octet); and/or a duplication activation and/or deactivation MAC CE. A MAC CE may comprise an LCID in the corresponding MAC subheader. Different MAC CEs may have different LCID in the corresponding MAC subheader. An LCID with 111011 in a MAC subheader may indicate a MAC CE associated with the MAC subheader is a long DRX command MAC CE.

FIG. 19 shows further examples of LCIDs associated with one or more MAC CEs. The MAC entity of the wireless device may send (e.g., transmit), to the MAC entity of the base station, one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry power headroom report (PHR) MAC CE; a multiple entry PHR MAC CE; a short truncated BSR; and/or a long truncated BSR. A MAC CE may comprise an LCID in the corresponding MAC subheader. Different MAC CEs may have different LCIDs in the corresponding MAC subheader. The LCID with 111011 in a MAC subheader may indicate a MAC CE associated with the MAC subheader is a short-truncated command MAC CE.

Two or more component carriers (CCs) may be aggregated, for example, in a carrier aggregation (CA). A wireless device may simultaneously receive and/or transmit on one or more CCs, for example, depending on capabilities of the wireless device. The CA may be supported for contiguous CCs. The CA may be supported for non-contiguous CCs.

A wireless device may have one RRC connection with a network, for example, if configured with CA. At (e.g., during) an RRC connection establishment, re-establishment and/or handover, a cell providing a NAS mobility information may be a serving cell. At (e.g., during) an RRC connection re-establishment and/or handover procedure, a cell providing a security input may be a serving cell. The serving cell may be referred to as a primary cell (PCell). A base station may send (e.g., transmit), to a wireless device, one or more messages comprising configuration parameters of a plurality of one or more secondary cells (SCells), for example, depending on capabilities of the wireless device.

A base station and/or a wireless device may use an activation and/or deactivation mechanism of an SCell for an efficient battery consumption, for example, if the base station and/or the wireless device is configured with CA. A base station may activate or deactivate at least one of the one or more SCells, for example, if the wireless device is configured with one or more SCells. The SCell may be deactivated, for example, after or upon configuration of an SCell.

A wireless device may activate and/or deactivate an SCell, for example, after or in response to receiving an SCell activation and/or deactivation MAC CE. A base station may send (e.g., transmit), to a wireless device, one or more messages comprising an sCellDeactivationTimer timer. The wireless device may deactivate an SCell, for example, after or in response to an expiry of the sCellDeactivationTimer timer.

A wireless device may activate an SCell, for example, if the wireless device receives an SCell activation/deactivation MAC CE activating an SCell. The wireless device may perform operations (e.g., after or in response to the activating the SCell) that may comprise: SRS transmissions on the SCell; CQI, PMI, RI, and/or CRI reporting for the SCell on a PCell; PDCCH monitoring on the SCell; PDCCH monitoring for the SCell on the PCell; and/or PUCCH transmissions on the SCell.

The wireless device may start and/or restart a timer (e.g., an sCellDeactivationTimer timer) associated with the SCell, for example, after or in response to activating the SCell. The wireless device may start the timer (e.g., sCellDeactivationTimer timer) in the slot, for example, if the SCell activation/deactivation MAC CE has been received. The wireless device may initialize and/or re-initialize one or more suspended configured uplink grants of a configured grant Type 1 associated with the SCell according to a stored configuration, for example, after or in response to activating the SCell. The wireless device may trigger a PHR, for example, after or in response to activating the SCell.

The wireless device may deactivate the activated SCell, for example, if the wireless device receives an SCell activation/deactivation MAC CE deactivating an activated SCell. The wireless device may deactivate the activated SCell, for example, if a timer (e.g., an sCellDeactivationTimer timer) associated with an activated SCell expires. The wireless device may stop the timer (e.g., sCellDeactivationTimer timer) associated with the activated SCell, for example, after or in response to deactivating the activated SCell. The wireless device may clear one or more configured downlink assignments and/or one or more configured uplink grant Type 2 associated with the activated SCell, for example, after or in response to the deactivating the activated SCell. The wireless device may suspend one or more configured uplink grant Type 1 associated with the activated SCell, for example, after or in response to deactivating the activated SCell. The wireless device may flush HARQ buffers associated with the activated SCell.

A wireless device may not perform certain operations, for example, if an SCell is deactivated. The wireless device may not perform one or more of the following operations if an SCell is deactivated: transmitting SRS on the SCell; reporting CQI, PMI, RI, and/or CRI for the SCell on a PCell; transmitting on UL-SCH on the SCell; transmitting on a RACH on the SCell; monitoring at least one first PDCCH on the SCell; monitoring at least one second PDCCH for the SCell on the PCell; and/or transmitting a PUCCH on the SCell.

A wireless device may restart a timer (e.g., an sCellDeactivationTimer timer) associated with the activated SCell, for example, if at least one first PDCCH on an activated SCell indicates an uplink grant or a downlink assignment. A wireless device may restart a timer (e.g., an sCellDeactivationTimer timer) associated with the activated SCell, for example, if at least one second PDCCH on a serving cell (e.g. a PCell or an SCell configured with PUCCH, such as a PUCCH SCell) scheduling the activated SCell indicates an uplink grant and/or a downlink assignment for the activated SCell. A wireless device may abort the ongoing random access procedure on the SCell, for example, if an SCell is deactivated and/or if there is an ongoing random access procedure on the SCell.

Figure 20A:
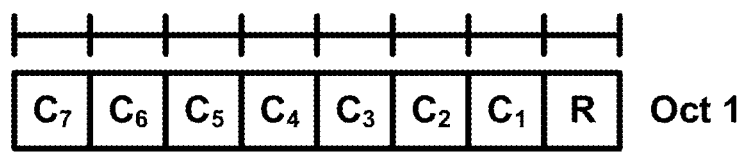
FIG. 20A and FIG. 20B show examples of SCell Activation/Deactivation MAC CE.

FIG. 20A shows an example of an SCell activation/deactivation MAC CE that may comprise one octet. A first MAC PDU subheader comprising a first LCID may identify the SCell activation/deactivation MAC CE of one octet. An SCell activation/deactivation MAC CE of one octet may have a fixed size. The SCell activation/deactivation MAC CE of one octet may comprise a single octet. The single octet may comprise a first number of C-fields (e.g., seven) and a second number of R-fields (e.g., one).

Figure 20B:
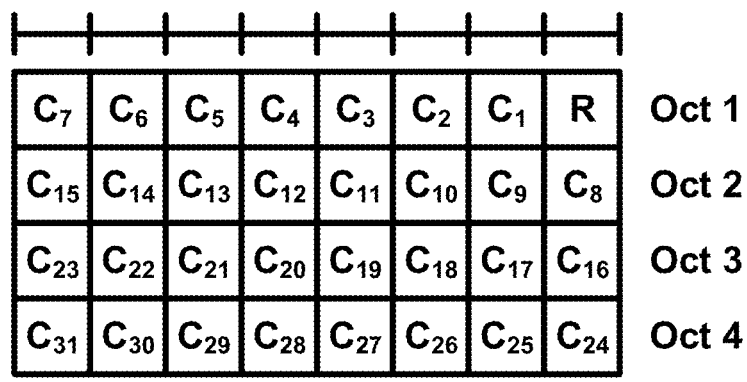

FIG. 20B shows an example of an SCell Activation/Deactivation MAC CE of four octets. A second MAC PDU subheader with a second LCID may identify the SCell Activation/Deactivation MAC CE of four octets. An SCell activation/deactivation MAC CE of four octets may have a fixed size. The SCell activation/deactivation MAC CE of four octets may comprise four octets. The four octets may comprise a third number of C-fields (e.g., 31) and a fourth number of R-fields (e.g., 1). A $C_i$ field may indicate an activation/deactivation status of an SCell with an SCell index i, for example, if an SCell with SCell index i is configured. An SCell with an SCell index i may be activated, for example, if the $C_i$ field is set to one. An SCell with an SCell index i may be deactivated, for example, if the $C_i$ field is set to zero. The wireless device may ignore the $C_i$ field, for example, if there is no SCell configured with SCell index i. An R field may indicate a reserved bit. The R field may be set to zero.

A base station may configure a wireless device with uplink (UL) bandwidth parts (BWPs) and downlink (DL) BWPs, for example, to enable bandwidth adaptation (BA) for a PCell. The base station may configure the wireless device with at least DL BWP(s) (e.g., an SCell may not have UL BWPS) to enable BA for an SCell, for example, if CA is configured. For the PCell, an initial BWP may be a first BWP used for initial access. For the SCell, a first active BWP may be a second BWP configured for the wireless device to first operate on the SCell if the SCell is activated.

A base station and/or a wireless device may switch a DL BWP and an UL BWP independently, for example, in paired spectrum (e.g., FDD). A base station and/or a wireless device may switch a DL BWP and an UL BWP simultaneously, for example, in unpaired spectrum (e.g., TDD). Switching between configured BWPs may be based on DCI and/or an inactivity timer. The base station and/or the wireless device may switch an active BWP to a default BWP, for example, based on or in response to an expiry of the inactivity timer associated with a cell (e.g., if the inactivity timer is configured for a serving cell). The default BWP may be configured by the network.

One UL BWP for each uplink carrier and one DL BWP may be active at a time in an active serving cell, for example, in FDD systems configured with BA. One DL/UL BWP pair may be active at a time in an active serving cell, for example, in TDD systems. Operating on the one UL BWP and the one DL BWP (and/or the one DL/UL pair) may enable a wireless device to use a reasonable amount of power (e.g., reasonable battery consumption). BWPs other than the one UL BWP and the one DL BWP that the wireless device may be configured with may be deactivated. The wireless device may refrain from monitoring a PDCCH, and/or may refrain from transmitting via a PUCCH, PRACH and/or UL-SCH, for example, on deactivated BWPs.

A serving cell may be configured with a first number (e.g., four) of BWPs. A wireless device and/or a base station may have one active BWP at any point in time, for example, for an activated serving cell. A BWP switching for a serving cell may be used to activate an inactive BWP and/or deactivate an active BWP. The BWP switching may be controlled by a PDCCH indicating a downlink assignment or an uplink grant. The BWP switching may be controlled by an inactivity timer (e.g., bandwidthpartInactivityTimer). The BWP switching may be controlled by a MAC entity, for example, based on initiating a random access procedure. A BWP may be initially active without receiving a PDCCH indicating a downlink assignment or an uplink grant, for example, based on an addition of an SpCell or an activation of an SCell. The active BWP for a serving cell may be indicated by an RRC message and/or a PDCCH message (e.g., PDCCH order). A DL BWP may be paired with an UL BWP, and/or BWP switching may be common for both UL and DL, for example, for unpaired spectrum.

Figure 21:
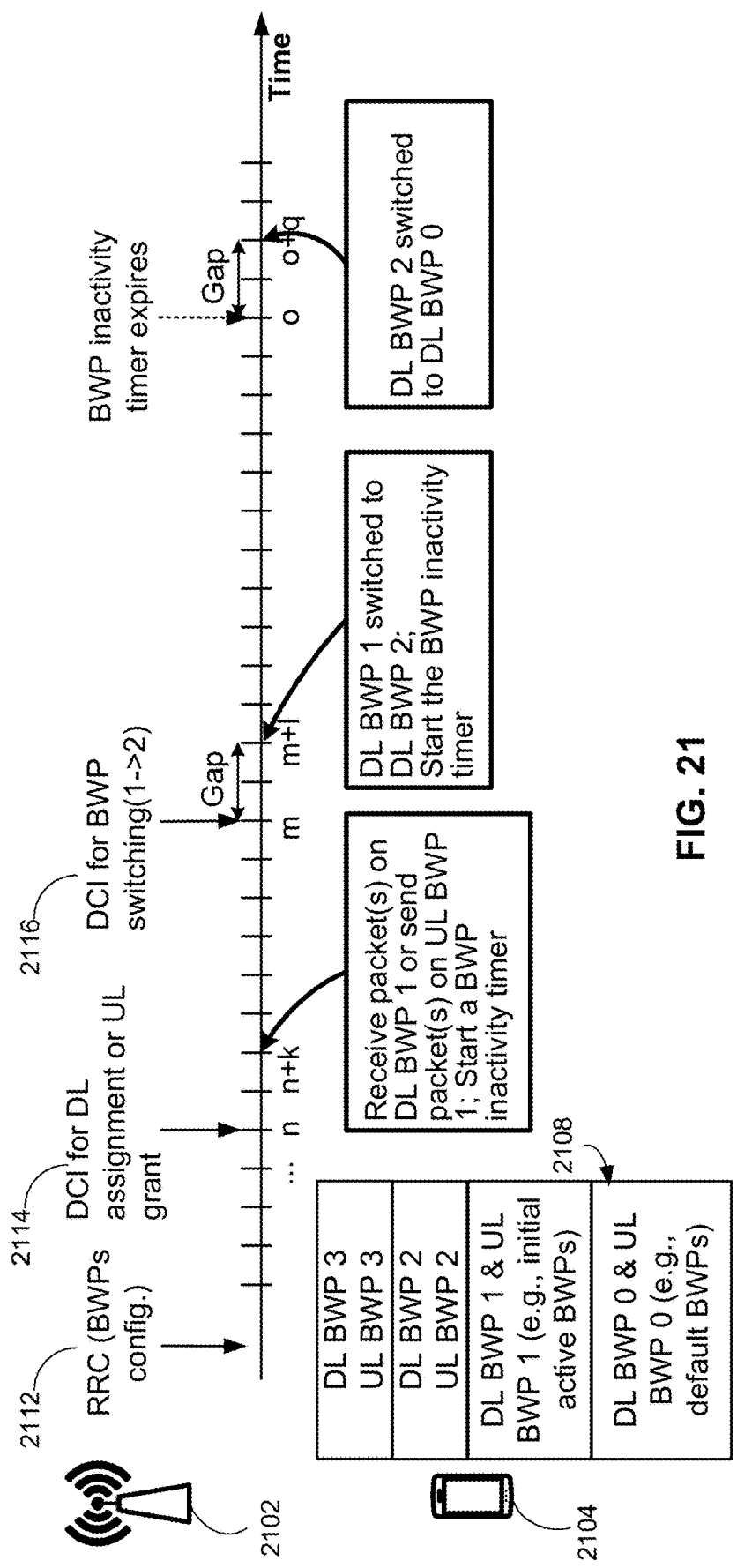
FIG. 21 shows an example of BWP operation.

FIG. 21 shows an example of BWP switching. The BWP switching may be on a PCell. A base station 2102 may send (e.g., transmit) one or more messages (e.g., one or more RRC messages) 2112 for configuring multiple BWPs (e.g., multiple BWPs comprising a DL BWP 0, a DL BWP 1, a DL BWP 2, a DL BWP 3, an UL BWP 0, an UL BWP 1, an UL BWP 2, and an UL BWP 3 shown in a table 2108). The DL (and/or UL) BWP 0 may be a default BWP. The DL (and/or UL) BWP 1 may be an initial active BWP (e.g., an initial DL BWP or an initial UL BWP). A wireless device 2104 may determine the multiple BWPs configured for the wireless device 2104, for example, based on the one or more messages 2112. The base station 2102 may send DCI 2114 for a DL assignment (e.g., at a time n). The DCI 2114 may be sent via the DL BWP 1 (e.g., an initial DL BWP). The wireless device 2104 may receive a packet via the DL BWP 1 or via another active DL BWP (e.g., at a time n+k), for example, based on the DL assignment. The wireless device 2104 may start a BWP inactivity timer (e.g., at the time n+k). The wireless device 2104 may start the BWP inactivity timer, for example, after receiving scheduled downlink packets. The base station 2102 may send DCI 2114 for an UL grant (e.g., at the time n). The DCI 2114 may be sent via the DL BWP 1 (e.g., a first DL BWP or an initial DL BWP). The wireless device 2104 may send a packet via an UL BWP 1 (e.g., via a first UL BWP or an initial UL BWP at a time n+k), for example, based on the UL grant. The wireless device 2104 may start a BWP inactivity timer (e.g., at the time n+k). The wireless device 2104 may start the BWP inactivity timer, for example, after sending scheduled uplink packets.

The base station 2102 may send DCI 2116 for BWP switching (e.g., a BWP switching from the DL BWP 1 to the DL BWP 2). The DCI 2116 may be sent via the active DL BWP 1 (e.g., at a time m). The wireless device 2104 may receive the DCI 2116, for example, by monitoring a PDCCH on the active DL BWP 1. The wireless device 2104 may switch the DL BWP 1 to the DL BWP 2 (e.g., at a time m+l), for example, based on the DCI 2116. There may be a delay (e.g., a gap) between the wireless device 2104 receiving the DCI 2116 and the wireless device 2104 switching to the DL BWP 2. The wireless device 2104 may start and/or re-start the BWP inactivity timer (e.g., at the time m+l), for example, after the BWP switching. The BWP inactivity timer may expire (e.g., at a time o), for example, if the wireless device 2104 does not perform reception or transmission for a period of time (e.g., a period from the time m+l to the time o). The wireless device 2104 may switch the DL BWP 2 to the DL BWP 0 (e.g., a default BWP). The fallback to the DL BWP 0 may occur (e.g., at a time o+q), for example, after the BWP inactivity timer expires. There may be a delay (e.g., a gap) between the BWP timer expiration (e.g., at a time o) and the wireless device 2104 switching to the DL BWP 0 (e.g., at a time o+q). BWPs are described as example resources, and any wireless resource may be applicable to one or more procedures described herein.

Figure 22:
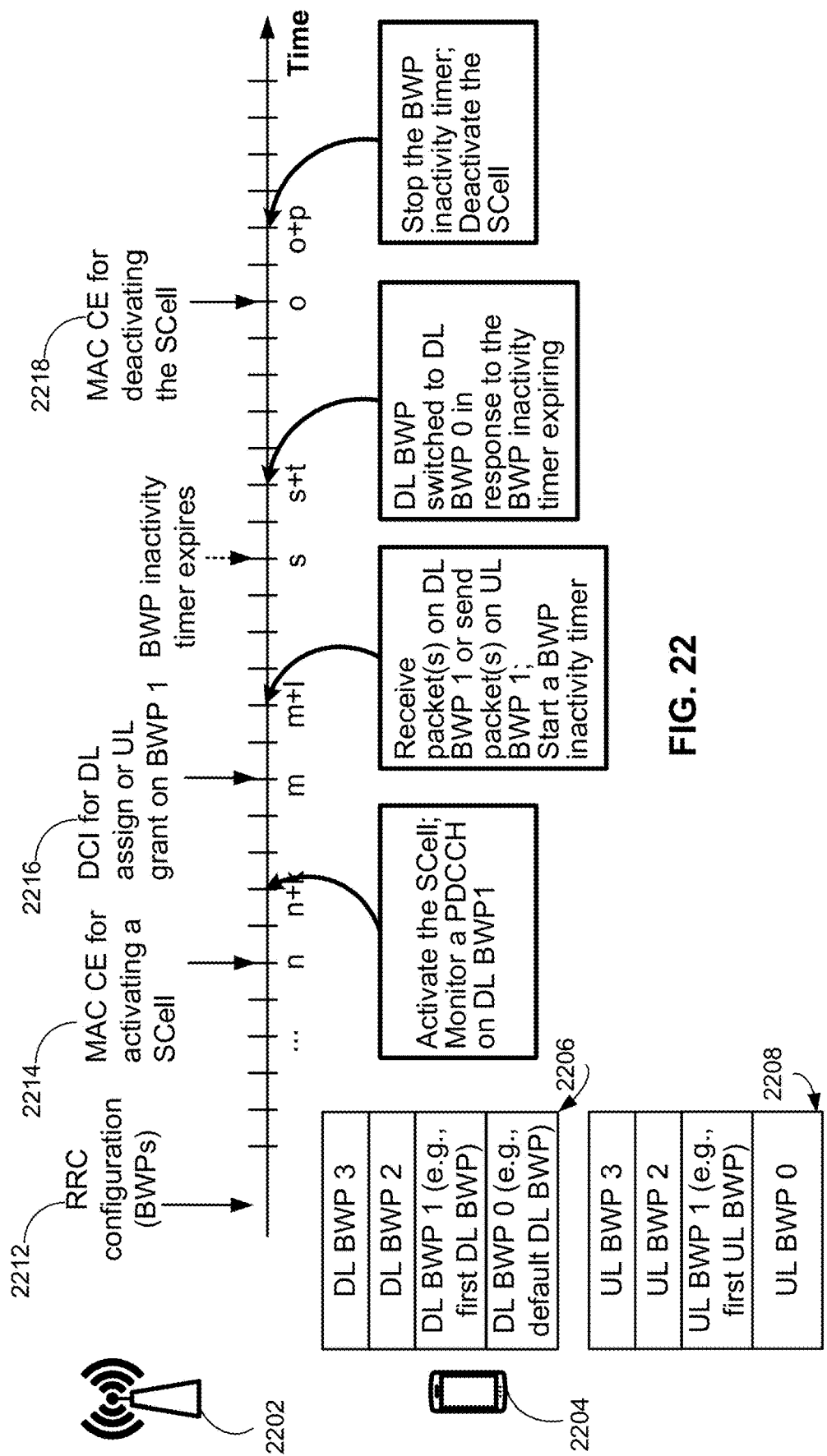
FIG. 22 shows an example of BWP operation in an SCell.

FIG. 22 shows an example of BWP switching. The BWP switching may be performed on an SCell. A base station 2202 may send (e.g., transmit) one or more messages (e.g., one or more RRC messages) 2212 for configuring multiple BWPs (e.g., multiple BWPs comprising a DL BWP 0, a DL BWP 1, a DL BWP 2, a DL BWP 3, an UL BWP 0, an UL BWP 1, an UL BWP 2, and an UL BWP 3 shown in tables 2206 and 2208, respectively). The multiple BWPs may be BWPs of an SCell. The DL (and/or UL) BWP 0 may be a default BWP. The DL (and/or UL) BWP 1 may be a first (or initial) active BWP (e.g., a first DL BWP or a first UL BWP). A wireless device 2204 may determine the multiple BWPs configured for the wireless device 2204, for example, based on the one or more messages 2212. The base station 2202 may send, to the wireless device 2204, a MAC CE 2214 for activating the SCell (e.g., at a time n). The wireless device 2204 may activate the SCell (e.g., at a time n+k). The wireless device 2204 may start to monitor a PDCCH on (e.g., sent via) the DL BWP 1. The base station 2202 may send DCI 2216 for a DL assignment (e.g., at a time m). The DCI 2216 may be sent via the DL BWP 1 (e.g., a first DL BWP). The wireless device 2204 may receive a packet via the DL BWP 1 or via another active DL BWP (e.g., at a time m+l), for example, based on the DL assignment. The wireless device 2204 may start a BWP inactivity timer (e.g., at the time m+l). The wireless device 2204 may start the BWP inactivity timer, for example, after receiving scheduled downlink packets. The base station 2202 may send DCI 2216 for an UL grant (e.g., at the time m). The DCI 2216 may be sent via the DL BWP 1 (e.g., a first DL BWP or an initial DL BWP). The wireless device 2204 may send a packet via an UL BWP 1 (e.g., via a first UL BWP or an initial UL BWP at a time m+l), for example, based on the UL grant. The wireless device 2204 may start a BWP inactivity timer (e.g., at the time m+l). The wireless device 2204 may start the BWP inactivity timer, for example, after sending scheduled uplink packets.

The BWP inactivity timer may expire (e.g., at a time s). The BWP inactivity may expire, for example, if the wireless device 2204 does not perform reception or transmission for a period of time (e.g., a period from the time m+l to the time s). The wireless device 2204 may switch the DL BWP 1 to the DL BWP 0 (e.g., a default BWP). The fallback to the DL BWP 0 may occur (e.g., at a time s+t), for example, after the BWP inactivity timer expires. The base station 2202 may send, to the wireless device 2204, a MAC CE 2218 for deactivating the SCell (e.g., at a time o). The wireless device 2204 may deactivate the SCell and/or stop the BWP inactivity timer (e.g., at a time o+p). The wireless device 2204 may deactivate the SCell and/or stop the BWP inactivity timer, for example, after receiving and/or checking an indication of the MAC CE 2218.

A MAC entity may use operations on an active BWP for an activated serving cell configured with a BWP, such as one or more of: transmitting via an UL-SCH; transmitting via a RACH; monitoring a PDCCH; transmitting via a PUCCH; receiving via a DL-SCH; initializing and/or reinitializing suspended configured uplink grants of configured grant Type 1 according to a stored configuration, if any and/or to start in a symbol based on a procedure. On an inactive BWP for each activated serving cell configured with a BWP, a MAC entity: may refrain from transmitting via an UL-SCH, may refrain from transmitting via a RACH, may refrain from monitoring a PDCCH, may refrain from transmitting via a PUCCH, may refrain from transmitting an SRS, may refrain from receiving via a DL-SCH, may clear any configured downlink assignment and configured uplink grant of configured grant Type 2, and/or may suspend any configured uplink grant of configured Type 1.

A random access procedure (e.g., based on an initiation of the random access procedure) on an active DL BWP and the active UL BWP may be performed, for example, if PRACH resources are configured for the active UL BWP. The random access procedure may be performed, for example, by a MAC entity. A MAC entity may switch to an initial DL BWP and an initial UL BWP, for example, if PRACH resources are not configured for an active UL BWP (e.g., based on initiation of a random access procedure). The MAC entity may perform the random access procedure on the initial DL BWP and the initial UL BWP, for example, based on the BWP switching.

A wireless device may perform BWP switching to a BWP indicated by a PDCCH, for example, if a MAC entity receives a PDCCH (e.g., a PDCCH order) for a BWP switching of a serving cell, for example, if a random access procedure associated with this serving cell is not ongoing.

A wireless device may determine whether to switch a BWP or ignore the PDCCH for the BWP switching, for example, if a MAC entity received a PDCCH for a BWP switching while a random access procedure is ongoing in the MAC entity. The MAC entity may stop the ongoing Random Access procedure and initiate a second Random Access procedure on a new activated BWP, for example, if the MAC entity decides to perform the BWP switching. The MAC entity may continue with the ongoing Random Access procedure on the active BWP, for example if the MAC decides to ignore the PDCCH for the BWP switching. A wireless device may perform the BWP switching to a BWP indicated by the PDCCH, for example, if a MAC entity receives a PDCCH for a BWP switching addressed to a C-RNTI for a successful completion of a Random Access procedure.

The MAC entity may start or restart the BWP-InactivityTimer associated with the active DL BWP for a variety of reasons. The MAC entity may start or restart the BWP-InactivityTimer associated with the active DL BWP, for example, if one or more of the following occur: a BWP-InactivityTimer is configured for an activated serving sell, if a Default-DL-BWP is configured and an active DL BWP is not a BWP indicated by the Default-DL-BWP, if the Default-DL-BWP is not configured and the active DL BWP is not the initial BWP; and/or if one or more of the following occur: if a PDCCH addressed to C-RNTI or CS-RNTI indicating downlink assignment or uplink grant is received on the active BWP, and/or if there is not an ongoing random access procedure associated with the activated serving cell.

The MAC entity may start or restart the BWP-InactivityTimer associated with the active DL BWP, for example, if one or more of the following occur: if a BWP-InactivityTimer is configured for an activated serving cell, if a Default-DL-BWP is configured and an active DL BWP is not a BWP indicated by the Default-DL-BWP, and/or if the Default-DL-BWP is not configured and the active DL BWP is not the initial BWP; and/or if one or more of the following occur: if a MAC-PDU is transmitted in a configured uplink grant or received in a configured downlink assignment, and/or if there is not an ongoing random access procedure associated with the activated serving cell.

The MAC entity may start or restart the BWP-InactivityTimer associated with the active DL BWP, for example, if one or more of the following occur: if a BWP-InactivityTimer is configured for an activated serving cell, if a Default-DL-BWP is configured and an active DL BWP is not a BWP indicated by the Default-DL-BWP, and/or if the Default-DL-BWP is not configured and the active DL BWP is not the initial BWP; and/or if one or more of the following occur: if a PDCCH addressed to C-RNTI or CS-RNTI indicating downlink assignment or uplink grant is received on the active BWP, if a MAC-PDU is transmitted in a configured uplink grant or received in a configured downlink assignment, and/or if an ongoing random access procedure associated with the activated Serving Cell is successfully completed in response to receiving the PDCCH addressed to a C-RNTI.

The MAC entity may start or restart the BWP-InactivityTimer associated with the active DL BWP based on switching the active BWP. For example, the MAC entity may start or restart the BWP-InactivityTimer associated with the active DL BWP if a PDCCH for BWP switching is received and the wireless device switches an active DL BWP to the DL BWP, and/or if one or more of the following occur: if a default downlink BWP is configured and the DL BWP is not the default downlink BWP, and/or if a default downlink BWP is not configured and the DL BWP is not the initial downlink BWP.

The MAC entity may stop the BWP-InactivityTimer associated with an active DL BWP of the activated serving cell, for example, if one or more of the following occur: if BWP-InactivityTimer is configured for an activated serving cell, if the Default-DL-BWP is configured and the active DL BWP is not the BWP indicated by the Default-DL-BWP, and/or if the Default-DL-BWP is not configured and the active DL BWP is not the initial BWP; and/or if a random access procedure is initiated. The MAC entity may stop a second BWP-InactivityTimer associated with a second active DL BWP of an SpCell, for example, if the activated Serving Cell is an SCell (other than a PSCell).

The MAC entity may perform BWP switching to a BWP indicated by the Default-DL-BWP, for example, if one or more of the following occur: if a BWP-InactivityTimer is configured for an activated serving cell, if the Default-DL-BWP is configured and the active DL BWP is not the BWP indicated by the Default-DL-BWP, if the Default-DL-BWP is not configured and the active DL BWP is not the initial BWP, if BWP-InactivityTimer associated with the active DL BWP expires, and/or if the Default-DL-BWP is configured. The MAC entity may perform BWP switching to the initial DL BWP, for example, if the MAC entity may refrain from performing BWP switching to a BWP indicated by the Default-DL-BWP.

A wireless device may be configured for operation in BWPs of a serving cell. The wireless device may be configured by higher layers for the serving cell for a set of (e.g., four) bandwidth parts (BWPs) for receptions by the wireless device (e.g., DL BWP set) in a DL bandwidth by a parameter (e.g., DL-BWP). The wireless device may be configured with a set of (e.g., four) BWPs for transmissions by the wireless device (e.g., UL BWP set) in an UL bandwidth by a parameter (e.g., UL-BWP) for the serving cell. An initial active DL BWP may be determined, for example, by: a location and number of contiguous PRBs; a subcarrier spacing; and/or a cyclic prefix (e.g., for the control resource set for a Type0-PDCCH common search space). A wireless device may be provided (e.g., by a higher layer) a parameter (e.g., initial-UL-BWP) for an initial active UL BWP for a random access procedure, for example, for operation on a primary cell. The wireless device may be provided (e.g., by a higher layer) a parameter (e.g., Active-BWP-DL-Pcell) for first active DL BWP for receptions, for example, if a wireless device has a dedicated BWP configuration. The wireless device may be provided (e.g., by a higher layer) a parameter (e.g., Active-BWP-UL-Pcell) for a first active UL BWP for transmissions on a primary cell, for example, if a wireless device has a dedicated BWP configuration.

The wireless device may be configured with a variety of parameters for a DL BWP and/or for an UL BWP in a set of DL BWPs and/or UL BWPs, respectively, for a serving cell. The wireless device may be configured with one or more of: a subcarrier spacing (e.g., provided by higher layer parameter DL-BWP-mu or UL-BWP-mu), a cyclic prefix (e.g., provided by higher layer parameter DL-BWP-CP or UL-BWP-CP), a PRB offset with respect to the PRB (e.g., determined by higher layer parameters offset-pointA-low-scs and ref-scs) and a number of contiguous PRBs (e.g., provided by higher layer parameter DL-BWP-BW or UL-BWP-BW), an index in the set of DL BWPs or UL BWPs (e.g., by respective higher layer parameters DL-BWP-index or UL-BWP-index), a DCI format 1_0 or DCI format 1_1 detection to a PDSCH reception timing values (e.g., provided by higher layer parameter DL-data-time-domain), a PDSCH reception to a HARQ-ACK transmission timing values (e.g., provided by higher layer parameter DL-data-DL-acknowledgement), and/or a DCI 0_0 or DCI 0_1 detection to a PUSCH transmission timing values (e.g., provided by higher layer parameter UL-data-time-domain).

A DL BWP from a set of configured DL BWPs (e.g., with an index provided by higher layer parameter DL-BWP-index) may be paired with an UL BWP from a set of configured UL BWPs (e.g., with an index provided by higher layer parameter UL-BWP-index). A DL BWP from a set of configured DL BWPs may be paired with an UL BWP from a set of configured UL BWPs, for example, if the DL BWP index and the UL BWP index are equal (e.g., for unpaired spectrum operation). A wireless device may not be expected to receive a configuration where the center frequency for a DL BWP is different from the center frequency for an UL BWP, for example, if the DL-BWP-index of the DL BWP is equal to the UL-BWP-index of the UL BWP (e.g., for unpaired spectrum operation).

A wireless device may be configured with control resource sets (e.g., coresets) for every type of common search space and/or for wireless device-specific search space, for example, for a DL BWP in a set of DL BWPs on a primary cell. The wireless device may not be expected to be configured without a common search space on the PCell, or on the PSCell, in the active DL BWP. The wireless device may be configured with control resource sets for PUCCH transmissions, for example, for an UL BWP in a set of UL BWPs. A wireless device may receive a PDCCH message and/or a PDSCH message in a DL BWP, for example, according to a configured subcarrier spacing and/or a CP length for the DL BWP. A wireless device may transmit via a PUCCH and/or via a PUSCH in an UL BWP, for example, according to a configured subcarrier spacing and CP length for the UL BWP.

The BWP indicator field value may indicate an active DL BWP, from the configured DL BWP set, for DL receptions, for example, if a BWP indicator field is configured in DCI format 1_1. The BWP indicator field value may indicate the active UL BWP, from the configured UL BWP set, for UL transmissions. A wireless device may be provided (e.g., for the primary cell) with a higher layer parameter (e.g., Default-DL-BWP, or any other a default DL BWP among the configured DL BWPs), for example, if a BWP indicator field is configured in DCI format 0_1. The default BWP may be the initial active DL BWP, for example, if a wireless device is not provided a default DL BWP by higher layer parameter Default-DL-BWP. A wireless device may be expected to detect a DCI format 0_1 indicating active UL BWP change, or a DCI format 1_1 indicating active DL BWP change, for example, if a corresponding PDCCH is received within first 3 symbols of a slot.

A wireless device may be provided (e.g., for a primary cell) with a higher layer parameter (e.g., Default-DL-BWP, or any other a default DL BWP among the configured DL BWPs). The default DL BWP may be the initial active DL BWP, for example, if a wireless device is not provided a default DL BWP by the higher layer parameter Default-DL-BWP. A wireless device may be provided with a higher layer parameter (e.g., BWP-InactivityTimer) for a timer value for the primary cell. The wireless device may increment the timer, if running, every interval of 1 millisecond for frequency range 1, every 0.5 milliseconds for frequency range 2, or any other interval, for example, if the wireless device may not detect a DCI format 1_1 for paired spectrum operation or, for example, if the wireless device may not detect a DCI format 1_1 or DCI format 0_1 for unpaired spectrum operation during the interval.

Wireless device procedures on the secondary cell may be same as on the primary cell. Wireless device procedures may use the timer value for the secondary cell and the default DL BWP for the secondary cell, for example, if a wireless device is configured for a secondary cell with a higher layer parameter (e.g., Default-DL-BWP) indicating a default DL BWP among the configured DL BWPs and the wireless device is configured with a higher layer parameter (e.g., BWP-InactivityTimer) indicating a timer value. The wireless device may use the indicated DL BWP and the indicated UL BWP on the secondary cell as the respective first active DL BWP and first active UL BWP on the secondary cell or carrier, for example, if a wireless device is configured by a higher layer parameter (e.g., Active-BWP-DL-SCell) for a first active DL BWP and by a higher layer parameter (e.g., Active-BWP-UL-SCell) for a first active UL BWP on a secondary cell or carrier.

A wireless device may have difficulty in determining whether DCI is indicating a BWP switching, a BWP activation, or a BWP deactivation, for example, if multiple active BWPs in a cell (e.g., PCell or SCell) are supported. A DCI format may be used (e.g., any legacy DCI format, a DCI format of NR Release 15, or any other DCI format). The DCI format may comprise a BWP index indicating a new BWP. Misalignment between a base station and the wireless device may occur regarding a state of a BWP. A base station may send (e.g., transmit) DCI comprising: a first field indicating a BWP, and/or a second field indicating a BWP action. The BWP action may comprise one or more of: switching to the BWP, activating the BWP, and/or deactivating the BWP. A base station may send (e.g., transmit) a MAC CE comprising an n-bit bitmap (e.g., an 8-bit bitmap associated with 4 bits for DL BWPs and/or 4 bits for UL BWPs, or any other quantity of bits) indicating that one or more BWPs may be activated/deactivated (e.g., activated or deactivated). A base station may designate a first BWP of a cell as a primary active BWP. The base station may send (e.g., transmit), via the primary active BWP, DCI activating/deactivating (e.g., activating or deactivating) a secondary BWP of the cell.

Multiple active BWPs may increase spectral efficiency, communication speed, interference mitigation, provide service-friendly BWP management, and/or other performance measures, for example, relative to a configuration supporting a single active BWP at a time (e.g., a single DL BWP and a single UL BWP at a time). Multiple active BWPs may support a plurality of active DL BWPs and/or a plurality of active UL BWPs. Configuring multiple active BWPS may require more complex BWP control protocols and technical designs, for example, relative to a single active BWP configuration. Some RRC signaling and/or DCI formats (e.g., legacy signaling and/or format, and/or other signaling and/or formats) may cause one or more problems, such as the misalignment between a base station and a wireless device regarding states of multiple BWPs.

One or more RRC signaling messages and/or one or more DCI formats may be enhanced. An RRC message may configure multiple active BWPs. An RRC message may configure one or more primary BWPs and one or more secondary BWPs. An RRC message may configure whether the one or more primary BWPs are switchable by DCI and/or a MAC CE. An RRC message may configure different BWPs for sending DCI for indicating a BWP change, for example, based on whether the one or more primary BWPs are switchable by DCI and/or a MAC CE. DCI may have a plurality of fields associated with a BWP control. A first field of DCI may indicate a BWP ID. A second field of the DCI may indicate an action associated with a BWP indicated by the BWP ID. The second field may have different sizes, for example, depending on different configurations and/or requirements. The size of the second field may be (e.g., semi-statically) changed (e.g., based on one or more RRC messages). The size of the second field may be determined, for example, based on whether a designated BWP is indicated as a primary active BWP and/or whether the designated BWP is allowed to be switched dynamically.

One or more MAC CEs may be configured for a plurality of BWP control, for example, if multiple active BWPs are supported. A MAC CE may comprise a bitmap associated with a plurality of DL BWPs and/or a plurality of UL BWPs. The MAC CE may indicate activation/deactivation of each of multiple BWPs.

Some communications (e.g., communications based on one or more DCIs) may enable dynamic BWP state changes without (or with reduced) processing delays and may avoid or reduce misalignments between a base station and a wireless device. These communications may be applicable, for example, if services, channel quality, and/or traffic loading on BWPs change frequently. Some other communications (e.g., communications based on one or more MAC CEs) may provide more robust BWP state controls and/or may reduce blind decoding complexity and/or power consumption of wireless devices. The latter communications may change states of a plurality of BWPs at the same time and may reduce signaling overhead. The latter communications may be applicable, for example, if services, channel quality, and/or traffic loading on BWPs change infrequently. Different communications may be used together or may be separately configured between a base station and a wireless device, for example, depending on varying requirements and signaling environments.

A base station may send (e.g., transmit) to, or receive from, a wireless device one or more data packets. The one or more data packets may be sent, or received, via one or more radio resources. The one or more date packets may be one or more URLLC (Ultra-Reliable Low Latency Communication) data packets with a small packet size (e.g., <100 bytes), which may require ultra-reliable (e.g., BLER less than $10^{(-5)}$) and low latency delivery (e.g., less than 1 millisecond) between the base station and the wireless device. The one or more data packets may be one or more eMBB (enhanced Mobile Broadband) data packets with a large packet size (e.g., >1000 bytes), which may require a large bandwidth (e.g., 400 MHz~1 GHz) and/or a large amount of radio resources for transmission. The one or more date packets may be one or more machine-type communication (e.g., MTC) data packets with a small packet size, which require a wide communication coverage (e.g., 10 KM~100 KM) or a transmission to a wireless device located in a basement. Other types of the one or more data packets may comprise vehicle to everything (V2X) packet(s) which may be transmitted between vehicles, or between vehicle and pedestrian, or between vehicle and roadside node, packet of industrial internet of things (IIOT), and the like. It may be beneficial to transmit a first type of service (eMBB, URLLC, MTC, V2X and/or IIOT) on a first active BWP of a cell and transmit a second type of service (eMBB, URLLC, V2X and/or IIOT) on a second active BWP of the cell, for example, if multiple services are launched in a cell. BWP and/or CA operation configurations may support at most one active BWP in a cell. The BWP and/or CA operation configurations may be less efficient and/or result in significant transmission latency, for example, if a base station attempts to send (e.g., transmit), to a wireless device, data packets for multiple services on multiple active BWPs. Activation/deactivation of an SCell based on a MAC CE (e.g., for adding an additional active BWP) may take a long time (e.g., several tens of milliseconds) and a significant delay may occur, for example, if the base station attempts to send the data packets by frequently activating and/or deactivating the multiple BWPs. Data transmission associated with some types of service on an additional active BWP of the SCell may not be tolerant of a delay caused by the activation/deactivation. The transmission latency may be improved, for example, by supporting multiple active BWPs in a cell.

A base station and/or a wireless device may be configured with multiple BWPs for a cell. A base station and a wireless device may communicate with each other via multiple active BWPs of the multiple BWPs in parallel (e.g., simultaneously or overlapped in time) to accommodate multiple services (e.g., eMBB, URLLC, VTX, IIOT, and/or MTC). A base station may send (e.g., transmit), via a first active BWP, an eMBB data packet to a wireless device. The base station may send (e.g., transmit), via a second active BWP, a URLLC data packet to the wireless device. The base station may send (e.g., transmit), via a third active BWP, an MTC data packet to the wireless device. Transmitting multiple data packets for different services via different active BWPs in parallel (e.g., simultaneously or overlapped in time) may reduce latency. Transmitting first data (e.g., eMBB data) and second data (e.g., URLLC data) via a single active BWP may cause interruption of one transmission (e.g., the eMBB data transmission) by another transmission (e.g., the URLLC data transmission). Transmitting multiple data packets for different services via different active BWPs in parallel (e.g., simultaneously or overlapped in time) may avoid the interruption. Physical and MAC layer procedures configured for the BWP operation configuration that does not support multiple active BWPs in a cell may not be suitable for the BWP operation configuration that supports multiple active BWPs in a cell (e.g., such an implementation may result in an inefficient BWP management process). Multiple active BWPs may not be efficiently supported in some systems (e.g., legacy systems and/or NR physical layer and MAC layer operation procedures). Physical layer and MAC layer procedures may be enhanced, and evolved signaling for an efficient BWP operation procedure may be configured to support multiple active BWPs operation in a cell.

A base station may send (e.g., transmit), to a wireless device, one or more messages comprising configuration parameters of a cell. The one or more messages may comprise one or more RRC messages (e.g., an RRC connection reconfiguration message, an RRC connection reestablishment message, and/or an RRC connection setup message). The cell may be a PCell (or a PSCell) or an SCell, for example, if a carrier aggregation or dual connectivity is configured. The cell may comprise a plurality of downlink BWPs. Each of the plurality of downlink BWPs may be associated with a BWP ID (e.g., a BWP-specific ID) and/or one or more parameters. The cell may comprise a plurality of uplink BWPs. Each of the plurality of uplink BWPs may be associated with a BWP ID (e.g., a BWP-specific ID) and/or one or more second parameters.

Each of the plurality of the downlink BWPs may be in one of an active state and an inactive state. A wireless device may perform operations via an active BWP (e.g., a DL BWP or an UL BWP). The operations may comprise transmitting an UL-SCH, transmitting a RACH, monitoring a PDCCH, transmitting a PUCCH, receiving a DL-SCH, and/or initializing (or reinitializing) any suspended configured uplink grants of configured grant Type 1 according to a stored configuration. For an inactive BWP (e.g., a DL BWP or an UL BWP), the wireless device may not transmit an UL-SCH, may not transmit a RACH, may not monitor a PDCCH, may not transmit a PUCCH, may not transmit an SRS, may not receive a DL-SCH, may clear any configured downlink assignment and configured uplink grant of configured grant Type 2, and/or may suspend any configured uplink grant of configured Type 1.

The one or more parameters (and/or the one or more second parameters) may comprise at least one of: a control resource set identified by a control resource set index; a subcarrier spacing; a cyclic prefix; a DM-RS scrambling sequence initialization value; a number of consecutive symbols; a set of resource blocks in frequency domain; a CCE-to-REG mapping; an REG bundle size; a cyclic shift for the REG bundle; an antenna port quasi-co-location; and/or an indication for a presence or absence of a TCI field for DCI format 1_0 or 1_1 transmitted on the control resource set. The one or more parameters may comprise cell-specific parameters. The one or more second parameters may comprise BWP-specific parameters. The configuration parameters may further indicate at least one of: an initial active DL BWP, of the plurality of DL BWPs, identified by a first BWP ID and/or a default DL BWP, of the plurality of DL BWPs, identified by a second BWP ID. The second BWP ID may be same as, or different from, the first BWP ID. The default DL BWP may be in inactive state, for example, if the second BWP ID is different from the first BWP ID of the initial active DL BWP.

The initial active DL BWP may be associated with one or more control resource set for one or more common search space (e.g., type0-PDCCH common search space). A wireless device may monitor a first PDCCH sent via the initial active DL BWP of a PCell (or a PSCell) to detect DCI in the first PDCCH, for example, if the wireless device switches from RRC idle state to RRC connected state.

A base station may activate an additional BWP dynamically (e.g., via DCI, a MAC CE, etc.), for example, if at least one of multiple types of services are triggered for transmission via the additional BWP. The base station may send (e.g., transmit) a first command to the wireless device to activate a second DL BWP, of the plurality of DL BWPs, indicated (e.g., identified) by a third BWP ID. The first command may be a MAC CE or DCI. The third BWP ID may be different from the first BWP ID and/or different from the second BWP ID. The wireless device may transition (e.g., switch) the second DL BWP from inactive state to active state and/or may maintain the initial active BWP in active state, for example, after or in response to the activating. The wireless device may monitor a first PDCCH sent via the initial active DL BWP. The wireless device may monitor a second PDCCH sent via the second DL BWP in parallel (e.g., simultaneously or overlapped in time), for example, after or in response to the activating. Activating the second DL BWP may not change the state of the initial active DL BWP.

Figure 23B:
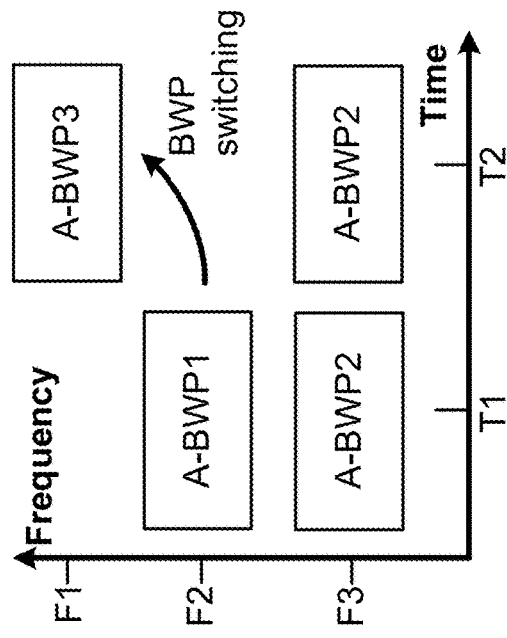
FIG. 23A, FIG. 23B and FIG. 23C show examples of multiple active BWPs operation.
Figure 23C:
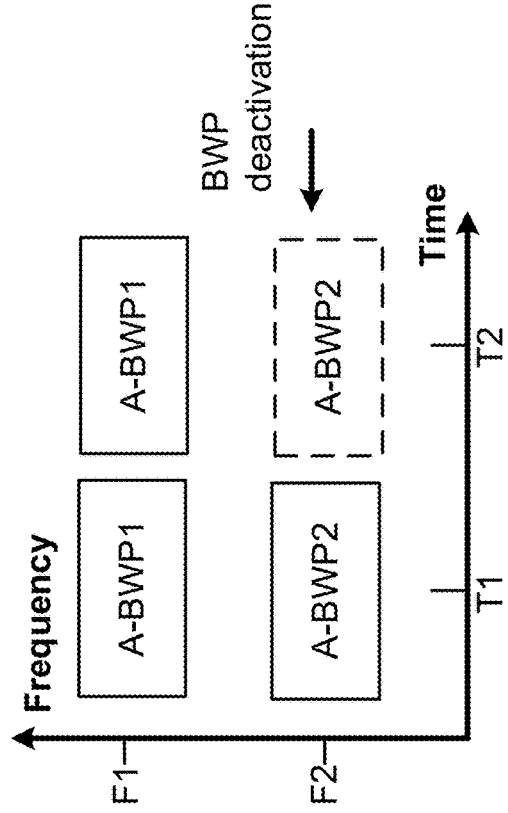
Figure 23A:
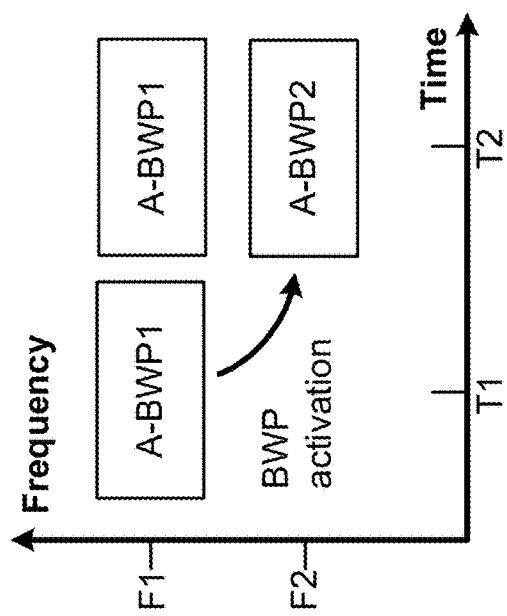

FIG. 23A shows an example of configuring multiple active BWPs. The base station may send (e.g., transmit) the first command (e.g., at a time T1) to the wireless device to activate another BWP (e.g., an A-BWP2), for example, if there is at least one active DL BWP (e.g., an A-BWP1) of a plurality of active BWPs in a cell. The A-BWP2 may be different from the A-BWP1. The wireless device may transition (e.g., switch) the A-BWP2 from inactive state to active state and/or maintain the A-BWP1 in active state (e.g., at a time T2 after the time T1). Activating the A-BWP2 may not change the state of the A-BWP1.

A base station may send (e.g., transmit), to a wireless device, one or more RRC messages comprising configuration parameters indicating a first active DL BWP and at least one second active DL BWP of a PCell (or a PSCell), for example, if multiple active BWPs are supported by the wireless device. The wireless device may monitor a first PDCCH sent via the first active DL BWP of a PCell (or a PSCell) and monitor at least one second PDCCH sent via the at least one second active DL BWP of the PCell (or the PSCell). The wireless device may monitor the first PDCCH and the at least one second PDCCH to detect one or more DCIs (e.g., when the wireless device is in RRC connected mode or the wireless devices switches from RRC idle state to RRC connected state). Configuring multiple active BWPs by the one or more RRC messages may reduce signaling overhead for BWP activation.

A base station may send (e.g., transmit), to a wireless device, one or more RRC messages comprising configuration parameters indicating a first active DL BWP of an SCell and at least one second active DL BWP of the SCell, for example, if multiple active BWPs are supported by the wireless device. The wireless device may monitor a first PDCCH sent via the first active DL BWP and at least one second PDCCH sent via the at least one second active DL BWP of the SCell. The wireless device may monitor the first PDCCH and the at least one second PDCCH to detect one or more DCIs (e.g., after or in response to the SCell being activated by a MAC CE or DCI). Configuring multiple active BWPs by the one or more RRC messages may reduce signaling overhead for BWP activation.

FIG. 23B shows an example of a BWP switching if multiple active BWPs are supported. A base station may send (e.g., transmit) a second command to a wireless device to switch from an A-BWP1 to an A-BWP3 (at a time T2), for example, if there are at least two active DL BWPs (e.g., the A-BWP1 and an A-BWP2) of a plurality of active BWPs in a cell (at a time T1 before the time T2). The A-BWP1 may be the initial active DL BWP configured by the one or more messages. The A-BWP2 may be a DL BWP activated by the first command. The second command may be a MAC CE or DCI. The A-BWP3 may be different from the A-BWP1 and from the A-BWP2. The wireless device may transition (e.g., switch) the A-BWP1 from active state to inactive state, transition (e.g., switch) the A-BWP3 from inactive state to active state, and/or maintain the A-BWP2 in active state, for example, after or in response to the switching. The wireless device may monitor a first PDCCH sent via the A-BWP3 and/or monitor a second PDCCH sent via the A-BWP2 in parallel (e.g., simultaneously or overlapped in time), for example, after or in response to the switching. Switching to the A-BWP3 from A-BWP1 may comprise deactivating the A-BWP1 and activating the A-BWP3.

FIG. 23C shows an example of BWP deactivation if multiple active BWPs are supported. A base station may send (e.g., transmit) a third command to a wireless device to deactivate an A-BWP2, for example, if there are at least two active DL BWPs (e.g., an A-BWP1 and the A-BWP2) of a plurality of active BWPs in a cell. The third command may be a MAC CE or DCI. The base station and/or the wireless device may deactivate the A-BWP2, for example, after or in response to an expiration of a BWP inactivity timer (e.g., associated with the A-BWP2 or associated with the cell). The deactivating may comprise transiting (e.g., switching) the A-BWP2 from active state to inactive state and/or maintaining the A-BWP1 in active state (e.g., at a time T2). The wireless device may monitor a first PDCCH sent via the A-BWP1 and/or stop monitoring a second PDCCH associated with the A-BWP2, for example, after or in response to the deactivating. The deactivating the A-BWP2 may not change the state of the A-BWP1 (e.g., the active state of the A-BWP1).

A base station and/or a wireless device may communicate via more than two active DL BWPs in a cell. The base station and/or the wireless device may perform BWP activation, BWP deactivation, and BWP switching, for example, to flexibly provide different services. A base station and/or a wireless device may maintain a first active DL BWP for a first transmission of a first service. The base station may activate a second DL BWP to be a second active DL BWP, for example, if a second service is triggered. The wireless device may monitor one or more PDCCHs and/or receive data packets on both the first active DL BWP and the second active DL BWP, for example, after or in response to the activating. The base station and/or the wireless device may activate a third DL BWP to be a third active DL BWP, for example, if a third service is triggered. The wireless device may monitor one or more PDCCHs and/or receive data packets on the first active DL BWP, the second active DL BWP, and the third active DL BWP, for example, after or in response to the activating.

A base station may cross-BWP schedule a second active DL BWP based on a first active DL BWP, for example, which may reduce blind decoding complexity. Cross-BWP scheduling may comprise scheduling, by a base station, a transmission (e.g., downlink or uplink transmissions) on a shared channel (e.g., downlink or uplink shared channels) of a second BWP via control channels of a first BWP. The first active DL BWP may be configured with a first number of control resource sets and/or a second number of search spaces. The second active DL BWP may be configured with a third number of control resource sets, and/or a fourth number of search spaces. The first number may be greater than the third number. The second number may be greater than the fourth number. The second active DL BWP may be configured with no PDCCH resource.

Figures 24A, 24B:
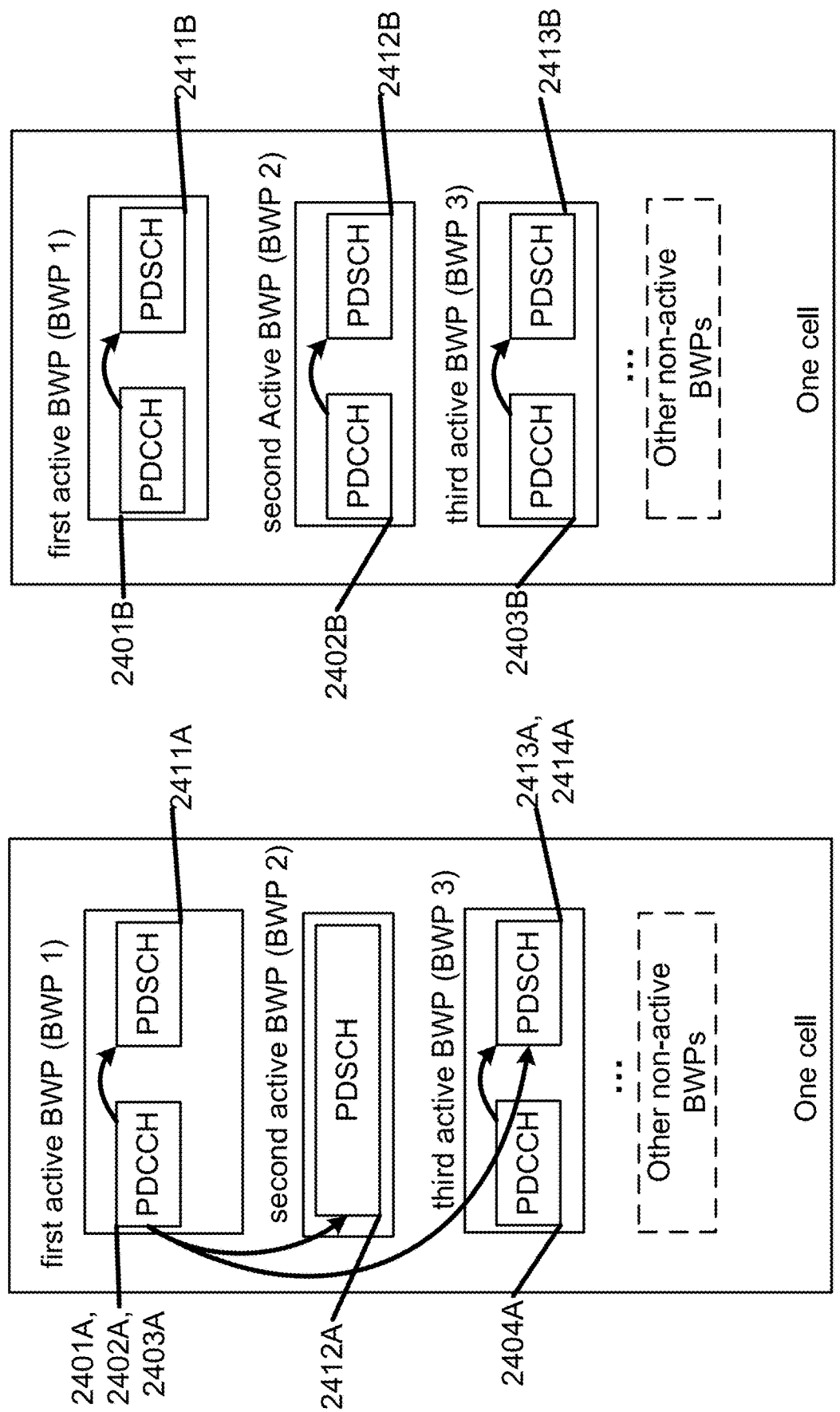
FIG. 24A and FIG. 24B show examples of BWP scheduling.

FIG. 24A shows an example of a cross-BWP scheduling. A base station may send (e.g., transmit), to a wireless device, a first PDCCH 2401A via a first active DL BWP (e.g., a BWP 1) to schedule a first PDSCH 2411A of the BWP 1. The base station may send (e.g., transmit) a second PDCCH 2402A via the BWP 1 to schedule a second PDSCH 2412A of a second active BWP (e.g., a BWP 2), for example, if the BWP 2 is configured to be cross-BWP scheduled by the BWP 1. The base station may send (e.g., transmit) a third PDCCH 2403A via the BWP 1 to schedule a third PDSCH 2413A of a third active BWP (e.g., a BWP 3), for example, if the BWP 3 is configured to be cross-BWP scheduled by the BWP 1. The base station may send (e.g., transmit) a fourth PDCCH 2404A via the BWP 3 to schedule a fourth PDSCH 2414A of the BWP 3, for example, if BWP 3 is configured to be self-scheduled. A wireless device may monitor one or more PDCCHs sent via the BWP 1 for at least one second BWP, for example, if the cross-BWP scheduling is supported and the at least one second BWP is configured to be cross-BWP scheduled by the BWP 1. The first PDCCH 2401A, the second PDCCH 2402A, and the third PDCCH 2403A may be three distinct PDCCHs on a same search space. Each of the three distinct PDCCHs may be sent via different locations in the same search space.

FIG. 24B shows an example of a self-BWP scheduling. A PDSCH of an active BWP may be self-scheduled by a PDCCH of the active BWP. A base station may schedule a first PDSCH resource 2411B on a first active BWP (e.g., a BWP 1) by a first PDCCH 2401B on the first active BWP. The base station may schedule a second PDSCH resource 2412B on a second active BWP (e.g., a BWP 2) by a second PDCCH 2402B on the second active BWP. The base station may schedule a third PDSCH resource 2413B on a third active BWP (e.g., a BWP 3) by a third PDCCH 2403B on the third active BWP.

A wireless device may monitor one or more PDCCHs in one or more common search spaces on the multiple active DL BWPs, for example, with multiple active DL BWPs in a cell (e.g., as shown in FIG. 23A, FIG. 23B and FIG. 23C). Each of the multiple active DL BWPs may be associated with one of the one or more common search spaces. Configuring a common search space for each of multiple active DL BWPs may not be efficient for a PDCCH resource utilization in the cell. Configuring a common search space for each of the multiple active DL BWPs may require a wireless device to monitor multiple common search spaces for the multiple active DL BWPs, which may consume battery power in an inefficient manner PDCCH resource utilization efficiency and battery power efficiency may be improved by one or more configurations described herein. The one or more configurations may comprise designating a first active DL BWP, of multiple active DL BWPs, as a primary active DL BWP (PBWP). The primary active DL BWP may be the initial active DL BWP configured in the one or more messages. The primary active DL BWP may be associated with one or more common search spaces, and/or one or more wireless device-specific search spaces (e.g., UE-specific search spaces). The primary active BWP may be a BWP via which the wireless device may perform an initial connection establishment procedure or may initiate a connection re-establishment procedure. The primary active DL BWP may be associated with one or more common search spaces for one or more DCI formats with CRC scrambled by one of SI-RNTI, RA-RNTI, TC-RNTI, P-RNTI, INT-RNTI, SFI-RNTI, TPC-PUSCH-RNTI, TPC-PUCCH-RNTI, TPC-SRS-RNTI, CS-RNTI, SP-CSI-RNTI, and/or C-RNTI. The one or more common search spaces may comprise at least one of: a type0-PDCCH common search space; a type0A-PDCCH common search space; a type1-PDCCH common search space; a type2-PDCCH common search space; and/or a type3-PDCCH common search space. The one or more DCI formats may comprise at least one of: a DCI format 0_0; a DCI format 0_1; a DCI format 1_0; a DCI format 1_1; a DCI format 2_0; a DCI format 2_1; a DCI format 2_2; and/or a DCI format 2-3.

The determination of the PBWP may be indicated by an RRC message, a first MAC CE, and/or first DCI. At least one second active DL BWP of the multiple active DL BWPs may be designated as at least one secondary active DL BWP (SBWP). The determination of the at least one SBWP may be indicated by a second MAC CE and/or second DCI. A secondary active DL BWP may be associated with one or more wireless device-specific search spaces. A wireless device may monitor one or more common search spaces and one or more first wireless device-specific search spaces on a PBWP of the cell and/or one or more second wireless device-specific search spaces on an SBWP of the cell, for example, if the PBWP and the SBWP are designated in the cell.

Figure 25A:
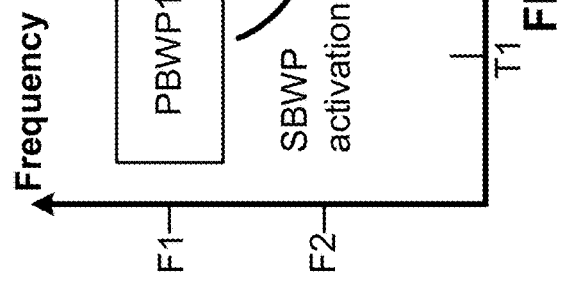
FIG. 25A, FIG. 25B, FIG. 25C and FIG. 25D show examples of multiple active BWPs operation.

FIG. 25A shows an example of a PBWP switching. A base station may designate, from the multiple active DL BWPs, a first active DL BWP as a PBWP (e.g., a PBWP1), and a second active DL BWP as an SBWP (e.g., an SBWP1), for example, if multiple DL BWPs are in active states in a cell. A wireless device may monitor a first PDCCH on the PBWP1 and a second PDCCH on the SBWP1 (e.g., at a time T1). A base station may send (e.g., transmit), to a wireless device, a first command to instruct a switch from the PBWP1 to a third BWP as a new primary BWP (e.g., a PBWP2). The wireless device may transition (e.g., switch) the PBWP1 from active state to inactive state and transition (e.g., switch) the third BWP (e.g., the PBWP2) from inactive state to active state, for example, after or in response to switching from the PBWP1 to the PBWP2. The activated third BWP may be a primary active BWP, for example, after or in response to the switching. The wireless device may monitor a first PDCCH on common search spaces and first wireless device-specific search spaces on the PBWP2 and/or may monitor a second PDCCH on second wireless device-specific search spaces on the SBWP1, for example, after or in response to the switching from the PBWP1 to the PBWP2.

Figure 25B:
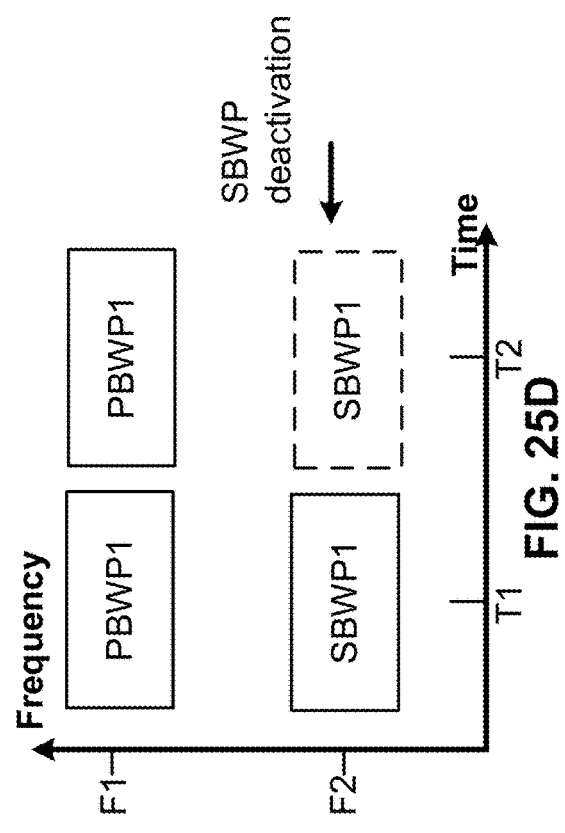

FIG. 25B shows an example of SBWP activation. A base station may send (e.g., transmit) a second command to a wireless device to activate a second DL BWP (e.g., an SBWP1) as a secondary BWP, for example, if a primary active BWP (e.g., a PBWP1) of a plurality of active BWPs are designated in a cell. The second DL BWP may be different from the PBWP1 and/or the plurality of active BWPs. The wireless device may transition (e.g., switch) the second DL BWP from inactive state to active state and maintain the PBWP1 in active state, for example, after or in response to the activating. The second DL BWP may be designated as an SBWP (e.g., an SBWP1), for example, after or in response to the activation. The wireless device may monitor a first PDCCH on common search spaces and first wireless device-specific search spaces on the PBWP1 and may monitor a second PDCCH on second wireless device-specific search spaces on the SBWP1, for example, after or in response to the activation.

Figure 25C:
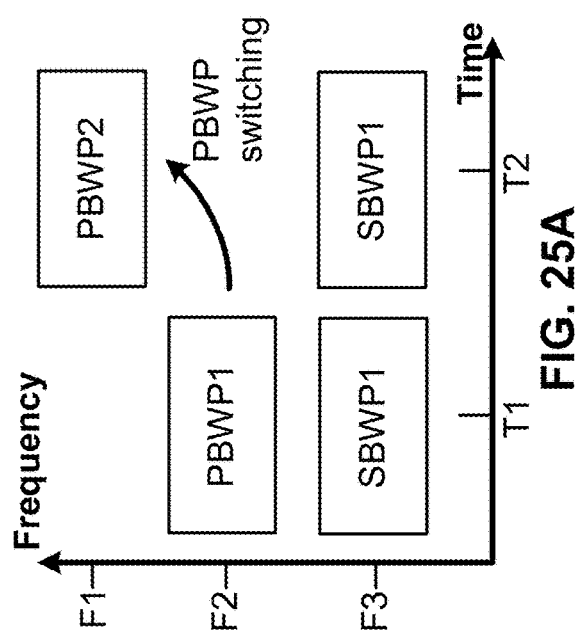

FIG. 25C shows an example of SBWP switching. A base station may assign, to a wireless device and/or from the multiple active DL BWPs, a first active DL BWP as a PBWP (e.g., a PBWP1) and a second active DL BWP as an SBWP (e.g., an SBWP1), for example, if a primary active BWP (e.g., the PBWP1) of a plurality of active BWPs is designated in a cell. The wireless device may monitor a first PDCCH on a PBWP1 and/or a second PDCCH on an SBWP1. The base station may send (e.g., transmit), to the wireless device, a third command to switch from the SBWP1 to a third BWP (e.g., an SBWP2) as a new secondary BWP. The wireless device may transition (e.g., switch) the SBWP1 from active state to inactive state and/or transition (e.g., switch) the third BWP from inactive state to active state, for example, after or in response to switching from the SBWP1 to the SBWP2. The activated third BWP may be a secondary active BWP, for example, after or in response to the switching. The wireless device may monitor the first PDCCH on common search spaces and/or first wireless device-specific search spaces on the PBWP1 and/or a third PDCCH on second wireless device-specific search spaces on the SBWP2, for example, after or in response to the switching from the SBWP1 to the SBWP2.

Figure 25D:
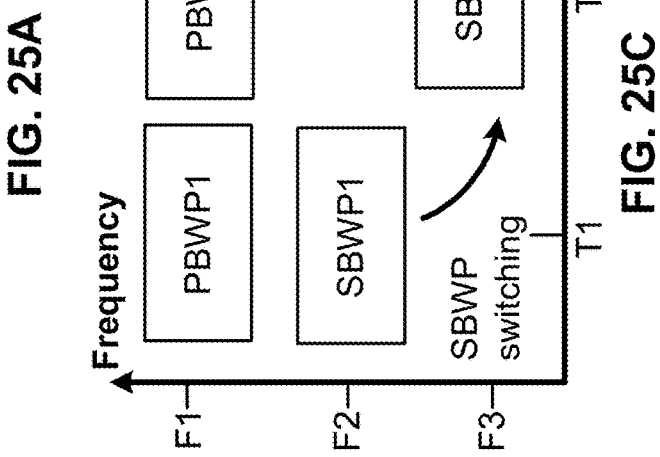

FIG. 25D shows an example of SBWP deactivation from a configuration in which multiple active DL BWPs are supported. A base station may send (e.g., transmit) a fourth command to a wireless device to deactivate an SBWP1, for example, if a primary active BWP (e.g., a PBWP1) and a secondary active BWP (e.g., the SBWP1) of a plurality of active DL BWPs are designated in a cell. The fourth command may be a MAC CE or DCI. The base station and/or the wireless device may deactivate the SBWP1, for example, after or in response to an expiration of a BWP inactivity timer. The BWP inactivity timer may be associated with the SBWP1. The wireless device may transition (e.g., switch) the SBWP1 from active state to inactive state and/or maintain the PBWP1 in active state, for example, after or in response to the deactivating. The wireless device may monitor a first PDCCH on (e.g., sent via) the PBWP1 and/or stop monitoring a second PDCCH on (e.g., associated with) the SBWP1, for example, after or in response to the deactivating. Deactivating the SBWP1 may not change the state of the PBWP1.

A base station and/or a wireless device may not allow a PBWP switching to a second active BWP by a MAC CE or by DCI, for example, in a configuration in which multiple active DL BWPs comprise a PBWP and at least one SBWP in a cell. The base station and/or the wireless device may trigger an SBWP deactivation, an SBWP activation, and/or an SBWP switching. Configuring the PBWP to be unswitchable may simplify signaling designs and/or reduce implementation complexity of the wireless device. The PBWP may be switched to the second PBWP, for example, only by an RRC message but not by a MAC CE or DCI. The RRC message triggering a PBWP switching may enable a base station to statically (or semi-statically) switch the PBWP. FIG. 26A, FIG. 26B and FIG. 26C show examples of configurations in which a PBWP is configured to be unswitchable (e.g., always active), such as by DCI. Configuring a PBWP to be unswitchable (e.g., at least by DCI) may simplify implementation of procedures for a base station and a wireless device, reduce signaling overhead, and/or reduce battery consumption of the wireless device. A wireless device may switch the PBWP to a new PBWP, for example, after or in response to receiving an RRC message indicating PBWP switching.

FIG. 26A shows an example of SBWP activation. A base station may send (e.g., transmit) a first command to a wireless device to activate a second DL BWP as a secondary BWP (e.g., an SBWP1), for example, if a primary active BWP (e.g., a PBWP1) of a plurality of active DL BWPs is designated in a cell. The second DL BWP may be different from the PBWP1 and/or the plurality of active BWPs. The wireless device may transition (e.g., switch) the second DL BWP from inactive state to active state and may maintain the PBWP1 in active state, for example, after or in response to the activating. The second DL BWP may be designated as an SBWP (e.g., an SBWP1), for example, after or in response to the activation. The wireless device may monitor a first PDCCH on common search spaces and/or first wireless device-specific search spaces on PBWP1 and/or a second PDCCH on second wireless device-specific search spaces on the SBWP1, for example, after or in response to the activation.

FIG. 26B shows an example of SBWP deactivation. A base station may send (e.g., transmit) a second command to a wireless device to deactivate the SBWP1, for example, if a primary active BWP (e.g., a PBWP1) and a secondary active BWP (e.g., the SBWP1) of a plurality of active DL BWPs are designated in a cell. The second command may be a MAC CE or DCI. The base station and/or the wireless device may deactivate the SBWP1, for example, after or in response to an expiration of a BWP inactivity timer. The BWP inactivity timer may be associated with the SBWP1. The wireless device may transition (e.g., switch) the SBWP1 from active state to inactive state and/or may maintain the PBWP1 in active state, for example, after or in response to the deactivating. The wireless device may monitor a first PDCCH on (e.g., sent via) the PBWP1 and/or may stop monitoring a second PDCCH on (e.g., associated with) the SBWP1, for example, after or in response to the deactivating.

FIG. 26C shows an example of SBWP switching. A base station may assign, to a wireless device and/or from multiple DL active BWPs, a first active DL BWP as a PBWP (e.g., a PBWP1) and a second active DL BWP as an SBWP (e.g., an SBWP1), for example, if the multiple DL active BWPs are configured in a cell. The wireless device may monitor a first PDCCH on (e.g., sent via) the PBWP1 and a second PDCCH on (e.g., sent via) the SBWP1. A base station may send (e.g., transmit), to the wireless device, a third command to switch from the SBWP1 to a third BWP as a secondary BWP (e.g., the SBWP2). The wireless device may transition (e.g., switch) the SBWP1 from active state to inactive state and/or transition (e.g., switch) the third BWP from inactive state to active state, for example, after or in response to switching from the SBWP1 to the SBWP2. The activated third BWP may be the secondary active BWP (e.g., the SBWP2). The wireless device may monitor the first PDCCH on common search spaces and/or first wireless device-specific search spaces on the PBWP1 and/or a third PDCCH on second wireless device-specific search spaces on the SBWP2, for example, after or in response to the switching from the SBWP1 to the SBWP2.

Some wireless devices (e.g., a first wireless device) may support at most one active BWP in a cell. Other wireless devices (e.g., a second wireless device) may support more than one active BWP in a cell. A base station and/or the first wireless device may trigger a BWP switching to a second BWP as an active BWP.

Some wireless device (e.g., a second wireless device) may support a plurality of active BWPs in a cell. For at least some of these wireless devices (e.g., a second wireless device), no specific designation of a PBWP or an SBWP of the plurality of active BWPs may be performed (e.g., as shown in FIGS. 23A, 23B, and 23C). Each of the plurality of active BWPs may be associated with one or more common search spaces. The second wireless device may communicate with the base station via the plurality of active BWPs in the cell. The base station and/or the second wireless device may trigger activating/deactivating a BWP and/or switching from a first BWP to a second BWP as a second active BWP.

Some wireless devices (e.g., a third wireless device) may support a plurality of active BWPs in a cell. For some wireless devices (e.g., the third wireless device), a PBWP and at least one SBWP of the plurality of active BWPs may be designated, and/or the PBWP may be maintained in active state, for example, at least until the third wireless device receives an indication of (e.g., an RRC message indicating) a PBWP switching. The PBWP may not be switched to a new active BWP dynamically (e.g., by DCI transmitted on a PDCCH). The third wireless device may communicate with the base station via the plurality of active BWPs in the cell. The base station and/or the third wireless device may trigger activating/deactivating an SBWP and/or switching from a first SBWP to a second BWP as a second SBWP.

Some wireless devices (e.g., a fourth wireless device) may support a plurality of active BWPs in a cell. For the some wireless devices (e.g., the fourth wireless device), a PBWP and at least one SBWP of the plurality of active BWPs may be designated, and/or the PBWP may be switched to a new BWP as a new PBWP dynamically (e.g., by DCI transmitted on a PDCCH). The fourth wireless device may communicate with the base station via the plurality of active BWPs in the cell. The base station and/or the wireless device may trigger activating/deactivating an SBWP, switching from a first PBWP to a second BWP as a second PBWP, and/or switching from a first SBWP to a third BWP as a second SBWP.

Different wireless devices may support different BWP operation modes. A wireless device may send (e.g., transmit) various information to a base station indicating the wireless device's capability of one or more of multiple BWP operation modes in a cell. The multiple BWP operation modes in a cell may comprise at least one of: a first mode in which the wireless may support a single active BWP in the cell; a second mode in which the wireless device may support multiple active BWPs, without a PBWP designation, in the cell; a third mode in which the wireless device may support multiple active BWPs with a PBWP and at least one SBWP designated and the PBWP switchable by an RRC message; a fourth mode in which the wireless device may support multiple active BWPs with a PBWP and at least one SBWP designated and the PBWP switchable by DCI; a fifth mode in which the wireless device may support multiple active BWPs with multiple PBWPs and multiple SBWPs designated and the PBWP switchable by an RRC or DCI; and/or any other modes. A base station may send (e.g., transmit), to a wireless device, one or more messages indicating one or more of the multiple BWP operation modes.

A base station and/or a wireless device may communicate via the multiple active BWPs with a default BWP operation mode, for example, if multiple active BWPs are supported. The default BWP operation mode may be one of the multiple BWP operation modes. A wireless device capable of supporting a first specification (e.g., a legacy device, a device configured to 3GPP Release 15, or a device configured for any other specification) may perform a BWP operation with the first mode (e.g., supporting a single active BWP in a cell) of the multiple BWP operation modes. A wireless device capable of supporting a second specification (e.g., a legacy device, a device configured to 3GPP Release 16, or a device configured for any other specification) may perform a BWP operation with the default BWP mode of the multiple BWP operation modes. To support multiple active BWPs in a cell, a default BWP mode may be preconfigured (e.g., predefined) as one of the second mode, the third mode, the fourth mode, the fifth mode, and/or any other mode, of multiple BWP operation modes.

A base station may send (e.g., transmit), to a wireless device, one or more messages comprising configuration parameters of a plurality of DL BWPs in a cell. Multiple DL BWPs of a plurality of DL BWPs may be activated as active DL BWPs. A wireless device and/or a base station may communicate via the active DL BWPs comprising a PBWP and an SBWP. The PBWP may switch to a first DL BWP as a new PBWP. The SBWP may switch to a second DL BWP as a new SBWP. The SBWP may be deactivated. A third BWP may be activated as a second SBWP. A base station may send (e.g., transmit) one or more DCIs indicating a PBWP switching, an SBWP activation, an SBWP deactivation, an SBWP switching, and/or a PDSCH scheduling on a PBWP or on an SBWP. The indication by the one or more DCIs may be, for example, based on at least one of: one or more values of one or more fields of the one or more DCI; and/or whether the one or more DCI is transmitted via a PBWP or an SBWP. The one or more DCIs may be sent (e.g., transmitted) with DCI format 1_0 or 1_1 indicating a PDSCH scheduling. The one or more fields may comprise at least one of: a carrier indicator; an identifier for a DCI format; a BWP indicator; a first field indicating a frequency domain resource assignment; a second field indicating a time domain resource assignment; a PUCCH resource indicator; a TPC command for a scheduled PUCCH; and/or a PDSCH-to-HARQ_feedback timing indicator. Reusing an existing DCI format (e.g., DCI format 1_0 or 1_1) for a BWP operation supporting multiple active BWPs may reduce blind decoding complexity at a wireless device.

A wireless device may switch the PBWP to a first BWP as a new PBWP indicated (e.g., identified) by the BWP indicator, for example, based on at least one of: the one or more DCI being transmitted via the PBWP; the BWP indicator indicating the first BWP different from the PBWP and the SBWP (e.g., if configured); and/or a value of the first field and/or the second field being different from a first value (e.g., all zeros) and/or a second value (e.g., all ones). The first value and/or the second value may be predefined (e.g., fixed). The wireless device may switch the SBWP to a second BWP as a new SBWP indicated (e.g., identified) by the BWP indicator, for example, based on at least one of: the one or more DCIs being transmitted via the SBWP; the BWP indicator indicating the second BWP different from the PBWP and from the SBWP; and/or a value of the first field and/or the second field being different from the first value (e.g., all zeros) and/or the second value (e.g., all ones).

The wireless device may activate a third BWP as a new SBWP indicated (e.g., identified) by the BWP indicator, for example, based on at least one of: the BWP indicator indicating the third BWP different from the PBWP and from the SBWP; and/or the value of the first field and/or the second field being the first value (e.g., all zeros). The wireless device may deactivate the SBWP, for example, based on at least one of: the one or more DCIs being transmitted via the PBWP; the BWP indicator indicating the SBWP; and/or the value of the first field or the second field being the second value (e.g., all ones).

The wireless device may receive a DL assignment via a PBWP (e.g., without a PBWP switching), for example, based on at least one of: the BWP indicator indicating the PBWP; and/or the value of the first field or the second field being different from the first value (e.g., all zeros) and/or the second value (e.g., all ones). The wireless device may receive a DL assignment via an SBWP (e.g., without an SBWP switching/activation/deactivation), for example, based on at least one of: the BWP indicator indicating the SBWP; and/or the value of the first field or the second field being different from the first value (e.g., all zeros) and/or the second value (e.g., all ones). The wireless device may receive one or more DL data packets from a first PDSCH on (e.g., sent via) the PBWP, for example, after or in response to receiving the DL assignment on the PBWP. The wireless device may receive one or more DL data packets from a second PDSCH on (e.g., sent via) the SBWP, for example, after or in response to receiving the DL assignment via the SBWP.

The base station and the wireless device may dynamically switch a PBWP to a new PBWP, activate an SBWP, deactivate an SBWP, or switch an SBWP to a new SBWP, for example, based on one or more fields of one or more DCIs. Blind decoding complexity and implementation cost of the wireless device may be reduced, and multiple active BWPs may be flexibly supported. A base station and/or a wireless device may support, for example, a PBWP and at most one SBWP of a plurality of BWPs. Supporting the PBWP and the at most one SBWP, compared with one single active BWP in a cell, may improve spectrum efficiency and maintain an acceptable level of implementation complexity of the base station and/or the wireless device.

A base station may send (e.g., transmit) one or more DCIs indicating a PBWP switching, an SBWP activation, and/or a PDSCH scheduling on a PBWP or on an SBWP, for example, based on at least one of: one or more values of one or more fields of the one or more DCIs; and/or whether the one or more DCIs are transmitted via a PBWP or an SBWP. The one or more DCIs may be sent, for example, if a PBWP and at most one SBWP of a plurality of DL BWPs are supported. Activation of an SBWP may comprise deactivating a first SBWP and activating a first inactive BWP as an SBWP (e.g., at a time). Activation of an SBWP may comprise activating a first inactive BWP as an SBWP (e.g., if there is no SBWP before the activating).

A base station may send (e.g., transmit) one or more DCIs indicating a PBWP switching, for example, if a PBWP and at most one SBWP of a plurality of BWPs are supported. The base station may send the one or more DCIs indicating the PBWP switching based on at least one of: the BWP indicator indicating a first BWP different from the PBWP and from the SBWP; the one or more DCIs being transmitted via the PBWP; and/or one or more value of the first field and/or the second field being different from a first value (e.g., all zeros) and/or a second value (e.g., all ones). The first value and/or the second value may be predefined (e.g., fixed).

A base station may send (e.g., transmit) one or more DCIs indicating an SBWP activation, for example, if a PBWP and at most one SBWP of a plurality of BWPs are supported. The base station may send the one or more DCIs indicating the SBWP activation based on at least one of: the BWP indicator indicating a BWP different from the PBWP (e.g., if there is no SBWP in the cell); the BWP indicator indicating the BWP different from the SBWP; the one or more DCIs being transmitted via the PBWP; the one or more DCIs being transmitted via the SBWP; one or more value of the first field and/or the second field being the first value (e.g., all zeros); and/or the value of the first field or the second field being the second value (e.g., all ones).

The wireless device may receive a DL assignment on (e.g., sent via) a PBWP (e.g., without PBWP switching), for example, based on the BWP indicator indicating the PBWP. The wireless device may receive a DL assignment on (e.g., sent via) an SBWP (e.g., without SBWP switching/activation), for example, based on the BWP indicator indicating the SBWP. The wireless device may receive one or more DL data packets from a first PDSCH on the PBWP, for example, after or in response to receiving the DL assignment on the PBWP. The wireless device may receive one or more DL data packets from a second PDSCH on the SBWP, for example, after or in response to receiving the DL assignment on the SBWP. Blind decoding complexity and implementation cost of the wireless device may be reduced, and a PBWP and at most one SBWP may be flexibly supported, for example, based on the one or more configurations.

A base station may send (e.g., transmit), to a wireless device, a MAC CE to activate or deactivate an SBWP, for example, if an SBWP activation or deactivation is not urgent (e.g., not time sensitive). The base station may send (e.g., transmit) DCI to switch from a first PBWP to a second BWP as a second PBWP and/or to switch from a first SBWP to a third BWP as a second SBWP. The base station may send the DCI to switch a BWP, for example, if BWP switching is urgent (e.g., time sensitive, such as for URLLC).

FIG. 27A, FIG. 27B, FIG. 27C, and FIG. 27D show examples of a MAC CE and a corresponding MAC sub-header for one or more SBWPs (or one or more PBWPs) activation/deactivation. FIG. 27A shows an example of the MAC CE comprising at least one of: one or more first fields indicating activation or deactivation of one or more DL BWPs; and/or one or more second fields indicating activation or deactivation of one or more UL BWPs. The one or more first fields may comprise a quantity of bits (e.g., D4, D3, D2, and D1 for four bits associated with four DL BWPs, respectively). Di may indicate activation/deactivation (e.g., activation or deactivation) of the DL BWP associated with DL BWP ID=i (e.g., i=1, 2, 3, and 4). As shown in FIG. 27A, Di (i=1, 2, 3, and 4) may correspond to four most significant bits of an octet 2 (Oct 2). The Oct 2 may comprise 8 bits and each of the 8 bits may be associated with an index (e.g., index k=0, 1, 2, 3, 4, 5, 6, and 7). k may be i+3, for example, if Di (i=1, 2, 3, and 4) corresponds to four most significant bits of the Oct 2 identified by the indexes (k=4, 5, 6, and 7). Each of the number of bits may indicate activation of a corresponding DL BWP, for example, based on the bit being set to a first value (e.g., 1). Each of the number of bits may indicate deactivation of a corresponding DL BWP, for example, based on the bit being set to a second value (e.g., 0). D4 being set to the first value may indicate a DL BWP associated with a BWP ID 4 is activated if the DL BWP is configured. D4 being set to the second value may indicate the DL BWP associated with the BWP ID 4 is deactivated if the DL BWP is configured. The wireless device may ignore the value of D4, for example, if the DL BWP associated with the BWP ID 4 is not configured. The wireless device may activate/deactivate a DL BWP associated with a BWP ID 3 based on a value of D3, for example, if the DL BWP associated with the BWP ID 3 is configured. The wireless device may activate/deactivate a DL BWP associated with a BWP ID 2 based on a value of D2, for example, if the DL BWP associated with the BWP ID 2 is configured. The wireless device may activate/deactivate a DL BWP associated with a BWP ID 1 based on a value of D1, for example, if the DL BWP associated with the BWP ID 1 is configured. An RRC message may indicate an association between a DL BWP and a BWP ID (e.g., the mapping relationships between the BWP ID 1 and a first DL BWP, between the BWP ID 2 and a second DL BWP, between the BWP ID 3 and a third DL BWP, and/or between the BWP ID 4 and a fourth DL BWP). An RRC message may not use the indexes i, j and/or k. The RRC message may indicate that the four DL BWPs and/or the four UL BWPs are associated with one of the eight indexes (e.g., the index k).

The one or more second fields may comprise a quantity of bits (e.g., U4, U3, U2, and U1 for 4 bits associated with four UL BWPs, respectively). Uj may indicate activation/deactivation (e.g., activation or deactivation) of the UL BWP associated with UL BWP ID=j (e.g., j=1, 2, 3, and 4). As shown in FIG. 27A, Uj (j=1, 2, 3, and 4) may correspond to four least significant bits of the Oct 2. k may be j−1, for example, if Uj (j=1, 2, 3, and 4) corresponds to four least significant bits of the Oct 2 identified by the indexes (k=0, 1, 2, and 3). Each of the number of bits may indicate activation of a corresponding UL BWP, for example, based on the bit being set to a first value (e.g., 1), if the UL BWP is configured. Each of the number of bits may indicate deactivation of a corresponding UL BWP, for example, based on the bit being set to a second value (e.g., 0), if the UL BWP is configured. The wireless device may ignore the value of Uj, for example, if the UL BWP associated with the UL BWP ID j is not configured.

FIG. 27B shows an example of the MAC CE comprising at least one of: one or more first fields indicating activation or deactivation of one or more DL BWPs; and/or one or more second fields indicating activation or deactivation of one or more UL BWPs. The configuration shown in FIG. 27B is similar to the configuration shown in FIG. 27A, for example, except that Uj (j=1, 2, 3, and 4) corresponds to four most significant bits of the Oct 2 identified by the indexes (k=4, 5, 6, and 7) and that Di (i=1, 2, 3, and 4) corresponds to four least significant bits of the Oct 2 identified by the indexes (k=0, 1, 2, and 3). k may be j+3, and k may be i−1.

FIG. 27C shows an example of the MAC CE comprising at least one of: one or more first fields indicating activation or deactivation of one or more DL BWPs; and/or one or more second fields indicating activation or deactivation of one or more UL BWPs. The configuration shown in FIG. 27C is similar to the configuration shown in FIG. 27A, for example, except that Uj (j=1, 2, 3, and 4) corresponds to four odd-numbered bits of the Oct 2 identified by the indexes (k=1, 3, 5, and 7) and that Di (i=1, 2, 3, and 4) corresponds to four even-numbered bits of the Oct 2 identified by the indexes (k=0, 2, 4, and 6). k may be 2j−1, and/or k may be 2i−2. Also or alternatively, Uj (j=1, 2, 3, and 4) may correspond to four even-numbered bits of the Oct 2 identified by the indexes (k=0, 2, 4, and 6) and Di (i=1, 2, 3, and 4) may correspond to four odd-numbered bits of the Oct 2 identified by the indexes (k=1, 3, 5, and 7). k may be 2j−2, and/or k may be 2i−1. A base station and/or a wireless device may dynamically use the eight bits of the Oct 2. The four most significant bits may be used for other purposes or may be reserved, for example, if the wireless device is configured with two DL BWPs (e.g., DL BWPs associated with D1 and D2) and with two UL BWPs (e.g., UL BWPs associated with U1 and U2). Two least significant bits (e.g., associated with D1 and U1) may always have the first value (e.g., 1), for example, a primary DL BWP and a primary UL BWP are designated (e.g., semi-statically). The two least significant bits may always have the first value (e.g., 1), for example, for the configurations of FIGS. 26A, 26B, and 26C (e.g., the primary DL BWP and the primary UL BWP are unswitchable).

FIG. 27D shows an example of the MAC subheader for BWP activation/deactivation. The MAC subheader may comprise at least one of: a reserved field; a flag field; an LCID field with a first value indicating the MAC CE for BWP activation/deactivation; and/or a length field. The LCID field may indicate the first value different from other LCID values (e.g., other LCID values as shown in FIG. 18 and/or FIG. 19). The MAC subheader may not comprise the length field, for example, based on the MAC CE for SBWP activation/deactivation having a fixed bit length.

The base station may send (e.g., transmit) one or more DCIs to switch from a first PBWP to a second BWP as a second PBWP or switch from a first SBWP to a third BWP as a second SBWP, for example, if one or more MAC CEs are used for activating/deactivating one or more SBWPs. The base station may send the one or more DCIs to switch from the first PBWP to the second BWP or switch from the first SBWP to the third BWP, for example, based on at least one of: one or more values of one or more fields of the one or more DCIs; and/or whether the one or more DCIs are transmitted on a PBWP or an SBWP.

The wireless device may switch the PBWP to a first BWP as a new PBWP indicated (e.g., identified) by the BWP indicator, for example, based on at least one of: the one or more DCIs being transmitted on the PBWP; and/or the BWP indicator indicating the first BWP different from the PBWP and from the SBWP (e.g., if configured). The wireless device may switch the SBWP to a second BWP as a new SBWP indicated (e.g., identified) by the BWP indicator, for example, based on at least one of: the one or more DCIs being transmitted on the SBWP; and/or the BWP indicator indicating the second BWP different from the PBWP and from the SBWP.

The wireless device may receive a DL assignment on (e.g., sent via) a PBWP (e.g., without PBWP switching), for example, after or in response to the BWP indicator indicating the PBWP. The wireless device may receive a DL assignment on (e.g., sent via) an SBWP (e.g., without SBWP switching/activation), for example, after or in response to the BWP indicator indicating the SBWP. The wireless device may receive one or more DL data packets from a first PDSCH mapped on the PBWP, for example, after or in response to receiving the DL assignment via the PBWP. The wireless device may receive one or more DL data packets from a second PDSCH mapped on the SBWP, for example, after or in response to receiving the DL assignment via the SBWP.

A base station may send (e.g., transmit) one or more DCIs indicating a PBWP switching or a PDSCH scheduling on a PBWP or on an SBWP, for example, if the PBWP and at most one SBWP of a plurality of BWPs are supported and/or one or more MAC CEs are used for activating/deactivating an SBWP. The base station may send the one or more DCIs indicating the PBWP switching or the PDSCH scheduling on the PBWP or on the SBWP, for example, based on a BWP indicator. The wireless device may switch the PBWP to a first BWP as a new PBWP indicated (e.g., identified) by the BWP indicator, for example, based on the BWP indicator indicating the first BWP different from the PBWP and from the SBWP (e.g., if configured). The wireless device may receive a DL assignment on (e.g., sent via) a PBWP (e.g., without PBWP switching), for example, after or in response to the BWP indicator indicating the PBWP. The wireless device may receive a DL assignment on (e.g., sent via) an SBWP (e.g., without SBWP switching/activation), for example, after or in response to the BWP indicator indicating the SBWP. The wireless device may receive one or more DL data packets from a first PDSCH mapped on the PBWP, after or in response to receiving the DL assignment via the PBWP. The wireless device may receive one or more DL data packets from a second PDSCH mapped on the SBWP, for example, after or in response to receiving the DL assignment via the SBWP. Combining MAC CE for SBWP activation/deactivation and DCI for PBWP/SBWP switching may reduce blind decoding complexity and dynamical signaling overhead (e.g., DCI for SBWP activation/deactivation) to support multiple active BWPs in a cell.

One or more MAC CEs for SBWP activation/deactivation may introduce intolerant transition latency (e.g., scheduling the MAC CE in PDSCH resources and sending one or more HARQ feedback for the MAC CE in PUCCH/PUSCH resources) for some services (e.g., URLLC services). A wireless device may receive multiple types of services, at least some of which may require a quick SBWP activation/deactivation. The transition latency may be reduced and/or avoided by introducing a first DCI format, different from one or more other (e.g., existing) DCI formats (e.g., DCI format 1_0/1_1). The first DCI format may comprise one or more fields indicating a PBWP switching, an SBWP activation, an SBWP deactivation, and/or an SBWP switching based on one or more values of the one or more fields of the first DCI format. The first DCI format may comprise at least one of: a BWP indicator; and/or a second field (e.g., BWP action/mode indication) indicating one of a PBWP switching, an SBWP activation, an SBWP deactivation, and/or an SBWP switching.

FIG. 28A shows an example of a first DCI format comprising a BWP ID field and a second field. The second field may be an action indication field (e.g., a field indicating an action associated with a BWP indicated by the BWP ID field). A wireless device may switch a PBWP to a first BWP as a new PBWP, for example, if the wireless device receives one or more DCIs based on the first DCI format. The wireless device may switch the PBWP to the first BWP, for example, based on at least one of: the BWP indicator (e.g., a BWP ID in the BWP ID field) indicating the first BWP; the first BWP being different from the PBWP; and/or the second field being set to a first value (e.g., "00" if a size of the second field corresponds to two bits). The wireless device may receive a DL assignment on (e.g., sent via) a PBWP (e.g., without PBWP switching), for example, based on the BWP indicator indicating the PBWP and/or the second field being set to the first value (e.g., "00").

The wireless device may activate a second BWP as an SBWP, for example, if the wireless device receives the one or more DCIs based on the first DCI format. The wireless device may activate the second BWP, for example, based on at least one of: the BWP indicator indicating the second BWP; and/or the second field being set to a second value (e.g., "01" if the size of the second field corresponds to two bits).

The wireless device may deactivate an SBWP, for example, if the wireless device receives the one or more DCIs based on the first DCI format. The wireless device may deactivate the SBWP, for example, based on at least one of: the BWP indicator indicating the SBWP; and the second field being set to a third value (e.g., "10").

The wireless device may switch an SBWP to a third BWP, for example, if the wireless device receives the one or more DCIs based on the first DCI format. The wireless device may switch the SBWP to the third BWP, for example, based on at least one of: the BWP indicator indicating the third BWP; the third BWP being different from the PBWP and from the SBWP; and/or the second field being set to a fourth value (e.g., "11" if the size of the second field corresponds to two bits). The wireless device may receive a DL assignment on (e.g., sent via) an SBWP (e.g., without SBWP switching), for example, after or in response to the BWP indicator indicating the SBWP and/or the second field being set to the fourth value (e.g., "11").

A base station may send (e.g., transmit) first DCI based on an existing DCI format (e.g., DCI format 1_0/1_1) indicating PBWP/SBWP switching and/or indicating a DL scheduling on the PBWP/SBWP. A base station may send (e.g., transmit) second DCI based on second DCI format (e.g., different from the existing DCI format) indicating SBWP activation/deactivation. The second DCI format may comprise at least one of: a BWP indicator; and/or a second field indicating activation or deactivation of an SBWP.

FIG. 28B shows an example DCI format comprising a BWP ID field and a second field. A wireless device may switch from the PBWP to a first BWP as a new PBWP, for example, if the wireless device receives the first DCI based on a particular DCI format (e.g., an existing DCI format, such as DCI format 1_0/1_1, or any other DCI format). The wireless device may receive first DCI, for example, based on the BWP indicator indicating the first BWP different from the PBWP and/or first DCI being transmitted via the PBWP. The wireless device may receive a DL assignment on (e.g., sent via) the PBWP, for example, after or in response to the BWP indicator indicating the PBWP.

A wireless device may switch from the SBWP to a second BWP as a new SBWP, for example, if the wireless device receives first DCI based on a particular DCI format (e.g., an existing DCI format such as DCI format 1_0/1_1, or any other DCI format). The wireless device may receive the first DCI, for example, based on the BWP indicator indicating the second BWP different from the SBWP and/or the first DCI being transmitted via the SBWP. The wireless device may receive a DL assignment on (e.g., sent via) the SBWP, for example, after or in response to the BWP indicator indicate the SBWP.

A wireless device may activate a third BWP indicated by the BWP indicator as a second SBWP, for example, if the wireless device receives the second DCI based on the second DCI format (e.g., different from DCI format 1_0/1_1). The wireless device may activate the third BWP, for example, based on the second field of the second DCI being a first value (e.g., "1" if a size of the second fields corresponds to one bit).

A wireless device may deactivate the SBWP indicated by the BWP indicator, for example, if the wireless device receives the second DCI based on the second DCI format (e.g., different from DCI format 1_0/1_1). The wireless device may deactivate the SBWP, for example, based on the second field of the second DCI being a second value (e.g., "0").

A base station may send (e.g., transmit) DCI based on a third DCI format (e.g., different from an existing format such as DCI format 1_0/1_1, or any other DCI format) indicating a PBWP switching or an SBWP activation, for example, if at most one SBWP is supported. The third DCI format may comprise at least one of: a BWP indicator; and/or a second field indicating a PBWP switching or an SBWP activation. The PBWP switching or the SBWP activation may be indicated based on a value of the second field. Activation of a BWP as a new SBWP may deactivate an active SBWP and activate the BWP as the new SBWP (e.g., at a time), for example, if at most one SBWP is supported.

A base station may send (e.g., transmit) the DCI based on the third DCI format to a wireless device. The wireless device may switch from the PBWP to a first BWP indicated by the BWP indicator, as a new PBWP, for example, if the wireless device receives the DCI and at most one SBWP is supported. The wireless device may switch from the PBWP to the first BWP, for example, based on the second field being a first value (e.g., "1" if a size of the second field corresponds to one bit). The wireless device may receive a DL assignment on (e.g., sent via) the PBWP, for example, if the BWP indicator indicates the PBWP.

The wireless device may activate a second BWP indicated by the BWP indicator, as a new SBWP, for example, if the wireless device receives the DCI based on the third DCI format and at most one SBWP is supported. The wireless device may activate the second BWP, for example, based on the second field being a second value (e.g., "0" if a size of the second field corresponds to one bit). The wireless device may deactivate a first SBWP (e.g., if the first SBWP is configured and in active state), for example, after or in response to activating the second BWP. The wireless device may receive a DL assignment on (e.g., sent via) the SBWP, for example, if the BWP indicator indicates the SBWP.

A base station may send (e.g., transmit) one or more DCIs (e.g., DCI format 1_0/1_1), to a wireless device, indicating an SBWP activation, an SBWP deactivation, or an SBWP switching, for example, based on at least one of: one or more values of one or more fields of the one or more DCIs; and/or whether the one or more DCIs are transmitted via a PBWP or via an SBWP. The one or more DCIs may be transmitted based on DCI format 1_0 or 1_1 indicating a PDSCH scheduling. The one or more fields may comprise at least one of: a carrier indicator; an identifier for a DCI format; a BWP indicator; a first field indicating a frequency domain resource assignment; a second field indicating a time domain resource assignment; a PUCCH resource indicator; a TPC command for a scheduled PUCCH; and/or a PDSCH-to-HARQ_feedback timing indicator. Reusing an existing DCI format (e.g., DCI format 1_0 or 1_1) for a BWP operation supporting multiple active BWPs may reduce blind decoding complexity at a wireless device. A PBWP may be in active state, for example, at least until receiving an RRC message.

The wireless device may switch the SBWP to a first BWP as a new SBWP indicated (e.g., identified) by the BWP indicator, for example, based on at least one of: the one or more DCIs being transmitted via the SBWP; the BWP indicator indicating the first BWP different from the PBWP and from the SBWP; a value of the first field or the second field being different from a first value (e.g., all zeros); and/or the value of the first field or the second field being different from a second value (e.g., all ones). The first value and/or the second value may be predefined (e.g., fixed).

The wireless device may activate a second BWP as a new SBWP indicated (e.g., identified) by the BWP indicator, for example, based on at least one of: the BWP indicator indicating the second BWP different from the PBWP and from the SBWP; and/or the value of the first field or the second field being the first value (e.g., all zeros). The wireless device may deactivate the SBWP, for example, based on at least one of: the one or more DCIs being transmitted via the PBWP; the BWP indicator indicating the SBWP different from the PBWP; and/or the value of the first field or the second field being the second value (e.g., all ones).

The wireless device may receive a DL assignment on (e.g., sent via) a PBWP, for example, based on the BWP indicator indicating the PBWP. The wireless device may receive a DL assignment on (e.g., sent via) an SBWP (e.g., without SBWP switching/activation/deactivation), for example, based on the BWP indicator indicating the SBWP. The wireless device may receive one or more DL data packets from a first PDSCH mapped on the PBWP, for example, after or in response to receiving the DL assignment via the PBWP. The wireless device may receive one or more DL data packets from a second PDSCH mapped on the SBWP, for example, after or in response to receiving the DL assignment via the SBWP.

The base station and the wireless device may dynamically activate an SBWP, deactivate an SBWP, and/or switch an SBWP to a new SBWP, for example, based on one or more fields of one or more DCIs. Transition latency and/or implementation cost of the wireless device may be reduced, and/or multiple active BWPs may be flexibly supported.

A base station may send (e.g., transmit) one or more DCIs indicating an SBWP activation, for example, if a PBWP and at most one SBWP are supported. The base station may send the one or more DCIS indicating the SBWP activation, for example, based on at least one of: the BWP indicator indicating a BWP different from the PBWP (e.g., if there is no SBWP in the cell); the BWP indicator indicating the BWP different from the SBWP; the one or more DCIs being transmitted via the PBWP; and/or the one or more DCIs being transmitted via the SBWP.

Activation of an SBWP may comprise deactivating a first SBWP and activating a first inactive BWP as the SBWP (e.g., at a time). Activation of an SBWP may comprise activating a first inactive BWP as the SBWP, for example, if there is no active SBWP before the activating.

The wireless device may receive a DL assignment via a PBWP (e.g., without PBWP switching), for example, based on the BWP indicator indicating the PBWP. The wireless device may receive a DL assignment via an SBWP (e.g., without SBWP switching/activation), for example, based on the BWP indicator indicating the SBWP. The wireless device may receive one or more DL data packets from a first PDSCH via the PBWP, for example, after or in response to receiving the DL assignment via the PBWP. The wireless device may receive one or more DL data packets from a second PDSCH via the SBWP, for example, after or in response to receiving the DL assignment via the SBWP. Blind decoding complexity and/or implementation cost of the wireless device may be reduced, and/or a PBWP and an SBWP (e.g., at most one SBWP) may be flexibly supported.

A base station may send (e.g., transmit), to a wireless device, a MAC CE to activate or deactivate an SBWP, for example, if an SBWP activation or deactivation is not urgent (or time sensitive). The base station may send (e.g., transmit) DCI to switch from a first SBWP to a second BWP as a second SBWP, for example, if a PBWP is in an active state until switched by an RRC message. FIG. 27A, FIG. 27B, FIG. 27C, and FIG. 27D show examples of a MAC CE and a corresponding MAC subheader for one or more SBWP activation/deactivation.

The base station may send (e.g., transmit) one or more DCIs (e.g., DCI format 1_0/1_1) to switch from a first SBWP to a second BWP as a second SBWP, for example, if one or more MAC CEs are used for activating/deactivating an SBWP and the PBWP is always in active state until switched by an RRC message. The base station may send the one or more DCIs to switch from the first SBWP to the second BWP, for example, based on at least one of: one or more values of one or more fields of the one or more DCIs; and/or whether the one or more DCIs are transmitted via a PBWP or via an SBWP. The wireless device may switch a first SBWP to a second BWP as a second SBWP indicated (e.g., identified) by the BWP indicator, for example, based on at least one of: the one or more DCIs being transmitted via the first SBWP; and/or the BWP indicator indicating the second BWP different from the PBWP and from the first SBWP.

The wireless device may receive a DL assignment via a PBWP, for example, based on the BWP indicator indicating the PBWP. The wireless device may receive a DL assignment via an SBWP (e.g., without SBWP switching), for example, based on the BWP indicator indicating the SBWP. The wireless device may receive one or more DL data packets from a first PDSCH via the PBWP, for example, after or in response to receiving the DL assignment via the PBWP. The wireless device may receive one or more DL data packets from a second PDSCH via the SBWP, for example, after or in response to receiving the DL assignment via the SBWP.

A base station may send (e.g., transmit) one or more DCIs indicating a PDSCH scheduling on a PBWP or an SBWP, for example, if a PBWP and at most one SBWP of a plurality of BWPs are supported and one or more MAC CEs are used for activating/deactivating an SBWP. The base station may send the one or more DCIs indicating the PDSCH scheduling, for example, based on a BWP indicator of the one or more DCIs. The wireless device may receive a DL assignment via a PBWP, for example, based on the BWP indicator indicating the PBWP. The wireless device may receive a DL assignment via an SBWP (e.g., without SBWP switching/activation), for example, based on the BWP indicator indicating the SBWP. The wireless device may receive one or more DL data packets from a first PDSCH via the PBWP, for example, after or in response to receiving the DL assignment via the PBWP. The wireless device may receive one or more DL data packets from a second PDSCH via the SBWP, for example, after or in response to receiving the DL assignment via the SBWP.

A wireless device may perform SBWP switching based on the one or more MAC CEs. A base station may send (e.g., transmit) the one or more MAC CEs indicating an activation of a second SBWP and/or a deactivation of a first SBWP, for example, by setting a second field of the one or more first fields corresponding the second SBWP to a first value (e.g., "1") and/or setting a first field of the one or more first fields corresponding to the first SBWP to a second value (e.g., "0"). The wireless device may switch from the first SBWP to the second SBWP, for example, after or in response to receiving the one or more MAC CEs. Combining MAC CE for SBWP activation/deactivation and DCI for SBWP switching may reduce blind decoding complexity and/or dynamic signaling overhead (e.g., DCI for SBWP activation/deactivation) to support multiple active BWPs in a cell.

One or more MAC CEs for SBWP activation/deactivation may introduce intolerant transition latency (e.g., which may be caused by scheduling the MAC CE in PDSCH resources at a base station and sending one or more HARQ feedbacks for the MAC CE in PUCCH/PUSCH resources at a wireless device) for some services (e.g., URLLC). A wireless device may receive multiple types of services, which may require a quick SBWP activation/deactivation. The transition latency may be reduced, for example, by introducing a first DCI format, which may be different from one or more other DCI formats (e.g., an existing DCI format such as DCI format 1_0/1_1, or any other DCI format). The first DCI format may comprise one or more fields indicating SBWP activation/deactivation/switching based on one or more values of the one or more fields of the first DCI format. The first DCI format may comprise at least one of: a BWP indicator; a second field (e.g., BWP action/mode indication) indicating one of SBWP activation, SBWP deactivation, and/or SBWP switching, for example, if a PBWP is in active state until switched/deactivated by an RRC message.

FIG. 29A shows an example of a first DCI format comprising a BWP ID field and an action indication field (e.g., a second field for indicating a change of a BWP). A wireless device may receive a DL assignment via a PBWP, for example, if the wireless device receives one or more DCIs based on the first DCI format. The wireless device may receive the DL assignment via the PBWP, for example, based on a BWP indicator indicating the PBWP and/or the second field being set to a first value (e.g., "00" if a size of the second field corresponds to two bits). A wireless device may receive a DL assignment via an SBWP, for example, if the wireless device receives one or more DCIs based on the first DCI format. The wireless device may receive the DL assignment via the SBWP, for example, based on the BWP indicator indicating the SBWP and/or the second field being set to a first value (e.g., "00").

The wireless device may activate a first BWP as an SBWP, for example, if the wireless device receives the one or more DCIs based on the first DCI format. The wireless device may activate the first BWP as an SBWP, for example, based on at least one of: the BWP indicator indicating the first BWP; and/or the second field being set to a second value (e.g., "01" if a size of the second field corresponds to two bits).

The wireless device may deactivate an SBWP, for example, if the wireless device receives the one or more DCIs based on the first DCI format. The wireless device may deactivate the SBWP, for example, based on at least one of: the BWP indicator indicating the SBWP; and the second field being set to a third value (e.g., "10").

The wireless device may switch an SBWP to a second BWP, for example, if the wireless device receives the one or more DCIs based on the first DCI format. The wireless device may switch the SBWP to the second BWP, for example, based on at least one of: the BWP indicator indicating the second BWP; the second BWP being different from the PBWP and from the SBWP; and/or the second field being set to a fourth value (e.g., "11").

FIG. 29B shows an example of second DCI format comprising a BWP ID field and an action indication field (e.g., a second field for indicating a change of a BWP). A base station may send (e.g., transmit) first DCI based on a DCI format (e.g., an existing DCI format such as DCI format 1_0/1_1, or any other DCI format) indicating SBWP switching, or DL scheduling on the PBWP/SBWP. A base station may send (e.g., transmit) second DCI based on the second DCI format (e.g., different from the existing DCI format, such as DCI format 1_0/1_1, or any other DCI format) indicating SBWP activation/deactivation. The second DCI format may comprise at least one of: a BWP indicator; and/or a second field indicating activation or deactivation of an SBWP.

A wireless device may switch from the SBWP to a first BWP as a new SBWP, for example, if the wireless device receives the first DCI based on the DCI format (e.g., an existing such as DCI format 1_0/1_1, or any other DCI format). The wireless device may switch from the SBWP to the first BWP, for example, based on the BWP indicator indicating the first BWP different from the SBWP and/or the first DCI being transmitted via the SBWP.

A wireless device may activate a second BWP indicated by the BWP indicator as a second SBWP, for example, if the wireless device receives the second DCI based on the second DCI format (e.g., different from DCI format 1_0/1_1 or another DCI format). The wireless device may activate the second BWP as the second SBWP, for example, based on the second field of the second DCI being a first value (e.g., "1" if a size of the second field corresponds to one bit). A wireless device may deactivate the SBWP indicated by the BWP indicator, for example, if the wireless device receives the second DCI based on the second DCI format (e.g., different from DCI format 1_0/1_1 or another DCI format). The wireless device may deactivate the SBWP indicated by the BWP indicator, for example, based on the second field of the second DCI being a second value (e.g., "0").

A base station may send (e.g., transmit) DCI based on a DCI format (e.g., an existing DCI format such as DCI format 1_0/1_1, or any other DCI format) indicating an SBWP activation, for example, if at most one SBWP is supported. A wireless device may activate a first BWP as a second SBWP, for example, based on the BWP indicator indicating the first BWP is different from a first SBWP and from the PBWP. The activating the first BWP as the second SBWP may comprise deactivating the first SBWP and activating the first BWP as the second SBWP (e.g., at a time), for example, if at most one SBWP is supported and the PBWP is in active state at least until switched/deactivated by an RRC message. The activating the first BWP as the second SBWP may comprise activating the first BWP as the second SBWP, for example, if there is no SBWP before the activating and/or if at most one SBWP is supported and the PBWP is in an active state at least until switched/deactivated by an RRC message.

A wireless device may support a plurality of active BWPs in a cell, for example, if a determination of a PBWP or an SBWP of the plurality of active BWPs is not performed. A base station may send (e.g., transmit) one or more DCIs indicating an active BWP switching, a BWP activation, a BWP deactivation, or a PDSCH scheduling on the active BWP, for example, based on at least one of: one or more values of one or more fields of the one or more DCIs. The one or more DCIs may be sent (e.g., transmitted) based on a DCI format (e.g., DCI format 1_0 or 1_1, or any other DCI format) indicating a PDSCH scheduling. The one or more fields may comprise at least one of: a carrier indicator; an identifier for a DCI format; a BWP indicator; a first field indicating a frequency domain resource assignment; a second field indicating a time domain resource assignment; a PUCCH resource indicator; a TPC command for scheduled PUCCH; and/or a PDSCH-to-HARQ_feedback timing indicator. Reusing a DCI format (e.g., an existing DCI format such as DCI format 1_0 or 1_1, or any other DCI format) for a BWP operation supporting multiple active BWPs may reduce blind decoding complexity at a wireless device.

A wireless device (e.g., with active BWPs in active state) may switch from a first active BWP to a second BWP indicated (e.g., identified) by the BWP indicator, for example, based on at least one of: the one or more DCIs being transmitted via the first active BWP; the BWP indicator indicating the second BWP different from the active BWPs; one or more values of the first field and/or the second field being different from a first value (e.g., all zeros); and/or the value of the first field or the second field being different from a second value (e.g., all ones).

A wireless device (e.g., tith active BWPs in active state) may activate a third BWP indicated (e.g., identified) by the BWP indicator, for example, based on at least one of: the BWP indicator indicating the third BWP different from the active BWPs; and/or the value of the first field or the second field being the first value (e.g., all zeros). A wireless device (e.g., with active BWPs in active state) may deactivate an active BWP, for example, based on at least one of: the BWP indicator indicating the active BWP; and/or the value of the first field or the second field being the second value (e.g., all ones).

A wireless device may receive a DL assignment via an active BWP (e.g., without active BWP switching), for example, based on at least one of: the BWP indicator indicating the active BWP; the value of the first field or the second field not being the first value (e.g., all zeros); and/or the value of the first field or the second field not being the second value (e.g., all ones). The wireless device may receive one or more DL data packets from a PDSCH via the active BWP, for example, after or in response to receiving the DL assignment via the active BWP.

A base station and/or a wireless device may dynamically switch/activate/deactivate a BWP based on one or more fields of one or more DCIs. Blind decoding complexity and implementation cost of the wireless device may be reduced and/or multiple active BWPs may be flexibly supported.

A wireless device may support a plurality of active BWPs in a cell, for example, if a determination of a PBWP or an SBWP of the plurality of active BWPs is not performed. A base station may send (e.g., transmit), to a wireless device, a MAC CE to activate or deactivate a BWP, for example, if BWP activation or deactivation is not urgent (e.g., not time sensitive). The base station may send (e.g., transmit) DCI to switch from a first active BWP to a second BWP as a second active BWP. FIG. 27A, FIG. 27B, FIG. 27C, and FIG. 27D show examples of a MAC CE and a corresponding MAC subheader for one or more BWP activation/deactivation.

A wireless device (e.g., with active BWPs in active state) may switch from a first active BWP to a second BWP indicated (e.g., identified) by the BWP indicator, for example, based on at least one of: the BWP indicator indicating the second BWP different from the active BWPs; and/or the DCI being transmitted via the first active BWP. A wireless device may receive a DL assignment via an active BWP (e.g., without active BWP switching), for example, based on the BWP indicator indicating the active BWP. A wireless device may receive one or more DL data packets from a PDSCH via the active BWP, for example, after or in response to receiving the DL assignment via the active BWP.

A wireless device may support a plurality of active BWPs in a cell, for example, if a determination of a PBWP or an SBWP of the plurality of active BWPs is not performed. One or more MAC CEs for SBWP activation/deactivation may introduce intolerant transition latency (e.g., caused by scheduling the MAC CE in PDSCH resources and sending one or more HARQ feedbacks for the MAC CE in PUCCH/PUSCH resources) for some services (e.g., URLLC). A wireless device may receive one or more of multiple types of services, at least some of which may require quick SBWP activation/deactivation. The transition latency by introducing a first DCI format, different from one or more other DCI formats (e.g., an existing DCI format such as DCI format 1_0/1_1, or any other DCI format), may be improved. The first DCI format may comprise one or more fields indicating one of BWP switching, BWP activation, and/or BWP deactivation, for example, based on one or more values of the one or more fields of the first DCI format. The first DCI format may comprise at least one of: a BWP indicator; and/or a second field (e.g., BWP action/mode indication) indicating one of BWP switching, BWP activation, and/or BWP deactivation.

FIG. 30A shows an example of a first DCI format comprising a BWP ID field and an action indication field (e.g., a second field for indicating a change of a BWP). A wireless device may switch a first active BWP to a first BWP as a second active BWP, for example, if the wireless device receives one or more DCIs based on the first DCI format and multiple BWPs are in active state. The wireless device may switch the first active BWP to the first BWP, for example, based on at least one of: the BWP indicator indicating the first BWP; the first BWP being different from the multiple BWPs; and/or the second field being set to a first value (e.g., "00" if a size of the second field corresponds to two bits). The wireless device may receive a DL assignment via an active BWP (e.g., without BWP switching), for example, based on the BWP indicator indicating the active BWP and/or the second field being set to a first value (e.g., "00" if a size of the second field corresponds to two bits).

The wireless device may activate a second BWP as an active BWP, for example, if the wireless device receives the one or more DCIs based on the first DCI format and multiple BWPs are in active state. The wireless device may activate the second BWP as an active BWP, for example, based on at least one of: the BWP indicator indicating the second BWP; and/or the second field being set to a second value (e.g., "01" if the size of the second field corresponds to two bits).

The wireless device may deactivate an active BWP, for example, if the wireless device receives the one or more DCIs based on the first DCI format and multiple BWPs are in active state. The wireless device may deactivate the active BWP, for example, based on at least one of: the BWP indicator indicating the active BWP; and the second field being set to a third value (e.g., "10" if the size of the second field corresponds to two bits).

The wireless device may switch a first active BWP to a third BWP, for example, if the wireless device receives the one or more DCIs based on the first DCI format and multiple BWPs are in active state. The wireless device may switch the first active BWP to the third BWP, for example, based on at least one of: the BWP indicator indicating the third BWP; the third BWP being different from the multiple BWPs; and/or the second field being set to a fourth value (e.g., "11" if the size of the second field corresponds to two bits).

FIG. 30B shows an example of a second DCI format comprising a BWP ID field and an action indication field (e.g., a second field for indicating a change of a BWP). A base station may send (e.g., transmit) first DCI based on a DCI format (e.g., an existing DCI format such as DCI format 1_0/1_1, or any other DCI format) indicating BWP switching, and/or DL scheduling on an active BWP.

A base station may send (e.g., transmit) second DCI based on the second DCI format (e.g., different from the first DCI format and/or different from an existing DCI format) indicating BWP activation/deactivation. The second DCI format may comprise at least one of: a BWP indicator; and/or a second field indicating activation or deactivation of a BWP.

A wireless device may switch from a first active BWP to a first BWP as a second active BWP, for example, if the wireless device receives the first DCI based on a DCI format (e.g., an existing DCI format such as DCI format 1_0/1_1, or any other DCI format) and multiple BWPs are in active states. The wireless device may switch from the first active BWP to the first BWP, for example, based on the BWP indicator indicating the first BWP different from the multiple active BWPs and/or the first DCI being transmitted via the first active BWP. The wireless device may receive a DL assignment via the first active BWP, for example, if the BWP indicator indicates the first active BWP.

A wireless device may activate a third BWP indicated by the BWP indicator as a second active BWP, for example, if the wireless device receives the second DCI based on the second DCI format (e.g., different from DCI format 1_0/1_1 or another DCI format). The wireless device may activate the third BWP as the second active BWP, for example, based on the second field of the second DCI being a first value (e.g., "1" if a size of the second field corresponds to one bit).

A wireless device may deactivate an active BWP indicated by the BWP indicator, for example, if the wireless device receives the second DCI based on the second DCI format (e.g., different from DCI format 1_0/1_1). The wireless device may deactivate the active BWP, for example, based on the second field of the second DCI being a second value (e.g., "0" if the size of the second field corresponds to one bit).

Some wireless devices (e.g., wireless devices compatible with LTE, LTE-Advanced, NR, etc.; and/or any other wireless device) may perform various monitoring in a cell. Such wireless devices may monitor a downlink radio link quality of a cell (e.g., a PCell or a PSCell). Such wireless devices may monitor a downlink radio link quality for detection of a failure event (e.g., failure event detection). A failure event may comprise, for example, a beam failure, a radio link failure, and/or any other loss and/or degradation of communication via one or more communication paths. The wireless device may monitor the downlink radio link quality, for example, for the purpose of a failure event indication to a higher layer of the wireless device (e.g., a MAC layer or an RRC layer). One or more wireless resources (e.g., BWPs) may be configured on the cell. The one or more wireless resources (e.g., BWPs) may comprise downlink resources (e.g., downlink BWPs) and/or uplink resources (e.g., uplink BWPs). The wireless device may send (e.g., transmit) and/or receive messages via an active resource (e.g., a single active BWP) of the one or more resources (e.g., BWPs) configured on the cell. Some or all of other resources (e.g., BWPs) configured on the cell may be inactive. The wireless device may monitor the downlink radio link quality on an active resource (e.g., an active BWP). The wireless device may refrain from monitoring the downlink radio link quality, for example, on other resources (e.g., other BWPs, such as inactive BWPs) of the one or more resources (e.g., BWPs) that may be configured on the cell.

Figure 31:
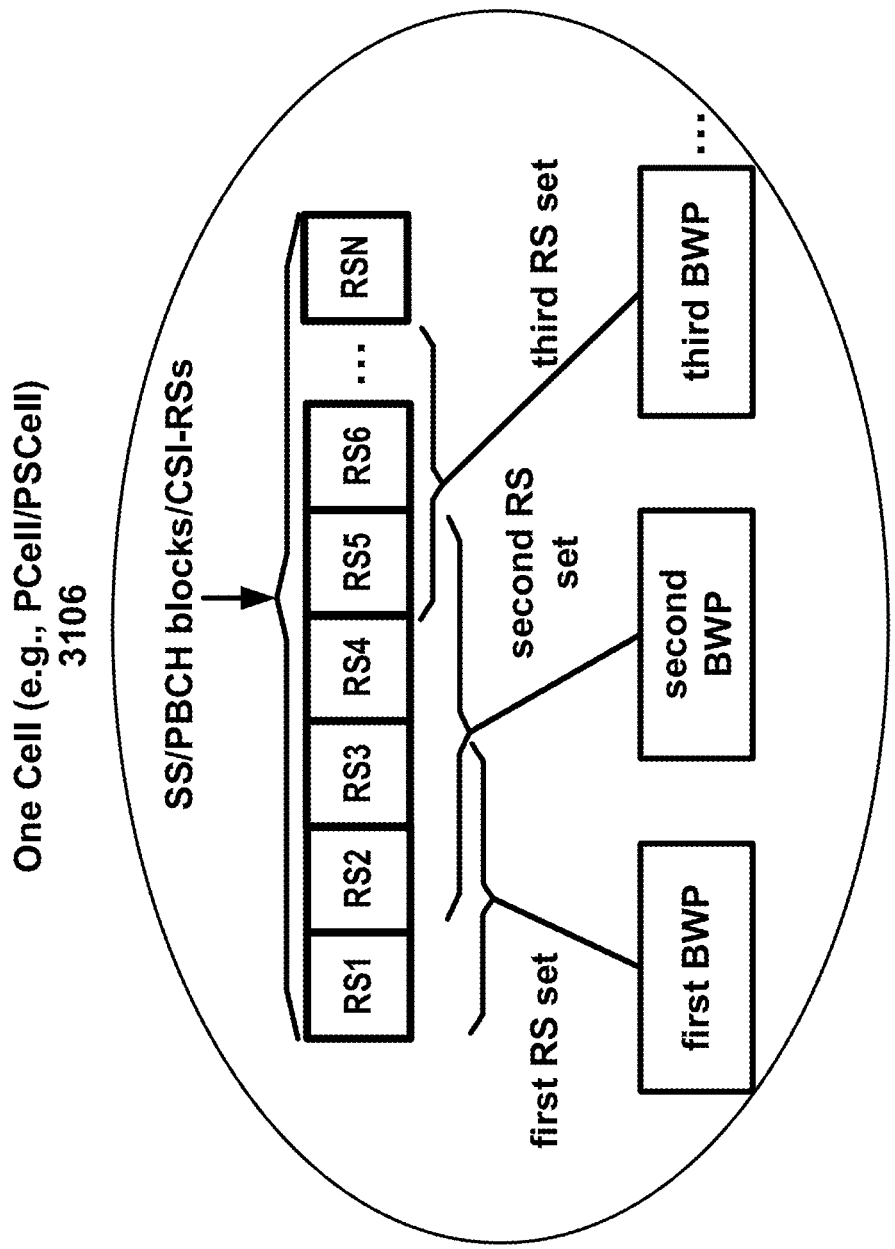
FIG. 31 shows an example configuration of bandwidth parts (BWPs) and corresponding sets of resources for failure event detection.

FIG. 31 shows an example of a configuration of BWPs and RSs in a cell 3106. A base station may send (e.g., transmit) one or more messages and/or data packets to a wireless device. The one or more messages and/or data packets may be received by a wireless device. The one or more messages and/or data packets may comprise configuration parameters. The configuration parameters may comprise, for example, resource configuration parameters such as BWP configuration parameters for one or more BWPs of a cell 3106. The cell 3106 may comprise a PCell, a PSCell, an SCell, or any other type of cell. The one or more BWPs may comprise a first BWP, a second BWP, and/or a third BWP (or any quantity of BWPs or other resources) of the cell 3106. The first BWP of the cell 3106 may be in an active state. The second BWP and the third BWP of the cell 3106 may each be in an inactive state.

The configuration parameters may comprise one or more failure event configuration parameters, for example, for each of the one or more BWPs. The one or more failure event configuration parameters may comprise a set of reference signal (RS) resource configurations for each BWP of the one or more BWPs. Each set of RS resource configurations may comprise one or more RSs (e.g., CSI-RS and/or SS blocks) for a corresponding BWP of the one or more BWPs. A first set of RS resource configurations may comprise one or more RSs (e.g., CSI-RS or SS blocks) for the first BWP. The wireless device may measure a downlink radio link quality associated with the one or more RSs for the first BWP for failure event detection, for example, for the first BWP and/or the cell 3106. A first RS set may be used for failure event detection associated with the first BWP when the first BWP is in active state, a second RS set may be used for failure event detection associated with a second BWP when the second BWP is in active state, and a third RS set may be used for failure event detection associated with a third BWP when the third BWP is in active state. Any quantity of RS sets may be used for failure event detection associated with any quantity of wireless resources (e.g., BWPs). The one or more failure event configuration parameters may comprise one or more thresholds for failure event detection.

Figure 32:
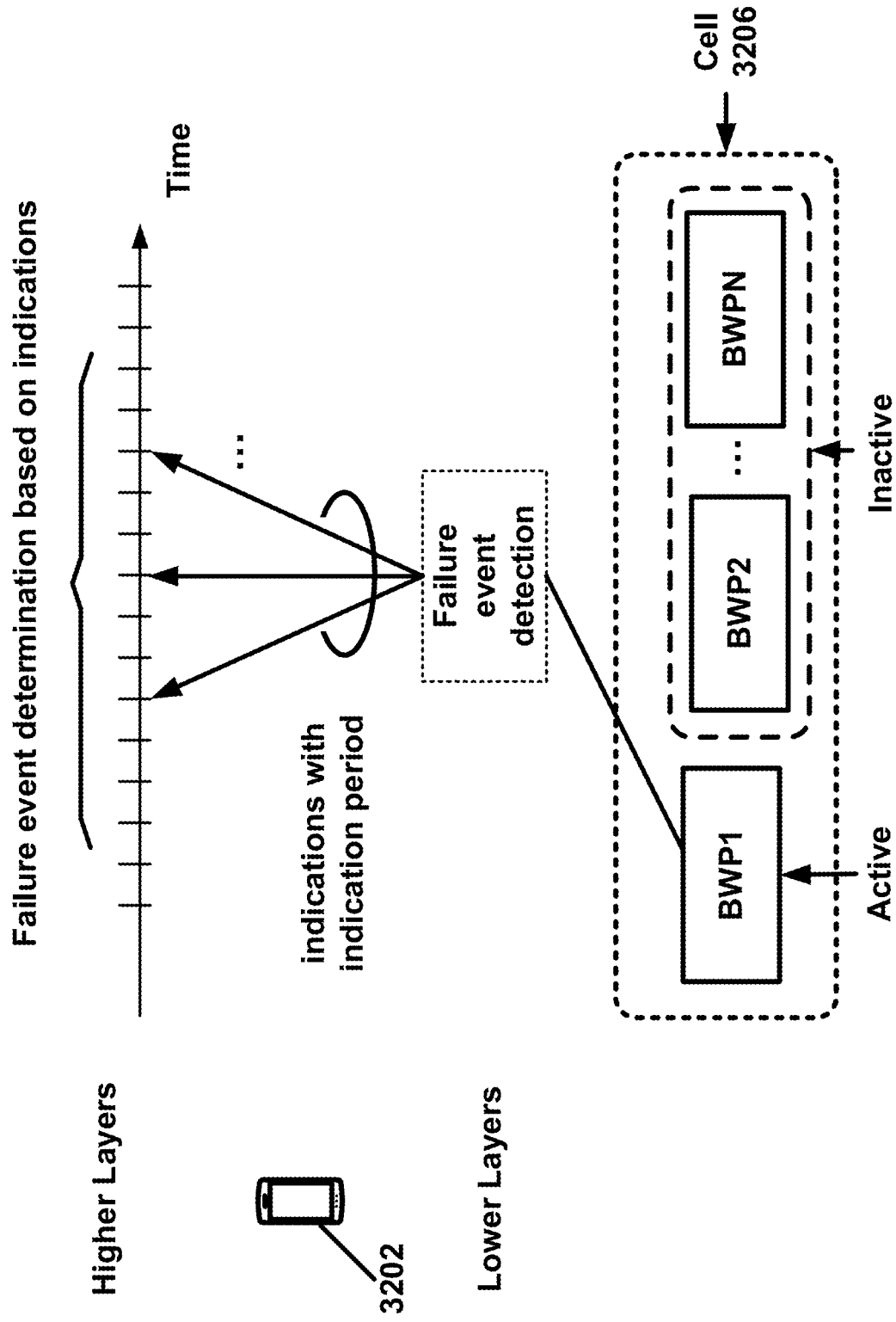
FIG. 32 shows an example of performing failure event detection on an active BWP.

FIG. 32 shows an example of monitoring a downlink radio link quality. A wireless device 3202 may monitor a downlink radio link quality in an active BWP (e.g., the first BWP) for failure event detection. The wireless device 3202 may be in a service coverage of cell 3206. The cell 3206 may comprise one or more resources (e.g., BWPs), such as a first BWP (BWP1), a second BWP (BWP2), and/or any other BWPs (BWPN). The first BWP may be active (e.g., BWP1). The second BWP (BWP2) may be inactive. Other BWPs (BWPN) may be inactive. The physical layer of the wireless device 3202 may provide (e.g., send) an indication, for example, via a higher layer (e.g., a MAC layer) of the wireless device 3202, based on monitoring the downlink radio link quality. The physical layer of the wireless device 3202 may send one or more indications, for example, if the downlink radio link quality for the one or more RSs for the first BWP has a block error rate (BLER) greater than a threshold. The threshold may comprise a failure event detection threshold that may be sent via one or more failure event configuration parameters or other configuration parameters. The wireless device may periodically (e.g., according to an indication period) provide (e.g., send) the one or more indications to a higher layer. The duration of one or more indication periods (e.g., periodicity) may be determined based on the one or more failure event configuration parameters. The wireless device 3202 may determine a failure event, for example, based on the one or more indications received by a higher layer of the wireless device 3202.

A cell may be configured with two or more active resources (e.g., two or more active BWPs in a cell). A wireless device may perform failure event detection on the two or more active resources (e.g., two or more active BWPs). Power consumption of the wireless device may increase, for example, if the wireless device performs RLM, BFD, or other failure event operation on the two or more active BWPs. The wireless device may perform RLM, BFD, or other failure event operation on an active resource (e.g., a single active BWP) from the two or more active resources (e.g., two or more active BWPs). The wireless device may select (e.g., autonomously select) an active resource (e.g., an active BWP) from the two or more active resources (e.g., from two or more active BWPs). Measurement accuracy for failure event detection may be reduced, for example, if the wireless device performs failure event on an active resource (e.g., on the active BWP) that may be determined (e.g., selected) autonomously by the wireless device.

A wireless device may perform failure event detection for each active resource (e.g., each active BWP) separately. A base station may be configured with two or more active resources (e.g., a first active BWP and a second active BWP in a cell). The wireless device may perform a first failure event detection for a first active resource (e.g., the first active BWP). The wireless device may perform a second failure event detection for a second active resource (e.g., a second active BWP). The wireless device may detect a failure event, for example, based on the first failure event detection and/or the second failure event detection.

A wireless device may perform failure event detection for each active resource (e.g., each active BWP) jointly. A base station may be configured with two or more active resources (e.g., a first active BWP and a second active BWP in a cell). The wireless device may perform failure event detection on a first active resource (e.g., the first active BWP) and a second active resource (e.g., the second active BWP) jointly. The wireless device may detect a failure event from a failure event detection that may be based on the first active BWP and the second active BWP.

A wireless device may perform failure event detection via an active resource (e.g., via an active BWP) of the two or more active resource (e.g., BWPs). The active resource (e.g., BWP) may be determined (e.g., selected) based on one or more criteria. The active resource (e.g., BWP) that may be determined (e.g., selected) may be aligned between the wireless device and a base station, for example, based on one or more rules (e.g., predefined rule, rule sent by RRC message, etc.).

A base station may communicate with a wireless device via two or more active BWPs in a cell (e.g., a PCell, a PSCell, an SCell, etc.). The two or more active BWPs may each be a downlink BWP. The base station may send (e.g., transmit) one or more types of data services via different active BWPs in parallel (e.g., simultaneously and/or overlapped in time). The wireless device may receive the one or more types of data services via different active BWPs in parallel (e.g., simultaneously and/or overlapped in time). The wireless device may perform failure event detection, for example, if two or more active BWPs are in an active state in the cell. The wireless device may be unable to determine how to perform failure event detection on the cell using an active BWP, for example, if two or more active BWPs overlap in time in the cell. The wireless device may be unable to determine how to select the active BWP from the two or more active BWPs to perform failure event detection. The wireless device may be unable to determine how to provide a failure event detection indication, for example, if the wireless device is capable of performing failure event detection on the two or more active BWPs in parallel (e.g., based on downlink radio link qualities on the two or more active BWPs). FIGS. 33-40 show examples of failure event detection on a cell (e.g., a PCell, a PSCell, an SCell, etc.) by a wireless device, for example, if the cell is configured with two or more active resource (e.g., two or more active BWPs).

Figure 33:
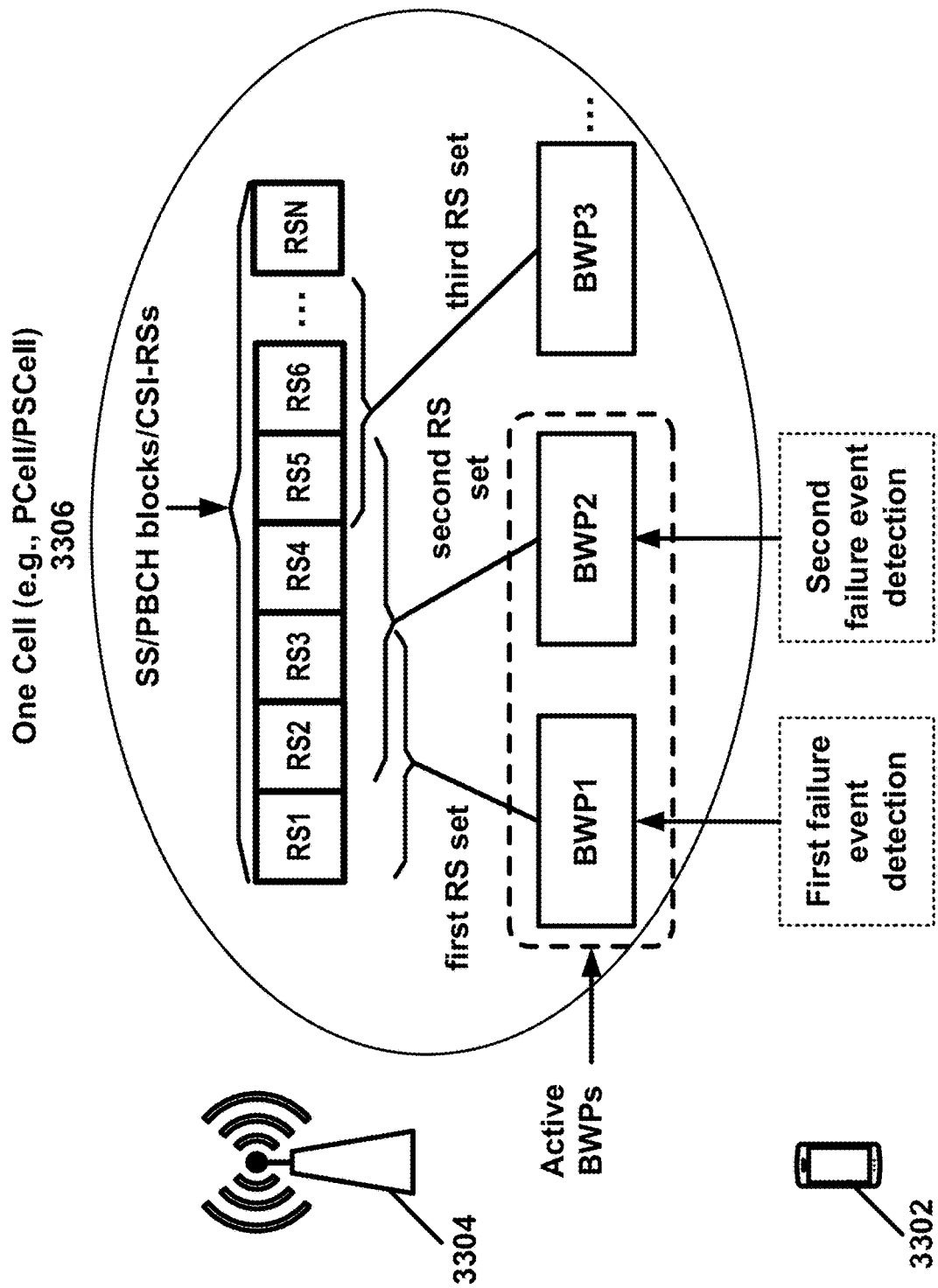
FIG. 33 shows an example configuration of two or more active BWPs and corresponding sets of resources for failure event detection.

FIG. 33 shows an example of failure event detection for two or more active resources (e.g., two or more active BWPs). The failure event detection may be performed separately, for example, separate failure event detection per resource (e.g., per BWP). A base station 3304 may send (e.g., transmit) one or more messages and/or data packets to the wireless device 3302. The wireless device 3302 may receive the one or more messages and/or data packets. The one or more messages and/or data packets may comprise configuration parameters of a cell 3306. The cell 3306 may comprise, for example, a PCell, a PSCell, an SCell, or any other cell type. The configuration parameters may comprise BWP configuration parameters for one or more BWPs. The one or more BWPs may comprise a first BWP, a second BWP, a third BWP. The first BWP may be an active BWP. The second BWP may be an active BWP. The third BWP may be an inactive BWP. The configuration parameters may comprise one or more failure event detection configuration parameters for each BWP of the one or more BWPs (e.g., for each of the first BWP and the second BWP, for example if the first BWP is active and/or the second BWP is active). The one or more failure event detection configuration parameters may comprise a set of BWP-specific RS resource configurations for each BWP of the one or more BWPs. A first set of BWP-specific RS resource configurations for the first BWP may comprise one or more first RSs (e.g., CSI-RS and/or SS blocks) associated with the first BWP. A second set of BWP-specific RS resource configurations for the second BWP may comprise one or more second RSs (e.g., CSI-RS and/or SS blocks) associated with the second BWP. The one or more first RSs may be RSs of the first BWP (e.g., a first RS set for failure event detection). The one or more second RSs may be RSs of the second BWP (e.g., a second RS set for failure event detection).

The base station 3304 and/or the wireless device 3302 may activate two or more BWPs of the one or more BWPs. The two or more BWPs may comprise a first BWP and a second BWP. Activating the two or more BWPs may comprise activating the first BWP of the two or more BWPs in a first slot and/or activating a second BWP of the two or more BWPs in a second slot. The first slot may be different from the second slot. The first slot may or overlap with the second slot. The first slot may refrain from overlapping with the second slot.

Each BWP of the two or more BWPs may be associated with a set of BWP-specific RS resources for failure event detection. Failure event detection may comprise providing one or more failure event detection indications. A first set of BWP-specific RS resources for the first BWP may comprise one or more first RSs (e.g., CSI-RS and/or SS blocks) associated with the first BWP. A second set of BWP-specific RS resources for the second BWP may comprise one or more second RSs (e.g., CSI-RS and/or SS blocks) associated with the second BWP.

The wireless device 3302 may perform failure event detection on each of the two or more BWPs, for example, based on the two or more BWPs being in active state in the cell 3306. Failure event detection may comprise assessing a downlink radio link quality on each of the two or more BWPs (e.g., the first BWP and the second BWP). Failure event detection assessing a downlink radio link quality may comprise evaluating the downlink radio link quality based on comparing measurements of BWP-specific resources, associated with the first BWP and the second BWP, with one or more thresholds. A threshold may correspond to a value sent or provided by a higher layer (e.g., an RRC layer or a MAC layer) of the wireless device 3302. The threshold may be BWP-specific. The threshold may be cell-specific (e.g., specific to the cell 3306).

The physical layer of the wireless device 3302 may compare a first downlink radio link quality of the one or more first RSs to a first threshold. The physical layer of the wireless device 3302 may compare a second downlink radio link quality of the one or more second RSs to a second threshold. The first threshold may correspond to a value sent or provided by a higher layer of the wireless device 3302 (e.g., an RRC layer or a MAC layer). The second threshold may be a second value sent or provided by a higher layer of the wireless device 3302 (e.g., the RRC layer or the MAC layer).

The physical layer of the wireless device 3302 may send a failure event detection indication for each of the two or more BWPs, for example, if the downlink radio link quality, based on the set of BWP-specific resources of each of the two or more BWPs, has a BLER that is greater than a threshold. The physical layer of the wireless device 3302 may send or provide a failure event detection indication to a higher layer (e.g., the MAC layer) of the wireless device 3302. The wireless device 3302 may send or provide a failure event detection indication via a higher layer periodically (e.g., based on a period specific to a BWP). The physical layer of the wireless device 3302 may send or provide a first failure event detection indication for the first BWP via a higher layer (e.g., the MAC layer), for example, if the first downlink radio link quality (e.g., based on a set of first BWP-specific resources of the first BWP) has a BLER that is greater than a first threshold. The wireless device 3302 may send or provide a first failure event detection indication via a higher layer periodically (e.g., based on a period specific to the BWP). The physical layer of the wireless device 3302 may send or provide a second failure event detection indication for the second BWP to a higher layer (e.g., the MAC layer), for example, if the second downlink radio link quality (e.g., based on a set of second BWP-specific resources of the second BWP) has a BLER that is greater than the second threshold. The wireless device 3302 may send or provide the second failure event detection indication to a higher layer periodically (e.g., based on a period specific to the BWP).

Performing failure event detection indication on the first BWP of the two or more BWPs may be independent from performing failure event detection on the second BWP of the two or more BWPs. The wireless device 3302 may determine a failure event based on one or more indications (e.g., a failure detection event indication, a first failure event detection indication, and/or a second failure event detection indication) received by a higher layer of the wireless device 3302.

The cell 3306 may be associated with one or more RSs (e.g., RS1, RS2, ..., RSN) and/or one or more BWPs (e.g., BWP1, BWP2 and BWP3, ...). BWP1 may be associated with RS1, RS2 and RS3, for example, for failure event detection. BWP2 may be associated with RS2, RS3, RS4 and RS5, for example, for failure event detection. BWP3 may be associated with RS5, RS6, ..., RSN. The wireless device 3302 may perform a first failure event detection based on RS1, RS2 and RS3. The wireless device 3302 may perform a second failure event detection based on RS2, RS3, RS4 and RS5 on BWP2, for example, if BWP1 and BWP2 are in an active state.

Figure 34:
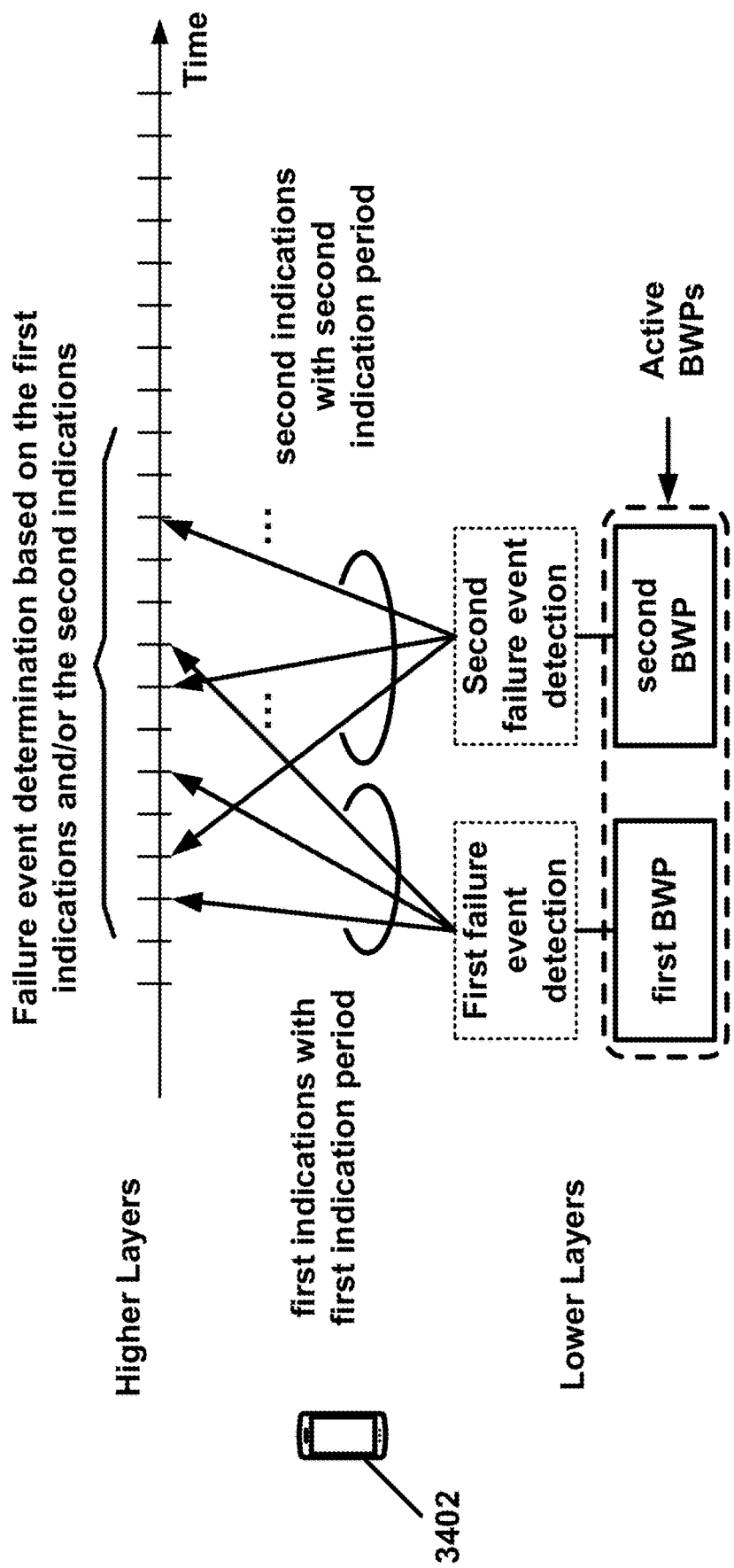
FIG. 34 shows an example of performing failure event detection on two or more active BWPs separately.

FIG. 34 shows an example of the wireless device 3402 performing failure event detection on one or more frames. The physical layer of the wireless device 3402 may indicate a first failure event detection indication (e.g., periodically based on a first BWP-specific period) on a first active BWP. The physical layer of the wireless device 3402 may indicate the first failure event detection indication to a higher layer of the wireless device 3402 (e.g., the MAC layer or the RRC layer). The physical layer of the wireless device 3402 may indicate a second failure event detection indication (e.g., periodically based on a second BWP-specific period) on a second active BWP. The physical layer of the wireless device 3402 may indicate the second failure event detection indication to a higher layer of the wireless device 3402. The first indications may be associated with first indication periods. The second indications may be associated with second indication periods. The first indication periods may be different from, and/or may refrain from overlapping with, the second indication periods.

The wireless device 3402 may assess downlink radio link quality of two or more active BWPs in the cell. The wireless device 3402 may detect a failure event, for example, based on downlink radio link qualities of the two or more active BWPs. Measurement results of downlink radio link quality may be more accurate based on the two or more active BWPs relative to measurement results of downlink radio link quality on a single active BWP. Unnecessary failure event detection may be avoided and/or additional declaration of a failure event may be avoided, for example, if the wireless device 3402 assesses downlink radio link quality of two or more active BWPs in the cell. Indicating one or more failure event detection indications on one or more active BWPs with one or more different periodicities may increase efficiency for failure event detection.

Figure 35:
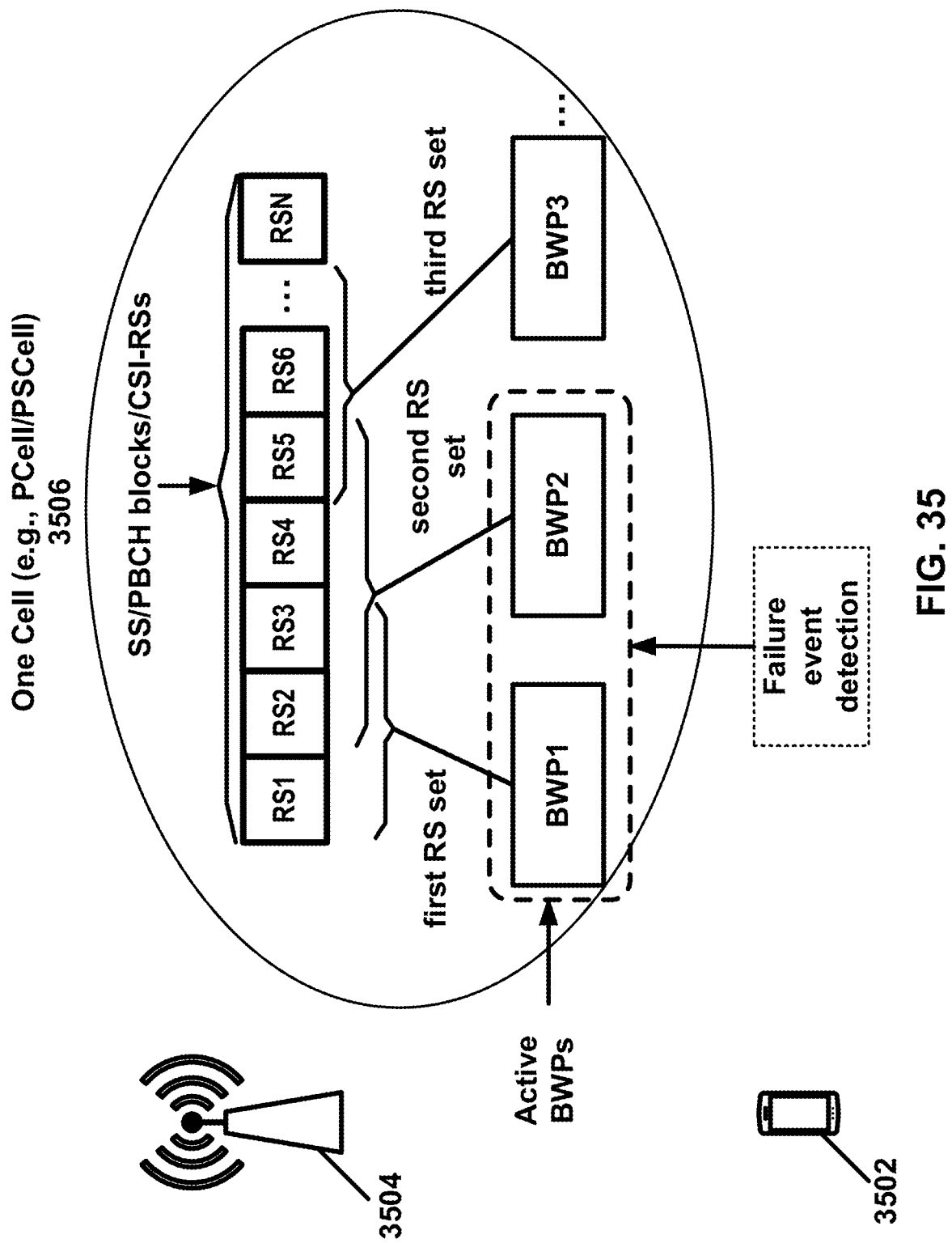
FIG. 35 shows an example configuration of two or more active BWPs and corresponding sets of resources for failure event detection.

FIG. 35 shows an example of failure event detection on two or more active BWPs. The failure event detection may be performed on two or more active BWPs jointly. A base station 3504 may send (e.g., transmit), to a wireless device 3502, one or more messages and/or data packets. The wireless device 3502 may receive the one or more messages and/or data packets. The one or more messages and/or data packets may comprise configuration parameters of a cell 3506. The cell 3506 may comprise a PCell. The cell may comprise a PSCell of an SCG, for example, if the cell 3506 comprises the SCG. The cell 3506 may comprise an SCell or any other cell type. The configuration parameters may indicate that the cell 3506 comprises one or more BWPs. The configuration parameters may indicate a set of resources (e.g., one or more RSs) on one or more BWPs for failure event detection. The set of resources may be indicated by a set of resource indexes. The set of resources may be a subset of one or more SS/PBCH blocks and/or of one or more CSI-RS resources. The one or more messages and/or data packets may indicate one or more thresholds comprising a first threshold for evaluating the downlink radio link quality of the cell 3506.

The base station 3504 and/or the wireless device 3502 may activate two or more BWPs of the one or more BWPs (e.g., BWP1 and BWP2). Each of the two or more BWPs may be associated with a set of resources for failure event detection.

The wireless device 3502 may perform failure event detection on the two or more BWPs, for example, if the two or more BWPs are in an active state in the cell 3506. Failure event detection may comprise assessing, for example, at least one time per an indication period, a downlink radio link quality on the two or more BWPs. Assessing a downlink radio link quality on the two or more BWPs may comprise comparing the downlink radio link quality, based on one or more sets of resources associated with the two or more active BWPs, over a time period to a threshold. The threshold may correspond to a value sent by a higher layer (e.g., an RRC layer or a MAC layer) of the wireless device 3502. The threshold may be BWP-specific. The threshold may be cell-specific (e.g., specific to the cell 3506).

The cell 3506 may be associated with one or more RSs (e.g., RS1, RS2, . . . , RSN) and one or more BWPs (e.g., BWP1, BWP2 and BWP3, . . . ). BWP1 may be associated with a first set of BWP-specific RS resources (e.g., RS1, RS2, and RS3) for a first failure event detection. BWP2 may be associated with a second set of BWP-specific RS resources (e.g., RS2, RS3, RS4, and RS5) for a second failure event detection. BWP1 and BWP2 may be in an active state. The physical layer of the wireless device 3502 may assess a downlink radio link quality of the cell 3506, for example, based on one or more sets of RSs comprising the first set of BWP-specific RS resources and the second set of BWP-specific RS resources. The one or more set of RSs may comprise, for example, RS1, RS2, RS3, RS4, and RS5. The physical layer of the wireless device 3502 may assess the downlink radio link quality of the cell 3506 by comparing the one or more sets of RSs over a time period to the threshold.

The physical layer of the wireless device 3502 may send a failure event detection indication via a higher layer of the wireless device 3502, for example, based on the downlink radio link quality assessed. The downlink radio link quality may be assessed based on the one or more sets of RSs. The physical layer of the wireless device 3502 may send the failure event detection indication, for example, if the one or more sets of RSs has a BLER greater than the threshold, for example, in one or more frames. The wireless device 3502 may perform failure event detection operation of the cell 3506, for example, jointly on one or more active BWPs (e.g., the BWP1 and the BWP2).

Figure 36:
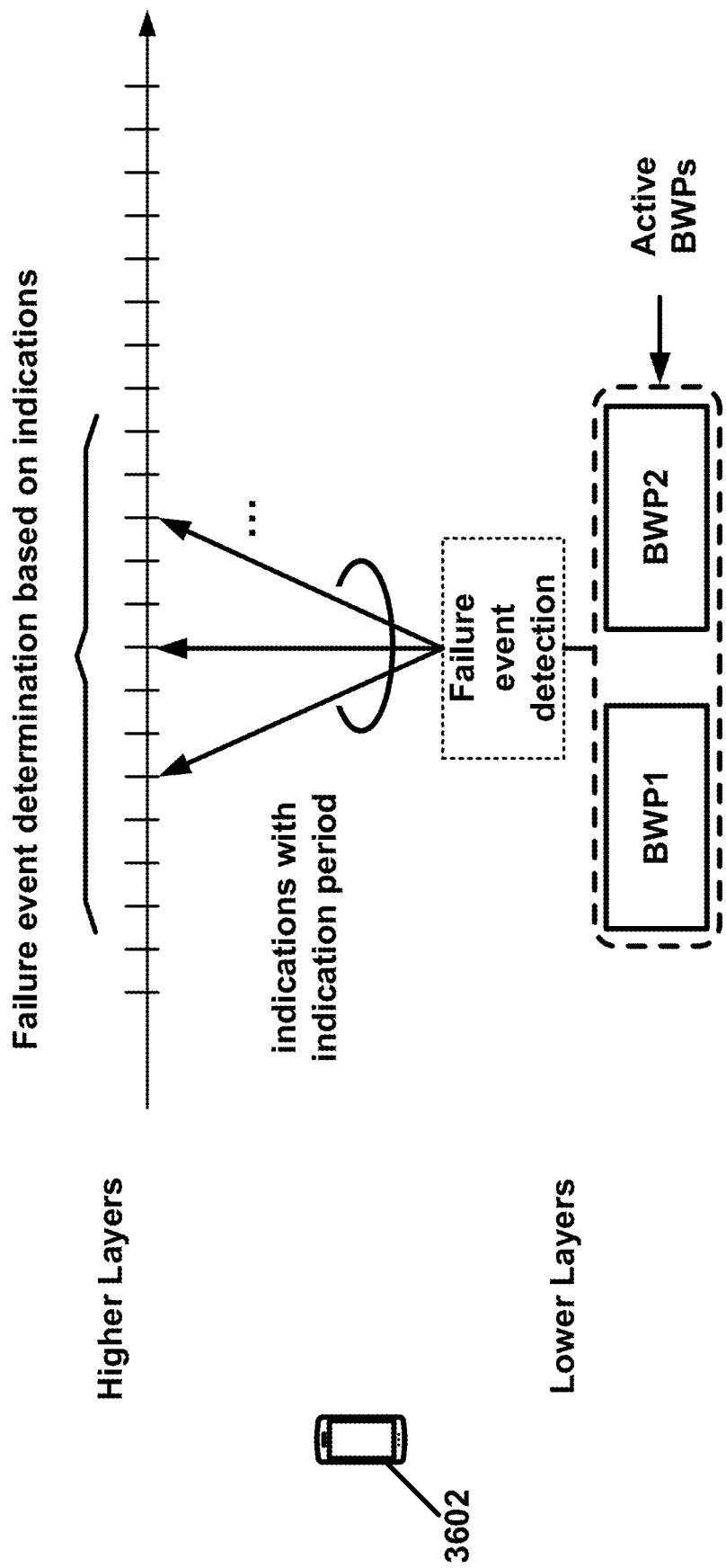
FIG. 36 shows an example of performing failure event detection on two or more active BWPs jointly.

FIG. 36 shows an example of failure event detection (e.g., on one or more frames and/or subframes). A wireless device 3602 may perform failure event detection operation jointly on a first BWP (BWP1) and a second BWP (BWP2), for example, on the one or more frames and/or subframes. The physical layer of the wireless device 3602 may send a failure event detection indication based on the failure event detection with an indication period on the one or more frames 3602. The physical layer of the wireless device 3602 may send a failure event detection indication (e.g., periodically) based on the failure event detection. The physical layer of the wireless device 3602 may perform the failure event detection based on one or more sets of RSs of BWP1 and BWP2. The physical layer of the wireless device 3602 may send the failure event detection indication via a higher layer of the wireless device 3602 (e.g., the MAC layer or the RRC layer). The higher layer of the wireless device 3602 may determine a failure event based on a quantity of the failure event detection indications. The higher layer of the wireless device 3502 may determine a failure, for example, if the quantity of failure event detection indications equals or is greater than a failure event detection threshold.

The physical layer of the wireless device 3602 may provide via a higher layer of the wireless device 3602 a failure event detection indication with an indication period (e.g., periodically). The failure event detection indication may be based on failure event detection on one or more sets of RSs of two or more active BWPs. Inefficiencies of a failure event detection indication to the higher layer of the wireless device 3602 may be reduced by performing the failure event detection on one or more sets of RSs of two or more active BWPs. Inefficiencies of determining a failure event may be reduced. A higher layer of the wireless device 3602 may reuse failure event detection resources to support two or more active BWPs in the cell, for example, by performing failure event detection on one or more sets of RSs of two or more active BWPs.

A first downlink radio link quality on a first active BWP of the two or more active BWPs may correspond with a second downlink radio link quality on a second active BWP of the two or more active BWPs. Power consumption of the wireless device may be increased by performing failure event detection on two or more active BWPs independently. By performing failure event detection operation jointly on a first BWP (BWP1) and a second BWP (BWP2), or on any quantity of multiple active BWPs jointly, the wireless device 3602 may conserve power and perform accurate failure event detection for multiple active BWPs.

Figure 37:
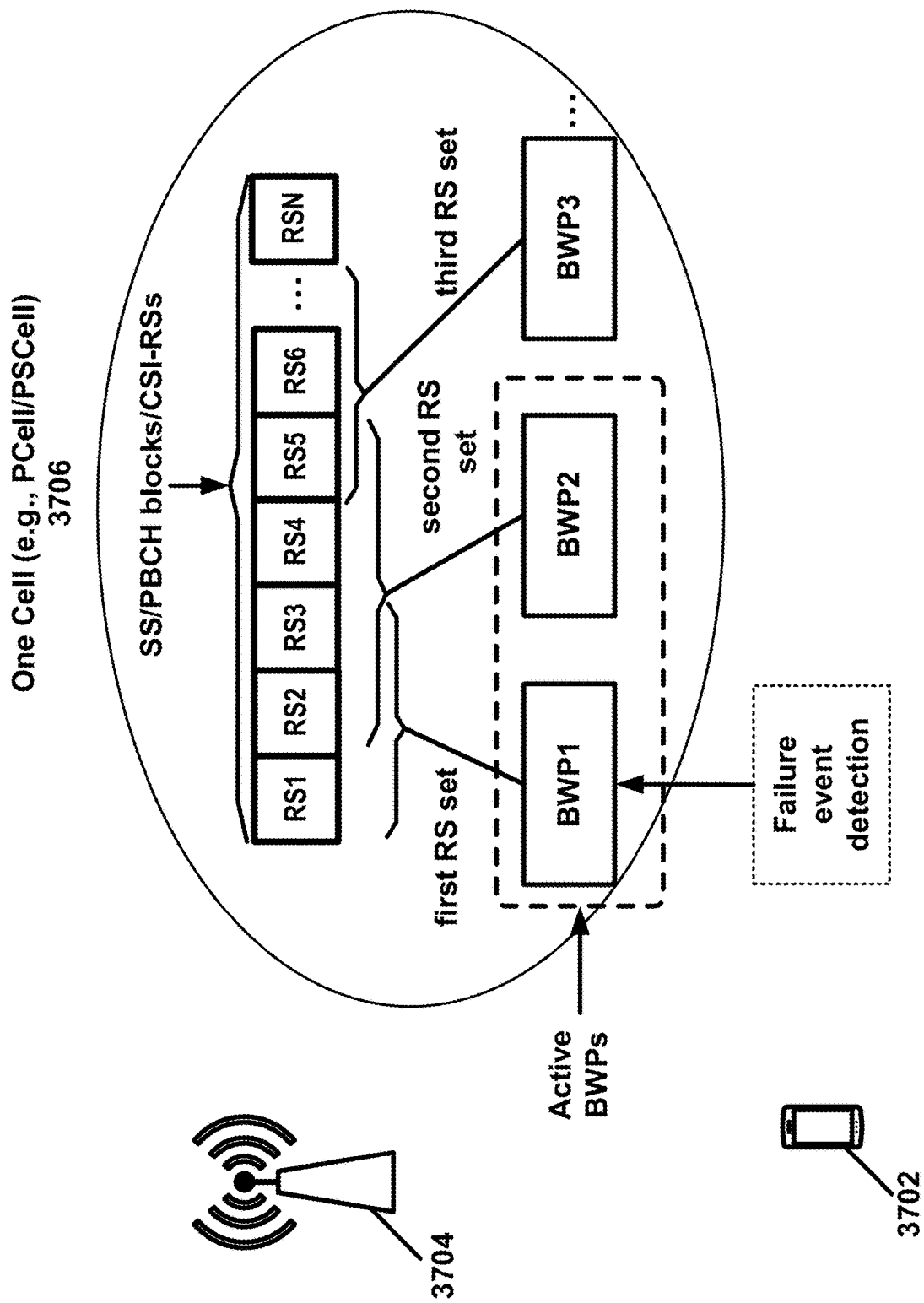
FIG. 37 shows an example configuration of two or more active BWPs and corresponding sets of resources for failure event detection.

FIG. 37 shows an example of a failure event detection on a determined (e.g., selected) active resource (e.g., a selected active BWP). A wireless device 3702 may perform failure event detection that may result in a reduced power consumption, for example, by the wireless device 3702 determining (e.g., selecting) an active BWPs from multiple active BWPs. A base station 3704 may send (e.g., transmit) one or more messages and/or data packets. The wireless device 3702 may receive the one or more messages and/or data packets. The one or more messages and/or data packets may comprise configuration parameters of a cell 3706. The cell 3706 may comprise a PCell. The cell may comprise a PSCell of an SCG, for example, if the cell 3706 comprises the SCG. The cell may comprise an SCell or any other cell type.

The configuration parameters may indicate that the cell 3706 comprises one or more BWPs. The configuration parameters may indicate a set of resources (e.g., one or more RSs) on at least one BWP of the one or more BWPs for failure event detection. The set of resources may be indicated by a set of resources indexes. The set of resources may be a subset of one or more SS/PBCH blocks and/or one or more CSI-RS resources. The one or more messages and/or data packets may indicate one or more thresholds comprising a first threshold for evaluating a downlink radio link quality of the cell 3706. The first threshold may be cell-specific (e.g., specific to the cell 3706). The first threshold may be BWP-specific. The one or more messages and/or data packets may indicate a first BWP-specific threshold associated with each BWP of the one or more BWPs.

The base station 3704 and/or the wireless device 3702 may activate two or more BWPs of the BWPs (e.g., the BWP1 and the BWP2). Each of the two or more BWPs may be associated with a set of resources for failure event detection. The wireless device 3702 may select a BWP of the two or more BWPs based on one or more criteria. The wireless device may perform failure event detection on the BWP determined (e.g., selected) based on the one or more criteria. The one or more criteria may comprise at least one of: a BWP index; a numerology index; a service type; a failure event detection RSs configuration; a PDCCH configuration; and/or any other indication.

Each of the two or more BWPs may be indicated by a BWP index. The wireless device 3702 may select the BWP of the two or more BWPs with a lowest BWP index of the two or more BWPs. The wireless device 3702 may perform failure event detection on the BWP. The BWP with the lowest BWP index may be a BWP on which the wireless device 3702 receives system information. Monitoring on the BWP with the lowest BWP index may help maintain a non-interrupted link for receiving system information, for example, from base station 3704. The wireless device 3702 may select the BWP with a highest BWP index of the two or more BWPs. The BWP with the highest BWP index may be a BWP on which the wireless device 3702 receives urgent data packets (e.g., URLLC). Monitoring on the BWP with the highest BWP index may help maintain a non-interrupted link for receiving urgent data packets, for example, from the base station 3704.

Each of the two or more BWPs may be associated with a numerology index. The wireless device 3702 may select the BWP of the two or more BWPs with a lowest numerology index among the two or more BWPs. The BWP with the lowest numerology index may be a BWP on which the wireless device 3702 receives system information and/or paging information. Monitoring on the BWP with the lowest numerology index may help maintain a robust link for receiving system information and/or paging information, for example, from the base station 3704. The wireless device 3702 may select the BWP of the two or more BWPs with a highest numerology index among the two or more BWPs. The wireless device may perform failure event detection on the BWP.

Each of the two or more BWPs may be associated with a BWP-specific failure event detection maximum counter. The wireless device 3702 may select the BWP of the two or more BWPs with a lowest BWP-specific failure event detection maximum counter among the two or more BWPs. Failure event detection may be performed faster based on the BWP with the lowest BWP-specific failure event detection maximum counter. A robust link with the base station 3704 may be faster based on monitoring on the BWP with the lowest BWP-specific failure event detection maximum counter. The wireless device 3702 may select the BWP of the two or more BWPs with a highest BWP-specific failure event detection maximum counter among the two or more BWPs. The wireless device 3702 may perform failure event detection on the BWP.

The base station 3704 may send (e.g., transmit) a first type of service (e.g., eMBB) on a first active BWP of the two or more active BWPs. The base station 3704 may send (e.g., transmit) a second type of service (e.g., MTC) on a second active BWP of the two or more active BWPs. The first type of service may be prioritized over the second type of service (e.g., by the wireless device 3702). The wireless device 3702 may select the BWP from the first active BWP and the second active BWP based on a type of service with a highest priority among the first type of service and the second type of service.

The first active BWP may be configured with failure event detection RSs. The second active BWP may lack configuration with failure event detection RSs. The wireless device 3702 may select the BWP to be the first active BWP that may be configured with failure event detection RSs. The first active BWP may be configured with PDCCH resources. The second active BWP may lack configuration with PDCCH resources. The wireless device 3702 may select the BWP to be the first active BWP that may be configured with PDCCH resources. The first active BWP may be configured with common search space for PDCCH monitoring. The second active BWP may lack configuration with common search space for PDCCH monitoring. The wireless device may select the BWP to be the first active BWP that may be configured with common search space.

The first active BWP may be a primary active BWP. The second active BWP may be a secondary active BWP. The wireless device 3702 may select the BWP to be the primary active BWP. The wireless device may perform failure event detection on the primary active BWP. The primary active BWP may be a BWP on which the wireless device 3702 may: perform an initial connection establishment procedure; initiate a connection re-establishment procedure; and/or monitor PDCCH candidates in one or more common search spaces for DCI formats with CRC scrambled by an SI-RNTI, an RA-RNTI, a TC-RNTI, a P-RNTI, an INT-RNTI, an SFI-RNTI, a TPC-PUSCH-RNTI, a TPC-PUCCH-RNTI, a TPC-SRS-RNTI, a CS-RNTI, an SP-CSI-RNTI, and/or a C-RNTI. The primary active BWP may be a BWP that may be maintained in an active state, for example, at least until the BWP is switched to another BWP (e.g., by an RRC message). The primary active BWP may be a first BWP in a licensed band. The secondary active BWP may be a second BWP in an unlicensed band. The primary active BWP may be a first BWP used with a first radio interface (e.g., a Uu interface between a base station and a wireless device). The secondary active BWP may be a second BWP used with a second radio interface (e.g., a sidelink interface between a first wireless device and a second wireless device).

The two or more active BWPs may be grouped into two active BWP groups. The wireless device 3702 may select a first active BWP from a first BWP group and a second active BWP from a second BWP group. The first BWP group may be in a low frequency (e.g., <6 GHz or other frequency). The second BWP group may be in a high frequency (e.g., >6 GHz or other frequency). The first BWP group may be in a licensed band. The second BWP group may be in an unlicensed band. The first active BWP and the second active BWP may be primary active BWPs. The wireless device 3702 may perform failure event detection on the first active BWP and the second active BWP independently. Monitoring the first active BWP in the low frequency and the second active BWP in the high frequency may provide the higher layer of the wireless device 3702 more radio link information over a wide bandwidth.

The wireless device 3702 may perform failure event detection on the BWP (e.g., the selected active BWP of the two or more active BWPs). Failure event detection may comprise assessing a radio link quality on the BWP, for example, determined (e.g., selected) based on one or more criteria. The downlink radio link quality may be assessed at least one time per indication period. Assessing a radio link quality on the determined (e.g., selected) active BWP may comprise evaluating the downlink radio link quality based on, for example, comparing failure event detection RSs associated with the BWP over a time period to the threshold. A first BWP (BWP1) may be associated with the first RS set for failure event detection (e.g., RS1, RS2, and RS3). A second BWP (BWP2) may be associated with the second RS set for failure event detection (e.g., RS2, RS3, RS4, and RS5). A third BWP (BWP3) may be associated with the third RS set for failure event detection (e.g., RS5, RS6, . . . RSN). BWP1 and BWP2 may be in an active state. The wireless device 3702 may select a BWP from BWP1 and BWP2 for failure event detection, for example, based on the one or more criteria. The determined (e.g., selected) BWP may be BWP1 based on the one or more criteria. The physical layer of the wireless device 3702 may assess a downlink radio link quality of the cell 3706 based on RS1, RS2 and RS3 of BWP1. The physical layer of the wireless device 3702 may assess the downlink radio link quality of the cell 3706 based on RS1, RS2 and RS3 of BWP1, for example, by comparing the downlink radio quality link over a time period to the threshold.

Figure 38:
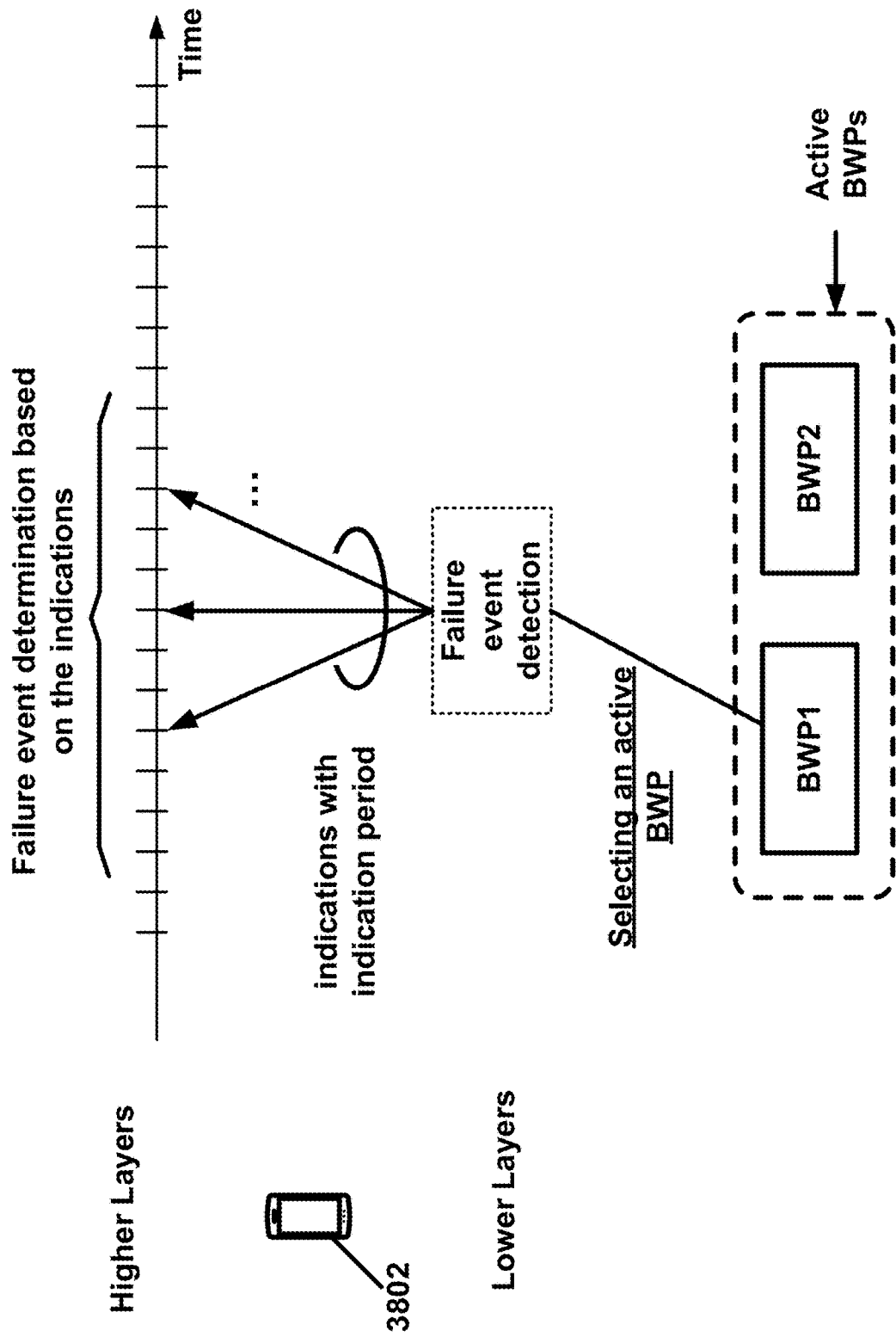
FIG. 38 shows an example of performing failure event detection on a selected active BWP.

FIG. 38 shows an example of failure event detection. The failure event detection may be on one or more frames and/or subframes. The wireless device 3802 may select a first BWP (BWP1) to perform failure event detection based on the one or more criteria. The physical layer of the wireless device 3802 may send a failure event detection indication via a higher layer of the wireless device 3802, for example, based on an indication period on the one or more frames and/or subframes. The physical layer of the wireless device 3802 may send a failure event detection indication via the higher layer of the wireless device 3802, for example, periodically.

The wireless device 3802 may detect a failure event based on a first failure event detection counter of the BWP1 being equal to or greater than a first number or quantity. The first quantity may be configured based on one or more RRC messages.

The wireless device 3802 may select an active BWP (e.g., BWP1) of two or more active BWPs (e.g., BWP1 and BWP 2) to perform failure event detection. Inefficiencies of failure event detection at the wireless device 3802 may be reduced by determining (e.g., selecting) an active BWP of the two or more active BWPs. Power consumption at the wireless device 3802 may be reduced by determining (e.g., selecting) an active BWP of the two or more active BWPs for failure event detection. Speed of failure event detection at the wireless device 3802 may be increased by determining (e.g., selecting) an active BWP of the two or more active BWPs.

Figure 39:
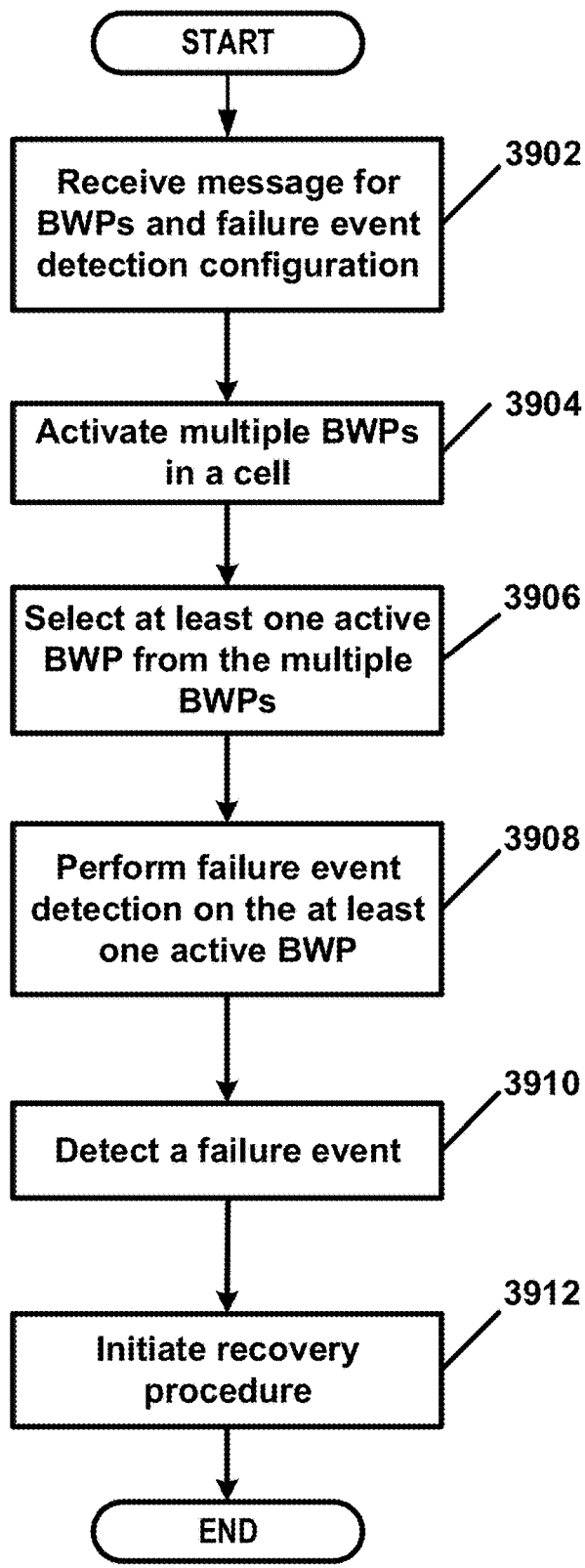
FIG. 39 shows an example method of determining a failure event.

FIG. 39 shows an example method for detecting a failure event. At step 3902, a wireless device may receive one or more RRC messages. The one or more RRC messages may be received from a base station. The one or more RRC message may comprise configuration parameters of a cell. The cell may comprise one or more BWPs. Each BWP of the one or more BWPs may be indicated by a BWP-specific index. Each BWP of the one or more BWPs may be associated with one or more RSs, for example, for failure event detection. Failure event detection may comprise at least one of a failure event detection indication and/or initiation of a recovery procedure.

At step 3904, the wireless device may activate two or more BWPs of the BWPs. At step 3906, the wireless device may select at least one BWP of the two or more BWPs based on one or more criteria. At step 3908, the wireless device may perform failure event detection, for example, based on the one or more reference signals associated with the at least one BWP. At step 3910, the wireless device may determine a failure event. The failure event may be detected based on failure event detection performed at step 3908. At step 3912, the wireless device may initiate a recovery procedure.

Figure 40:
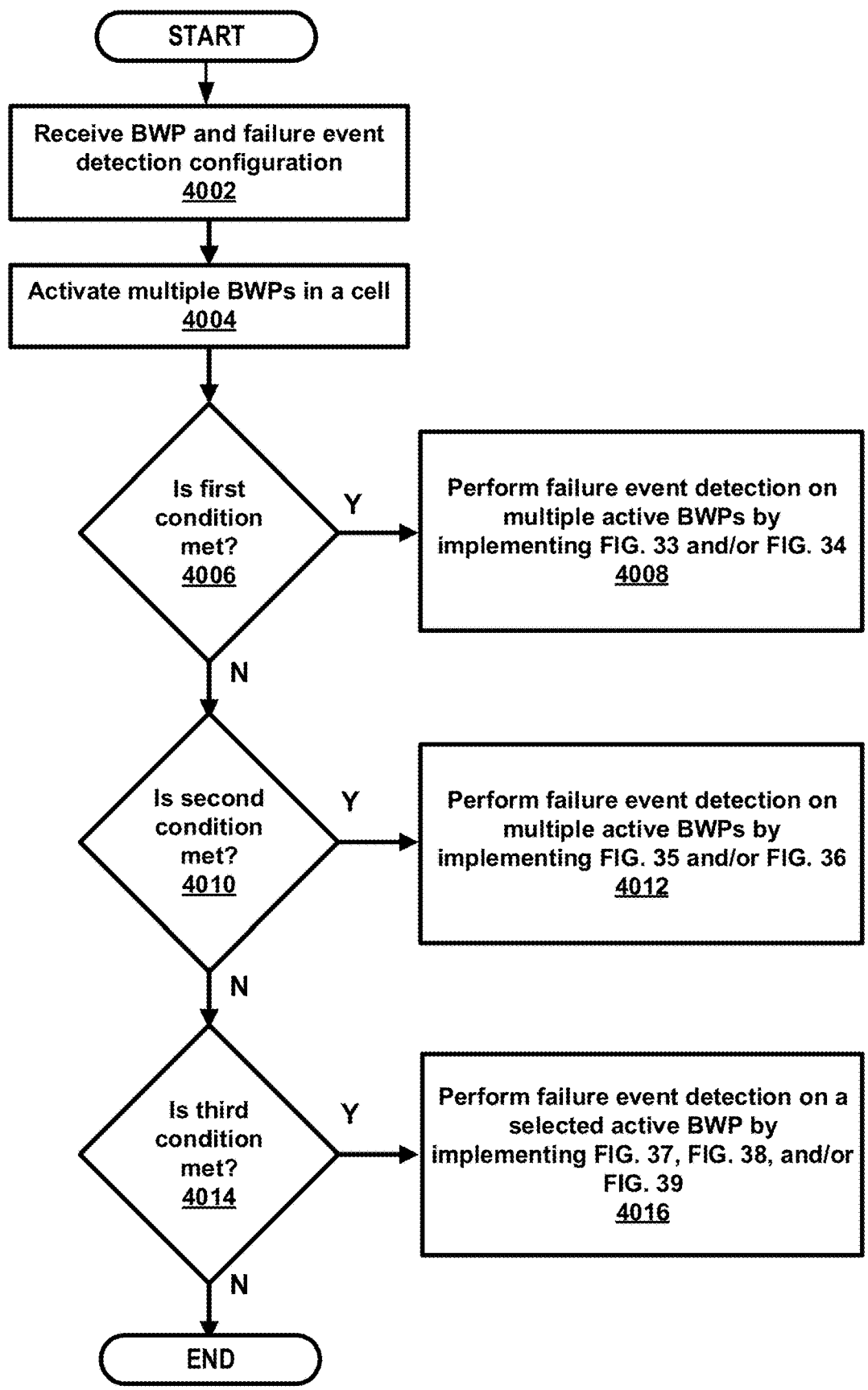
FIG. 40 shows an example method for a wireless device determining a failure event.

FIG. 40 shows an example method for a wireless device determining a failure event. The wireless device may determine the failure event autonomously. The wireless device may determine the detection of a failure event with two or more active BWPs configured in a cell. A base station may unaware of detection of a failure event by the wireless device. At step 4002, the wireless device may receive one or more messages and/or data packets. The one or more messages may comprise BWP configuration parameters. The one or more messages and/or data packets may comprise configuration parameters for failure event detection. At step 4004, one or more BWPs in the cell may be activated.

At step 4006, the wireless device may determine if a first condition is met. Determining if the first condition is met may comprise determining if all active BWPs are configured in an unlicensed band and/or if a speed of failure event detection is to be increased. Step 4008 may be performed if the first condition is met. At step 4008, the wireless device may perform failure event detection on two or more active BWPs, for example, as shown in FIG. 33 and/or FIG. 34. Step 4010 may be performed if the first condition is not met.

At step 4010, the wireless device may determine if a second condition is met. Determining if the second condition is met may comprise determining if all active BWPs are configured in a licensed band and/or if a measurement accuracy of failure event detection is to be improved and/or if a robustness of failure event detection is to be improved. Step 4012 may be performed if the second condition is met. At step 4012, the wireless device may perform failure event detection on two or more active BWPs, for example, as shown in FIG. 35 and/or FIG. 36. Step 4014 may be performed if the second condition is not met.

At step 4014, the wireless device may determine if a third condition is met. Determining if the third condition is met may comprise determining if all active BWPs have a similar channel quality (e.g., operate intra-band). Step 4016 may be performed if the second condition is met. At step 4016, the wireless device may perform failure event detection on a determined (e.g., selected) active BWP, for example, as shown in FIG. 37, 38, and/or FIG. 39.

The steps shown in the method of FIG. 40 may be implemented in any order and are not limited to the order shown in FIG. 40. For example, step 4010 and/or step 4014 may be performed before or after step 4006, and/or step 4014 may be performed before or after step 4006 and/or step 4010. The wireless device may determine performing failure event detection on two or more active BWPs, for example, if the wireless device is capable of monitoring radio link quality on the two or more active BWPs. The wireless device may determine performing failure event detection on an active BWP (e.g., jointly or independently), for example, if the wireless device is capable of monitoring radio link quality on the active BWP. The wireless device may select (e.g., autonomously select) the active BWP from the two or more active BWPs.

A wireless device may be configured to perform some or all of the operations described herein. The wireless device may be similar to, or the same as, each of the wireless devices described herein, including, for example, wireless devices 3202, 3302, 3402, 3502, 3602, 3702, and 3802.

Some wireless devices (e.g., wireless devices compatible with LTE, LTE-Advanced, NR, etc.; and/or any other wireless device) may perform various monitoring for a cell. Such wireless devices may monitor a downlink radio link quality of a cell, such as a PCell (e.g., of an MCG). Such wireless devices may monitor a first downlink radio quality of the PCell, for example, for the purpose of indicating an out-of-sync status and/or an in-sync status to a higher layer of the wireless device (e.g., a MAC layer or an RRC layer). One or more BWPs may be configured on the PCell. The wireless device may send (e.g., transmit) and/or receive, one or more messages and/or data packets via an active BWP (e.g., a single active BWP) of the one or more BWPs configured on the PCell. The other BWPs configured on the PCell (e.g., some or all of the other BWPs configured on the PCell) may be inactive. The wireless device may monitor the first downlink radio link quality in the active BWP. The wireless device may refrain from monitoring the first downlink radio link quality, for example, in other BWPs of the one or more BWPs configured on the PCell (e.g., may refrain from monitoring in any inactive BWP).

Some wireless devices (e.g., wireless devices compatible with LTE, LTE-Advanced, NR, etc.; and/or any other wireless device) may monitor a second downlink radio link quality of a PSCell of an SCG, for example, for the purpose of indicating an out-of-sync status and/or an in-sync status to a higher layer of the wireless device. The wireless device may monitor the second downlink radio link quality of the PSCell of the SCG, for example, if the wireless device is configured with the SCG. The wireless device may monitor the second downlink radio link quality of the PSCell of the SCG, for example, if a first parameter (e.g., rlf-TimersAndConstantsSCG) is sent by the higher layer, for example, and is not set to release. One or more BWPs may be configured on the PSCell. The wireless device may send (e.g., transmit) and/or receive one or more messages and/or data packets via an active BWP (e.g., a single active BWP) of the one or more BWPs configured on the PSCell. Other BWPs configured on the PSCell (e.g., some or all of the other BWPs configured on the PCell) may be inactive. The wireless device may monitor the second downlink radio link quality in the active BWP. The wireless device may refrain from monitoring the second downlink radio link quality, for example, in other BWPs of the one or more BWPs configured on the PSCell (e.g., may refrain from monitoring in any inactive BWP).

Figure 41:
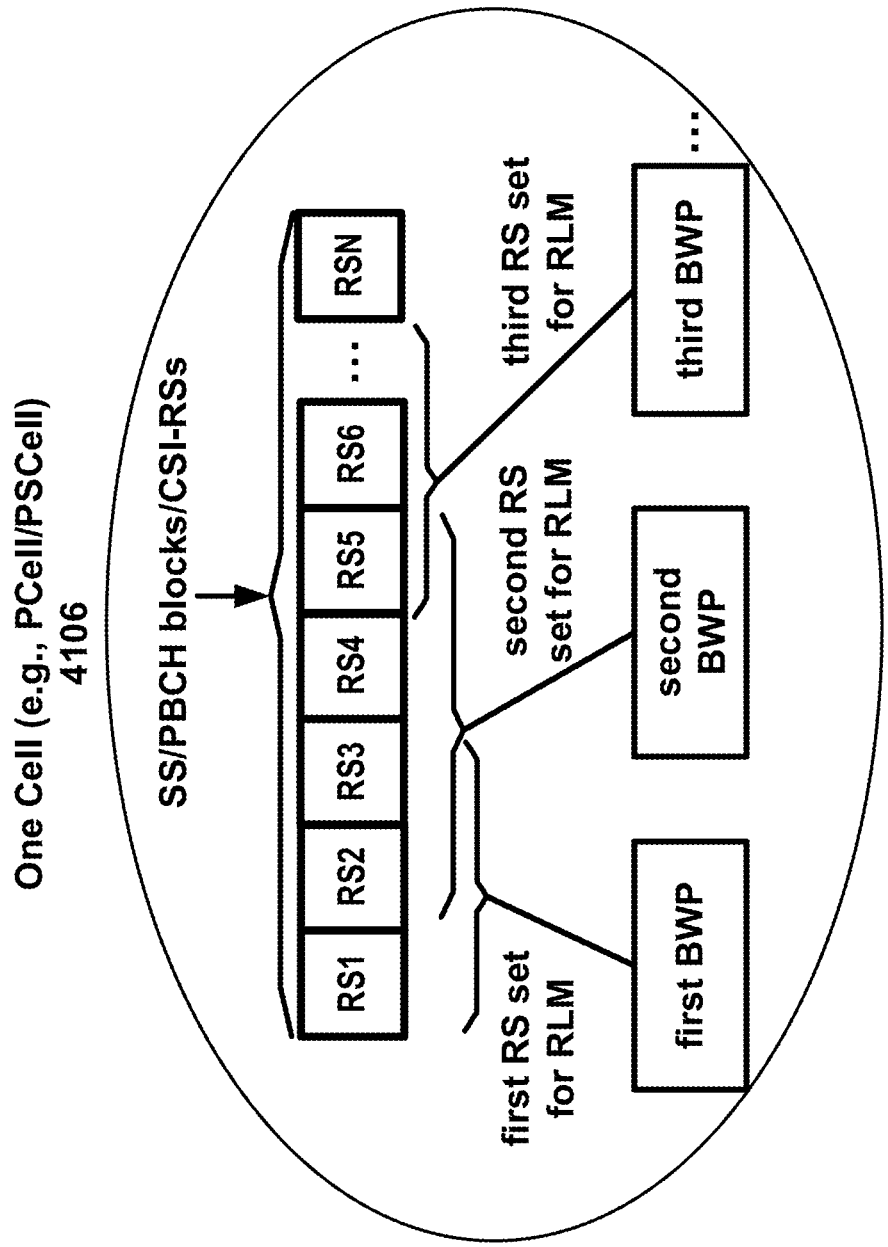
FIG. 41 shows an example configuration of BWPs and corresponding sets of resources for radio link monitoring (RLM).

FIG. 41 shows an example of one or more message and/or data packets that a base station may send (e.g., transmit). The one or more messages and/or data packets may be received by a wireless device. The one or more messages and/or data packets may comprise parameters indicating at least one of a first timer value for a first timer (e.g., t310), a first number or quantity (e.g., n310), and a second number or quantity (e.g., n311). The first timer value may be a value (e.g., 0, 50, 100, 200, 500, 1000, 2000, etc.) for example, measured in milliseconds. The first timer and/or first timer value may be used by the wireless device to determine an RLF, for example, if the first timer expires. The first quantity may comprise a positive number (e.g., 1, 2, 3, 4, 6, 8, 10, 20, etc.). The first quantity may be used to count a consecutive number of out-of-sync indications. The second number may comprise a positive number (e.g., 1, 2, 3, 4, 5, 6, 8, 10, etc.). The second number may be used to count a consecutive number of in-sync indications.

The one or more messages and/or data packets may comprise, for example, configuration parameters of one or more BWPs of a cell 4106. The cell 4106 may comprise, for example, a PCell or a PSCell. The configuration parameters may indicate, for example, on each of the one or more BWPs, a set of resources (e.g., RSs) for radio link monitoring (RLM). The set of resources may be indicated by a set of resource indexes (e.g., RS1, RS2, etc.). The set of resources may be referred to as RLM RSs. The set of resources may comprise, for example, a subset of one or more SS/PBCH blocks and/or a subset of one or more CSI-RS resources. A first message may comprise a first RS set for RLM associated with a first BWP. A second message may comprise a second RS set for RLM associated with a second BWP. A third message may comprise a third RS set for RLM associated with a third BWP. Any quantity of messages may comprise a corresponding RS for RLM associated with a corresponding BWP or other wireless resource. The first BWP may be associated with a first RS set for RLM that may comprise, for example, RS1, RS2, and RS3. The second BWP may be associated with a second RS set for RLM that may comprise, for example, RS2, RS3, RS4, and RS5. The third BWP may be associated with a third RS set for RLM that may comprise, for example, RS5, RS6, RSN. One or more RSs may be included in one or more RS sets for RLM (e.g., for overlapping RS sets).

The one or more messages and/or data packets may comprise one or more thresholds, for example, for evaluating a downlink radio link quality of the cell 4106. The one or more thresholds may comprise a first threshold (e.g., $Q_{out}$) and/or a second threshold (e.g., $Q_{in}$). The first threshold, for example, may correspond to a first block error rate (BLER) value (e.g., $10^{-1}$ or $10^{-2}$). The second threshold, for example, may correspond to a second BLER value (e.g., $10^{-2}$ or $10^{-5}$).

Figure 42:
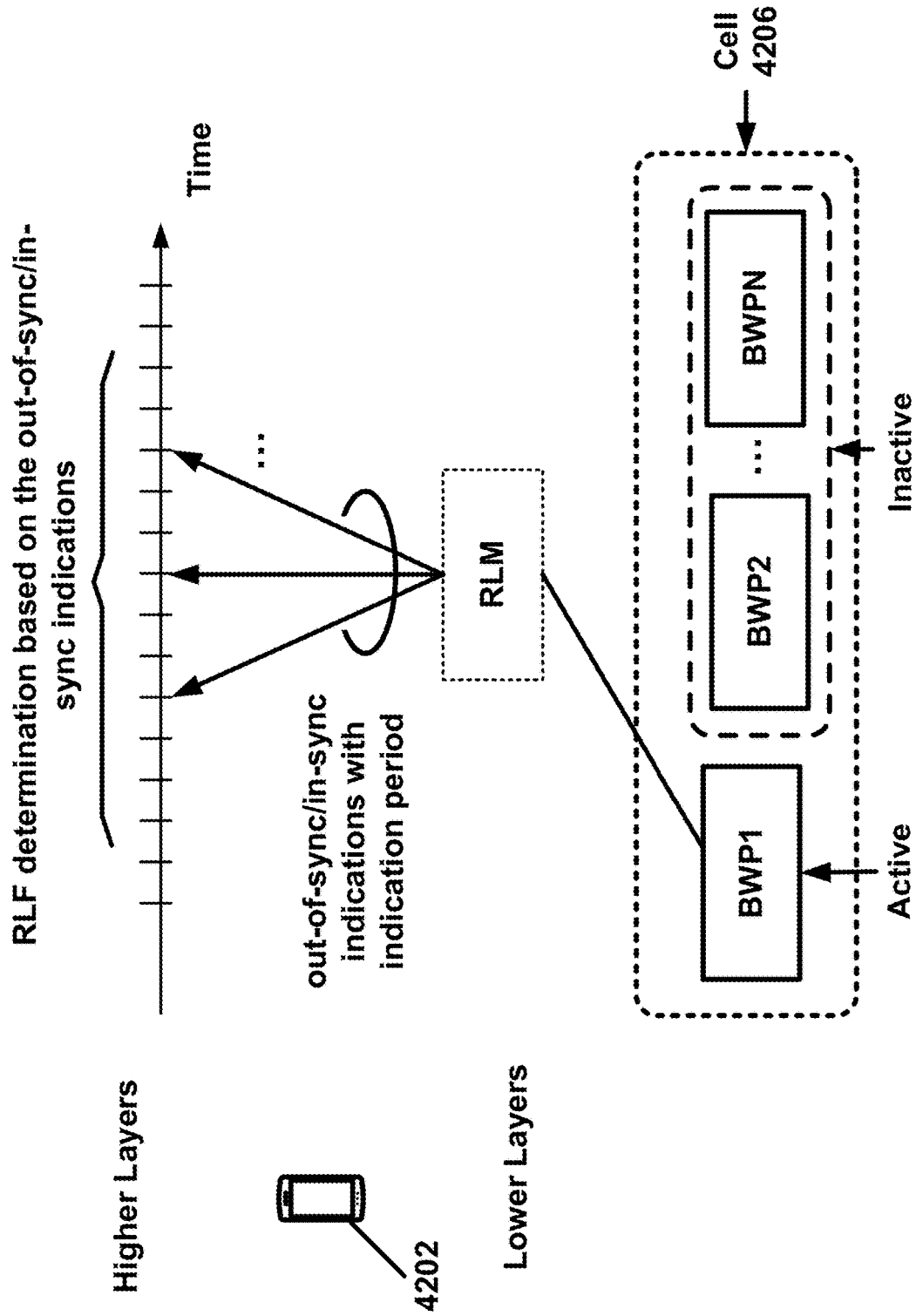
FIG. 42 shows an example of performing RLM on an active BWP.

FIG. 42 shows an example of monitoring a downlink radio link quality. A wireless device 4202 may monitor the downlink radio link quality in an active BWP (e.g., BWP1). Other BWPs of a cell 4206, for example, may be inactive (e.g., BWP2 . . . BWPN). The wireless device 4202 may refrain from monitoring the downlink radio link quality, for example, in the other BWPs (e.g., may refrain from monitoring some or all inactive BWPs). A physical layer of the wireless device 4202 may assess (e.g., evaluate) the downlink radio link quality of the cell 4206 in a first indication period. The physical layer of the wireless device 4202 may assess the downlink radio link quality of the cell 4206 in the first indication period, for example, if the wireless device 4202 is in a non-DRX mode of operation. The physical layer of the wireless device 4202 may assess the downlink radio link quality at least one time per first indication period. The downlink radio link quality may be assessed (e.g., evaluated), for example, based on the set of resources, the first threshold (e.g., $Q_{out}$), and/or the second threshold (e.g., $Q_{in}$). The set of resources may comprise the first RS set for RLM associated with BWP1. The set of resources may refrain from including (e.g., may exclude) some or all other RLM RSs. The downlink radio link quality may be assessed, for example, by evaluating the set of resources against the first threshold (e.g., $Q_{out}$) and/or the second threshold (e.g., $Q_{in}$), for example, over a time period. The first indication period comprise any amount of time, for example, a shortest periodicity of the set of resources (e.g., a maximum amount of time for the first indication period) or a second amount of time (e.g., 10 ms).

A downlink radio link quality may be assessed, for example, by evaluating a set of resources against a first threshold (e.g., $Q_{out}$) and/or a second threshold (e.g., $Q_{in}$), for example, over a time period (e.g., a measurement period). A wireless device may derive, over the time period, a BLER based on a hypothetical PDCCH transmission associated with the set of resources. The wireless device may generate an out-of-sync indication for the time period for example, if the derived BLER is greater than the first threshold. The wireless device may generate an in-sync indication for the time period, for example, if the derived BLER is less than the second threshold. The wireless device may indicate the out-of-sync indication and/or the in-sync indication to higher layer of the wireless device with an indication periodicity that may be of any value.

The physical layer of the wireless device 4202 may assess (e.g., evaluate) the downlink radio link quality of the cell 4206 in a second indication period. The physical layer of the wireless device 4202 may assess the downlink radio link quality of the cell 4206 in the second indication period, for example, if the wireless device 4202 is in a DRX mode of operation. The physical layer of the wireless device 4202 may assess the downlink radio link quality, for example, at least one time per second indication period. The second indication period may comprise any amount of time, for example, a shortest periodicity of the set of resources (e.g., a maximum amount of time for the second indication period) or a second amount of time equal to a value of a DRX period.

The physical layer of the wireless device 4202 may indicate a first indication (e.g., an out-of-sync indication) to a higher layer of the wireless device 4202, for example, based on the downlink radio link quality assessed by the physical layer of the wireless device 4202. The physical layer of the wireless device 4202 may indicate the first indication, for example, if a measurement for the set of resources (e.g., a corresponding BLER) fails to satisfy (e.g., is greater than) the first threshold (e.g., $Q_{out}$), for example, in one or more frames and/subframes.

The physical layer of the wireless device 4202 may indicate a second indication (e.g., an in-sync indication) to the higher layer of the wireless device 4202, for example, based on the downlink radio link quality assessed by the physical layer of the wireless device 4202. The physical layer of the wireless device 4202 may indicate the second indication, for example, if a measurement for the set of resources (e.g., a corresponding BLER) satisfies (e.g., is less than) the second threshold (e.g., $Q_{in}$), for example, in one or more frames and/or subframes.

The wireless device 4202 may perform RLM, for example, based on the set of resources, to determine downlink radio link quality of the cell 4206. The wireless device 4202 may refrain from performing RLM outside an active BWP, for example, if the cell 4206 is configured with one or more BWPs.

The wireless device 4202, in relation to the cell 4206, may start the first timer with the first timer value (e.g., t310), for example, based on receiving a quantity (e.g., n310) of consecutive out-of-sync indications for the cell 4206 from and/or via one or more lower layers (e.g., a physical layer) of the wireless device 4202. The wireless device 4202 may start the first timer using the first timer value (e.g., t310), for example, based on a second timer (e.g., t311) not running. The second timer (e.g., t311) may be configured, for example, via one or more RRC messages. The wireless device 4202 may start the second timer (e.g., t311), for example, based on initiating an RRC connection re-establishment procedure. The wireless device 4202 may stop the second timer (e.g., t311), for example, based on determining (e.g., selecting) a cell (e.g., a suitable NR cell and/or a cell using a second RAT (e.g., LTE or WIFI)). The second timer (e.g., t311) may expire, for example, based on the wireless device 4202 being in an RRC_IDLE state.

The wireless device 4202, in relation to the cell 4206, may stop the first timer (e.g., t310), for example, based on receiving a quantity (e.g., n311) of consecutive in-sync indications for the cell 4206 from and/or via one or more lower layers (e.g., the physical layer) of the wireless device 4202. The wireless device 4202 may stop the first timer (e.g., t310), for example, based on the first timer (e.g., t310) running.

The wireless device 4202 may determine a radio link failure (e.g., RLF) is detected for an MCG, for example, based on the first timer (e.g., t310) expiring in the cell 4206. The wireless device 4202 may initiate a connection re-establishment procedure, for example, based on determining detection of the RLF of the MCG. The wireless device 4202 may initiate the connection re-establishment procedure, for example, if an AS security is activated. The wireless device 4202 may perform one or more actions upon leaving an RRC_CONNECTED mode, for example, if the AS security is not activated.

The wireless device 4202 may determine an RLF is detected for an SCG, for example, based on the first timer (e.g., t310) expiring in the cell 4206. The wireless device 4202 may initiate an SCG failure information procedure to report an SCG RLF, for example, based on determining the RLF of the SCG.

A cell may be configured with one or more active BWPs. A wireless device may perform RLM on the one or more active BWPs (e.g., on some or all of the one or more active BWPs). Power consumption of the wireless device may increase, for example, if the wireless device performs RLM on more than one active BWPs. The wireless device may perform RLM on an active BWP (e.g., a single active BWP) from the one or more active BWPs. The wireless device may select (e.g., autonomously select) the active BWP from the one or more active BWPs. Measurement accuracy for RLF detection may be reduced, for example, if the wireless device performs RLM on the active BWP determined (e.g., selected) autonomously by the wireless device, for example, without the base station knowing a basis for determining (e.g., selecting) the active BWP for the RLM by the wireless device.

A wireless device may perform RLM for each active BWP separately. A base station may be configured with two or more active BWPs (e.g., a first active BWP and a second active BWP). The wireless device may perform a first RLM for the first active BWP. The wireless device may perform a second RLM for the second active BWP. The wireless device may determine an RLF based, for example, on one or more of the first RLM or the second RLM. The wireless device may perform RLM on each active BWP. The RLM in each active BWP may be separately performed by the wireless device. The wireless device may generate in-sync and/or out-of-sync indications based on the RLM in each active BWPs. The in-sync and/or out-of-sync indications may be separate for each active BWP. The wireless device may determine an RLF based on the separate in-sync and/or out-of-sync indications.

Determining an RLF based on a first RLM and a second RLM, for example, performed separately may improve a speed and/or an accuracy of the RLF. Determining an RLF based on a first RLM and a second RLM, for example, performed separately may increase a quantity of out-of-sync and/or in-sync indications. Determining RLF based on performing the first RLM and the second RLM separately may reduce RLF detection error. Determining RLF based on performing the first RLM and the second RLM separately may avoid unnecessarily triggering a connection re-establishment procedure (e.g., if the first active BWP and the second active BWP are configured on a PCell in an unlicensed band).

A wireless device may perform RLM for each active BWP jointly (e.g., together). A base station may be configured with two or more active BWPs (e.g., a first active BWP and a second active BWP). The wireless device may perform RLM on the first active BWP and the second active BWP jointly. The wireless device may determine an RLF based on RLM in the first active BWP and the second active BWP. The wireless device may perform RLM based on combined RLM RSs on the two or more active BWPs (e.g., based on the combined RSs of the first active BWP and the second active BWP). The wireless device may generate in-sync and/or out-of-sync indications based on the combined RLM RSs. The wireless device may determine an RLF based on the in-sync and/or out-of-sync indications.

Performing RLM jointly on one or more active BWPs of a cell may improve in-sync or out-of-sync indications and/or may reduce a complexity of RLF detection. Performing RLM jointly on one or more active BWPs of a cell may reduce RLF detection error (e.g., by avoiding unnecessarily triggering a connection re-establishment procedure).

A wireless device may perform RLM on an active BWP (e.g., a single active BWP) of the one or more active BWPs. The active BWP may be determined (e.g., selected) based on one or more criteria. The active BWP determined (e.g., selected) may be aligned between the wireless device and a base station based on one or more rules. The wireless device may select the active BWP for RLM from the one or more active BWPs based on one or more criteria. Monitoring RLM RSs on the active BWP of a cell may improve power consumption of the wireless device. Monitoring RLM RSs on the active BWP of a cell may improve downlink spectrum efficiency (e.g., by not transmitting RLM RSs on other active BWPs). Selection and/or alignment of an active BWP from one or more active BWPs of a cell for an RLM may reduce power consumption and/or may reduce downlink signaling overhead (e.g., by avoiding sending RSs by a base station on an active BWP not selected for RLM).

A base station may communicate with a wireless device on one or more active BWPs in a cell (e.g., a PCell, a PSCell, an SCell, or any other cell type). The base station may send (e.g., transmit) one or more types of data services via different active BWPs in parallel (e.g., simultaneously and/or overlapped in time). The wireless device may receive the one or more types of data services via the different active BWPs in parallel (e.g., simultaneously and/or overlapped in time). The wireless device may perform RLM on the cell, for example, if one or more BWPs are in an active state in the cell. The wireless device may be unable to determine how to perform RLM on the cell using an active BWP, for example, if one or more active BWPs overlap in time in the cell. The wireless device may be unable to determine how to select the active BWP from the one or more active BWPs to perform RLM. The wireless device may be unable to determine how to send a first indication (e.g., an out-of-sync indication) and/or to provide a second indication (e.g., an in-sync indication), for example, if the wireless device is capable of performing RLM on one or more active BWPs in parallel based on downlink radio link qualities on the one or more active BWPs. RLM may be performed on a cell (e.g., a PCell, a PSCell, an SCell, or any other cell type) by a wireless device, for example, if the cell is configured with one or more active BWPs.

Figure 43:
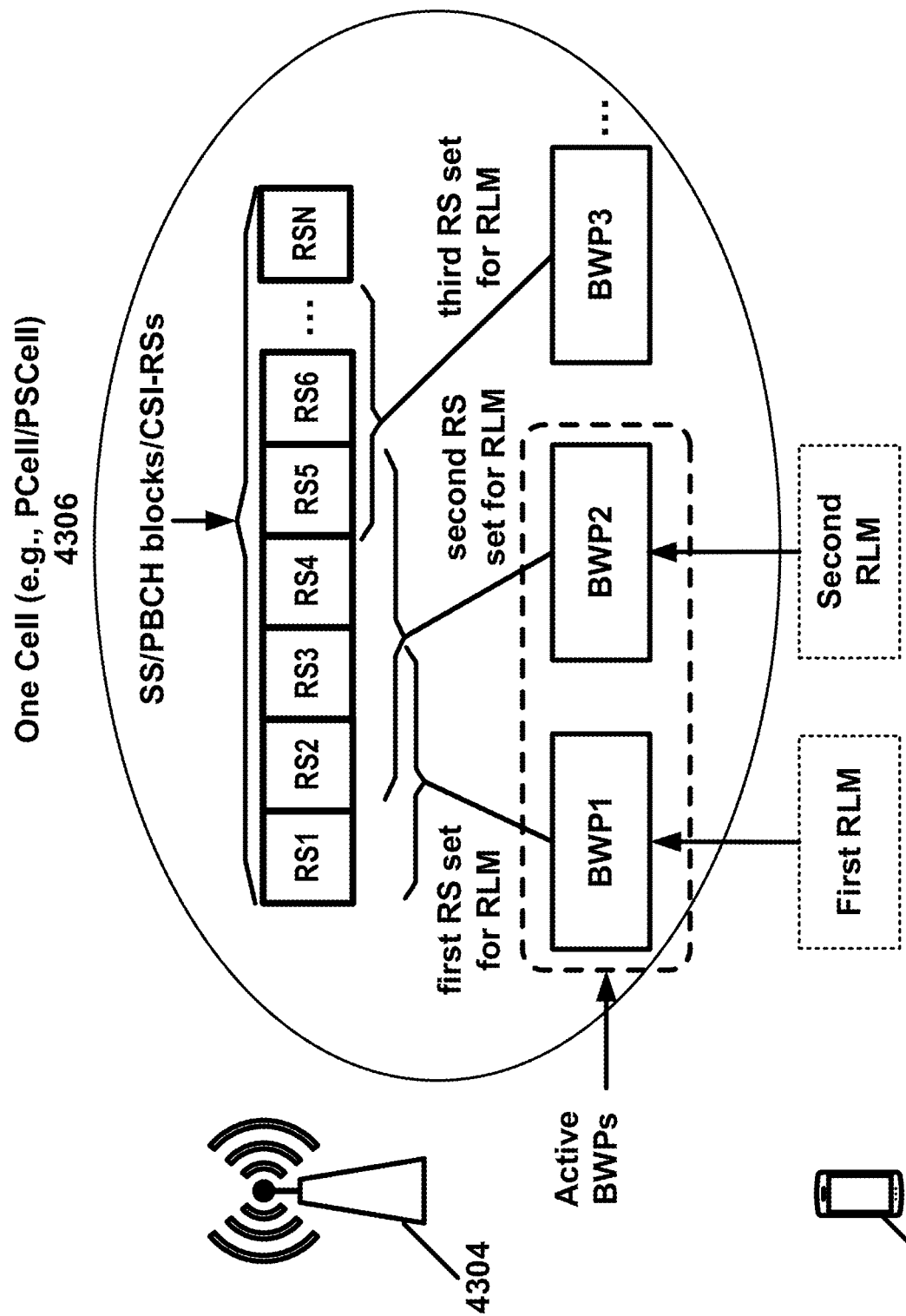
FIG. 43 shows an example configuration of two or more active BWPs and corresponding sets of resources for RLM.

FIG. 43 shows an example of RLM on at least two active BWPs separately. A base station 3310 may send (e.g., transmit), to a wireless device 4302, one or more messages and/or data packets. The wireless device 4302 may receive the one or more messages and/or data packets. The one or more messages and/or data packets may comprise parameters indicating at least one of a first timer value for a first timer (e.g., t310), a first quantity (e.g., n310), and a second quantity (e.g., n311). The one or more messages and/or data packets may comprise configuration parameters of a cell 4306. The cell 4306 may comprise any type of cell. The cell 4306 may comprise a PCell. The cell 4306 may comprise a PSCell of an SCG, for example, if the cell 4306 comprises the SCG. The cell 4306 may comprise an SCell or any other cell type. The configuration parameters may indicate that the cell 4306 comprises one or more BWPs. The configuration parameters may indicate a set of resources (e.g., RSs) on at least one BWP of the one or more BWPs for RLM. The set of resources may be indicated by a set of resource indexes. The set of resources may comprise a subset of one or more SS/PBCH blocks and/or one or more CSI-RS resources.

The one or more messages and/or data packets may indicate one or more thresholds for evaluating the downlink radio link quality of the cell 4306. The one or more thresholds may comprise a first threshold (e.g., $Q_{out}$) and/or a second threshold (e.g., $Q_{in}$). The first threshold and/or the second threshold may be cell-specific (e.g., specific to the cell 4306). The first threshold and/or the second threshold may be BWP-specific. The one or more messages and/or data packets may indicate a first BWP-specific threshold and/or a second BWP-specific threshold associated with one or more of (e.g., with each BWP of) the one or more BWPs.

The base station 4304 and/or the wireless device 4302 may activate two or more BWPs (e.g., at least two active BWPs) of the one or more BWPs. Each of the two or more BWPs that may be activated may be associated with a set of resources for RLM. The wireless device 4302 may perform RLM on each of the two or more BWPs, for example, based on the two or more BWPs each being in an active state in the cell 4306. RLM may comprise assessing (e.g., evaluating), at least one time per indication period, a downlink radio link quality on each of the two or more BWPs. The downlink radio link quality on an active BWP of the two or more BWPs may be assessed, for example, based on a set of resources associated with the two or more active BWPs and the first threshold (e.g., the first cell-specific threshold or the first BWP-specific threshold associated with the first active BWP) and/or the second threshold (e.g., the second cell-specific threshold or the second BWP-specific threshold associated with the second active BWP). The downlink radio link quality may be assessed, for example, based on comparing the set of resources to the first threshold and/or the second threshold over a time period to determine whether a measured quality (e.g., corresponding to a BLER) satisfies (e.g., is less than) a threshold (e.g., the first threshold and/or the second threshold).

A physical layer of the wireless device 4302 may send a first indication (e.g., an out-of-sync indication) via a higher layer of the wireless device 4302, for example, based on the downlink radio link quality assessed by the physical layer of the wireless device 4302. The physical layer of the wireless device 4302 may send the first indication, for example, if the set of resources correspond to a BLER greater than the first threshold, for example, in one or more frames and/or subframes. The physical layer of the wireless device 4302 may send a second indication (e.g., an in-sync indication) to a higher layer of the wireless device 4302, for example, based on the downlink radio link quality assessed by the physical layer of the wireless device 4302. The physical layer of the wireless device 4302 may send the second indication, for example, if the set of resources correspond to a BLER less than the second threshold, for example, in one or more frames and/or subframes. The wireless device 4302 may perform RLM on each of the two or more BWPs independently (e.g., performing RLM on a first active BWP may be independent of performing RLM on a second active BWP of the two or more active BWPs).

The cell 4306 (e.g., as a PCell) may be associated with one or more RSs (e.g., RS1, RS2, . . . , RSN) and one or more of BWPs (e.g., BWP1, BWP2 and BWP3, . . . ). BWP1 may be associated with RS1, RS2 and RS3 for RLM. RS1, RS2, and RS3 may be a first RS set for RLM. BWP2 may be associated with RS2, RS3, RS4, and RS5 for RLM. RS2, RS3, RS4, and RS5 may be a second RS set for RLM. BWP3 may be associated with RS5, RS6, . . . , RSN. RS5, RS6, . . . , RSN may be a third RS set for RLM. The wireless device 4302 may perform a first RLM based on RS1, RS2 and RS3 on BWP1. The wireless device 4302 may perform a second RLM based on RS2, RS3, RS4 and RS5 on BWP2, for example, if BWP1 and BWP2 are in an active state.

The wireless device 4302 may start the first timer with the first timer value (e.g., t310), for example, based on at least one of: receiving a first quantity (e.g., n310) of consecutive out-of-sync indications for the cell 4306 from a lower layer (e.g., a physical layer) of the wireless device 4302; and/or a second timer (e.g., t311) not running. The second timer (e.g., t311) may be configured via one or more RRC messages.

One or more of the consecutive out-of-sync indications may comprise the first indication triggered by a first downlink radio link quality. The first downlink radio quality may be assessed based on a first set of resources associated with the first active BWP. The first downlink radio quality may correspond to a BLER. The wireless device 4302 may determine whether a measurement corresponding to the first downlink radio quality (e.g., a BLER) fails to satisfy (e.g., is greater than) the first threshold (e.g., $Q_{out}$). One or more of the consecutive out-of-sync indications may comprise the second indication. The second indication may be triggered by a second downlink radio link quality assessed based on a second set of resources associated with the second active BWP corresponding to a BLER greater than the first threshold (e.g., $Q_{out}$). The wireless device 4302 may stop the first timer (e.g., t310) for the cell 4306, for example, based on at least one of: receiving n311 consecutive in-sync indications for the cell 3312 from the lower layer (e.g., the physical layer) of the wireless devices 3302; and/or the first timer t310 running One or more consecutive in-sync indications may comprise the first indication. The first indication may be triggered by the first downlink radio link quality assessed based on the first set of resources associated with the first active BWP corresponding to a BLER less than the second threshold (e.g., $Q_{in}$). One or more consecutive in-sync indications may comprise the second indication. The second indication may be triggered by the second downlink radio link quality assessed based on the second set of resources associated with the second active BWP corresponding to a BLER less than the second threshold (e.g., $Q_{in}$).

The wireless device 4302 may determine an RLF for an MCG, for example, based on the first timer expiring in relation to the cell 4306. The wireless device 4302 may initiate a connection re-establishment procedure, for example, based on determining the RLF of the MCG. The wireless device 4302 may initiate a connection re-establishment procedure, for example, if an AS security is activated. The wireless device 4302 may perform one or more actions upon leaving RRC_CONNECTED mode. The wireless device 4302 may perform one or more actions upon leaving RRC_CONNECTED mode, for example, if the AS security is not activated.

The wireless device 4302 may determine an RLF for an SCG, for example, based on the first timer expiring in the cell 4306. The wireless device 4302 may determine the RLF for the SCG based on the first timer expiring in the cell 4306, for example, if the cell 4306 is a PSCell. The wireless device 4302 may initiate an SCG failure information procedure to report the RLF for the SCG, for example, based on determining the RLF for the SCG.

Figure 44:
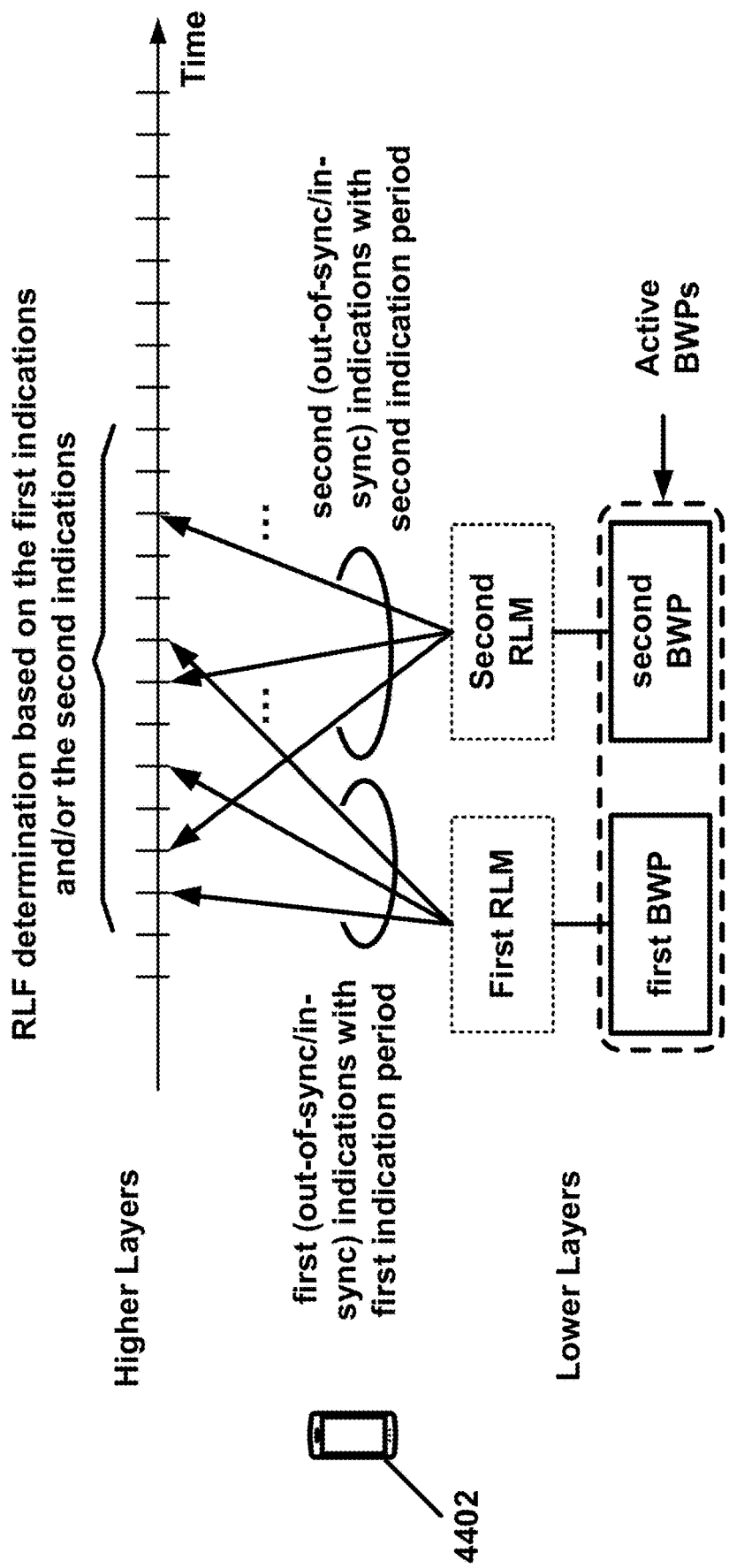
FIG. 44 shows an example of performing RLM on two or more active BWPs separately.

FIG. 44 shows an example performing RLM on one or more frames and/or subframes. The physical layer of the wireless device 4402 may send one or more first indications (e.g., out-of-sync and/or in-sync indications) associated with a first indication period on a first active BWP, for example, to a higher layer of the wireless device 4402 (e.g., a MAC layer or an RRC layer). The physical layer of the wireless device 4402 may indicate one or more second indications (e.g., out-of-sync and/or in-sync indications) associated with a second indication period on a second active BWP, for example, to the higher layer of the wireless device 4402. The higher layer of the wireless device 4402 may determine an RFL based on the one or more first indications and/or the one or more second indications.

The wireless device 4402 may assess downlink radio link quality of two or more active BWPs in the cell. The wireless device 4402 may determine an RLF based on downlink radio link qualities of the two or more active BWPs. Measurement results of downlink radio link quality may be more accurate based on the two or more active BWPs compared to measurement results of downlink radio link quality on a single active BWP. An unnecessary RLF determination may be avoided and/or an RRC reconnection latency may be reduced, for example, if the wireless device 4402 assesses downlink radio link quality of the two or more active BWPs in the cell.

One or more indications (e.g., out-of-sync and/or in-sync indications) on two or more active BWPs with one or more different periodicities may be inefficient. Difficulties may arise in managing a first timer, a first counter, and/or a second counter for RLF determination in a higher layer of the wireless device 4402, for example, if a wireless device receives one or more indications from two or more active BWPs.

Figure 45:
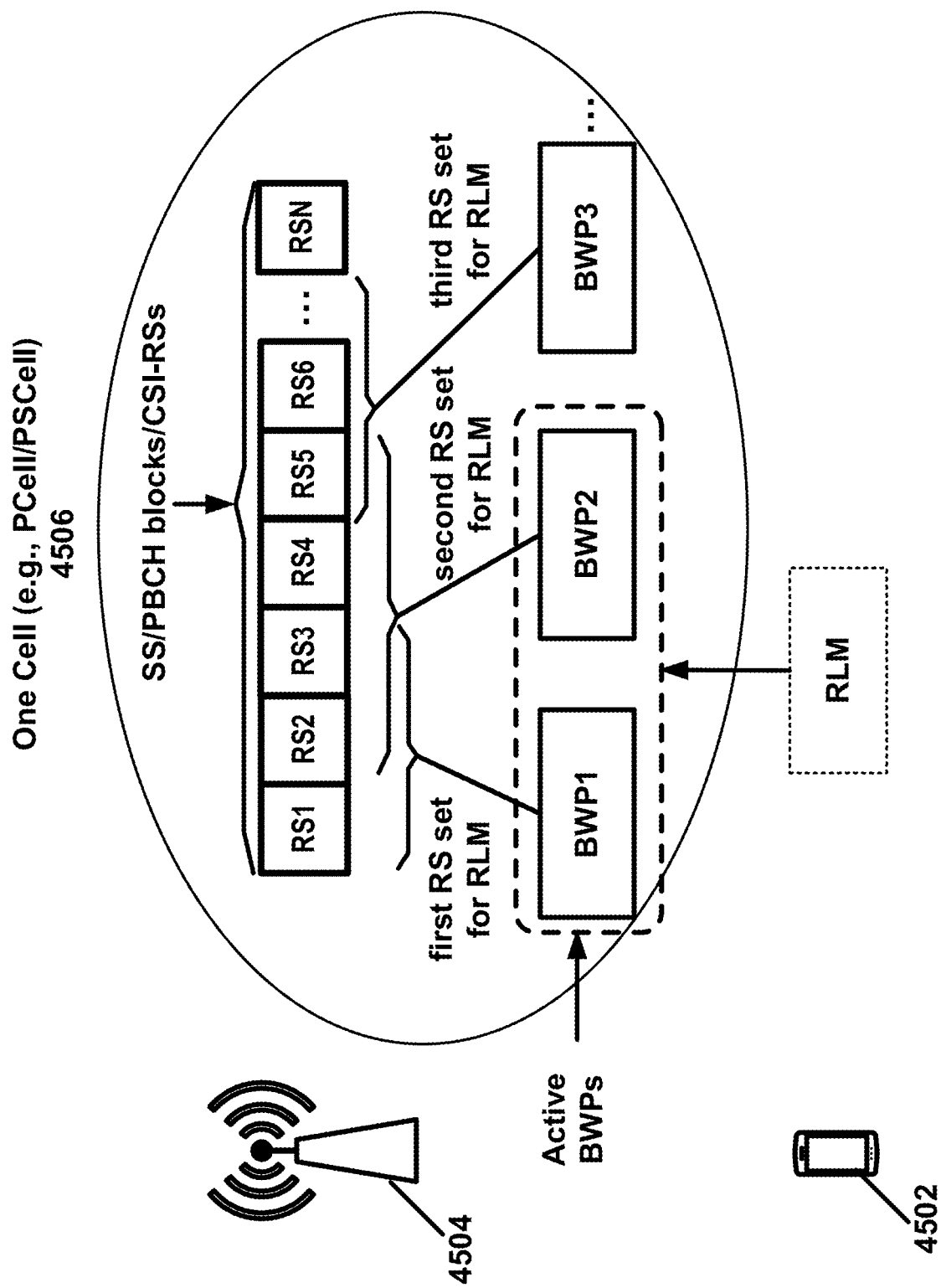
FIG. 45 shows an example configuration of two or more active BWPs and corresponding sets of resources for RLM.

FIG. 45 shows an example of RLM on two or more active BWPs jointly. A wireless device 4502 may send efficient out-of-sync and/or in-sync indications, for example, if two or more BWPs are active. The wireless device 4502 may perform RLF detection for the two or more active BWPs, for example, with reduced complexity. A base station 4504 may send (e.g., transmit), to the wireless device 4502, one or more messages and/or data packets. The wireless device 4502 may receive the one or more messages and/or data packets. The one or more messages and/or data packets may comprise parameters indicating at least one of a first timer value for a first timer (e.g., t310), a first quantity (e.g., n310), and a second quantity (e.g., n311).

The one or more messages and/or data packets may comprise configuration parameters of the cell 4506. The cell 4506 may comprise any type of cell. The cell 4506 may comprise a PCell. The cell 4506 may comprise a PSCell of an SCG, for example, if the cell 4506 comprises the SCG. The cell 4506 may comprise an SCell or any other cell type. The configuration parameters may indicate that the cell 4506 comprises one or more BWPs. The configuration parameters may indicate a set of resources (e.g., RSs) on a BWP of the one or more BWPs for RLM. The set of resources may be indicated by a set of resource indexes. The set of resources may comprise a subset of one or more SS/PBCH blocks and/or one or more CSI-RS resources. The one or more messages and/or data packets may indicate one or more thresholds for evaluating the downlink radio link quality of the cell 4506. The one or more thresholds may comprise a first threshold (e.g., $Q_{out}$) and/or a second threshold (e.g., $Q_{in}$).

The base station 4504 and/or the wireless device 4502 may activate two or more BWPs (e.g., two or more active BWPs) of the one or more BWPs. Each of the two or more BWPs that may be activated may be associated with a set of resources for RLM.

The wireless device 4502 may perform RLM on the two or more BWPs, for example, based on the two or more BWPs being in an active state in the cell 4506. RLM may comprise assessing a downlink radio link quality on the two or more BWPs. RLM may comprise assessing the downlink radio link quality at least one time per indication period. Assessing the downlink radio link quality on the two or more BWPs may comprise evaluating the downlink radio link quality based on one or more sets of resources associated with the two or more active BWPs over a time period. The downlink radio link quality may be assessed, for example, by comparing the one or more sets of resources to the first and/or the second threshold. The downlink radio link quality may be assessed, for example, based on comparing the one or more sets of resources associated with the two or more active BWPs to the first threshold and/or the second threshold over a time period to determine whether a measured quality (e.g., corresponding to a BLER) satisfies (e.g., is less than) less than a threshold (e.g., the first threshold and/or the second threshold).

A first BWP (BWP1) may be associated with a first set RS set for RLM (e.g., RS1, RS2, and RS3). A second BWP (BWP2) may be associated with a second RS set for RLM (e.g., RS2, RS3, RS4, and RS5). A third BWP (BWP3) may be associated with a third RS set for RLM (e.g., RS5, RS6, . . . RSN). BWP1 and BWP2 may be in an active state. BWP3 may be in an inactive state. The first RS set for RLM may comprise a first set of one or more RSs. The second RS set for RLM may comprise a second set of one or more RSs. The third RS set for RLM may comprise a third set of one or more RSs. Any quantity of RS sets may comprise a corresponding quantity of one or more RSs. The physical layer of the wireless device 4502 may assess a downlink radio link quality of the cell 4506 based on one or more sets of RSs comprising the first set of RSs and/or the second set of RSs. The one or more sets of RSs may comprise RS1, RS2, RS3, RS4, and RS5. The physical layer of the wireless device 4502 may assess the downlink radio link quality of the cell 4506 based on the one or more sets of RSs. The downlink radio quality may be assessed based on the one or more sets of RSs and the first threshold and/or the second threshold, for example, over a time period.

The physical layer of the wireless device 4502 may send a first indication (e.g., an out-of-sync indication) to a higher layer of the wireless device 4502, for example, based on evaluating the one or more sets of RSs. The one or more sets of RSs may correspond to a measured BLER. The physical layer of the wireless device 4502 may send the first indication, for example, if the measured BLER fails to satisfy (e.g., is greater than) as the first threshold, for example, in one or more frames and/subframes. The physical layer of the wireless device 4502 may indicate a second indication (e.g., an in-sync indication) to the higher layer, for example, based on evaluating the one or more sets of RSs. The physical layer of the wireless device 4502 may send the second indication, for example, if the measured BLER satisfies (e.g., is less than) the second threshold, for example, in one or more frames and/or subframes. The wireless device 4502 may perform RLM of a cell jointly on two or more active BWPs.

The wireless device 4502 may start the first timer with the first timer value (e.g., t310), for example, based on one or more of: receiving a first quantity (e.g., n310) of consecutive out-of-sync indications for the cell 4506 from a lower layer (e.g., a physical layer) of the wireless device 4502; and/or a second timer (e.g., t311) not running. The second timer (e.g., t311) may be configured via one or more RRC messages.

The wireless device 4502 may stop the first timer (e.g., t310) for the cell 4506, for example, based on one or more of: receiving a second quantity (e.g., n311) of consecutive in-sync indications for the cell 4506 from the lower layer (e.g., the physical layer) of the wireless device 4502; and/or the first timer (e.g., t310) running. The wireless device 4502 may determine an RLF for an MCG, for example, based on the first timer expiring in relation to the cell 4506. The wireless device 4502 may initiate a connection re-establishment procedure, for example, based on determining the RLF of the MCG. The wireless device 4502 may initiate a connection re-establishment procedure based on determining the RLF of the MCG, for example, if an AS security is activated. The wireless device 4502 may perform one or more actions upon leaving RRC_CONNECTED mode. The wireless device 4502 may perform the one or more actions upon leaving RRC_CONNECTED mode, for example, if the AS security is not activated.

The wireless device 4502 may determine an RLF for an SCG, for example, based on the first timer expiring in the cell 4506. The wireless device 4502 may determine the RLF for the SCG based on the first timer expiring in the cell 4506, for example, if the cell 4506 comprises a PSCell. The wireless device 4502 may initiate an SCG failure information procedure to report the RLF for the SCG, for example, based on determining the RLF for the SCG.

Figure 46:
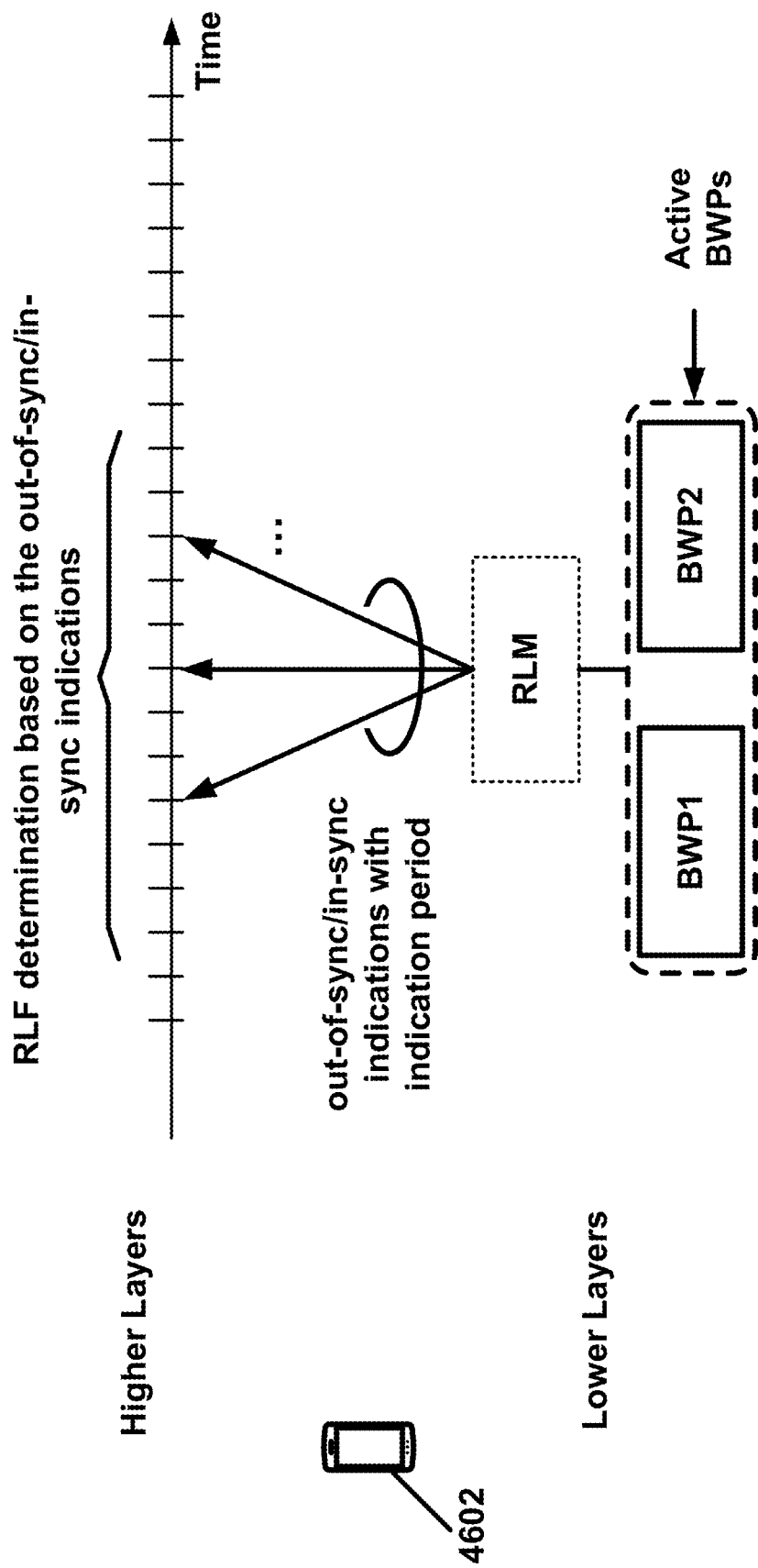
FIG. 46 shows an example of performing RLM on two or more active BWPs jointly.

FIG. 46 shows an example of performing RLM jointly on multiple BWPs. A wireless device 4602 may perform RLM jointly on BWP1 and BWP2 using one or more frames and/or subframes. The physical layer of the wireless device 4602 may send an indication (e.g., an out-of-sync and/or in-sync indication) based on RLM associated with an indication period. RLM may be based on two or more sets of RSs of BWP1 and BWP2. The physical layer of the wireless device may send the indication to the higher layer of the wireless device 4602 (e.g., the MAC layer or the RRC layer). The higher layer of the wireless device 4602 may determine an RLF based on one or more of: the indication; the first timer (e.g., t310); the first quantity (e.g., n310); and/or the second quantity (e.g., n311).

The physical layer of wireless device 4602 may send via the higher layer of the wireless device 4602 an indication (e.g., an out-of-sync and/or an in-sync indication) with an indication period. The indication may be based on RLM on one or more sets of RSs of two or more active BWPs. Inefficiencies of the out-of-sync and/or the in-sync indications to the higher layer of the wireless device 4602 may be reduced by performing RLM on one or more sets of RSs of two or more active BWPs. Inefficiencies of determining an RLF may be reduced. A higher layer of the wireless device 4602 may reuse RLF detection resources to support two or more active BWPs in the cell, for example, by performing RLM on one or more sets of RSs of two or more active BWPs.

Figure 47:
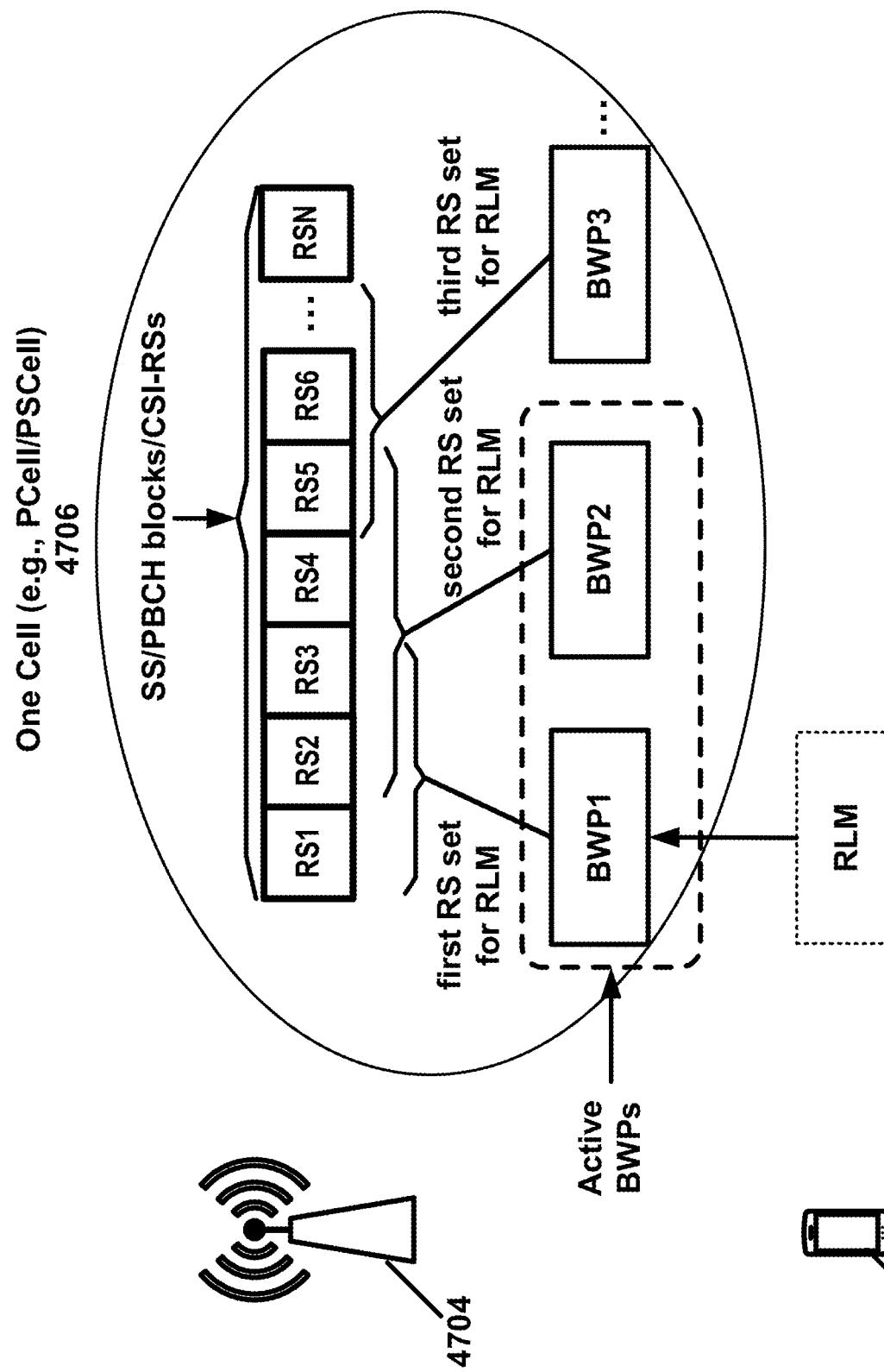
FIG. 47 shows an example configuration of two or more active BWPs and corresponding sets of resources for RLM.

A first downlink radio link quality on a first active BWP of the two or more active BWPs may be similar as a second downlink radio link quality on a second active BWP of the two or more active BWPs. Power consumption of the wireless device may be increased by performing RLM on two or more active BWPs independently or jointly Enhanced methods are described for reducing power consumption of the wireless device for RLM. The methods may comprise at least one of: determining (e.g., selecting) one or more active BWPs from the multiple active BWPs; and/or performing radio link monitoring on the determined (e.g., selected) one or more active BWPs FIG. 47 shows an example of RLM on a determined (e.g., selected) active BWP. A wireless device 4702 may perform RLM determined (e.g., selected) active BWP using reduced power consumption. A base station 4704 may send (e.g., transmit), to the wireless device 4702, one or more messages and/or data packets. The wireless device 4702 may receive the one or more messages and/or data packets. The one or more messages and/or data packets may comprise parameters indicating one or more of a first timer value for a first timer (e.g., t310), a first quantity (e.g., n310), and a second quantity (e.g., n311).

The one or more messages and/or data packets may comprise configuration parameters of a cell 4706. The cell 4706 may comprise any type of cell. The cell 4706 may comprise a PCell.

The cell 4706 may comprise a PSCell of an SCG, for example, if the cell 4706 comprises the SCG. The cell 4706 may comprise an SCell or any other cell type. The configuration parameters may indicate that the cell 4706 comprises one or more BWPs. The configuration parameters may indicate a set of resources (e.g., RSs) on one or more BWPs of the one or more BWPs for RLM. The set of resources may be indicated by a set of resource indexes. The set of resources may comprise a subset of one or more SS/PBCH blocks and/or one or more CSI-RS resources.

The one or more messages and/or data packets may indicate one or more thresholds for evaluating the downlink radio link quality of the cell 4706. The one or more thresholds may comprise a first threshold (e.g., $Q_{out}$) and/or a second threshold (e.g., $Q_{in}$). The first threshold and/or the second threshold may be cell-specific (e.g., specific to the cell 4706).

The first threshold and/or the second threshold may be BWP-specific. The one or more messages and/or data packets may indicate a first BWP-specific threshold and/or a second BWP-specific threshold associated with each BWP of the one or more BWPs.

The base station 4704 and/or the wireless device 4702 may activate two or more BWPs (e.g., two or more active BWPs) of the one or more BWPs. Each of the two or more BWPs that may be activated may be associated with a set of resources for RLM.

The wireless device 4702 may select one or more BWPs (e.g., an active BWP) of the two or more active BWPs for RLM. The active BWP may be determined (e.g., selected) by the wireless device 4702 based on one or more criteria. The wireless device 4702 may perform RLM on the active BWP. The one or more criteria may comprise one or more of: a BWP index; a numerology index; a service type; an RLM RSs configuration; and/or a PDCCH configuration.

The two or more active BWPs may each be indicated by a BWP index. The wireless device 4702 may select the active BWP based on the BWP indexes of the two or more active BWPs. The wireless device 4702 may select the active BWP based on the active BWP having a lowest BWP index of the two or more active BWPs. The wireless device 4702 may perform RLM on the active BWP. The active BWP having the lowest BWP index may be a BWP on which the wireless device 4702 may receive system information. RLM monitoring on the active BWP having the lowest BWP index may help maintain a non-interrupted link with the base station 4704, for example, to receive the system information. The wireless device 4702 may select the active BWP having a highest BWP index of the two or more active BWPs. The active BWP having the highest BWP index may be a BWP on which the wireless device 4702 may receive urgent data packets. RLM monitoring on the active BWP with the highest BWP index may help maintain a non-interrupted link with the base station 4704, for example, to receive the urgent data packets.

The two or more active BWPs may each be associated with a numerology index. The wireless device 4702 may select the active BWP based on the numerology indexes of the two or more active BWPs. The wireless device 4702 may select the active BWP associated with a lowest numerology index of the two or more active BWPs. The active BWP associated with the lowest numerology index may be a BWP on which the wireless device 4702 receives system information and/or paging. RLM monitoring on the active BWP associated with the lowest numerology index may help maintain a robust link with the base station 4704, for example, to receive system information and/or paging. The wireless device 4702 may select the active BWP associated with a highest numerology index of the numerology indexes.

The base station 4704 may transmit a first type of service (e.g., eMBB) on a first active BWP of the two or more active BWPs. The base station 4704 may transmit a second type of service (e.g., MTC) on a second active BWP of the two or more active BWPs. The first type of service may be prioritized over the second type of service at the wireless device 4702. The wireless device 4702 may select the active BWP with a highest priority between the first type of service and the second type of service.

The first active BWP may be configured with RLM RSs. The second active BWP may lack configuration with RLM RSs. The wireless device 4702 may select the active BWP to be the first active BWP that may be configured with RLM RSs.

The first active BWP may be configured with PDCCH resources. The second active BWP may lack configuration with PDCCH resources. The wireless device 4702 may select the active BWP to be the first active BWP that may be configured with PDCCH resources.

The first active BWP may be configured with common search space for PDCCH monitoring. The second active BWP lack configuration with common search space for PDCCH monitoring. The wireless device may select the active BWP to be the first active BWP that may be configured with common search space.

The first active BWP may be a primary active BWP. The second active BWP may be a secondary active BWP. The wireless device 4702 may select the active BWP to be the primary active BWP. The wireless device may perform RLM on the primary active BWP. The primary active BWP may be a BWP on which the wireless device 4702, for example: may perform an initial connection establishment procedure; may initiate a connection re-establishment procedure; and/or may monitor PDCCH candidates in one or more common search spaces for DCI formats with CRC scrambled by an SI-RNTI, an RA-RNTI, a TC-RNTI, a P-RNTI, an INT-RNTI, an SFI-RNTI, a TPC-PUSCH-RNTI, a TPC-PUCCH-RNTI, a TPC-SRS-RNTI, a CS-RNTI, an SP-CSI-RNTI, or a C-RNTI. The primary active BWP may be a BWP which may be maintained in an active state, for example, until switched to another BWP by an RRC message. The primary active BWP may be a first BWP in a licensed band. The secondary active BWP may be a second BWP in an unlicensed band. The primary active BWP may be a first BWP used with a first radio interface (e.g., a Uu interface between a base station and a wireless device). The secondary active BWP may be a second BWP used with a second radio interface (e.g., a sidelink interface between a first wireless device and a second wireless device).

The two or more active BWPs may be grouped into two active BWP groups. The wireless device 4702 may select a first active BWP from a first BWP group and a second active BWP from a second BWP group. The first BWP group may be in a low frequency (e.g., <6 GHz). The second BWP group may be in a high frequency (e.g., >6 GHz). The first BWP group may be in a licensed band. The second BWP group may be in an unlicensed band. The first active BWP and the second active BWP may be primary active BWPs.

The wireless device 4702 may perform RLM on the first active BWP and the second active BWP independently. Monitoring the first active BWP in the low frequency and the second active BWP in the high frequency may send via the higher layer of the wireless device 4702 more radio link information over a wide bandwidth.

The wireless device 4702 may perform RLM on the determined (e.g., selected) active BWP. RLM may comprise assessing a downlink radio link quality on the selected active BWP (e.g., the one active BWP). The downlink radio link quality may be assessed at least one time per indication period. Assessing a downlink radio link quality on the determined (e.g., selected) active BWP may comprise comparing the downlink radio link quality based on RLM RSs associated with the determined (e.g., selected) active BWP over a time period to the first threshold and the second threshold. A first BWP (BWP1) may be associated with a first RS set for RLM (e.g., RS1, RS2, and RS3). A second BWP (BWP2) may be associated with a second RS set for RLM (e.g., RS2, RS3, RS4, and RS5). A third BWP (BWP3) may be associated with a third RS set for RLM (e.g., RS5, RS6, . . . RSN). BWP1 and BWP2 may be in active state. The wireless device 4702 may select an active BWP (e.g., a one active BWP) from between BWP1 and BWP2 for RLM, for example, based on the one or more criteria. The determined (e.g., selected) active BWP may be BWP1 based on the one or more criteria. The physical layer of the wireless device 4702 may assess a downlink radio link quality of the cell 4706 based on RS1, RS2 and RS3 of BWP1. The downlink radio link quality of the cell 4706 based on RS1, RS2 and RS3 of BWP1 may be compared, for example, over a time period, to the first threshold and the second threshold.

Figure 48:
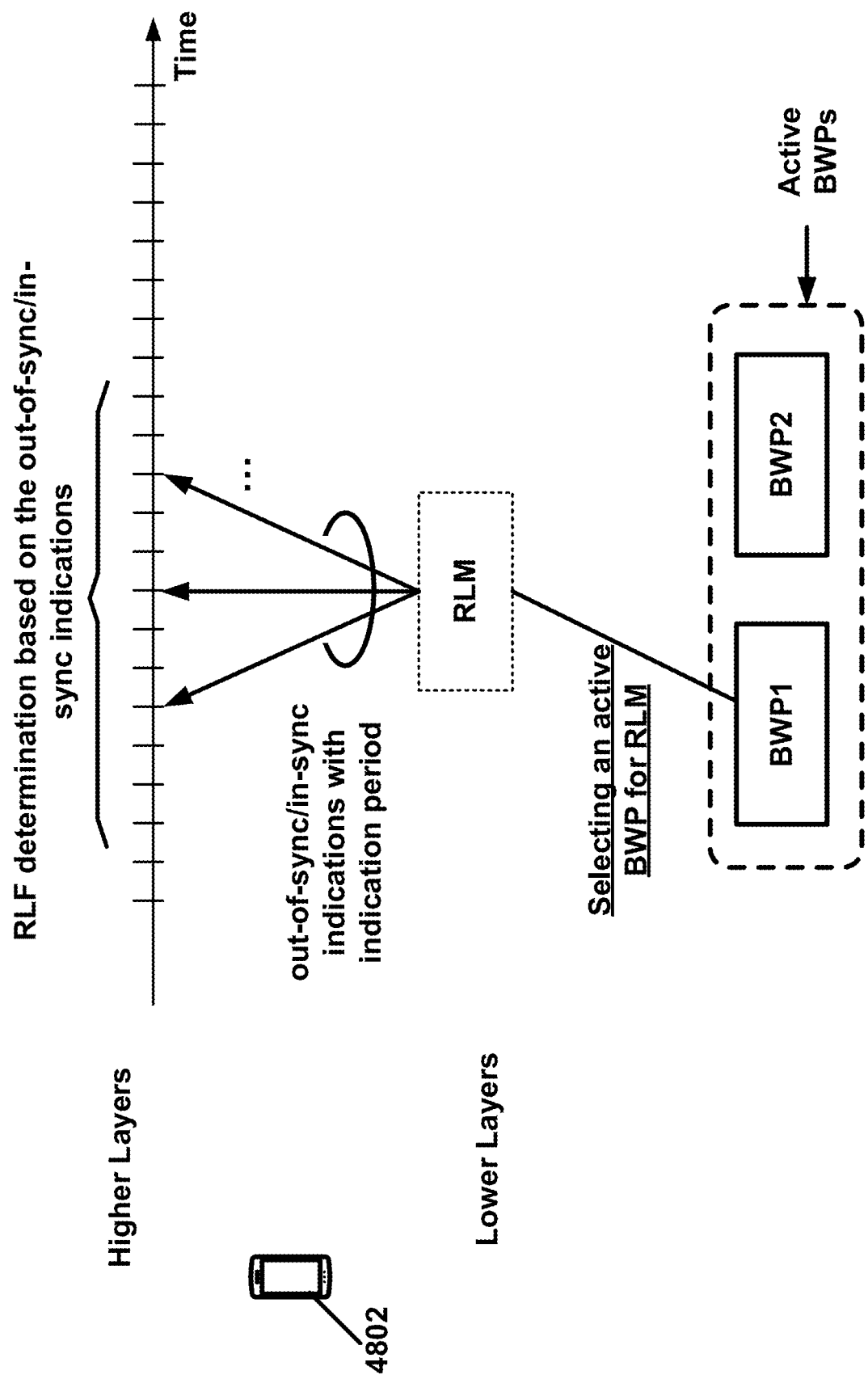
FIG. 48 shows an example of performing RLM on a selected active BWP.

FIG. 48 shows an example of RLM on one or more frames and/or subframes. A wireless device 4802 may select BWP1 to perform RLM. The wireless device 4802 may select BWP1 based on one or more criteria. The physical layer of the wireless device 4802 may indicate a first indication (e.g., an out-of-sync indication) to the higher layer of the wireless device 4802, for example, based on assessing a downlink radio link quality. The physical layer of the wireless device 4802 may indicate the first indication, for example, if a measurement associated with the downlink radio link quality (e.g., a corresponding BLER) fails to satisfy (e.g., greater than) the first threshold, for example, in the one or more frames and/or subframes. The physical layer of the wireless device 4802 may indicate a second indication (e.g., an in-sync indication) to the higher layer of the wireless device 4802 based on the assessing the downlink radio link quality. The physical layer of the wireless device 4802 may indicate the second indication, for example, if a measurement associated with the downlink radio link quality (e.g., a corresponding BLER) satisfies (e.g., less than) the second threshold.

The wireless device 4802 may start a first timer with a first timer value (e.g., t310), for example, based on one or more of: receiving a first quantity (e.g., n310) of consecutive out-of-sync indications for the cell from and/or via a lower layer (e.g., a physical layer) of the wireless device 4802; and/or a second timer (e.g., t311) not running. The second timer (e.g., t311) may be configured via one or more RRC messages. The wireless device 4802 may stop the first timer (e.g., t310) for the cell, for example, based on one or more of: receiving a second quantity (e.g., n311) of consecutive in-sync indications for the cell from and/or via the lower layer (e.g., the physical layer) of the wireless devices 4802; and/or the first timer (e.g., t310) running.

The wireless device 4802 may determine an RLF for an MCG, for example, based on the first timer expiring in relation to the cell. The wireless device 4802 may initiate a connection re-establishment procedure, for example, based on determining the RLF of the MCG. The wireless device 4802 may initiate the connection re-establishment procedure based on determining the RLF of the MCG, for example, if an AS security is activated. The wireless device 4802 may perform one or more actions upon leaving RRC_CONNECTED mode. The wireless device 4802 may perform the one or more actions upon leaving RRC_CONNECTED mode, for example, if the AS security is not activated.

The wireless device 4802 may determine an RLF for an SCG, for example, based on the first timer expiring in the cell, for example, if the cell is a PSCell. The wireless device 4802 may initiate an SCG failure information procedure to report the RLF for the SCG, for example, based on determining the RLF for the SCG.

The wireless device 4802 may select an active BWP of the two or more active BWPs to perform RLM. Inefficiencies of RLM at the wireless device 4802 may be reduced by determining (e.g., selecting) the active BWP of the two or more active BWPs. Power consumption at the wireless device 4802 may be reduced by determining (e.g., selecting) active BWP of the two or more active BWPs for RLM.

Figure 49:
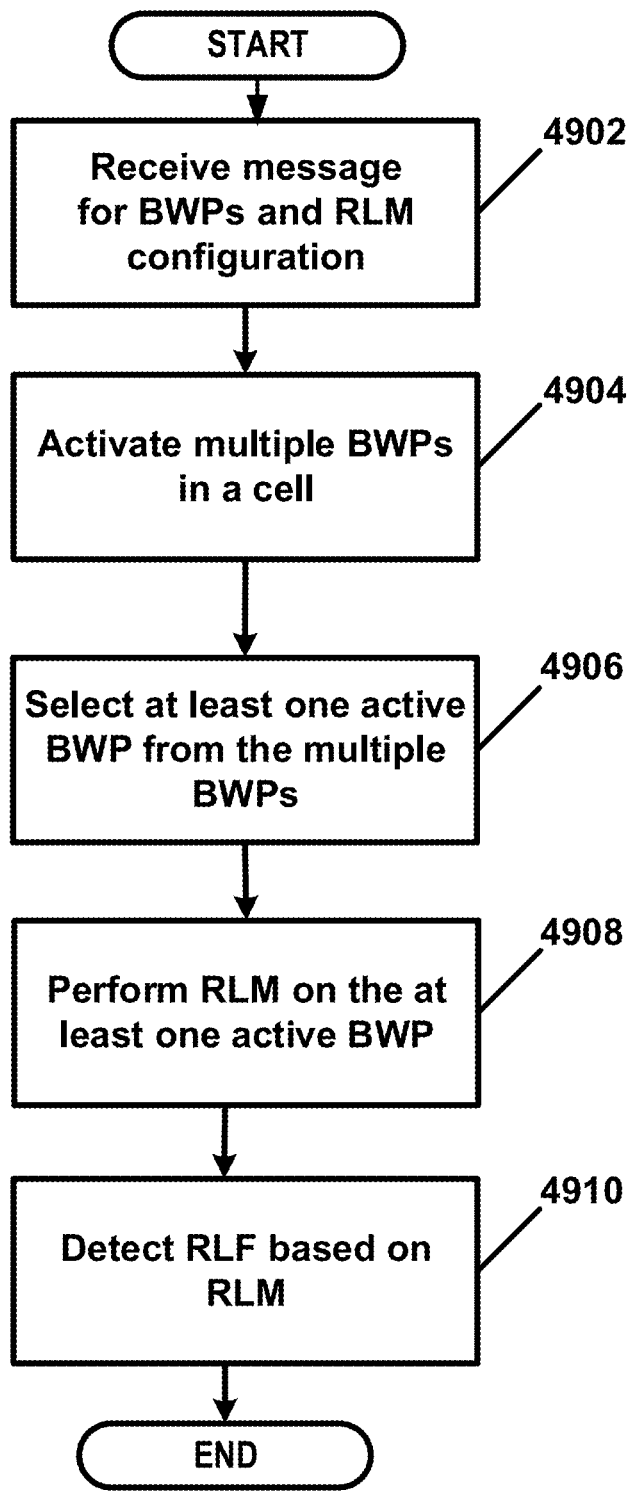
FIG. 49 shows an example method for determining a radio link failure (RLF).

FIG. 49 shows an example method for determining an RLF. At step 4902, a wireless device may receive one or more RRC messages. The one or more RRC messages may be sent by a base station. The one or more RRC messages may comprise configuration parameters of a cell. The cell may comprise one or more BWPs. Each of the one or more BWPs may be indicated by a BWP-specific index. Each BWP of the one or more BWPs may be associated with one or more RSs for RLM. The configuration parameters may comprise configuration for the one or more BWPs. The configuration parameters may comprise an RLM configuration for each of the one or more BWPs. At step 4904, the wireless device may activate two or more BWPs of the one or more BWPs. At step 4906, the wireless device may select a BWP of the two or more BWPs. The wireless device may select the BWP based on one or more criteria. At step 4908, the wireless device may perform RLM, for example, based on the one or more RSs associated with the BWP. At step 4910, the wireless device may determine an RLF. The RLF may be determined based on RLM performed at step 4908.

The one or more RRC messages received at step 4902 may indicate one or more of a first timer, a first counter, a second counter, a first threshold, and/or a second threshold for RLM detection performed at step 4908. Activating the two or more BWPs at step 4904 may comprise one or more of: activating a first BWP of the two or more BWPs at a first slot; and/or monitoring a first PDCCH of the first BWP based on activating the first BWP.

Activating the two or more BWPs at step 4904 may further comprise one or more of: activating a second BWP of the two or more BWPs at a second slot; and/or monitoring a second PDCCH of the second BWP based on activating the second BWP. The wireless device may monitor the first PDCCH of the first BWP for the second BWP based on activating the second BWP. The wireless device may monitor the first PDCCH of the first BWP for the second BWP based on activating the second BWP, for example, if the second BWP is not configured with PDCCH resource.

The one or more criteria (e.g., for selecting the at least one BWP in step 4906) may be based on a value of a BWP-specific index. The determining (e.g., selecting) at step 4906 may comprise determining (e.g., selecting) a BWP with a lowest BWP-specific index between the two or more BWPs. The determining (e.g., selecting) at step 4906 may comprise determining (e.g., selecting) a BWP with a highest BWP-specific index between the two or more BWPs.

Each of the one or more BWPs may be indicated by a numerology index. The determining (e.g., selecting) at step 4906 may comprise determining (e.g., selecting) a BWP with a lowest numerology index between the two or more BWPs. The determining (e.g., selecting) at step 4906 may comprise determining (e.g., selecting) a BWP with a highest numerology index between the two or more BWPs.

The determining (e.g., selecting) at step 4906 may comprise determining (e.g., selecting) a primary active BWP from the two or more BWPs. The primary active BWP may be a BWP on which the wireless device may perform an initial connection establishment procedure. The primary active BWP may be a BWP on which the wireless device may initiate a connection re-establishment procedure. The primary active BWP may be a BWP on which the wireless device may monitor PDCCH candidates, for example, in one or more common search spaces for DCI formats with CRC scrambled by an SI-RNTI, an RA-RNTI, a TC-RNTI, a P-RNTI, an INT-RNTI, an SFI-RNTI, a TPC-PUSCH-RNTI, a TPC-PUCCH-RNTI, a TPC-SRS-RNTI, a CS-RNTI, an SP-CSI-RNTI, and/or a C-RNTI. At step 4908, RLM may be performed. The RLM may comprise one or more of: assessing a downlink radio link quality based on the one or more RSs; out-of-sync and/or in-sync indications based on the assessed downlink radio link quality compared to the first threshold and/or the second threshold; and/or determining an RLF based on the out-of-sync and/or the in-sync indications, the first timer, the first counter, and/or the second counter.

Figure 50:
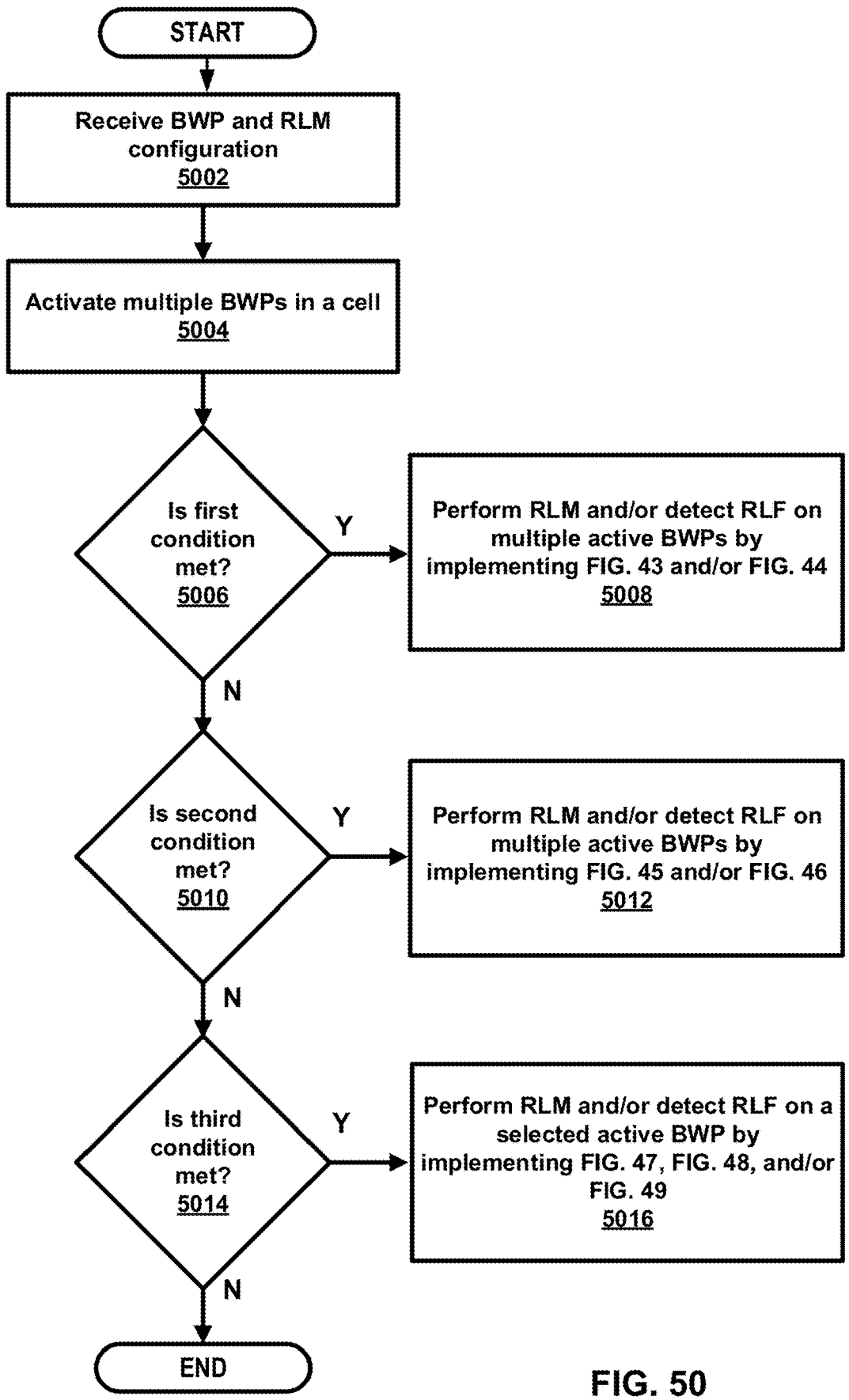
FIG. 50 shows an example method for a wireless device determining a RLF.

FIG. 50 shows an example method for a wireless device determining an RLF. The RLF may be based on RLM. The wireless device may determine the RLF autonomously. The wireless device may determine the RLF based on two or more active BWPs configured in a cell. A base station may be unaware aware of RLM procedures determined by the wireless device. At step 5002, the wireless device may receive one or more messages and/or data packets. The one or more messages and/or data packets may comprise BWP configuration parameters. The one or more messages and/or data packets may comprise configuration parameters for RLM. At step 5004, two or more BWPs in the cell may be activated.

At step 5006, the wireless device may determine if a first condition is met. Determining if the first condition is met may comprise determining if all active BWPs are configured in an unlicensed band and/or if a speed of RLM is to be increased. The method shown in FIG. 50 may proceed to step 5008 if the first condition is met. At step 5008, the wireless device may perform RLM and/or determine an RLF on two or more active BWPs, as shown in FIG. 43 and/or FIG. 44. Step 5010 may be performed if the first condition is not met.

At step 5010, the wireless device may determine if a second condition is met. Determining if the second condition is met may comprise determining if all active BWPs are configured in a licensed band and/or if a measurement accuracy of RLM is to be improved. Step 5012 may be performed if the second condition is met. At step 5012, the wireless device may perform RLM and/or determine an RLF on two or more active BWPs as shown in FIG. 45 and/or FIG. 46. Step 5014 may be performed if the second condition is not met.

At step 5014, the wireless device may determine if a third condition is met. Determining if the third condition is met may comprise determining if all active BWPs are in same frequency band, if all active BWPs partially or fully overlap, if all active BWPs have a same service type, and/or if all active BWPs have different service types with one having a higher priority than any other service type. Step 5016 may be performed if the third condition is met. At step 5016, the wireless device may perform RLM and/or determine an RLF on a determined (e.g., selected) active BWP, for example, as shown in FIG. 47, 48, and/or FIG. 49.

The steps shown in the method of FIG. 50 may be implemented in any order and are not limited to the order shown in FIG. 50. For example, step 5010 and/or step 5014 may be performed before or after step 5006, and/or step 5014 may be performed before or after step 5006 and/or step 5010. The wireless device may determine to perform RLM on the active BWP (e.g., jointly or independently), for example, if the wireless device is capable of monitoring radio link quality on the active BWP. The wireless device may select (e.g., autonomously select) the active BWP from the two or more active BWPs.

A wireless device may be configured to perform some or all of the operations described herein. The wireless device may be similar to, or the same as, each of the wireless devices described herein, including, for example, wireless devices 3202, 3302, 3402, 3502, 3602, 3702, 3802, 4202, 4302, 4402, 4502, 4602, 4702, and 4802.

Some wireless devices (e.g., wireless devices compatible with LTE, LTE-Advanced, NR, etc.; and/or any other wireless device) may perform various monitoring in a cell. Such wireless devices may monitor a downlink radio link quality of a cell, such as a PCell or a PSCell. Such wireless devices (e.g., a physical layer of such wireless devices) may monitor the downlink radio link quality, for example, for the purpose of providing a beam failure indication (BFI) to a higher layer of the wireless device (e.g., a MAC layer or an RRC layer). One or more BWPs may be configured on the cell. The wireless device may send (e.g., transmit) and/or receive, one or more message and/or data packets via an active BWP (e.g., a single active BWP) of the one or more BWPs configured on the cell. The other BWPs configured on the cell (e.g., some or all of the other BWPs configured on the PCell), for example, may be inactive. The wireless device may monitor the downlink radio link quality in the active BWP. The wireless device may refrain from monitoring the downlink radio link quality, for example, in any other BWPs of the one or more BWPs configured on the cell (e.g., may refrain from monitoring in any inactive BWP).

Figure 51:
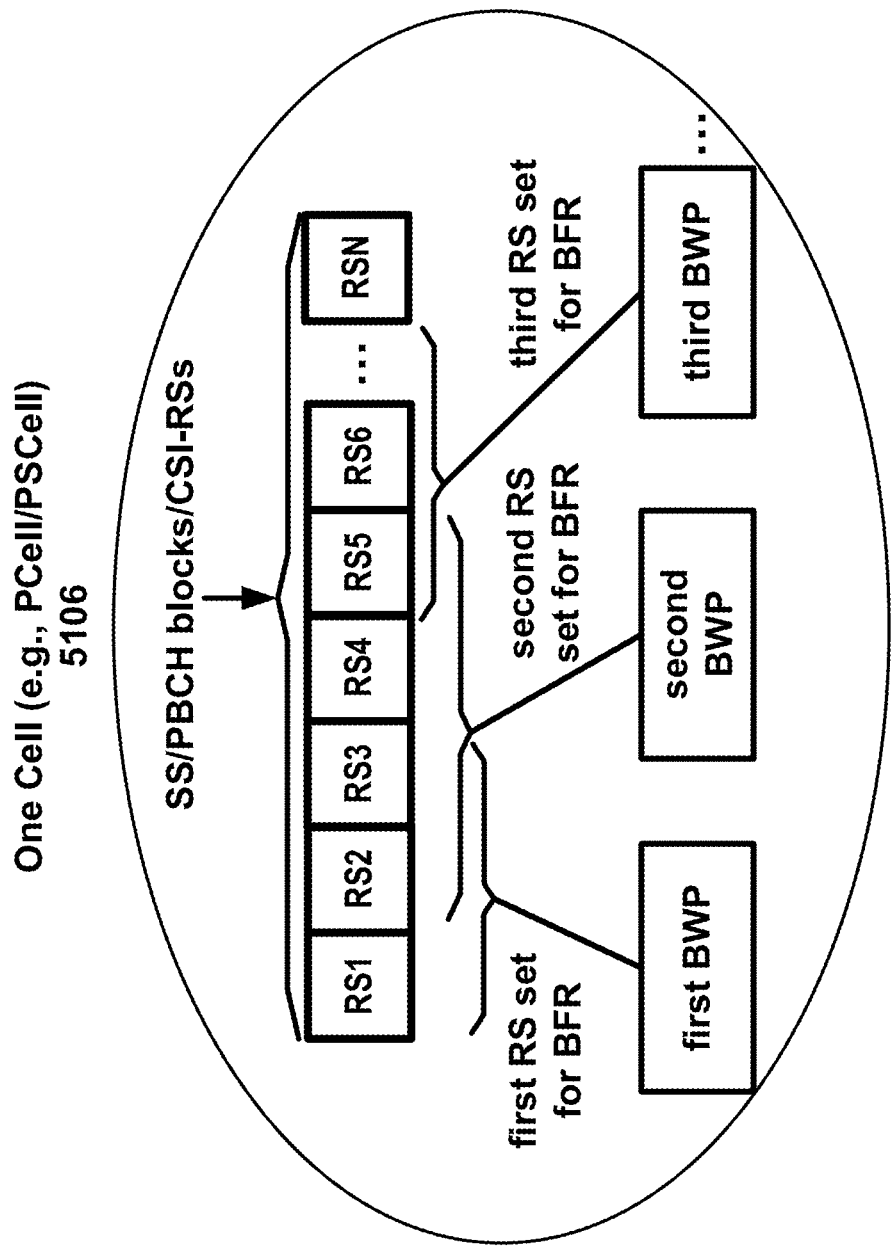
FIG. 51 shows an example configuration of BWPs and corresponding sets of resources for beam failure detection (BFD).

FIG. 51 shows an example configuration of BWPs and corresponding sets of resources for beam failure detection (BFD). A base station may send (e.g., transmit) one or more messages and/or data packets. The one or more messages and/or data packets may be received by a wireless device. The one or more messages and/or data packets may comprise configuration parameters. The one or more messages and/or data packets may comprise one or more RRC messages (e.g., an RRC connection reconfiguration message, an RRC connection reestablishment message, and/or an RRC connection setup message). The configuration parameters may comprise, for example, BWP configuration parameters for one or more BWPs of a cell 5106. The cell 5106 may comprise, for example, a PCell, a PSCell, or an SCell. The one or more BWPs may comprise a first BWP, a second BWP, and a third BWP of the cell 5106.

The configuration parameters may comprise one or more beam failure recovery (BFR) configuration parameters, for example, for each of the one or more BWPs. The one or more BFR configuration parameters may comprise a set of one or more RS resource configurations for each BWP of the one or more BWPs. Each set of RS resource configurations may comprise one or more RSs (e.g., CSI-RS and/or SS blocks) for a corresponding BWP of the one or more BWPs. A first set of RS resource configurations may comprise one or more RSs (e.g., CSI-RS and/or SS blocks) for the first BWP. The wireless device may measure a downlink radio link quality of one or more first beams associated with the one or more RSs for the first BWP for beam failure detection (BFD) and/or BFR, for example, for the first BWP and/or the cell 5106.

The one or more BFR configuration parameters may comprise a second set of RS resource configurations comprising one or more second RSs (e.g., CSI-RS and/or SS blocks) of the first BWP. The wireless device may measure a downlink radio link quality of one or more second beams associated with the one or more second RSs of the first BWP. A first RS set for BFR may be associated with the first BWP. A second RS set for BFR may be associated with a second BWP. A third RS set for BFR may be associated with a third BWP. The one or more BFR configuration parameters may comprise one or more BFR request (BFRQ) resources. The one or more BFR configuration parameters may comprise an association between each of the one or more second RSs and each of the one or more BFRQ resources.

The first BWP of the cell 5106 may be in active state. The second BWP and the third BWP of the cell 5106 may be in an inactive state. The wireless device may monitor at least one PDCCH of the first BWP. At least one RS (e.g., a DM-RS) of the at least one PDCCH may be associated with the one or more first RSs (e.g., QCL-ed). A physical layer of the wireless device may assess a downlink radio link quality of the one or more first RSs, for example, by comparing a BLER associated with the first RSs to a first threshold. The first threshold (e.g., a hypothetical BLER or an L1-RSRP) may be a first threshold value sent by a higher layer of the wireless device (e.g., an RRC layer or a MAC layer).

Figure 52:
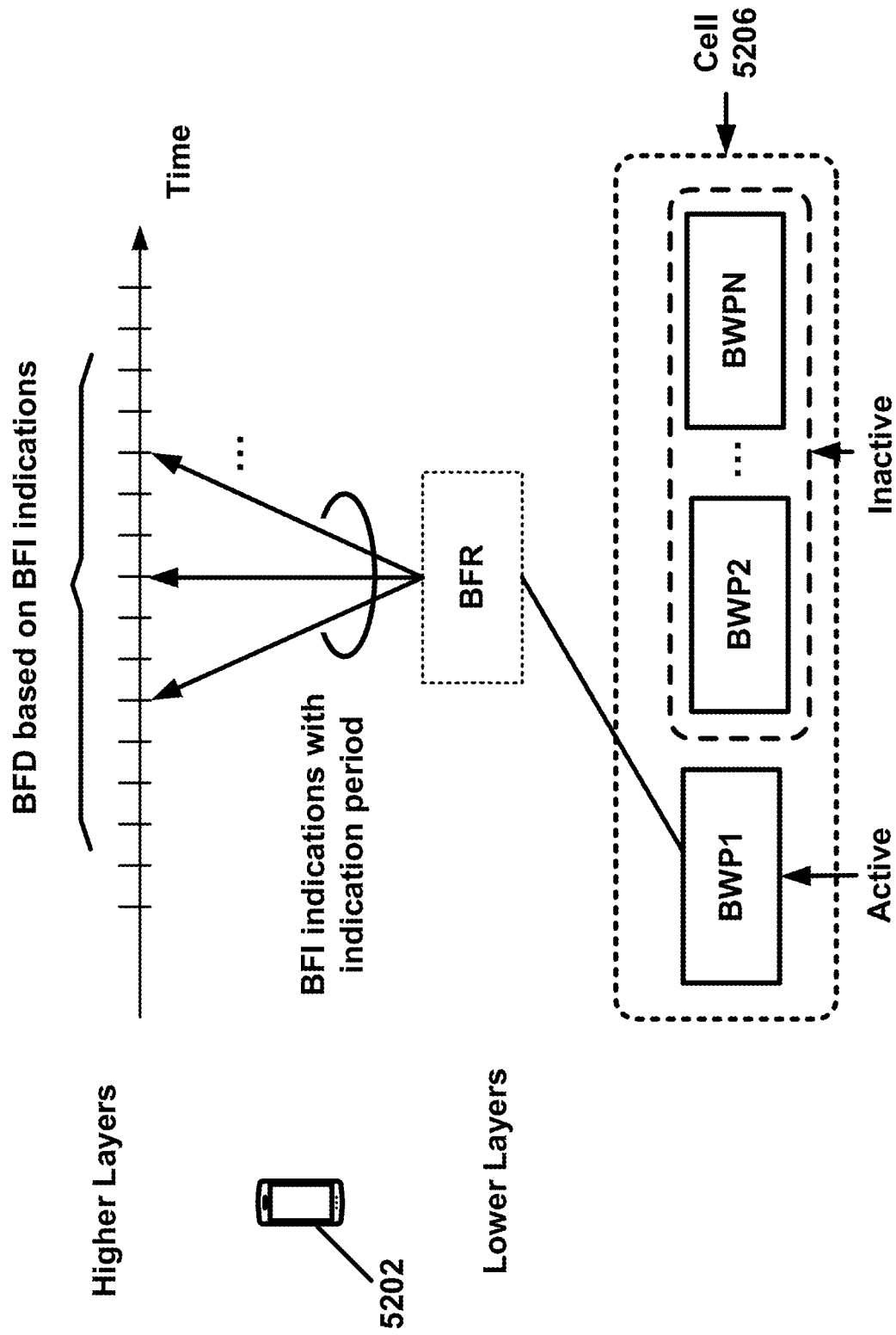
FIG. 52 shows an example of performing BFD on an active BWP.

FIG. 52 shows an example of performing BFD on an active BWP. A wireless device 5202 may monitor a downlink radio link quality on an active BWP (e.g., the first BWP), for example, for BFR. At least some wireless devices (e.g., wireless devices compatible with 3GPP Release 15, and/or any other wireless devices) may be configured up to a maximum quantity of resources (e.g., BWPs). Such wireless devices may activate, for example, one BWP of the maximum quantity of BWPs (e.g., 4 BWPs, 8 BWPs, 16 BWPs, etc.) at a time. For such wireless devices (e.g., the wireless device 5202), one BWP (e.g., an uplink BWP and/or a downlink BWP) may be active in a cell 5206 (e.g., a PCell, an SCell, etc.). If there is one active BWP in the cell 5206, the wireless device 5202 may perform BFD and/or BFR for the active BWP. BWPs may have similar channel conditions, such as in high frequencies (e.g., 60 GHz). If there is a beam failure on a first BWP, there may also be a beam failure on a second BWP, for example, if the first BWP and the second BWP share the same serving beams and/or channel qualities. The wireless device 5202 may activate at least two downlink BWPs on the cell 5206, for example, if multiple active downlink BWPs may be supported for the cell 5206. Monitoring each active BWP of the at least two downlink BWPs for BFD may increase the power and/or battery consumption of the wireless device 5202, for example, if the at least two downlink BWPs are active.

Detecting a beam failure on one of the BWPs of at least two downlink BWPs may be sufficient to declare and/or detect a beam failure for at least two downlink BWPs. A wireless device may reduce power consumption and/or reduce interference, for example, by performing BFD on one active BWP of one or more active BWPs, such as using a rule (e.g., a predefined rule) applied by both the wireless device and a base station, for example, to select the active BWP for BFD. The rule may comprise one or more of: select a downlink BWP, among the at least two downlink BWPs, with the lowest/highest BWP index; select a downlink BWP, among the at least two downlink BWPs, designated as a primary BWP (e.g., default BWP, initial downlink BWP, etc.); select a downlink BWP, among the at least two downlink BWPs, configured with common control/UE-specific channel(s); select a downlink BWP, among the at least two downlink BWPs, configured with the lowest/highest beam failure detection counter; and/or select a downlink BWP, among the at least two downlink BWPs, configured with the lowest/highest subcarrier spacing.

A first BWP with a high subcarrier spacing (e.g., 60 kHz, 120 kHz) may be used for a first service (e.g., an URLLC service). A second BWP with a low subcarrier spacing (e.g., 15 kHz, 30 kHz) may be used for a second service (e.g., an eMBB service). A wireless device may select a BWP among the first BWP and the second BWP for beam failure detection, for example, if the first BWP and the second BWP are active at the same time for both the first service (e.g., URLLC) and the second service (e.g., eMBB service). The wireless device may select a BWP among the first BWP and the second BWP, for example depending on the service (or subcarrier spacing). If a first service (e.g., URLLC) is more important for the wireless device and the first service is frequent, the wireless device may select the first BWP with the high subcarrier spacing configured for the first service (e.g., URLLC) which may require more reliability and/or robust transmission. If a second service (e.g., eMBB service) is very frequent and the second service (e.g., URLLC) is infrequent, the wireless device may select the second BWP with the lowest subcarrier spacing configured for the second service (e.g., eMBB service) to support high data rate applications (e.g., virtual reality, real-time monitoring, etc.).

A physical layer of the wireless device 5202 may send a BFI indication via a higher layer (e.g., a MAC layer) of the wireless device 5202. The physical layer of the wireless device 5202 may send the BFI indication, for example, if the downlink radio link quality (e.g., the BLER, SINR, and/or the L1-RSRP) for the one or more RSs for the first BWP (e.g., a periodic CSI-RS and/or an SSB) fails to satisfy the first threshold (e.g., if the BLER is greater than a BLER of the first threshold, if the SINR is less than a SINR of the first threshold, and/or the L1-RSRP is less than an L1-RSRP of the first threshold). The wireless device 5202 may send the BFI to the higher layer with a periodicity (e.g., sent periodically according to a period). The periodicity may comprise any value. The periodicity may be determined by the one or more BFR configuration parameters. The periodicity may be determined by a maximum between a first value (e.g., a shortest periodicity of the one or more RSs for the first BWP) and a second value (e.g., 2 ms). The second value may be configured via the one or more RRC messages.

The physical layer of the wireless device 5202 may refrain from sending a non-BFI indication to the higher layer of the wireless device 5202, for example, if the downlink radio link quality (e.g., a BLER, SINR, and/or an L1-RSRP) for the one or more RSs of the first BWP (e.g., a periodic CSI-RS and/or an SSB) satisfies the first threshold (e.g., if the BLER is less than the BLER of the first threshold, if the SINR is greater than the SINR of the first threshold, and/or the L1-RSRP is greater than the L1-RSRP of the first threshold).

The wireless device 5202 may start and/or restart a first BFD timer (e.g., a beamFailureDetectionTimer) of the first BWP, for example, if a MAC layer of the wireless device 5202 receives a BFI of the first BWP from the physical layer of the wireless device 5202. The first BFD timer may be configured via an RRC message (e.g., by one or more BeamFailureRecoveryConfig parameters associated with an RRC message). The wireless device may increment a first beam failure counter (e.g., a BFI_COUNTER) of the first BWP (e.g., by one unit), for example, based on the BFI.

The wireless device 5202 may determine a beam failure based on the first beam failure counter being equal to or greater than a first number, value, or quantity (e.g., a beamFailureInstanceMaxCount value). The first number, value, or quantity may be configured via an RRC message (e.g., by the one or more BeamFailureRecoveryConfig parameters). The wireless device 5202 may set the first beam failure counter to zero, for example, if the first BFD timer expires. A second timer of the wireless device 5202 may be configured. The wireless device 5202 may start the second timer (e.g., a BFR timer) based on detecting the beam failure. The wireless device 5202 may initiate a random access procedure for BFR based on the first beam failure counter being equal to or greater than the first value.

The random access procedure may comprise a candidate beam identification procedure. The candidate beam identification procedure may comprise the wireless device 5202 identifying a first RS in the one or more second RSs of the first BWP. The first RS may be associated with a BFRQ resource of the one or more BFRQ resources. The BFRQ resource may comprise at least one preamble and/or at least one PRACH resource (e.g. a time and/or a frequency resource). A second downlink radio link quality (e.g., a BLER, an SINR, and/or an L1-RSRP) for the one or more RSs for the second BWP (e.g., a periodic CSI-RS and/or an SSB) may satisfy a second threshold (e.g., if the BLER is greater than a BLER of the second threshold, if the SINR is less than a SINR of the second threshold, and/or the L1-RSRP is less than an L1-RSRP of the second threshold). The second threshold may be a second threshold value sent via the higher layer of the wireless device 5202 (e.g., an RRC layer or a MAC layer).

The wireless device 5202 may initiate a BFRQ transmission of the random access procedure based on identifying the first RS of the first BWP. The BFRQ transmission may comprise sending (e.g., transmitting) at least one preamble via the at least one PRACH resource for the random access procedure of the first BWP, for example, in a first slot.

The wireless device 5202 may start monitoring for a BFR response of a base station based on sending the at least one preamble in the first slot, for example, in a second slot. Monitoring for the BFR response may comprise monitoring at least one second PDCCH, for example, in one or more CORESETs associated with the first BWP. Monitoring the at least one second PDCCH may comprise monitoring for a first DCI (e.g., a downlink assignment and/or an uplink grant), for example, within a configured response window. The first DCI may comprise a CRC scrambled by a C-RNTI of the wireless device 5202. The one or more CORESETs may be configured by the one or more BFR configuration parameters. The random access procedure for a BFR procedure may be successfully completed based on receiving the first DCI on the at least one second PDCCH in the one or more CORESETs, for example, within the configured response window.

A cell may be configured with one or more active BWPs. The wireless device may perform BFD on an active BWP (e.g., a single active BWP) of the one or more active BWPs. Power consumption of the wireless device may increase, for example, if the wireless device performs BFD on more than one active BWPs (e.g., on all of the active BWPs). The wireless device may select (e.g., autonomously select) an active BWP from the one or more active BWPs. Measurement accuracy for BFD may be reduced, for example, if the wireless device performs BFD on the active BWP determined (e.g., selected) autonomously by the wireless device, for example, without a knowing a basis for determining (e.g., selecting) the active BWP by the wireless device.

A wireless device may perform BFD for each active BWP separately. A base station may be configured with two or more active BWPs (e.g., a first active BWP and a second active BWP). The wireless device may perform a first BFD for the first active BWP. The wireless device may perform a second BFD for the second active BWP. The wireless device may determine a beam failure based on either the first BFD or the second BFD.

A wireless device may perform BFD for each active BWP jointly (e.g., together). A base station may be configured with two or more active BWPs (e.g., a first active BWP and a second active BWP). The wireless device may perform BFD on the first active BWP and the second active BWP jointly. The wireless device may determine a beam failure based on the BFD.

A wireless device may perform BFD on an active BWP (e.g., a single active BWP) of the two or more active BWPs. The active BWP may be determined (e.g., selected) based on one or more criteria. The active BWP determined (e.g., selected) may be aligned between the wireless device and a base station based on one or more rules.

A base station may communicate with a wireless device on two or more active BWPs in a cell (e.g., a PCell, a PSCell, an SCell, or any other cell type). The one or more active BWPs may each be a downlink BWP. The base station may send (e.g., transmit) one or more types of data services via different active BWPs in parallel (e.g., simultaneously and/or overlapped in time). The wireless device may receive the one or more types of data services via different active BWPs in parallel (e.g., simultaneously and/or overlapped in time). The wireless device may perform BFR, for example, if the one or more active BWPs are in an active state in the cell. The wireless device may be unable to determine how to perform a BFR operation (e.g., a BFI indication, a BFD, and/or a BFR) on the cell, for example, if one or more active BWPs overlap in time in the cell. The wireless device may be unable to determine how to select a single active BWP from the one or more active BWPs to perform the BFR operation. The wireless device may be unable to determine how to send a BFI indication based on downlink radio link qualities on the two or more active BWPs, for example, if the wireless device is capable of performing BFR operations on the two or more active BWPs in parallel. FIGS. 53, 54, 55, 56, 57, 58, 59, and 60 show BFR on a cell (e.g., a PCell, a PSCell, an SCell, or any other cell type) by a wireless device, for example, if the cell is configured with two or more active BWPs.

Figure 53:
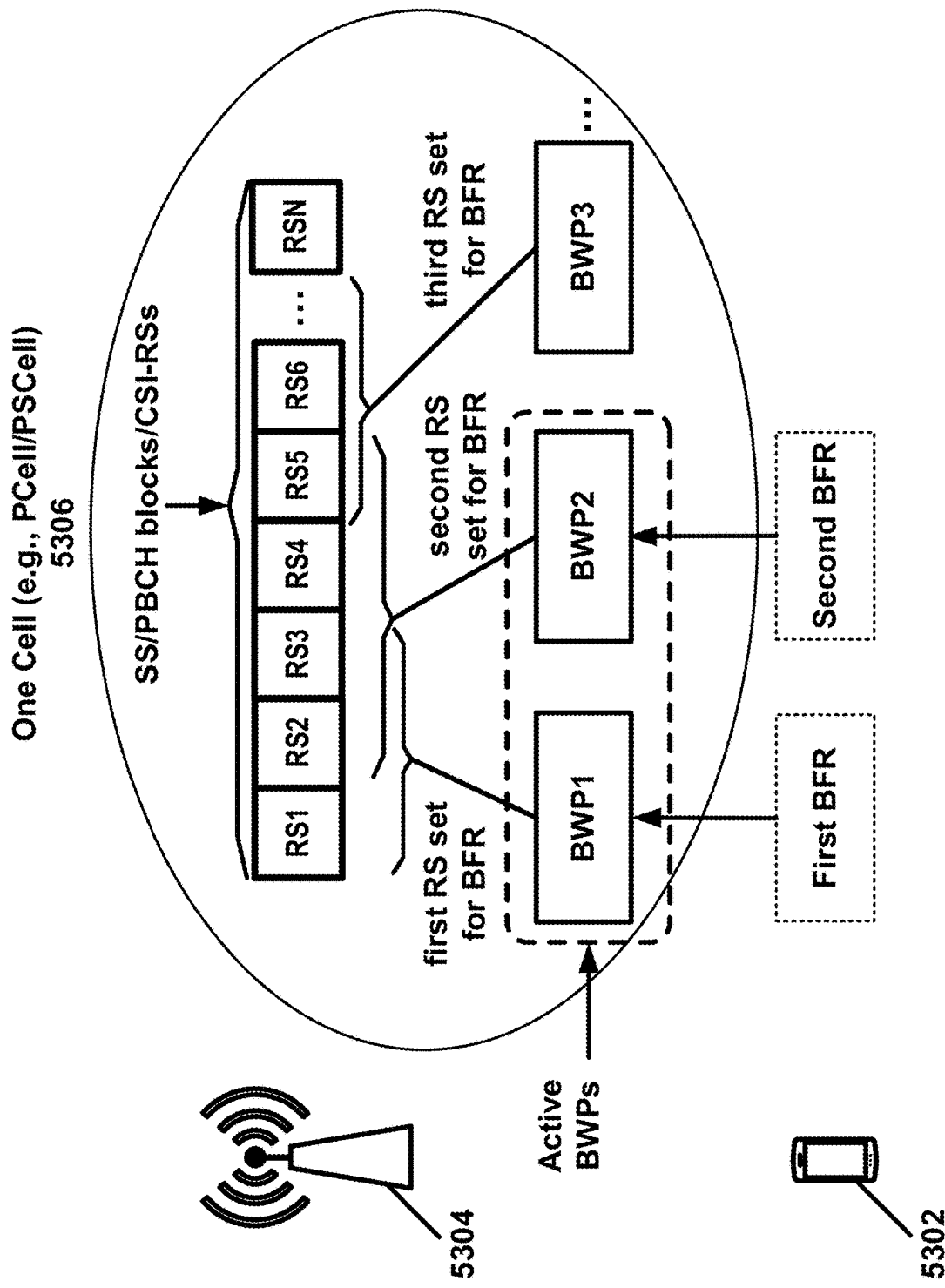
FIG. 53 shows an example configuration of two or more active BWPs and corresponding sets of resources for BFD.

FIG. 53 shows an example configuration of two or more active BWPs and corresponding sets of resources for BFD. BFD may be performed on at least two active BWPs separately. A base station 5304 may send (e.g., transmit), to a wireless device 5302, one or more messages and/or data packets. The wireless device 5302 may receive the one or more messages and/or data packets. The one or more messages and/or data packets may comprise configuration parameters of a cell 5306. The configuration parameters may comprise BWP configuration parameters for one or more BWPs. The one or more BWPs may comprise a first BWP, a second BWP, and a third BWP. The first BWP may be an active BWP. The second BWP may be an active BWP. The third BWP may be an inactive BWP. The configuration parameters may comprise one or more BFR configuration parameters (e.g., one or more BeamFailureRecoveryConfig parameters) for each BWP of the one or more BWPs (e.g., for each of the first BWP and the second BWP).

The one or more BFR configuration parameters may comprise a set of BWP-specific RS resource configurations for each BWP of the one or more BWPs. A first set of BWP-specific RS resource configurations for the first BWP may comprise one or more first RSs (e.g., CSI-RS and/or SS blocks) of the first BWP. A second set of BWP-specific RS resource configurations for the second BWP may comprise one or more second RSs (e.g., CSI-RS and/or SS blocks) of the second BWP. The one or more first RSs may be BFR RSs of the first BWP (e.g., a first RS set for BFR). The one or more second RSs may be BFR RSs of the second BWP (e.g., a second RS set for BFR).

Each BWP of the one or more BWPs may be associated with a BWP-specific BFI counter (e.g., a beamFailureInstanceMaxCount). The BWP-specific BFI counter may be configured by the one or more BFR configuration parameters. The first BWP may be configured with a first BWP-specific BFI counter. The second BWP may be configured with a second BWP-specific BFI counter.

The one or more BWPs may be associated with a BWP-specific BFI counter (e.g., a beamFailureInstanceMaxCount). The BWP-specific BFI counter may be configured by the one or more BFR configuration parameters. The BWP-specific BFI counter may be cell-specific (e.g., specific to the cell 5306).

Each BWP of the one or more BWPs may be associated with a BWP-specific BFD timer (e.g., a beamFailureDetectionTimer). The BWP-specific BFD timer may be configured by the one or more BFR configuration parameters. The first BWP may be configured with a first BWP-specific BFD timer. The second BWP may be configured with a second BWP-specific BFD timer.

The one or more BWPs may be associated with a BWP-specific BFD timer (e.g., the beamFailureDetectionTimer). The BWP-specific BFD timer may be configured by the one or more BFR configuration parameters. The BWP-specific BFD timer may be cell specific (e.g., specific to the cell 5306).

The base station 5304 and/or the wireless device 5302 may activate two or more BWPs (e.g., two or more active BWPs) of the one or more BWPs. The two or more active BWPs may comprise a first active BWP and a second active BWP. Activating two or more BWPs may comprise activating the first active BWP of the two or more active BWPs in a first slot and/or activating the second active BWP of the two or more active BWPs in a second slot.

Each active BWP of the two or more active BWPs may be associated with a set of BWP-specific RS resources for a BFR operation. The BFR operation may comprise a BFI indication, BFD, and/or BFR. A first set of BWP-specific RS resources for the first BWP may comprise one or more first RSs (e.g., CSI-RS and/or SS blocks) of the first BWP. A second set of BWP-specific RS resources for the second BWP may comprise one or more second RSs (e.g., CSI-RS and/or SS blocks) of the second BWP.

The wireless device 5302 may perform a BFR operation on each of the two or more active BWPs in the cell 5306. A BFR operation may comprise assessing a downlink radio link quality on each of the two or more active BWPs (e.g., the first active BWP and the second active BWP). Assessing a downlink radio link quality may comprise evaluating the downlink radio link quality based on comparing a set of BWP-specific resources associated with a BWP, for example, over a time period, to a threshold. The threshold (e.g. a hypothetical BLER or an L1-RSRP) may be a value sent via a higher layer (e.g., an RRC layer or a MAC layer) of the wireless device 5302. The threshold may be BWP-specific. The threshold may be cell-specific (e.g., specific to the cell 5306).

The wireless device 5302 may monitor at least one PDCCH of the first BWP. At least one first RS (e.g., a DM-RS) of the at least one PDCCH may be associated with the one or more first RSs (e.g., QCL-ed). The physical layer of the wireless device 5302 may assess a first downlink radio link quality of the one or more first RSs, for example, by comparing the first downlink radio link quality with a first threshold. The wireless device 5302 may monitor at least one second PDCCH of the second BWP. At least one second RS (e.g., a DM-RS) of the at least one second PDCCH may be associated with the one or more second RSs (e.g., QCL-ed). The physical layer of the wireless device 5302 may assess a second downlink radio link quality of the one or more second RSs by, for example, comparing the second downlink radio link quality with a second threshold. The first threshold (e.g., a hypothetical BLER or an L1-RSRP) may be a value sent via the higher layer of the wireless device 5302 (e.g., the RRC layer or the MAC layer). The second threshold (e.g., a hypothetical BLER or an L1-RSRP) may be a second threshold value sent via the higher layer of the wireless device 5302 (e.g., the RRC layer or the MAC layer).

The physical layer of the wireless device 5302 may send a BFI indication, for example, if the downlink radio link quality (e.g., the BLER, SINR, or the L1-RSRP), for example, based on the set of BWP-specific resources (e.g., the periodic CSI-RS or the SSB) of the two or more active BWPs fails to satisfy the threshold (e.g., if the BLER is greater than a BLER of the threshold, if the SINR is less than a SINR of the threshold, and/or the L1-RSRP is less than an L1-RSRP of the threshold). The physical layer of the wireless device 5302 may send the BFI indication via the higher layer (e.g., the MAC layer) of the wireless device 5302. The wireless device 5302 may send the BFI indication to the higher layer with a BWP-specific periodicity (e.g., sent periodically according to a period). The BWP-specific periodicity may be any value. The BWP-specific periodicity may be determined by a maximum value between a shortest periodicity of the set of BWP-specific resources and a third value (e.g., 2 ms). The third value may be configured by the configuration parameters.

The physical layer of the wireless device 5302 may send a first BFI indication for the first BWP via the higher layer (e.g., the MAC layer), for example, if the first downlink radio link quality (e.g., the BLER, SINR, or the L1-RSRP), for example, based on the set of first BWP-specific resources of a BWP of the two or more active BWPs, fails to satisfy the first threshold (e.g., if the BLER is greater than a BLER of the first threshold, if the SINR is less than a SINR of the first threshold, and/or the L1-RSRP is less than an L1-RSRP of the first threshold). The wireless device 5302 may send the first BFI indication to the higher layer with a first BWP-specific periodicity (e.g., periodically sent according to a period). The first BWP-specific periodicity may be any value. The first BWP-specific periodicity may be determined by a maximum value between a shortest periodicity of the first set of BWP-specific resources and a fourth value (e.g., 2 ms). The fourth value may be configured by the configuration parameters. Performing a first BFR operation on the first BWP of the at least two BWPs may be independent of performing a second BFR operation on the second BWP of the at least two BWPs.

The wireless device 5302 may start and/or restart a BWP-specific BFD timer (e.g., a beamFailureDetection-Timer), for example, if the higher layer of the wireless device 5302 receives a BFI indication from a BWP of the two or more active BWPs (e.g., the first BWP or the second BWP). The higher layer of the wireless device 5302 may receive the BFI indication from the physical layer of the wireless device 5302. The wireless device may increment a beam failure counter (e.g., a BFI_COUNTER) of the BWP (e.g., by one unit) associated with the BFI indication.

The wireless device 5302 may determine a beam failure of the BWP based on the beam failure counter being equal to or greater than a BWP-specific BFI counter of the BWP. The wireless device 5302 may set the beam failure counter to zero, for example, if the BWP-specific BFD timer of the BWP expires. The wireless device 5302 may comprise a second timer (e.g., a BFR timer). The wireless device 5302 may start the second timer based on detecting the beam failure of the BWP.

The wireless device may start and/or restart a first BWP-specific BFD timer (e.g., a beamFailureDetectionTimer) of the first BWP, for example, if a higher layer of the wireless device 5302 receives the first BFI indication of the first BWP. The higher layer of the wireless device 5302 may receive the first BFI indication of the first BWP from the physical layer of the wireless device 5302. The wireless device 5302 may increment a first beam failure counter (e.g., a BFI_COUNTER) of the first BWP (e.g., by one unit).

The wireless device 5302 may determine a first beam failure of the first BWP based on the first beam failure counter being equal to or greater than the first BWP-specific BFI counter. The wireless device may set the first beam failure counter to zero, for example, if the first BWP-specific BFD timer expires. The wireless device 5302 may initiate a random access procedure for a BFR of the cell 5306 based on determining a beam failure of a BWP.

The higher layer of the wireless device 5302 may determine a beam failure based on the first BFI indication of the first BWP and the second BFI indication of the second BWP. A BWP-specific beam failure counter (e.g., a beamFailure-InstanceMaxCount) may be configured for the cell 5306 and/or for each BWP.

The cell 5306 may be associated with one or more RSs (e.g., RS1, RS2, ..., RSN) and one or more BWPs (e.g., BWP1, BWP2 and BWP3, ...). BWP1 may be associated with RS1, RS2 and RS3, for example, for a BFR operation. BWP2 may be associated with RS2, RS3, RS4 and RS5, for example, for a BFR operation. BWP3 may be associated with RS5, RS6, ..., RSN. The wireless device 5302 may perform a first BFR operation based on RS1, RS2 and RS3 and/or may perform a second BFR operation based on RS2, RS3, RS4 and RS5 on BWP2, for example, if BWP1 and BWP2 are in an active state.

Figure 54:
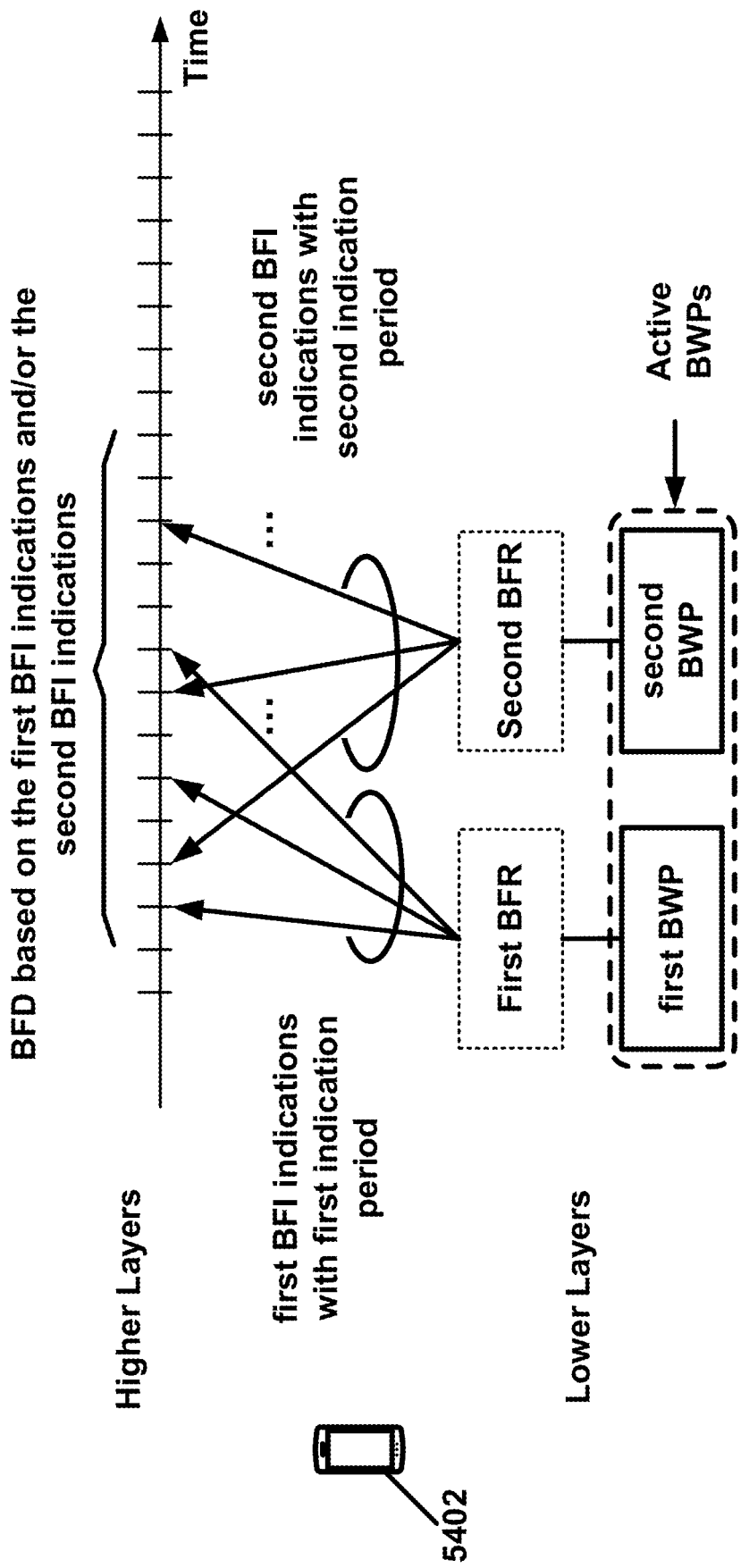
FIG. 54 shows an example of performing BFD on two or more active BWPs separately.

FIG. 54 shows an example of performing BFD on two or more active BWPs separately. BFR operation may be performed on one or more frames and/or subframes. The physical layer of the wireless device 5402 may send a first BFI indication with a first BWP-specific periodicity (e.g., periodically based on a period of any value) on a first active BWP. The physical layer of the wireless device 5402 may send the first BFI indication via the higher layer of the wireless device 5402 (e.g., the MAC layer and/or the RRC layer). The physical layer of the wireless device 5402 may send a second BFI indication with a second BWP-specific periodicity (e.g., periodically based on a period of any value) on a second active BWP. The physical layer of the wireless device 5402 may send the second BFI indication via the higher layer of the wireless device 5402.

The wireless device 5402 may assess downlink radio link quality of two or more active BWPs in the cell. The wireless device 5402 may determine a beam failure based on downlink radio link qualities of the two or more active BWPs. Measurement results of downlink radio link quality may be more accurate based on the two or more active BWPs compared to measurement results of downlink radio link quality on a single active BWP. Unnecessary BFD may be avoided and/or declaration of beam failure may be avoided, for example, if the wireless device 5402 assesses downlink radio link quality of the two or more active BWPs in the cell.

Providing BFI indications on two or more active BWPs with one or more different periodicities may be inefficient. Managing a first BWP-specific BFD timer (e.g., a beamFailureDetectionTimer), a first BWP-specific BFI counter (e.g., a beamFailureInstanceMaxCount), a second BWP-specific BFD timer, and/or a second BWP-specific BFI counter, for example, in a higher layer of the wireless device 5402 may be difficult to implement.

Figure 55:
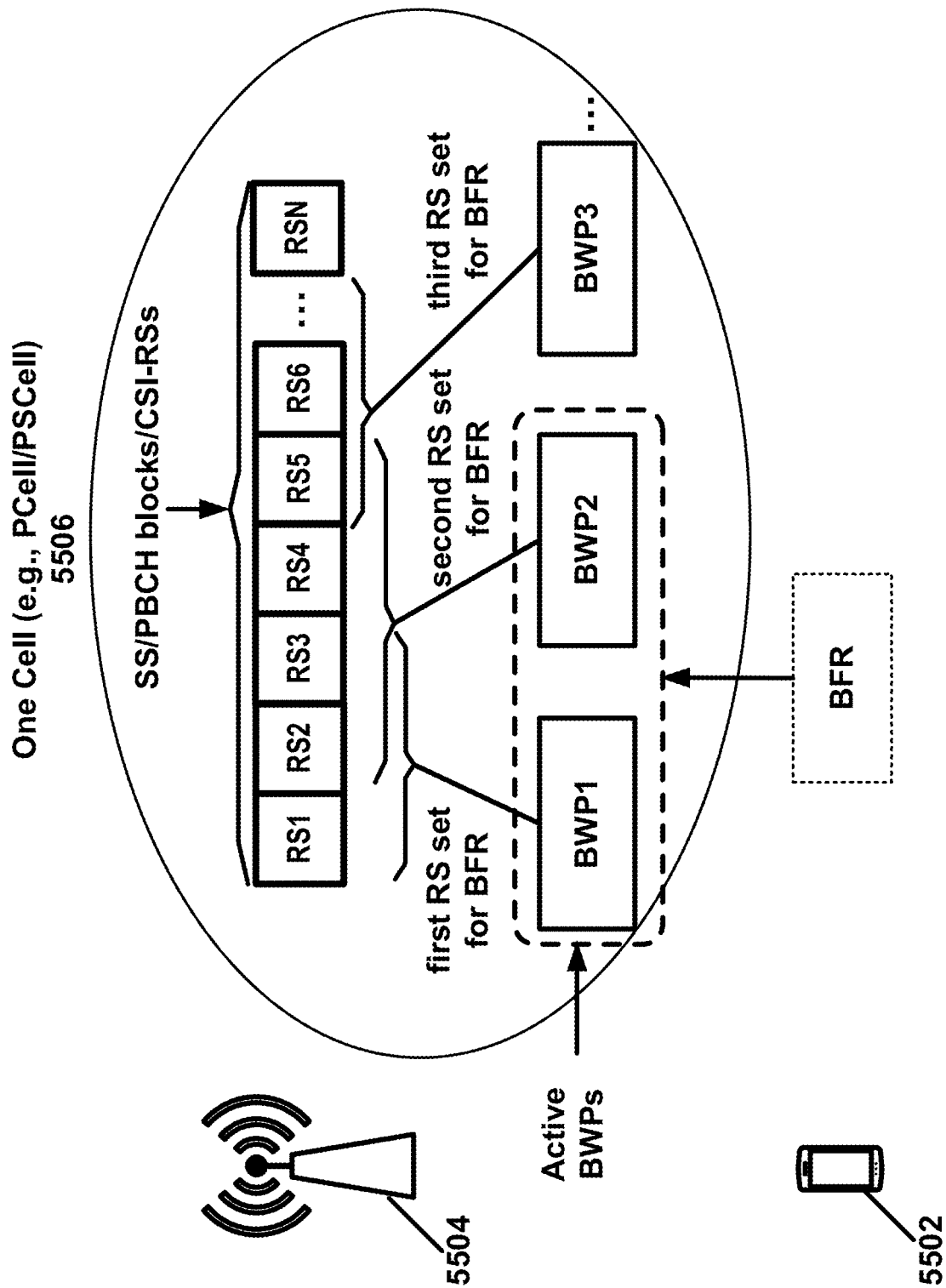
FIG. 55 shows an example configuration of two or more active BWPs and corresponding sets of resources for BFD.

FIG. 55 shows an example configuration of two or more active BWPs and corresponding sets of resources for BFD. BFD may be performed on two or more active BWPs jointly. The wireless device 5502 may send one or more BFIs efficiently, for example, based on two or more active BWPs. Inefficiencies associated with providing the one or more BFIs may be reduced, for example, by the wireless device 5502. A base station 5504 may send (e.g., transmit), to a wireless device 5502, one or more messages and/or data packets. The wireless device 5502 may receive the one or more messages. The one or more messages and/or data packets may comprise configuration parameters of a cell 5506. The cell 5506 may comprise a PCell. The cell 5506 may comprise a PSCell of an SCG, for example, if the cell 5506 comprises the SCG. The cell 5506 may comprise an SCell or any other cell type. The configuration parameters may indicate the cell 5506 comprises one or more BWPs. The configuration parameters may indicate a set of resources (e.g., RSs) on at least one BWP of the one or more BWPs for a BFR operation. The set of resources may be indicated by a set of resources indexes. The set of resources may be a subset of one or more SS/PBCH blocks and/or one or more CSI-RS resources. The one or more messages and/or data packets may indicate one or more thresholds comprising a first threshold for evaluating the downlink radio link quality of the cell 5506.

The base station 5504 and/or the wireless device 5502 may activate at least two BWPs of the one or more BWPs (e.g., BWP1 and BWP2). Each of the at least two BWPs may be associated with a set of resources for BFD and BFR.

The wireless device 5502 may perform a BFR operation on the at least two BWPs based on the at least two BWPs being in an active state in the cell. The BFR operation may comprise assessing at least one time per an indication period a downlink radio link quality on the at least two BWPs. Assessing a downlink radio link quality on the at least two BWPs may comprise comparing on one or more sets of resources associated with the at least two active BWPs, for example, over a time period, to a threshold. The threshold (e.g., a hypothetical BLER or an L1-RSRP) may be a value sent by the higher layer (e.g., the RRC or the MAC layer) of the wireless device 5502. The threshold may be BWP-specific. The threshold may be cell-specific (e.g., specific to the cell 5506).

The cell 5506 may be associated with one or more RSs (e.g., RS1, RS2, . . . , RSN) and one or more BWPs (e.g., BWP1, BWP2 and BWP3, . . . ). BWP1 may be associated with a first set of BWP-specific RS resources (RS1, RS2, and RS3) for a first BFR operation. BWP2 may be associated with a second set of BWP-specific RS resources (RS2, RS3, RS4, and RS5) for a second BFR operation. BWP1 and BWP2 may be in an active state. The physical layer of the wireless device 5502 may assess a downlink radio link quality of the cell 5506 based on one or more sets of RSs comprising the first set of BWP-specific RS resources and the second set of BWP-specific RS resources. The one or more sets of RSs may comprise RS1, RS2, RS3, RS4, and RS5. The physical layer of the wireless device 5502 may assess the downlink radio link quality of the cell 5506 based on the one or more sets of RSs, for example, over a time period, by comparison with a threshold.

The physical layer of the wireless device 5502 may send a BFI indication via the higher layer of the wireless device 5502 based on the downlink radio link quality assessed. The downlink radio link quality may be assessed based on the one or more sets of RSs. The physical layer of the wireless device 5502 may send the BFI indication, for example, if the downlink radio link quality fails to satisfy the threshold, for example, in one or more frames and/or subframes. The wireless device 5502 may perform a BFR operation of the cell 5506, for example, jointly on two or more active BWPs (e.g., the BWP1 and the BWP2). The wireless device 5502 may initiate a random access procedure for BFR based on a number of the BFI indications equaling or exceeding a BWP-specific BFI counter (e.g., a beamFailureInstanceMaxCount).

The BWP-specific BFI counter may be configured for the cell 5506. The BWP-specific BFI counter may be configured for each BWP. The first BWP (e.g., BWP1) may be configured with a first BWP-specific BFI counter. The second BWP (e.g., BWP2) may be configured with a second BWP-specific BFI counter.

A BWP-specific BFI counter of an active BWP may be used in a BFR operation, for example, if one or more active BWPs are in the cell 5506. A maximum BWP-specific BFI counter of the one or more active BWPs may be used for a BFR operation, for example, if two or more active BWPs are in the cell 5506.

A minimum BWP-specific BFI counter of the two or more active BWPs may be used for a BFR operation, for example, if there are two or more active BWPs in the cell 5506. The minimum BWP-specific BFI counter may enable a faster BFR operation.

Figure 56:
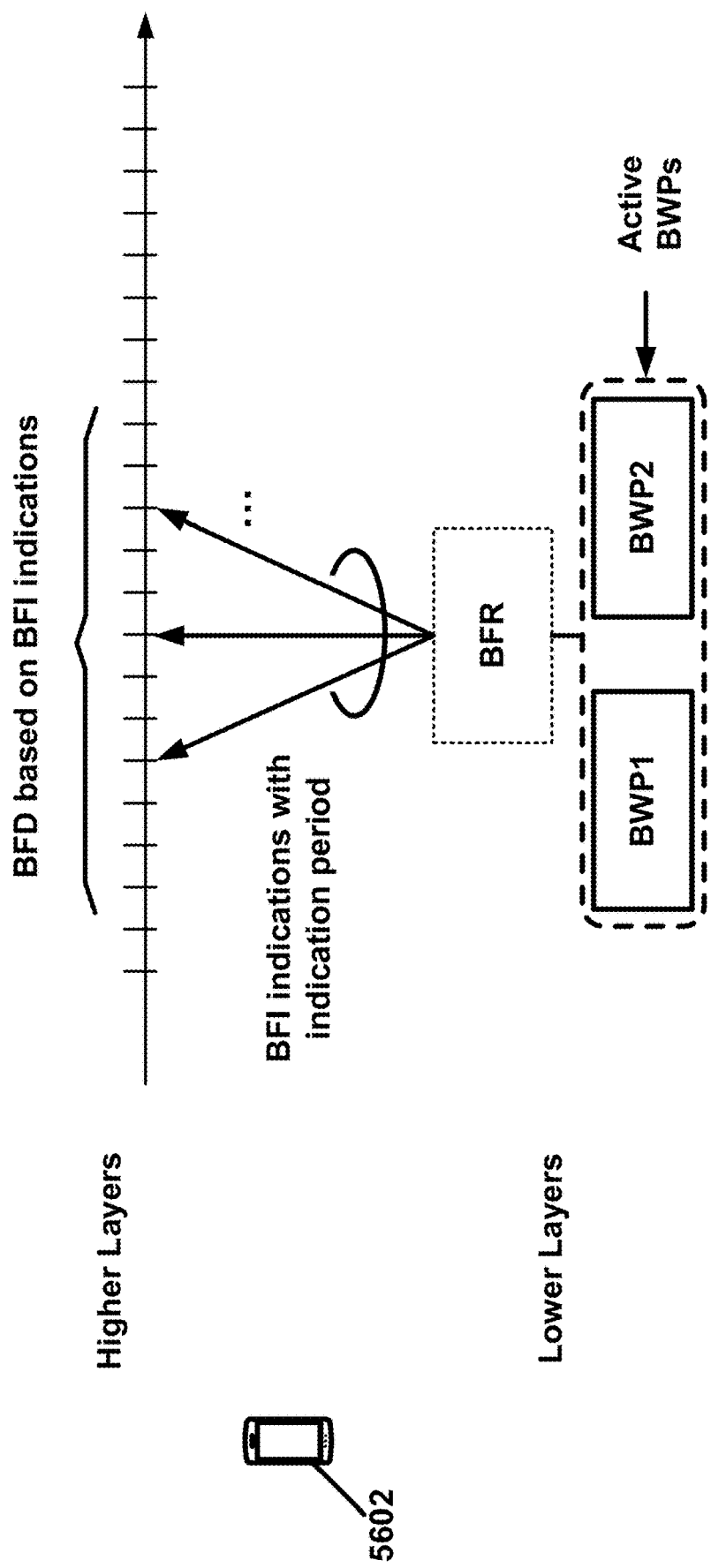
FIG. 56 shows an example of performing BFD jointly on two or more active BWPs.

FIG. 56 shows an example of performing BFD jointly on two or more active BWPs. A wireless device 5602 may perform the BFR operation jointly on BWP1 and BWP2, for example, using one or more frames and/or subframes 3602. The physical layer of the wireless device 5602 may send a BFI indication based on the BFR operation, for example, periodically (e.g., based on an indication period) on the one or more frames and/or subframes. The physical layer of the wireless device 5602 may perform the BFR operation based on one or more sets of RSs of BWP1 and BWP2. The physical layer of the wireless device 5602 may indicate the BFI indication to the higher layer of the wireless device 5602 (e.g., the MAC layer or the RRC layer). The higher layer of the wireless device 5602 may determine a beam failure based on a quantity of the BFI indications. The higher layer of the wireless device 5602 may determine a beam failure, for example, if the quantity of BFI indications equals or is greater than the BWP-specific BFI counter The physical layer of wireless device 5602 may send to the higher layer of the wireless device 5602 a BFI indication periodically (e.g., based on the indication period). The BFI indication may be based on a BFR operation on one or more sets of RSs of two or more active BWPs. Inefficiencies of providing a BFI indication to the higher layer of the wireless device 5602 may be reduced by performing the BFR operation on one or more sets of RSs of the two or more active BWPs. Inefficiencies of determining a beam failure may be reduced. A higher layer of the wireless device 5602 may reuse BFD resources to support one or more active BWPs in the cell, for example, by performing the BFR operation on the one or more sets of RSs of the two or more active BWPs.

A first downlink radio link quality on a first active BWP of the one or more active BWPs may be similar as a second downlink radio link quality on a second active BWP of the one or more active BWPs. Power consumption of the wireless device may be increased by performing a BFR operation on the one or more active BWPs independently or jointly.

Figure 57:
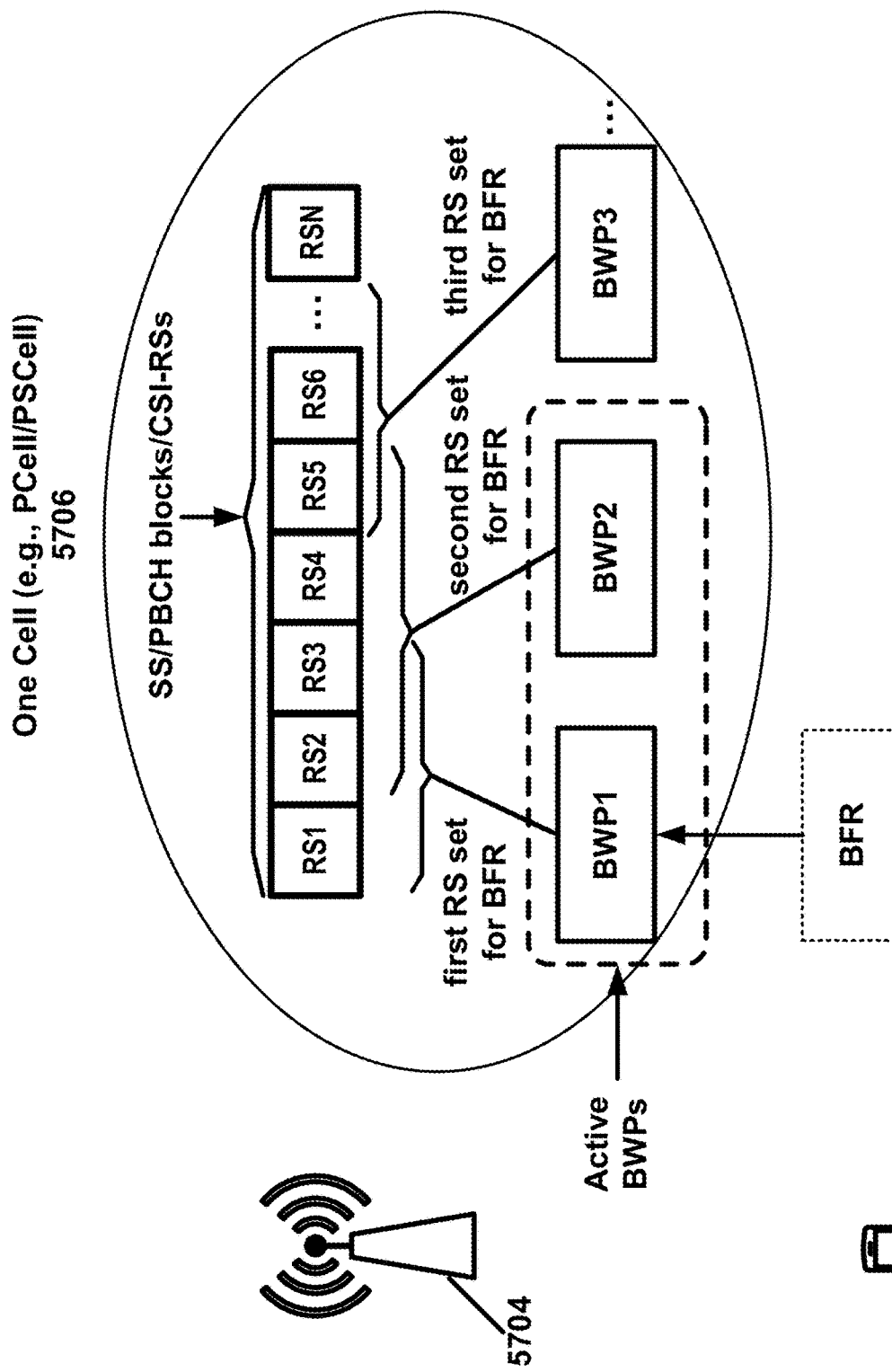
FIG. 57 shows an example configuration of two or more active BWPs and corresponding sets of resources for BFD.

FIG. 57 shows an example configuration of two or more active BWPs and corresponding sets of resources for BFD. BFD may be performed on a selected active BWP. A wireless device 5702 may perform BFD on the selected active BWP using reduced power consumption. The wireless device 5702 may use reduced power consumption, for example, by determining (e.g., selecting) the selected active BWP from two or more active BWPs and/or performing a BFR operation on the selected active BWP of the two or more active BWPs. A base station 5704 may send (e.g., transmit), to the wireless device 5702, one or more messages and/or data packets. The wireless device 5702 may receive the one or more messages and/or data packets. The one or more messages and/or data packets may comprise configuration parameters of a cell 5706. The cell 5706 may be a PCell. The cell 5706 may be a PSCell of an SCG, for example, if the cell 5706 comprise the SCG. The cell 5706 may be an SCell or any other cell type.

The configuration parameters may indicate the cell 5706 comprises one or more BWPs. The configuration parameters may indicate a set of resources (e.g., RSs) on at least one BWP of the one or more BWPs for a BFR operation. The set of resources may be indicated by a set of resources indexes. The set of resources may be a subset of one or more SS/PBCH blocks and/or one or more CSI-RS resources.

The one or more messages and/or data packets may indicate one or more thresholds comprising a first threshold for evaluating a downlink radio link quality of the cell. The first threshold may be cell specific (e.g., specific to the cell 5706). The first threshold may be BWP-specific. The one or more messages and/or data packets may indicate a first BWP-specific threshold associated with each BWP of the one or more BWPs.

The base station 5704 and/or the wireless device 5702 may activate two or more BWPs of the one or more BWPs (e.g., the BWP1 and the BWP2). Each of the two or more BWPs may be associated with a set of resources for BFR.

The wireless device may select an active BWP (e.g., a selected one active BWP) of the two or more BWPs based on one or more criteria. The wireless device may perform a BFR operation on the active BWP determined (e.g., selected) based on the one or more criteria. The one or more criteria may comprise at least one of: a BWP index; a numerology index; a service type; a BFR RSs configuration; and/or a PDCCH configuration.

Each of the two or more BWPs may be indicated by a BWP index. The wireless device 5702 may select the active BWP of the two or more BWPs with a lowest BWP index between the two or more BWPs. The wireless device 5702 may perform a BFR operation on the active BWP. The BWP with the lowest BWP index may be a BWP on which the wireless device 5702 receives system information. Monitoring on the BWP with the lowest BWP index may help maintain a non-interrupted link for receiving system information, for example, from base station 5704. The wireless device 5702 may select the active BWP with a highest BWP index of the two or more BWPs. The active BWP with the highest BWP index may be a BWP on which the wireless device 5702 receives urgent data packets. Monitoring on the active BWP with the highest BWP index may help maintain a non-interrupted link for receiving urgent data packets, for example, from the base station 5704.

Each of the two or more BWPs may be associated with a numerology index. The wireless device 5702 may select the active BWP of the two or more BWPs with a lowest numerology index between the two or more BWPs. The active BWP with the lowest numerology index may be a BWP on which the wireless device 5702 receives system information and/or paging. Monitoring on the active BWP with the lowest numerology index may help maintain robust link for receiving system information and/or paging, for example, from the base station 5704. The wireless device 5702 may select the active BWP of the two or more BWPs with a highest numerology index between the two or more BWPs. The wireless device may perform a BFR operation on the active BWP.

Each of the two or more BWPs may be associated with a BWP-specific beam failure maximum counter (e.g., a beamFailureInstanceMaxCount). The wireless device 5702 may select the active BWP of the two or more BWPs with a lowest BWP-specific beam failure maximum counter between the two or more BWPs. A BFR operation may be performed faster, based on the active BWP with the lowest BWP-specific beam failure maximum counter. A robust link with the base station 5704 may be faster, based on monitoring on the active BWP with the lowest BWP-specific beam failure maximum counter. The wireless device 5702 may select the active BWP of the two or more BWPs with a highest BWP-specific beam failure maximum counter between the two or more BWPs. The wireless device may perform a BFR operation on the determined (e.g., selected) BWP.

The base station 5704 may transmit a first type of service (e.g., eMBB) on a first active BWP of the two or more active BWPs. The base station 5704 may transmit a second type of service (e.g., MTC) on a second active BWP of the two or more active BWPs. The first type of service may be prioritized over the second type of service at the wireless device 5702. The wireless device 5702 may select the active BWP from the first active BWP and the second active BWP based on a type of service with a highest priority between the first type of service and the second type of service.

The first active BWP may be configured with BFR RSs. The second active BWP may lack a configuration with BFR RSs. The wireless device 5702 may select the active BWP to be the first active BWP that may be configured with BFR RSs. The first active BWP may be configured with PDCCH resources. The second active BWP may lack a configuration with PDCCH resources. The wireless device 5702 may select the active BWP to be the first active BWP that may be configured with PDCCH resources. The first active BWP may be configured with common search space for PDCCH monitoring. The second active BWP may lack a configuration with common search space for PDCCH monitoring. The wireless device may select the active BWP to be the first active BWP that may be configured with common search space.

The first active BWP may be a primary active BWP. The second active BWP may be a secondary active BWP. The wireless device 5702 may select the active BWP to be the primary active BWP. The wireless device may perform a BFR operation on the primary active BWP. The primary active BWP may be a BWP on which the wireless device 5702, for example: may perform an initial connection establishment procedure; may initiate a connection re-establishment procedure; and/or may monitor PDCCH candidates in one or more common search spaces for DCI formats with CRC scrambled by an SI-RNTI, an RA-RNTI, a TC-RNTI, a P-RNTI, an INT-RNTI, an SFI-RNTI, a TPC-PUSCH-RNTI, a TPC-PUCCH-RNTI, a TPC-SRS-RNTI, a CS-RNTI, an SP-CSI-RNTI, and/or a C-RNTI. The primary active BWP may be a BWP which may be maintained in an active state. The primary active BWP may be a BWP which may be maintained in an active state, for example, until switched to another BWP by an RRC message. The primary active BWP may be a first BWP in a licensed band. The secondary active BWP may be a second BWP in an unlicensed band. The primary active BWP may be a first BWP used with a first radio interface (e.g., a Uu interface between a base station and a wireless device). The secondary active BWP may be a second BWP used with a second radio interface (e.g., a sidelink interface between a first wireless device and a second wireless device).

The two or more active BWPs may be grouped into two active BWP groups. The wireless device 5702 may select a first active BWP from a first BWP group and a second active BWP from a second BWP group. The first BWP group may be in a low frequency (e.g., <6 GHz). The second BWP group may be in a high frequency (e.g., >6 GHz). The first BWP group may be in a licensed band. The second BWP group may be in an unlicensed band. The first active BWP and the second active BWP may be primary active BWPs. The wireless device 5702 may perform a BFR operation on the first active BWP and the second active BWP independently. Monitoring the first active BWP in the low frequency and the second active BWP in the high frequency may provide the higher layer of the wireless device 5702 more radio link information over a wide bandwidth.

The wireless device 5702 may perform a BFR operation on the active BWP (e.g., the active BWP determined (e.g., selected) from the two or more active BWPs). The BFR operation may comprise assessing downlink a radio link quality on the BWP, for example, determined (e.g., selected) based on one or more criteria. The downlink radio link quality may be assessed at least one time per indication period. Assessing downlink radio link quality on the determined (e.g., selected) active BWP may comprise evaluating the downlink radio link quality based on BFR RSs associated with the at least one BWP, over a time period, by comparison with the threshold. BWP1 may be associated with the first RS set for BFR (e.g., RS1, RS2, and RS3). BWP2 may be associated with the second RS set for BFR (e.g., RS2, RS3, RS4, and RS5). BWP3 may be associated with the third RS set for BFR (e.g., RS5, RS6, . . . RSN). BWP1 and BWP2 may be in an active state. The wireless device 5702 may select an active BWP from between BWP1 and BWP2 for a BFR operation, for example, based on the one or more criteria. The active BWP may be BWP1 based on the one or more criteria. The physical layer of the wireless device 5702 may assess a downlink radio link quality of the cell 5706 based on RS1, RS2 and RS3 of BWP1. The physical layer of the wireless device 5702 may assess the downlink radio link quality of the cell 5706 based on RS1, RS2 and RS3 of BWP1, over a time period, by comparison with the threshold.

Figure 58:
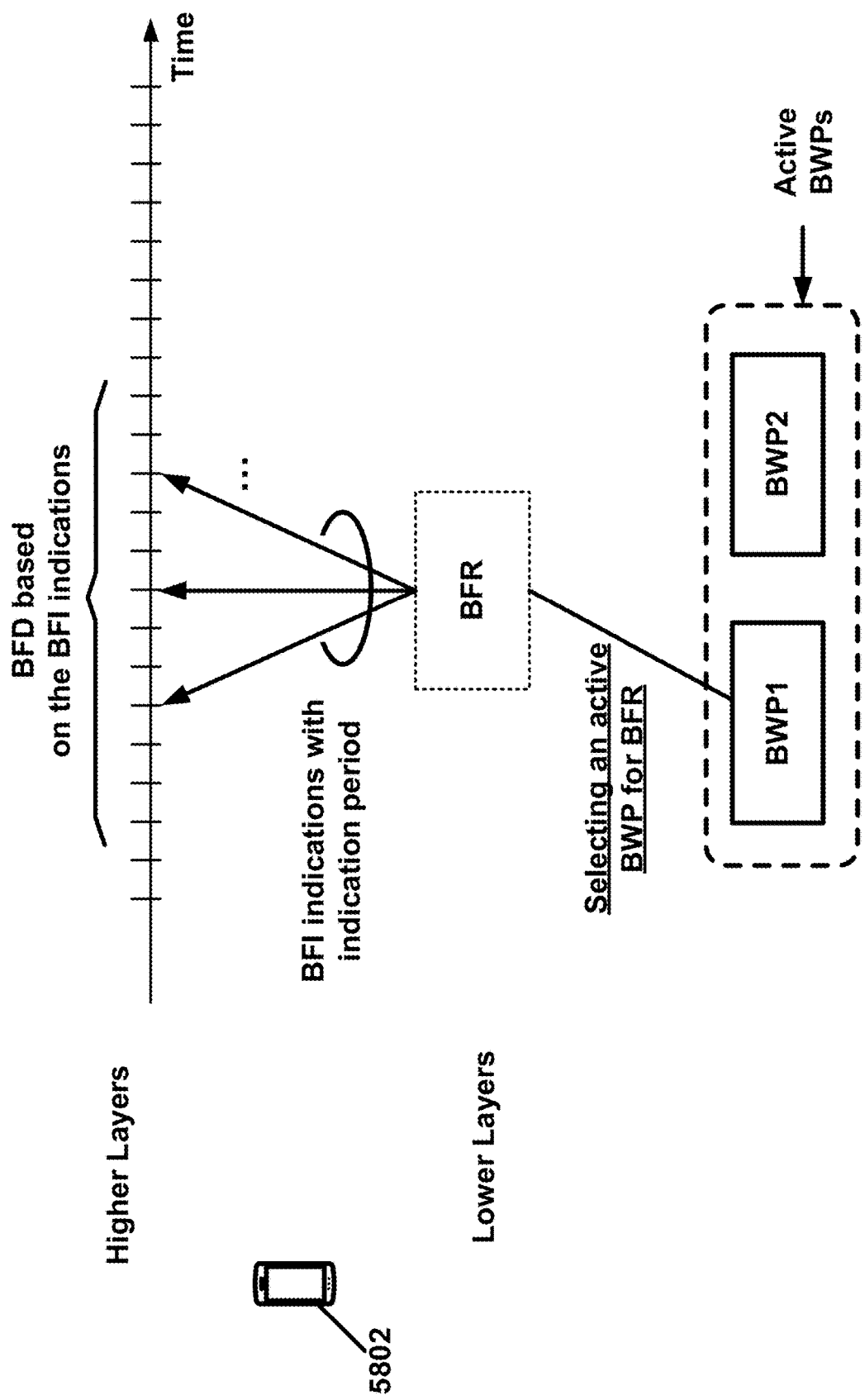
FIG. 58 shows an example of performing BFD on a selected active BWP.

FIG. 58 shows an example of performing BFD on a determined (e.g., selected) active BWP. BFD and/or BFR may be performed using one or more frames and/or subframes. A wireless device 5802 may select BWP1 to perform a BFR operation based on the one or more criteria. The physical layer of the wireless device 5802 may send a BFI indication via the higher layer of the wireless device 5802 based on the BFR operation periodically (e.g., based on an indication period) on the one or more frames and/or subframes.

The wireless device 5802 may determine a beam failure based on a first beam failure counter of the BWP1 being equal to or greater than a first value (e.g., a beamFailureInstanceMaxCount). The first number may be configured by RRC (e.g., by BeamFailureRecoveryConfig). The wireless device may initiate a random access procedure for a BFR based on the first beam failure counter being equal to or greater than the first number.

The wireless device 5802 may select an active BWP of the two or more active BWPs to perform a BFR operation. Inefficiencies of the BFR operation at the wireless device 5802 may be reduced by determining (e.g., selecting) an active BWP of two or more BWPs. Power consumption at the wireless device 5802 may be reduced by determining (e.g., selecting) the active BWP of the two or more BWPs for the BFR operation. Speed of the BFR operation at the wireless device 5802 may be increased by determining (e.g., selecting) the active BWP of the two or more active BWPs.

Figure 59:
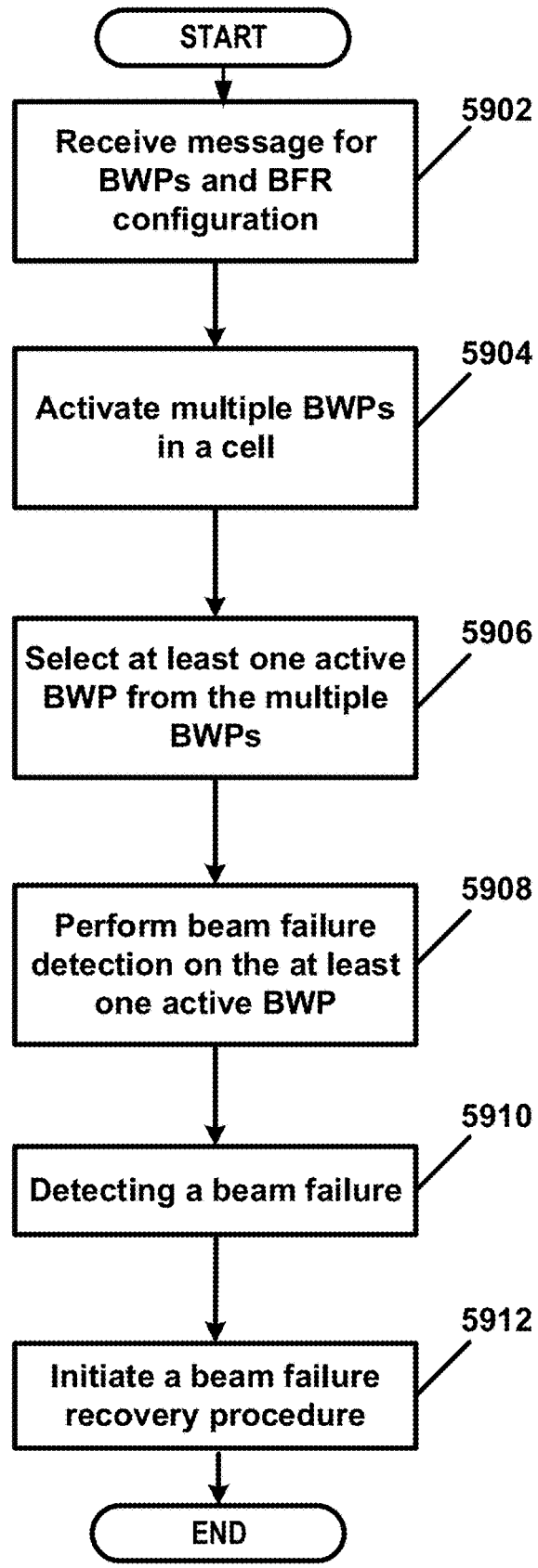
FIG. 59 shows an example method for determining a beam failure.

FIG. 59 shows an example method for determining a beam failure. At step 5902, a wireless device may receive one or more RRC messages. The one or more RRC messages may be received from a base station. The one or more RRC message may comprise configuration parameters of a cell. The cell may comprise one or more BWPs. Each BWP of the one or more BWPs may be indicated by a BWP-specific index. Each BWP of the one or more BWPs may be associated with one or more RSs, for example, for a BFR operation. The BFR operation may comprise at least one of a BFI indication, BFD, BFR request transmission, and/or BFR request response reception.

At step 5904, the wireless device may activate two or more BWPs of the one or more of BWPs. At step 5906, the wireless device may select a BWP of the two or more BWPs based on one or more criteria. At step 5908, the wireless device may perform the BFR operation based on the one or more RSs associated with the active BWP. At step 5910, the wireless device may determine a beam failure. The beam failure may be determined based on the BFR operation performed at step 5908. At step 5912, the wireless device may initiate a BFR procedure.

The one or more RRC messages received at step 5902 may indicate at least one of a first timer, a first counter, a second counter, a first threshold, and/or a second threshold for a BFR operation (e.g., the BFR operation performed at step 5908). Activating the two or more BWPs at step 5904 may comprise at least one of: activating a first BWP of the two or more BWPs at a first slot; and/or monitoring a first PDCCH of the first BWP based on activating the first BWP.

Activating the two or more BWPs at step 5904 may comprise at least one of: activating a second BWP of the two or more BWPs at a second slot; and/or monitoring a second PDCCH of the second BWP based on activating the second BWP. The wireless device may monitor the first PDCCH of the first BWP for the second BWP based on activating the second BWP, for example, if the second BWP lacks configuration with PDCCH resource.

The one or more criteria may be based on a value of a BWP-specific index. The determining (e.g., selecting) at step 5906 may comprise determining (e.g., selecting) a BWP with a lowest BWP-specific index between the two or more BWPs. The determining (e.g., selecting) at step 5906 may comprise determining (e.g., selecting) a BWP with a highest BWP-specific index between the two or more BWPs.

Each BWP of the one or more BWPs may be configured by (or may be associated with) a BWP-specific beam failure maximum counter (e.g., a beamFailureInstanceMaxCount). The one or more criteria may be based on a value of the BWP-specific beam failure maximum counter. The determining (e.g., selecting) at step 5906 may comprise determining (e.g., selecting) a BWP with a lowest BWP-specific beam failure maximum counter between the two or more BWPs. The determining (e.g., selecting) at step 5906 may comprise determining (e.g., selecting) a BWP with a highest BWP-specific beam failure maximum counter between the two or more BWPs.

The determining (e.g., selecting) at step 5906 may comprise determining (e.g., selecting) a BWP with a lowest numerology index between the two or more BWPs. The determining (e.g., selecting) at step 5906 may comprise determining (e.g., selecting) a BWP with a highest numerology index between the two or more BWPs.

The determining (e.g., selecting) at step 5906 may comprise determining (e.g., selecting) a primary active BWP from the two or more BWPs. The primary active BWP may be a BWP on which the wireless device may perform an initial connection establishment procedure, may initiate a connection re-establishment procedure, and/or may monitor PDCCH candidates in one or more common search spaces for DCI formats with CRC scrambled by an SI-RNTI, an RA-RNTI, a TC-RNTI, a P-RNTI, an INT-RNTI, an SFI-RNTI, a TPC-PUSCH-RNTI, a TPC-PUCCH-RNTI, a TPC-SRS-RNTI, a CS-RNTI, an SP-CSI-RNTI, and/or a C-RNTI.

Figure 60:
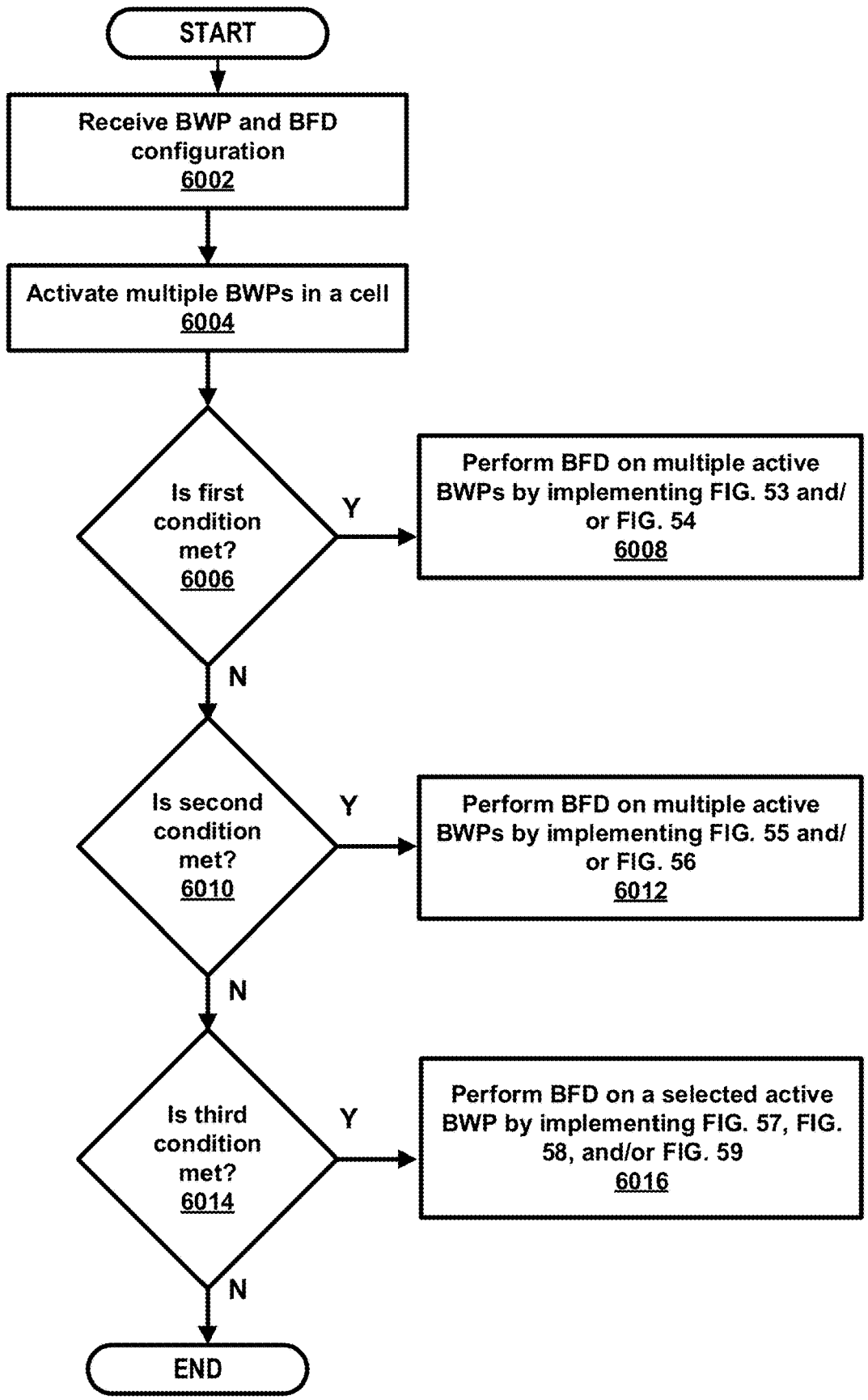
FIG. 60 shows an example method for a wireless device determining a beam failure.

FIG. 60 shows an example method for a wireless device determining a beam failure. A wireless device may autonomously determine a BFR operation. The wireless device may determine the BFR operation with two or more active BWPs configured in a cell. A base station may be unaware of the BFR operation determined by the wireless device. At step 6002, the wireless device may receive one or more messages and/or data packets. The one or more messages and/or data packets may comprise BWP configuration parameters. The one or more messages and/or data packets may comprise configuration parameters for BFD. At step 6004, two or more BWPs in the cell may be activated.

At step 6006, the wireless device may determine if a first condition is met. Determining if the first condition is met may comprise determining if all active BWPs are configured in an unlicensed band and/or if a speed of BFD is to be increased. Step 6008 may be performed if the first condition is met. At step 6008, the wireless device may perform BFD on the two or more active BWPs, for example, as shown in FIG. 53 and/or FIG. 54. Step 6010 may be performed if the first condition is not met.

At step 6010, the wireless device may determine if a second condition is met. Determining if the second condition is met may comprise determining if all active BWPs are configured in a licensed band and/or if a measurement accuracy of BFD may be improved and/or if a robustness of BFD may be improved. Step 6012 may be performed if the second condition is met. At step 6012, the wireless device may perform BFD on two or more active BWPs, for example, as shown in FIG. 55 and/or FIG. 56. Step 5014 may be performed if the second condition is not met.

At step 6014, the wireless device may determine if a third condition is met. Determining if the third condition is met may comprise determining if all active BWPs have a similar channel quality (e.g., operate intra-band). Step 6016 may be performed if the second condition is met. At step 6016, the wireless device may perform BFD on a determined (e.g., selected) active BWP, for example, as shown in FIG. 57, 58, and/or FIG. 59.

The steps shown in the method of FIG. 60 may be implemented in any order and are not limited to the order shown in FIG. 60. The wireless device may determine a BFR operation to perform on two or more active BWPs, for example, if the wireless device is capable of monitoring radio link quality on the two or more active BWPs. The wireless device may determine performing a BFR operation on an active BWP (e.g., jointly or independently), for example, if the wireless device is capable of monitoring radio link quality on the active BWP. The wireless device may autonomously select the active BWP from the two or more active BWPs.

A wireless device may be configured to perform some or all of the operations described herein. The wireless device may be similar to, or the same as, each of the wireless devices described herein, including, for example, wireless devices 3202, 3302, 3402, 3502, 3602, 3702, 3802, 4202, 4302, 4402, 4502, 4602, 4702, 4802, 5202, 5302, 5402, 5502, 5602, 5702, and 5802.

A wireless device may receive configuration parameters for a first bandwidth part (BWP) of a cell and for a second BWP of the cell, may activate the first BWP and the second BWP, may select, based on a first downlink control channel configuration of the first BWP and a second downlink control channel configuration of the second BWP, a BWP, of the first BWP and the second BWP, for radio link monitoring for the cell, may measure, during a time period that the first BWP and the second BWP are active, one or more reference signals associated with the determined (e.g., selected) BWP for the radio link monitoring for the cell, may determine, based on the measuring, a radio link failure for the cell, and/or may initiate, based on the radio link failure for the cell, a connection re-establishment procedure. The wireless device may determine the BWP for the radio link monitoring for the cell is further based on a first radio interface type on the first BWP and/or a second radio interface type on the second BWP. The first downlink control channel configuration of the first BWP and the at least a second downlink control channel configuration of the second BWP may comprise a first BWP index of the first BWP and a second BWP index of the second BWP, a first numerology index of the first BWP and a second numerology index of the second BWP, a first service type on the first BWP and a second service type on the second BWP, and/or a radio link monitoring reference signal configuration. The wireless device may initiate the connection re-establishment procedure by sending a preamble associated with a random access procedure. The wireless device may initiate the connection re-establishment procedure by determining (e.g., selecting) a new cell based on a cell selection procedure and/or by sending, based on the new cell, a preamble associated with a random access procedure. The one or more reference signals associated with the determined (e.g., selected) BWP may comprise at least one of a synchronization signal block and/or a channel state information reference signal. The configuration parameters may comprise a first reference signal associated with the first BWP and/or a second reference signal associated with the second BWP. The cell may a primary cell and/or a primary secondary cell. The BWP for the radio link monitoring of the cell may comprise be determined based on the determined (e.g., selected) BWP being configured with downlink control channel resources, the determined (e.g., selected) BWP being configured with a common search space set for downlink channel monitoring, and/or the determined (e.g., selected) BWP being configured with reference signals for radio link monitoring. The wireless device may monitor, based on the activating the first BWP, a first downlink control channel on the first BWP for first downlink control information indicating resource allocation of the first BWP and/or monitor, based on the activating the second BWP, a second downlink control channel on the second BWP for second downlink control information indicating resource allocation of the second BWP. The wireless device may determine whether a radio link quality of the cell for a time period satisfies a first threshold associated with a first block error rate and/or a second threshold associated with a second block error rate. The wireless device may determine at least one first indication, based on a radio link quality not satisfying a first threshold and/or at least one second indication, based on the radio link quality satisfying a second threshold. The wireless device may determine a radio link failure event has occurred, based on a first quantity of the at least one first indications and/or a radio link failure event has not occurred, based on a second quantity of the at least one second indications. The radio link failure may not be detected (e.g., the wireless device may refrain from detecting or not be able to detect the RLF), based on a BWP which may not be determined. The wireless device may determine the BWP by not selecting, among the first BWP and the second BWP, a BWP that is not configured with downlink control channel resources. The wireless device may determine the BWP by selecting, among the first BWP and the second BWP, a BWP that may be configured with a common search space set for downlink control channel monitoring. The wireless device may determine the BWP by not selecting, among the first BWP and the second BWP, a BWP that may not be configured with a common search space set for downlink control channel monitoring. The wireless device may determine the BWP by selecting, among the first BWP and the second BWP, a BWP configured with reference signals for radio link monitoring. The wireless device may determine the BWP by not selecting, among the first BWP and the second BWP, a BWP that may not be configured with reference signals for radio link monitoring. The wireless device may activate the first BWP and the second BWP by: activating the first BWP at a first time interval, and activating the second BWP at a second time interval. The wireless device may activate the first BWP based on or in response to receiving at least one of: a first command indicating an activation of the first BWP, or a second command indicating switching an active BWP to the first BWP. The wireless device may activate the second BWP based on or in response to receiving at least one of: a first command indicating an activation of the second BWP, or a second command indicating switching an active BWP to the second BWP. The wireless device may monitor, based on or in response to activating the second BWP, a downlink control channel on the second BWP for a downlink control information indicating resource allocation of the second BWP. The wireless device may detect the radio link failure for the cell based on a first quantity of the first indications. The first quantity may be configured in a radio resource control message. The wireless device may refrain from detecting (e.g., may not detect) the radio link failure for the cell based on a second quantity of the second indications. The second quantity may be configured in the radio resource control message A wireless device may receive configuration parameters for a first bandwidth part (BWP) of a cell and for a second BWP of the cell, may activate the first BWP and the second BWP, may select, based on a first radio interface type associated with the first BWP and a second radio interface type associated with the second BWP, a BWP, of the first BWP and the second BWP, for radio link monitoring for the cell, may measure, during a time period that the first BWP and the second BWP are active, one or more reference signals associated with the determined (e.g., selected) BWP for the radio link monitoring for the cell, may determine, based on the measuring, a radio link failure for the cell, and/or may initiate, based on the radio link failure for the cell, a connection re-establishment procedure. The first radio interface type associated with the first BWP may comprise an Uu radio interface between a base station and the wireless device and/or a sidelink radio interface between the wireless device and a second wireless device. The second radio interface type associated with the second BWP may comprise an Uu radio interface between a base station and the wireless device and/or a sidelink radio interface between the wireless device and a second wireless device. The wireless device may determine the BWP for the radio link monitoring for the cell is further based on the BWP comprising a Uu radio interface type. The wireless device may activate the first BWP and the second BWP by activating the first BWP at a first time interval and/or activating the second BWP at a second time interval, that at least partially overlaps with the first time interval. The wireless device may determine the BWP by refraining from selecting (e.g., not selecting), among the first BWP and the second BWP, a BWP without an Uu radio interface type. The wireless device may activate the first BWP and the second BWP by: activating the first BWP at a first time interval, and/or activating the second BWP at a second time interval.

A base station may send, to a wireless device that may receive, one or more messages comprising configuration parameters of a first bandwidth part (BWP) of a cell and a second BWP of the cell. The configuration parameters may indicate at least one of: first plurality of reference signals for/of the first BWP, and/or second plurality of reference signals for/of the second BWP. The wireless device may activate the first BWP and the second BWP. The wireless device may measure, for radio link monitoring of the cell, the first plurality of reference signals and the second plurality of reference signals. The wireless device may detect, based on the radio link monitoring, a radio link failure for the cell. The wireless device may initiate, in response to detecting the radio link failure, a connection re-establishment procedure.

A base station may send, to a wireless device that may receive, one or more messages comprising configuration parameters of a first bandwidth part (BWP) of a cell and a second BWP of the cell. The configuration parameters may indicate at least one of: a first plurality of reference signals associated with the first BWP, and/or a second plurality of reference signals associated with the second BWP. The wireless device may activate the first BWP and the second BWP. The wireless device may measure, for a first radio link monitoring for the cell, the first plurality of reference signals. The wireless device may measure, for a second radio link monitoring for the cell, the second plurality of reference signals. The wireless device may detect, based on the first radio link monitoring and the second radio link monitoring, a radio link failure for the cell. The wireless device may initiate, based on or in response to detecting the radio link failure, a connection re-establishment procedure.

A wireless device may receive configuration parameters for a first bandwidth part (BWP of a cell and for a second BWP of the cell, may activate activating the first BWP and the second BWP, may select, based on one or more criteria, a BWP for radio link monitoring for the cell, wherein the one or more criteria comprises a first BWP index of the first BWP and a second BWP index of the second BWP, a first numerology index of the first BWP and a second numerology index of the second BWP, a first service type on the first BWP and a second service type on the second BWP, and a radio link monitoring reference signal configuration, may measure, during a time period that the first BWP and the second BWP are active, one or more reference signals associated with the determined (e.g., selected) BWP, may determine, based on the measuring, a radio link failure for the cell, and/or may initiate, based the radio link failure for the cell, a connection re-establishment procedure. The wireless device may select the BWP for the radio link monitoring for the cell is further based on the determined (e.g., selected) BWP being configured with downlink control channel resources, the determined (e.g., selected) BWP being configured with a common search space set for downlink channel monitoring, and/or the determined (e.g., selected) BWP being configured with reference signals for radio link monitoring. The determined (e.g., selected) BWP may be configured with downlink control channel resources and/or a common search space for downlink control channel monitoring. The configuration parameters may indicate a first reference signal associated with the first BWP and a second reference signal associated with the second BWP.

A wireless device may receive one or more configuration parameters of a cell, may activate activating at least two downlink bandwidth parts (BWPs) of a plurality of downlink BWPs for the cell, wherein each of the plurality of downlink BWPs is associated with a respective set of one or more reference signals for beam failure detection, may measure, for beam failure detection, the respective set of one or more reference signals of a first downlink BWP of the plurality of downlink BWPs, and/or may determine, based on the measuring, a beam failure for the at least two downlink BWPs. The one or more configuration parameters may indicate a first set of one or more reference signals for a beam failure detection associated with the first downlink BWP and/or a second set of one or more reference signals for a beam failure detection associated with a second downlink BWP of the at least two downlink BWPs. The wireless device may measure the respective sets of one or more reference signals associated with first the downlink BWP is based on the activating the least two downlink BWPs for the cell. The wireless device may determine the beam failure for the at least two downlink BWPs is based on a beam failure detection of a first downlink BWP of the at least two downlink BWPs and/or a beam failure detection of a second downlink BWP of the at least two downlink BWPs. The plurality of downlink BWPs may be in one of an active state and an inactive state. An active state of a first downlink BWP of the at least two downlink BWPs may comprise monitoring a downlink control channel of the first downlink BWP. Each of the plurality of downlink BWPs may be associated with a BWP-specific index. The wireless device may determine the first downlink BWP, of the at least two downlink BWPs, based on a BWP-specific index among at least two BWP-specific indexes associated with the at least two downlink BWPs, a determination that the first downlink BWP is a primary BWP, a BWP-specific numerology, a BWP-specific beam failure counter, and/or a BWP-specific type of service. The wireless device may determine a downlink BWP, of the at least two downlink BWPs, that is a primary BWP. The wireless device may measure the respective set of one or more reference signals associated with the first downlink BWP by determining whether a radio link quality of the respective set of one or more reference signals associated with the first downlink BWP satisfies a threshold. The wireless device may determine the beam failure for the at least two downlink BWPs is further based on the radio link quality not satisfying the threshold. The wireless device may refrain from performing (e.g., may not perform) beam failure detection by measuring the respective set of one or more reference signals of a second downlink BWP of the at least two downlink BWPs. The second downlink BWP may be different from the downlink BWP. The inactive state of a first downlink BWP may comprise refraining from monitoring (e.g., not monitoring) a downlink control channel of the first downlink BWP. The wireless device may activate the at least two downlink BWPs by: activating a first downlink BWP of the at least two downlink BWPs in a first slot, and/or activating a second downlink BWP of the at least two downlink BWPs in a second slot. The wireless device may determine the downlink BWP by determining a downlink BWP with a highest BWP specific index among at least two BWP specific indexes of the at least two downlink BWPs. Each of the plurality of downlink BWPs may be associated with a BWP specific numerology. The wireless device may determine a downlink BWP by determining a downlink BWP with a lowest BWP specific numerology among at least two BWP specific numerologies of the at least two downlink BWPs. The wireless device may determine a downlink BWP by determining a downlink BWP with a highest BWP specific numerology among at least two BWP specific numerologies of the at least two downlink BWPs. Each of the plurality of downlink BWPs may be associated with a BWP specific beam failure counter. The wireless device may determine the downlink BWP by determining a downlink BWP with a lowest BWP specific beam failure counter among at least two BWP specific beam failure counters of the at least two downlink BWPs. The wireless device may determine the downlink BWP by determining a downlink BWP with a highest BWP specific beam failure counter among at least two BWP specific beam failure counters of the at least two downlink BWPs. Each of the plurality of downlink BWPs may be associated with a BWP specific type of service. The wireless device may determine the downlink BWP by determining a downlink BWP with a BWP specific type of service having a highest priority among at least two BWP specific type of services of the at least two downlink BWPs.

A wireless device may receive one or more configuration parameters for a first downlink bandwidth part (BWP) of a cell and for a second downlink BWP of the cell. The or more configuration parameters may indicate a first set of one or more reference signals for a beam failure detection associated with the first downlink BWP and/or a second set of one or more reference signals for a beam failure detection associated with the second downlink BWP, may activate the first downlink BWP and the second downlink BWP, may measure, for beam failure detection and based on the activating, the first set of one or more reference signals and the second set of one or more reference signals, and/or may determine, based on the measuring, a beam failure for the cell. Each of the first downlink BWP and the second downlink BWP may be in one of an active state and an inactive state. An active state of the first downlink BWP may comprise monitoring a downlink control channel of the first downlink BWP. Each of the first downlink BWP and the second downlink BWP may be associated with a BWP-specific index. The wireless device may determine the beam failure for the cell is further based on a radio link quality not satisfying a threshold.

A wireless device may receive one or more configuration parameters for a first downlink bandwidth part (BWP) of a cell and/or for a second downlink BWP of the cell. The one or more configuration parameters may indicate a first set of one or more reference signals for a beam failure detection associated with the first downlink BWP and/or a second set of one or more reference signals for a beam failure detection associated with the second downlink BWP. The wireless device may activate the first downlink BWP and the second downlink BWP, and based on the activating, perform beam failure detection of the cell that may comprise beam failure detection of the first downlink BWP and/or the beam failure detection associated with the second downlink BWP. The wireless device may determine, based on the beam failure detection of the cell, an instance of a beam failure for the cell. Each of the first downlink BWP and the second downlink BWP may be in one of an active state and an inactive state. An active state of the first downlink BWP may comprise monitoring a downlink control channel of the first downlink BWP. Each of the first downlink BWP and the second downlink BWP is associated with a BWP-specific index.

Figure 61:
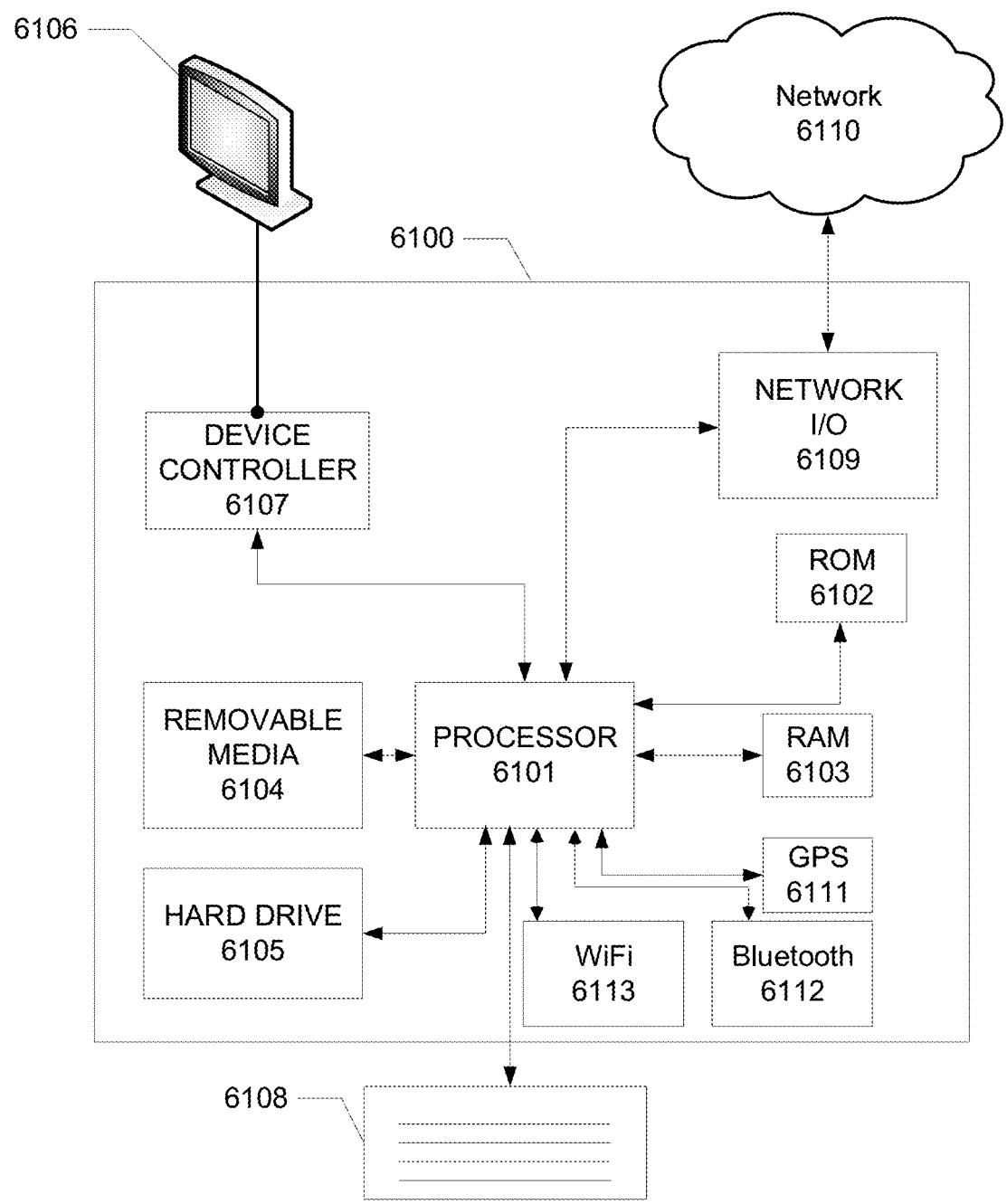
FIG. 61 shows example elements of a computing device that may be used to implement any of the various devices described herein.

FIG. 61 shows example elements of a computing device that may be used to implement any of the various devices described herein, including, e.g., the base station 120A and/or 120B, the wireless device 110 (e.g., 110A and/or 110B), or any other base station, wireless device, or computing device described herein. The computing device 6100 may include one or more processors 6101, which may execute instructions stored in the random access memory (RAM) 6103, the removable media 6104 (such as a Universal Serial Bus (USB) drive, compact disk (CD) or digital versatile disk (DVD), or floppy disk drive), or any other desired storage medium. Instructions may also be stored in an attached (or internal) hard drive 6105. The computing device 6100 may also include a security processor (not shown), which may execute instructions of one or more computer programs to monitor the processes executing on the processor 6101 and any process that requests access to any hardware and/or software components of the computing device 6100 (e.g., ROM 6102, RAM 6103, the removable media 6104, the hard drive 6105, the device controller 6107, a network interface 6109, a GPS 6111, a Bluetooth interface 6112, a WiFi interface 6113, etc.). The computing device 6100 may include one or more output devices, such as the display 6106 (e.g., a screen, a display device, a monitor, a television, etc.), and may include one or more output device controllers 6107, such as a video processor. There may also be one or more user input devices 6108, such as a remote control, keyboard, mouse, touch screen, microphone, etc. The computing device 6100 may also include one or more network interfaces, such as a network interface 6109, which may be a wired interface, a wireless interface, or a combination of the two. The network interface 6109 may provide an interface for the computing device 6100 to communicate with a network 6110 (e.g., a RAN, or any other network). The network interface 6109 may include a modem (e.g., a cable modem), and the external network 6110 may include communication links, an external network, an in-home network, a provider's wireless, coaxial, fiber, or hybrid fiber/coaxial distribution system (e.g., a DOCSIS network), or any other desired network. Additionally, the computing device 6100 may include a location-detecting device, such as a global positioning system (GPS) microprocessor 6111, which may be configured to receive and process global positioning signals and determine, with possible assistance from an external server and antenna, a geographic position of the computing device 6100.

The example in FIG. 61 may be a hardware configuration, although the components shown may be implemented as software as well. Modifications may be made to add, remove, combine, divide, etc. components of the computing device 6100 as desired. Additionally, the components may be implemented using basic computing devices and components, and the same components (e.g., processor 6101, ROM storage 6102, display 6106, etc.) may be used to implement any of the other computing devices and components described herein. For example, the various components described herein may be implemented using computing devices having components such as a processor executing computer-executable instructions stored on a computer-readable medium, as shown in FIG. 61. Some or all of the entities described herein may be software based, and may co-exist in a common physical platform (e.g., a requesting entity may be a separate software process and program from a dependent entity, both of which may be executed as software on a common computing device).

The disclosed mechanisms herein may be performed if certain criteria are met, for example, in a wireless device, a base station, a radio environment, a network, a combination of the above, and/or the like. Example criteria may be based on, for example, wireless device and/or network node configurations, traffic load, initial system set up, packet sizes, traffic characteristics, a combination of the above, and/or the like. If the one or more criteria are met, various examples may be used. It may be possible to implement examples that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. A base station communicating with a plurality of wireless devices may refer to base station communicating with a subset of the total wireless devices in a coverage area. Wireless devices referred to herein may correspond to a plurality of wireless devices of a particular LTE or 5G release with a given capability and in a given sector of a base station. A plurality of wireless devices may refer to a selected plurality of wireless devices, and/or a subset of total wireless devices in a coverage area. Such devices may operate, function, and/or perform based on or according to drawings and/or descriptions herein, and/or the like. There may be a plurality of base stations or a plurality of wireless devices in a coverage area that may not comply with the disclosed methods, for example, because those wireless devices and/or base stations perform based on older releases of LTE or 5G technology.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device.

The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
receiving, by a wireless device, an indication to activate a first downlink bandwidth part (BWP) for a cell and a second downlink BWP for the cell;
determining a radio link failure for the cell during a time period in which the wireless device performs measurements of one or more reference signals associated with the first downlink BWP; and
based on the determined radio link failure for the cell based on the measurements of the one or more reference signals associated with the first downlink BWP, sending one or more messages associated with connection re-establishment.

2. The method of claim 1, wherein the one or more reference signals associated with the first downlink BWP comprises at least one of:
a synchronization signal block; or
a channel state information reference signal.

3. The method of claim 1, wherein the one or more messages associated with connection re-establishment comprises at least one of:
a preamble associated with a random access procedure;
a RRC connection message;
a RRC reconnection message; or
a handover request.

4. The method of claim 1, further comprising:
monitoring a first downlink control channel on the first downlink BWP for first downlink control information indicating resource allocation of the first downlink BWP.

5. The method of claim 1, wherein the determining the radio link failure for the cell comprises at least one of:
determining that a radio link quality of the cell for a time period satisfies a first threshold associated with a block error rate; or
determining a radio link failure event based on a quantity of at least one indication satisfying a second threshold.

6. The method of claim 1, further comprising:
receiving a downlink control channel configuration of the first downlink BWP; and measuring the first downlink BWP based on the downlink control channel configuration.

7. The method of claim 1, further comprising:
measuring the first downlink BWP based on a radio interface type associated with the first downlink BWP.

8. The method of claim 7, wherein the determining the first downlink BWP is further based on at least one of:
a downlink control channel configuration of the second downlink BWP;
a first radio interface type on the first downlink BWP; or
a second radio interface type on the second downlink BWP.

9. A method comprising:
during a time period in which a first downlink bandwidth part (BWP) of a cell and a second downlink BWP of the cell are both active and the first downlink BWP, but not the second downlink BWP, is being measured, determining, by a wireless device, a radio link failure for the cell based on measurements of the first downlink BWP; and
based on the determined radio link failure for the cell, sending one or more messages associated with connection re-establishment.

10. The method of claim 9, wherein the one or more messages associated with connection re-establishment comprises at least one of:
a preamble associated with a random access procedure;
a RRC connection message;
a RRC reconnection message; or
a handover request.

11. The method of claim 9, further comprising:
monitoring a first downlink control channel on the first downlink BWP for first downlink control information indicating resource allocation of the first downlink BWP.

12. The method of claim 9, wherein the determining the radio link failure for the cell comprises at least one of:
determining that a radio link quality of the cell for a time period satisfies a first threshold associated with a block error rate; or
determining a radio link failure event based on a quantity of at least one indication satisfying a second threshold.

13. The method of claim 9, further comprising:
receiving a downlink control channel configuration of the first downlink BWP; and
measuring the first downlink BWP based on the downlink control channel configuration.

14. The method of claim 9, further comprising:
measuring the first downlink BWP based on a radio interface type associated with the first downlink BWP.

15. A wireless device comprising:
one or more processors; and
memory storing instructions that, when executed by the one or more processors, cause the wireless device to:
receive an indication to activate a first downlink bandwidth part (BWP) for a cell and a second downlink BWP for the cell;
determine a radio link failure for the cell during a time period in which the wireless device performs measurements of one or more reference signals associated with the first downlink BWP; and
send, based on the determined radio link failure for the cell based on the measurements of the one or more reference signals associated with the first downlink BWP, one or more messages associated with connection re-establishment.

16. The wireless device of claim 15, wherein the one or more reference signals associated with the first downlink BWP comprises at least one of:
a synchronization signal block; or
a channel state information reference signal.

17. The wireless device of claim 15, wherein the one or more messages associated with connection re-establishment comprises at least one of:
a preamble associated with a random access procedure;
a RRC connection message;
a RRC reconnection message; or
a handover request.

18. The wireless device of claim 15, wherein the instructions, when executed by the one or more processors, cause the wireless device to:
monitor a first downlink control channel on the first downlink BWP for first downlink control information indicating resource allocation of the first downlink BWP.

19. The wireless device of claim 15, wherein the instructions, when executed by the one or more processors, cause the wireless device to determine the radio link failure for the cell based on at least one of:
determining that a radio link quality of the cell for a time period satisfies a first threshold associated with a block error rate; or
determining a radio link failure event based on a quantity of at least one indication satisfying a second threshold.

20. The wireless device of claim 15, wherein the instructions, when executed by the one or more processors, cause the wireless device to:
receive a downlink control channel configuration of the first downlink BWP; and
measure the first downlink BWP based on the downlink control channel configuration.

21. The wireless device of claim 15, wherein the instructions, when executed by the one or more processors, cause the wireless device to measure the first downlink BWP based on a radio interface type associated with the first downlink BWP.

22. The wireless device of claim 21, wherein the instructions, when executed by the one or more processors, cause the wireless device to determine the first downlink BWP further based on at least one of:
a downlink control channel configuration of the second downlink BWP;
a first radio interface type on the first downlink BWP; or
a second radio interface type on the second downlink BWP.

23. A wireless device comprising:
one or more processors; and
memory storing instructions that, when executed by the one or more processors, cause the wireless device to:
determine, during a time period in which a first downlink bandwidth part (BWP) of a cell and a second downlink BWP of the cell are both active and the first downlink BWP, but not the second downlink BWP, is being measured, a radio link failure for the cell based on measurements of the first downlink BWP; and
send, based on the determined radio link failure for the cell, one or more messages associated with connection re-establishment.

24. The wireless device of claim 23, wherein the one or more messages associated with connection re-establishment comprises at least one of:
a preamble associated with a random access procedure;

a RRC connection message;

a RRC reconnection message; or a handover request.

25. The wireless device of claim 23, wherein the instructions, when executed by the one or more processors, cause the wireless device to monitor a first downlink control channel on the first downlink BWP for first downlink control information indicating resource allocation of the first downlink BWP.

26. The wireless device of claim 23, wherein the instructions, when executed by the one or more processors, cause the wireless device to determine the radio link failure for the cell based on at least one of:

determining that a radio link quality of the cell for a time period satisfies a first threshold associated with a block error rate; or determining a radio link failure event based on a quantity of at least one indication satisfying a second threshold.

27. The wireless device of claim 23, wherein the instructions, when executed by the one or more processors, cause the wireless device to:

receive a downlink control channel configuration of the first downlink BWP; and measure the first downlink BWP based on the downlink control channel configuration.

28. The wireless device of claim 23, wherein the instructions, when executed by the one or more processors, cause the wireless device to measure the first downlink BWP based on a radio interface type associated with the first downlink BWP.

* * * * *

UNITED STATES PATENT AND TRADEMARK OFFICE
CERTIFICATE OF CORRECTION

PATENT NO. : 11,672,043 B2
APPLICATION NO. : 17/894263
DATED : June 6, 2023
INVENTOR(S) : Zhou et al.

It is certified that error appears in the above-identified patent and that said Letters Patent is hereby corrected as shown below:

On the Title Page

In the List of References

Other Publications, Page 2, Column 1, Line 18:
Delete "Bsues" and insert --issues--

Other Publications, Page 2, Column 2, Line 11:
Delete "ncorporated," and insert --Incorporated,--

Other Publications, Page 2, Column 2, Line 65:
Delete "JL" and insert --UL--

Other Publications, Page 3, Column 1, Line 39:
Delete "Croup" and insert --Group--

Other Publications, Page 3, Column 2, Line 2:
Delete "an" and insert --on--

Other Publications, Page 3, Column 2, Line 72:
Delete "DOCOMO,Inc.," and insert --DOCOMO, Inc.,--

Other Publications, Page 3, Column 2, Line 72:
Delete "Remaing" and insert --Remaining--

Other Publications, Page 4, Column 2, Line 9:
Delete "Remaing" and insert --Remaining--

Signed and Sealed this
Nineteenth Day of August, 2025

Coke Morgan Stewart
*Acting Director of the United States Patent and Trademark Office*

CERTIFICATE OF CORRECTION (continued)
U.S. Pat. No. 11,672,043 B2

In the Specification

Detailed Description, Column 15, Line 23:
After "channel", insert --.--

Detailed Description, Column 37, Line 7:
After "layer", insert --.--

Detailed Description, Column 49, Line 45:
Delete "(HOT)," and insert --(IIOT),--

Detailed Description, Column 49, Line 47:
Delete "(HOT)," and insert --(IIOT),--

Detailed Description, Column 49, Line 49:
Delete "(HOT)," and insert --(IIOT),--

Detailed Description, Column 50, Line 6:
Delete "(HOT)," and insert --(IIOT),--

Detailed Description, Column 54, Line 7:
After "manner", insert --.--

Detailed Description, Column 54, Line 34:
Delete "2-3." and insert --2_3.--

Detailed Description, Column 88, Line 46:
Delete "3310" and insert --4304--

Detailed Description, Column 90, Line 25:
Delete "3312" and insert --4306--

Detailed Description, Column 90, Line 27:
After "running", insert --.--

Detailed Description, Column 93, Line 53:
After "jointly", insert --.--

Detailed Description, Column 121, Line 37:
Delete "Lab VIEWMathScript." and insert --LabVIEWMathScript.--

Detailed Description, Column 122, Lines 18-19:
After "manner", insert --.--